US012556859B2

(12) United States Patent
Zhang et al.

(10) Patent No.: US 12,556,859 B2
(45) Date of Patent: Feb. 17, 2026

(54) HEADPHONES

(71) Applicant: SHENZHEN SHOKZ CO., LTD., Guangdong (CN)

(72) Inventors: Lei Zhang, Shenzhen (CN); Junjiang Fu, Shenzhen (CN); Zhen Wang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 148 days.

(21) Appl. No.: 18/617,606

(22) Filed: Mar. 26, 2024

(65) Prior Publication Data

US 2024/0236555 A1 Jul. 11, 2024

Related U.S. Application Data

(63) Continuation of application No. PCT/CN2022/101273, filed on Jun. 24, 2022.

(51) Int. Cl.
*H04R 1/28* (2006.01)
*H04R 1/10* (2006.01)
*H04R 1/34* (2006.01)

(52) U.S. Cl.
CPC ........... *H04R 1/288* (2013.01); *H04R 1/1008* (2013.01); *H04R 1/1075* (2013.01); *H04R 1/2811* (2013.01); *H04R 1/345* (2013.01)

(58) Field of Classification Search
CPC ........ H04R 1/347; H04R 1/1016; H04R 5/02; H04R 1/38; H04R 1/10; H04R 2203/12; H04R 1/40; H04R 25/407
See application file for complete search history.

(56) References Cited

U.S. PATENT DOCUMENTS

2013/0266170 A1 10/2013 Yamagishi
2015/0023515 A1 1/2015 Reimert
(Continued)

FOREIGN PATENT DOCUMENTS

CN 106101956 A 11/2016
CN 214708008 U 11/2021
(Continued)

OTHER PUBLICATIONS

Notice of Reasons for Rejection in Japanese Application No. 2024532563 mailed on Jun. 3, 2025, 10 pages.
(Continued)

*Primary Examiner* — Kile O Blair
(74) *Attorney, Agent, or Firm* — METIS IP LLC

(57) ABSTRACT

Embodiments of the present disclosure disclose a headphone including a first acoustic wave generation structure, a second acoustic wave generation structure, an acoustic transmission structure, and a filtering structure. The first acoustic wave generation structure and the second acoustic wave generation structure respectively generate a first acoustic wave and a second acoustic wave. The acoustic transmission structure may be configured to transmit the first acoustic wave and the second acoustic wave to a spatial point outside the headphone. The first acoustic wave transmitted to the spatial point interferes with the second acoustic wave transmitted to the spatial point in a first frequency range, and the interference reduces an amplitude of the first acoustic wave in the first frequency range. The filtering structure may be configured to reduce an amplitude of an acoustic wave generated by the headphone in a second frequency range at the spatial point.

20 Claims, 50 Drawing Sheets

(56) References Cited

U.S. PATENT DOCUMENTS

| | | | |
|---|---|---|---|
| 2019/0052954 A1* | 2/2019 | Rusconi Clerici Beltrami ........... G10K 11/26 | |
| 2021/0067857 A1 | 3/2021 | Struzik | |
| 2021/0219074 A1 | 7/2021 | Zhang et al. | |
| 2022/0014849 A1 | 1/2022 | Christiansen | |
| 2022/0070570 A1 | 3/2022 | Zhang et al. | |

FOREIGN PATENT DOCUMENTS

| | | | |
|---|---|---|---|
| JP | H08185189 | A | 7/1996 |
| JP | 2004341470 | A | 12/2004 |
| JP | 2007047560 | A | 2/2007 |
| WO | 2022020122 | A1 | 1/2022 |

OTHER PUBLICATIONS

The Extended European Search Report in European Application No. 22947427.5 mailed on Nov. 25, 2024, 11 pages.
International Search Report in PCT/CN2022/101273 mailed on Mar. 9, 2023, 6 pages.
Written Opinion in PCT/CN2022/101273 mailed on Mar. 9, 2023, 5 pages.

* cited by examiner

HEADPHONES

CROSS-REFERENCE TO RELATED APPLICATION

This application is a continuation of International Application No. PCT/CN2022/101273, filed on Jun. 24, 2022, the contents of which are hereby incorporated by reference.

TECHNICAL FIELD

The present disclosure relates to the field of acoustics, and in particular, to headphones.

BACKGROUND

A headphone is a portable audio output device that enables sound conduction. In order to solve the problem of sound leakage in the headphone, two or more acoustic sources are usually utilized to emit two sound signals of opposite phases. In the far field, the difference in acoustic paths from the two acoustic sources of opposite phases to a point in the far field is essentially negligible such that the two sound signals may cancel each other out to reduce far-field sound leakage. This method can reduce the sound leakage to a certain extent, but there are still some limitations. For example, since a wavelength of a high-frequency sound leakage is relatively short, a distance between the two acoustic sources is non-negligible compared to the wavelength of the high-frequency sound leakage, causing the sound signals emitted by the two acoustic sources to be unable to cancel out in the far field. As another example, when the acoustic transmission structure of the headphone resonates, there is a difference between a phase of the sound signal that is actually radiated at an outlet of the headphone and an original phase of an acoustic wave generation position, which also causes the two sound signals to be unable to cancel out, making it difficult to ensure the sound leakage reduction effect at high frequency in the far field.

Therefore, it is desirable to provide headphones that reduce the sound leakage.

SUMMARY

Embodiments of the present disclosure provide a headphone including a first acoustic wave generation structure and a second acoustic wave generation structure. The first acoustic wave generation structure and the second acoustic wave generation structure may respectively generate a first acoustic wave and a second acoustic wave. The first acoustic wave may have a phase difference with the second acoustic wave, and the phase difference may be within a range of 120°-240°. The headphone may also include an acoustic transmission structure and a filtering structure. The acoustic transmission structure may be configured to transmit the first acoustic wave and the second acoustic wave to a spatial point outside the headphone. The first acoustic wave transmitted to the spatial point may interfere with the second acoustic wave transmitted to the spatial point in a first frequency range, and the interference may reduce an amplitude of the first acoustic wave in the first frequency range. The filtering structure may be configured to reduce an amplitude of an acoustic wave generated by the headphone in a second frequency range at the spatial point.

Embodiments of the present disclosure provide a headphone including a first acoustic wave generation structure, an acoustic transmission structure, and a filtering structure.

The acoustic transmission structure may be configured to transmit a first acoustic wave generated by the first acoustic wave generation structure to a spatial point outside the headphone. The first acoustic wave may generate a resonance having a resonant frequency under an action of the acoustic transmission structure. The filtering structure may be configured to absorb, in a target frequency range, the first acoustic wave transmitted through the acoustic transmission structure to reduce an amplitude of an acoustic wave generated by the headphone at the spatial point. The target frequency range may include the resonant frequency.

Embodiments of the present disclosure provide a headphone including a loudspeaker, a housing, and a filtering structure. The housing may be configured to accommodate the loudspeaker and may include a first sound guiding hole and a second sound guiding hole acoustically connected with the loudspeaker, respectively. The loudspeaker may output an acoustic wave with a phase difference through the first sound-guiding hole and the second sound guiding hole. The filtering structure may be provided in an acoustic transmission structure between the first sound guiding hole or the second sound guiding hole and the loudspeaker, and may be configured to absorb an acoustic wave in a target frequency range. The target frequency range may be within a range from 1 kHz to 10 KHz.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
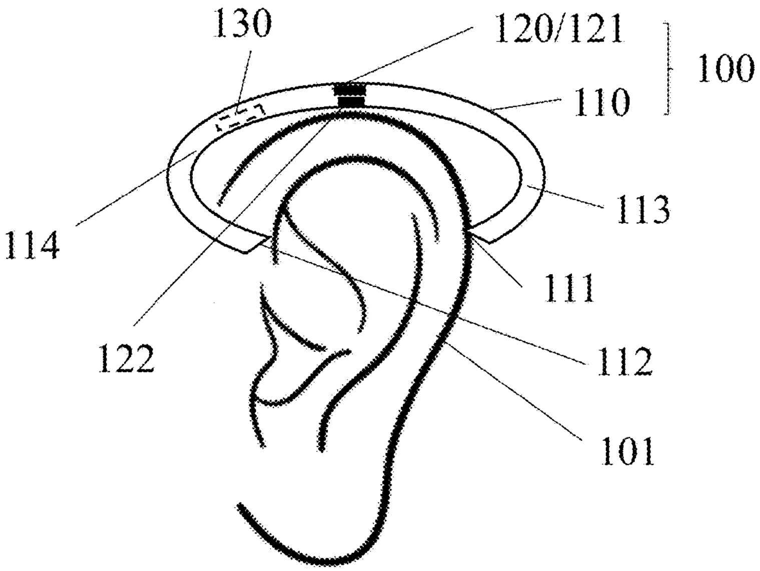
FIG. 1 is a schematic diagram illustrating an exemplary structure of an open-ear headphone according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that “system”, “device”, “unit” and/or “module” as used herein is a manner used to distinguish different components, elements, parts, sections, or assemblies at different levels. However, if other words serve the same purpose, the words may be replaced by other expressions.

As shown in the present disclosure and claims, the words “one”, “a”, “a kind” and/or “the” are not especially singular but may include the plural unless the context expressly suggests otherwise. In general, the terms “comprise,” “comprises,” “comprising,” “include,” “includes,” and/or “including,” merely prompt to include operations and elements that have been clearly identified, and these operations and elements do not constitute an exclusive listing. The methods or devices may also include other operations or elements.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

Embodiments of the present disclosure describe an open-ear headphone. When a user wears the open-ear headphone, the open-ear headphone may be fixed to a head of the user through a housing such that a loudspeaker is located near an ear of the user and does not block an ear canal of the user. The open-ear headphone may be worn on the head of the user (e.g., an open-ear headphone worn in a form of eyeglasses or other structures), or on other parts of a body of the user' (e.g., the neck/shoulder of the user), or placed near the ear of the user by other means (e.g., handheld). The open-ear headphone may include the loudspeaker and the housing. The housing is configured to accommodate the loudspeaker and includes two sound guiding holes (e.g., a first sound guiding hole and a second sound guiding hole) acoustically connected with the loudspeaker, and the loudspeaker may output a first acoustic wave and a second acoustic wave with a phase difference through a first sound guiding hole and a second sound guiding hole. The housing and the sound guiding holes of the housing may form acoustic transmission structures of the open-ear headphone for transmitting the first acoustic wave and the second acoustic wave to a spatial point outside the open-ear headphone.

In some embodiments, the open-ear headphone may further include a filtering structure, and the filtering structure refers to a structure that has a modulating effect on a frequency characteristic of the acoustic wave. In some embodiments, the filtering structure may include an acoustic absorbing structure, and the acoustic absorbing structure may be configured to absorb the acoustic wave of the first acoustic wave and/or the second acoustic wave in a target frequency range. The target frequency range may include a frequency greater than or equal to a resonant frequency of the acoustic transmission structure. In a frequency range smaller than the resonant frequency (also referred to as a first frequency range), the first acoustic wave and the second acoustic wave are not absorbed by the sound-absorbing structure, and the first acoustic wave and the second acoustic wave in the first frequency range may interfere and cancel each other due to the phase difference (e.g., an opposite phase) at the spatial point, thereby reducing the amplitude of the first acoustic wave in the first frequency range, and realizing a sound leakage reduction effect of a dipole. Furthermore, since the first acoustic wave and/or the second acoustic wave in the target frequency range (also referred to as a second frequency range) is absorbed by the sound-absorbing structure, the resonance of the first acoustic wave and/or the second acoustic wave that occurs near the resonant frequency under the action of the acoustic transmission structure may be reduced or avoided, which may reduce or avoid the inability of the first acoustic wave and/or the second acoustic wave to interfere and cancel each other (or even interfere and enhance each other to increase the sound leakage) at the spatial point due to the change of the phase and/or the amplitude of the first acoustic wave and/or the second acoustic wave after the resonance, thereby reducing the amplitude of the acoustic wave generated by the headphone in the target frequency range at the spatial point. In some embodiments, the resonant frequency may occur in a mid-to-high frequency band (e.g., 2 kHz to 8 kHz), and the target frequency range may include a high frequency that is greater than the resonant frequency of the acoustic transmission structure, thereby ameliorating the problem of a worse sound leakage reduction effect of the dipole in the high-frequency range.

FIG. 1 is a schematic diagram illustrating an exemplary structure of an open-ear headphone according to some embodiments of the present disclosure.

As shown in FIG. 1, an open-ear headphone 100 may include a housing 110 and a loudspeaker 120. In some embodiments, the open-ear headphone 100 may be worn on the body of the user (e.g., the head, neck, or upper torso of the human body) through the housing 110, and the housing 110 and the loudspeaker 120 may be close to but does not block the ear canal, allowing the ear 101 of the user to stay open, and allowing the user to access sound from the external environment while accessing sound output from the open-ear headphone 100 at the same time. For example, the open-ear headphone 100 may be provided around or partially around the ear 101 of the user and may transmit sound through air conduction or bone conduction.

In some embodiments, the housing 110 may be used to be worn on the body of the user and may accommodate the loudspeaker 120. In some embodiments, the housing 110 may be a closed housing structure that is internally hollow and the loudspeaker 120 is provided in the housing 110. In some embodiments, the open-ear headphone 100 may be combined with a product, such as glasses, a headphone, a head-mounted display device, an AR/VR helmet, etc. In this case, the housing 110 may be fixed near the ear of the user in a hanging or clamping manner. In some embodiments, a hook may be provided on the housing 110, and the shape of the hook may match the shape of an auricle, so that the open-ear headphone 100 may be independently worn on the ear of the user through the hook.

In some embodiments, the housing 110 may be a housing structure with a shape adapted to the ear 101 of the human body, e.g., circular, oval, polygonal (regular or irregular), U-shape, V-shape, semicircular, so that the housing 110 may be hooked up directly at the ear 101 of the user. In some embodiments, the housing 110 may also include a fixing structure. The fixing structure may include an ear hook, an elastic band, etc., so that the open-ear headphone 100 may be better fixed on the body of the user, thereby preventing the open-ear headphone 100 from falling down.

In some embodiments, the housing 110 may be provided above or below the ear 101 of the user when the user is wearing the open-ear headphone 100. The housing 110 may also be provided with a sound guiding hole 111 (or referred to as the second sound guiding hole) and a sound guiding hole 112 (or referred to as the first sound guiding hole) for transmitting sound. In some embodiments, the sound guiding hole 111 and the sound guiding hole 112 may be respectively provided on both sides of the ear of the user, and the loudspeaker 120 may output sound with a phase difference through the sound guiding hole 111 and the sound guiding hole 112. In some embodiments, the sound guiding hole 112 may be provided on a front side of the auricle of the ear of the user, and the sound guiding hole 111 may be provided on a rear side of the auricle of the ear of the user, as shown in FIG. 1.

The loudspeaker 120 refers to an element that may receive an electrical signal and convert the electrical signal into a sound signal for output. In some embodiments, differentiated by frequency, the type of loudspeaker 120 may include a low-frequency (e.g., 30 Hz-150 Hz) loudspeaker, a low-mid frequency (e.g., 150 Hz-500 Hz) loudspeaker, a mid-high frequency (e.g., 500 Hz-5 kHz) loudspeaker, a high frequency (e.g., 5 kHz-16 kHz) loudspeaker, or a full frequency (e.g., 30 Hz-16 kHz) loudspeaker, or any combination thereof. In some embodiments, in terms of frequency, the type of loudspeaker 120 may include a loudspeaker with a low-frequency (for example, 30 Hz-150 Hz), a loudspeaker with a mid-low-frequency (for example, 150 Hz-500 Hz), a loudspeaker with a mid-high-frequency (for example, 500 Hz-5 kHz), a loudspeaker with a high-frequency (for example, 5 kHz-16 kHz), a loudspeaker with a full-frequency (for example, 30 Hz-16 kHz), etc., or any combination thereof. The low-frequency, high-frequency, etc. mentioned herein may merely represent an approximate range of the frequency, and different division manners may be used in different application scenarios. For example, a frequency division point may be determined. Low-frequency may represent a frequency range below the frequency division point, and high-frequency may represent a frequency range above the frequency division point. The frequency division point may be an arbitrary value within the audible range of the human ear, for example, 500 Hz, 600 Hz, 700 Hz, 800 Hz, 1000 Hz, etc.

In some embodiments, the housing 110 may be provided with a core 121 and a main board 122 inside the housing 110. The core 121 may form at least a part of the structure of the loudspeaker 120, and the loudspeaker 120 may utilize the core 121 to generate sound that is respectively transmitted along a corresponding acoustic path to a corresponding sound guiding hole and output from the sound guiding hole. The main board 122 may be electrically connected to the core 121 to control the sound generation of the core 121. In some embodiments, the main board 122 may be provided on the housing 110 near the core 121 to shorten the wiring distance to the core 121 and other components (e.g., function buttons).

In some embodiments, the loudspeaker 120 may include a diaphragm. When the diaphragm vibrates, sound may be emitted from a front side and a rear side of the diaphragm, respectively. In some embodiments, the front side of the diaphragm within the housing 110 is provided with a front chamber 113 for transmitting sound. The front chamber 113 is acoustically connected to the sound guiding hole 111, and sound from the front side of the diaphragm may be emitted from the sound guiding hole 111 through the front chamber 113. A rear chamber 114 for transmitting sound is provided on the rear side of the diaphragm within the housing 110. The rear chamber 114 is acoustically connected to the sound guiding hole 112, and sound from the rear side of the diaphragm may be emitted from the sound guiding hole 112 through the rear chamber 114. In some embodiments, the core 121 may include a core housing (not shown). The core housing and the diaphragm of the loudspeaker 120 form the front chamber and the rear chamber of the loudspeaker 120. In some embodiments, the open-ear headphone 100 may also include a power supply 130. The power supply 130 may be provided at any position of the open-ear headphone 100, for example, a position on the housing 110 away from or near the loudspeaker 120. In some embodiments, the position of the power supply 130 may also be reasonably set according to a weight distribution of the open-ear headphone 100, so that the weight distribution of the open-ear headphone 100 is more balanced, thereby improving the user's comfort and stability of wearing the open-ear headphone 100. In some embodiments, the power supply 130 may provide electrical power to various components of the open-ear headphone 100 (e.g., the loudspeaker 120, the core 121, etc.). The power supply 130 may be electrically connected to the loudspeaker 120 and/or the core 121 to provide electrical power thereto. It is to be noted that when the diaphragm is vibrating, a set of sounds with a phase difference may be produced simultaneously on the front side and the rear side of the diaphragm. After the sound passes through the front chamber 113 and the rear chamber 114, respectively, it propagates outwardly from the sound guiding hole 111 and the sound guiding hole 112. In some embodiments, the structure of the front chamber 113 and the rear chamber 114 may be configured such that the sound output from the loudspeaker 120 at the sound guiding hole 111 and the sound guiding hole 112 meets specific conditions. For example, the lengths of the front chamber 113 and the rear chamber 114 may be designed such that a set of sounds having a particular phase relationship (e.g., an opposite phase) may be output at the sound guiding hole 111 and the sound guiding hole 112, such that both the problem of low volume of the near-field heard sound and the problem of sound leakage in the far field of the open-ear headphone 100 may be effectively solved.

To further illustrate the effect of the distribution of the sound guiding holes on both sides of the auricle on the sound output effect of the open-ear headphone, the open-ear headphone and the auricle are equivalent to a model including two point sources and a baffle.

For purposes of convenience of description and illustration, when the size of the sound guiding hole on an open-ear headphone is small, each of the sound guiding holes may be approximated as a point source. A sound pressure p of a sound field generated by a single-point source satisfies equation (1):

$$p = \frac{j\omega\rho_0}{4\pi r} Q_0 \exp j(\omega t - kr), \tag{1}$$

where ω denotes an angular frequency, $\rho_0$ denotes an air density, r denotes a distance between a target point and the point source, $Q_0$ denotes a volume velocity of the point source, and k denotes the wave number. The magnitude of the sound field pressure of the point source at the target point is inversely proportional to the distance from the target point to the point source.

As described above, sound radiated by the open-ear headphone to the surrounding environment (i.e., a far-field sound leakage) may be reduced by providing two sound guiding holes (e.g., the sound guiding hole 111 and the sound guiding hole 112) in the open-ear headphone 100 to construct dipole acoustic sources. In some embodiments, the two sound guiding holes, i.e., the dipole acoustic sources, output sound with a certain phase difference. When the position, phase difference, or the like in the dipole acoustic source satisfy certain conditions, the open-ear headphone may be made to exhibit different sound effects in a near field and a far field. For example, when the phase of point sources corresponding to the two sound guiding holes is opposite, i.e., when an absolute value of the phase difference between the two point sources is 180°, the reduction of the far-field sound leakage may be realized according to the principle of sound cancellation. As another example, the reduction of far-field sound leakage may also be realized when the phase of the point sources corresponding to the two sound guiding holes is approximately opposite. Merely by way of example, the absolute value of the phase difference between the two point sources for realizing the reduction of the far-field sound leakage may be within a range of 120°-240°.

Figure 2:
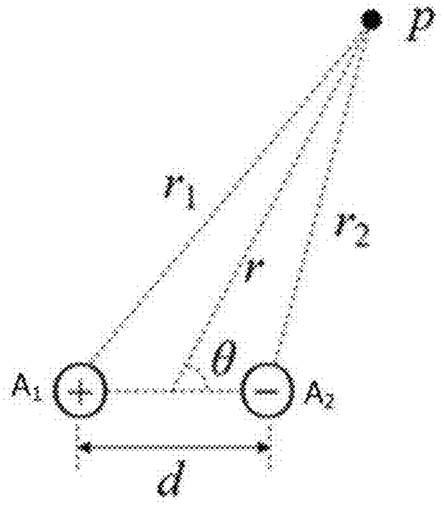
FIG. 2 is a schematic diagram illustrating two point sources according to some embodiments of the present disclosure.

FIG. 2 is a schematic diagram illustrating two point sources according to some embodiments of the present disclosure.

As shown in FIG. 2, the sound pressure p in the sound field generated by the dipole acoustic sources satisfies the following equation:

$$p = \frac{A_1}{r_1} \exp j(\omega t - kr_1 + \varphi_1) + \frac{A_2}{r_2} \exp j(\omega t - kr_2 + \varphi_2), \tag{2}$$

where $A_1$ and $A_2$ denote intensities of the two point sources, $\varphi_1$ and $\varphi_2$ denote phases of the two point sources, respectively, d denotes a distance between the two point sources, and $r_1$ and $r_2$ may satisfy the equation (3):

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 - 2*r*\frac{d}{2}*\cos\theta} \end{cases}, \tag{3}$$

where r denotes a distance between a target point in space and a center of the dipole acoustic sources, and θ denotes an included angle between a connection line connecting the target point and the center of the dipole acoustic sources and a straight line on which the dipole acoustic sources are located.

It may be seen through equation (3) that the magnitude of the sound pressure p at the target point in the sound field is related to an intensity of the acoustic source at each point, the distance d, the phase, and a distance between the two acoustic sources.

Figure 3:
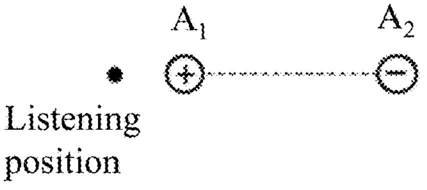
FIG. 3 is a schematic diagram illustrating two point sources and a listening position according to some embodiments of the present disclosure.
Figure 4:
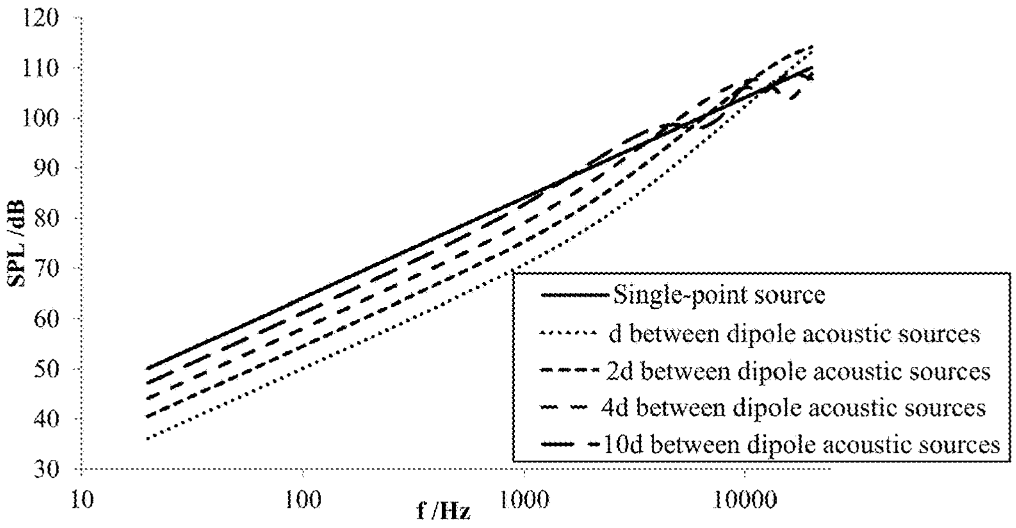
FIG. 4 is a schematic diagram illustrating exemplary frequency response curves of dipole acoustic sources with different distances at a near-field listening position according to some embodiments of the present disclosure.

FIG. 3 is a schematic diagram illustrating two point sources and a listening position according to some embodiments of the present disclosure. FIG. 4 is a schematic diagram illustrating exemplary frequency response curves of dipole acoustic sources with different distances at a near-field listening position according to some embodiments of the present disclosure.

In some embodiments, the listening position may be taken as a target point to further illustrate a relationship between a sound pressure at the target point and the distance d between the two point sources. The listening position referred to herein may be used to represent the position of the ear of the user, i.e., the sound at the listening position may be used to represent a near-field heard sound generated by two point sources. It should be noted that "near-field heard sound" refers to a sound within a certain range from an acoustic source (e.g., a point sources equivalent to the sound guiding hole 111), e.g., a sound within 0.2 m from the acoustic source. Merely by way of example, as shown in FIG. 3, a point source A1 and a point source A2 are located on the same side of the listening position, the point source A1 is closer to the listening position, and the point source A1 and the point source A2 respectively output sounds of the same amplitude with opposite phases. As shown in FIG. 4, a volume at the listening position gradually increases as a distance between the point source A1 and the point source A2 is gradually increased (e.g., from d to 10d). That is, as the distance between the point source A1 and the point source A2 increases, an amplitude difference (i.e., sound pressure difference) between the two sounds reaching the listening position may become larger, and the difference in a sound path distance is even larger, making the sound cancellation effect weaker, which may increase the sound volume at the listening position. However, due to the existence of sound cancellation, the sound volume at the listening position may still be less than the sound volume generated by a single-point source at a same position in the low and middle-frequency band (for example, a frequency of less than 1000 Hz). However, in the high-frequency band (for example, a frequency close to 10000 Hz), due to the decrease in the wavelength of the sound, mutual enhancement of the sound may appear, making the sound generated by the dipole acoustic sources louder than that of the single-point source. In some embodiments, a sound pressure amplitude, i.e., the sound pressure, refers to the pressure generated by the vibration of sound through air.

Figure 5:
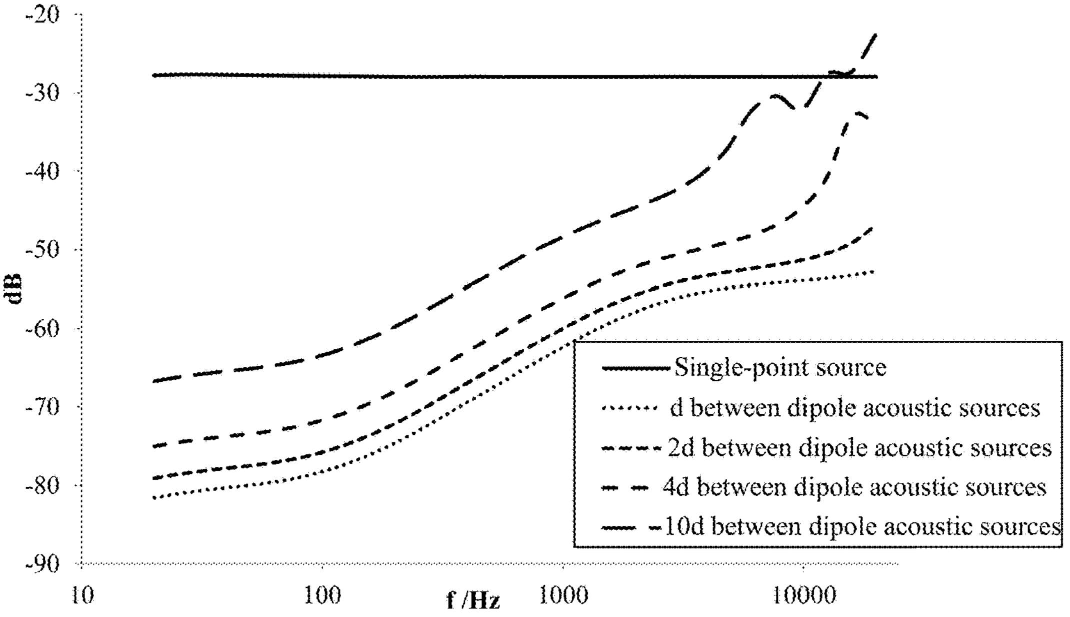
FIG. 5 is a schematic diagram illustrating sound leakage index curves of dipole acoustic sources with different distances in a far field according to some embodiments of the present disclosure.

In some embodiments, the volume at the listening position may be increased by increasing the distance of the dipole acoustic source. However, as the distance is increased, the sound cancellation capability of the dipole acoustic source may be weakened, which in turn leads to an increase in far-field sound leakage. Merely by way of example, FIG. 5 is a schematic diagram illustrating sound leakage index curves of dipole acoustic sources with different distances in a far field according to some embodiments of the present disclosure. As shown in FIG. 5, a far-field leakage index of a single-point source is designated as a reference, and the far-field leakage index gradually increases as the distance of the dipole acoustic source is increased from d to 10d, indicating that the sound leakage becomes progressively larger. Descriptions regarding the sound leakage index may be found in equation (4) and related descriptions thereof.

Figure 6:
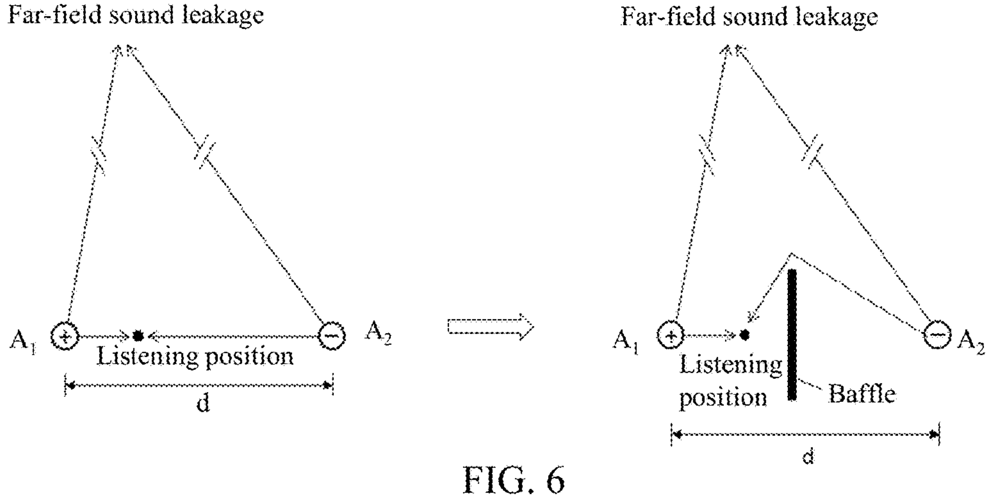
FIG. 6 is a schematic diagram illustrating an exemplary distribution of a baffle provided in dipole acoustic sources according to some embodiments of the present disclosure.

In some embodiments, two sound guiding holes in the open-ear headphone are distributed on both sides of the auricle, which is conducive to improving an output effect of the open-ear headphone, i.e., increasing the intensity of the sound at the near-field listening position while decreasing the volume of the far-field leaked sound (also referred to as sound leakage). For the sake of illustrating open-ear headphones only, the human auricle is equated to a baffle, and the sound emitted from the two sound guiding holes is equated to two point sources (e.g., point source A1 and point source A2). FIG. 6 is a schematic diagram illustrating an exemplary distribution of a baffle provided in dipole acoustic sources according to some embodiments of the present disclosure. As shown in FIG. 6, when a baffle is provided between the point source A1 and the point source A2, in the near field, a sound field of the point source A2 needs to bypass the baffle to interfere with the acoustic wave of the point source A1 at the listening position, which may be equivalent to increasing the sound path distance from the point source A2 to the listening position. As a result, assuming that the point source A1 and the point source A2 have a same amplitude, compared to the case without the baffle, a difference between the acoustic waves of the point source A1 and the point source A2 at the listening position may increase, so that the degree of cancellation of the two sounds at the listening position may decrease, causing the volume at the listening position to increase. In the far field, since the acoustic waves generated by the point source A1 and the point source A2 may interfere in a large space without bypassing the baffle (similar to the case without a baffle), compared to the case without a baffle, the sound leakage in the far field may not increase significantly. Therefore, a baffle structure provided between the point source A1 and the point source A2 may significantly increase the sound volume at the near-field listening position while the volume of the far-field sound leakage is not increased significantly. It may be appreciated that the auricle is used herein as the baffle between the two sound guiding holes to reduce sound leakage of the open-ear headphone and to increase the volume of the heard sound for the user, and in some embodiments, the baffle may also be provided between the two sound guiding holes to achieve the sound leakage reduction effect and increasing the volume of the heard sound, as described in FIG. 31-FIG. 52 of the present disclosure, and the related descriptions thereof.

Figure 7:
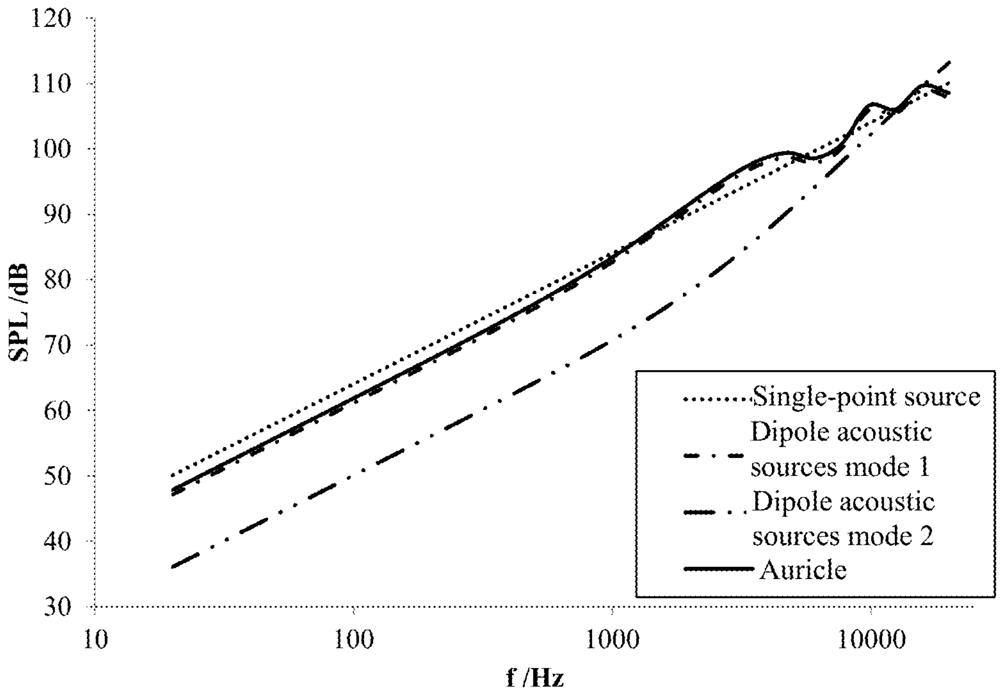
FIG. 7 is a schematic diagram illustrating exemplary frequency response curves in a near field when an auricle is located between dipole acoustic sources according to some embodiments of the present disclosure.
Figure 8:
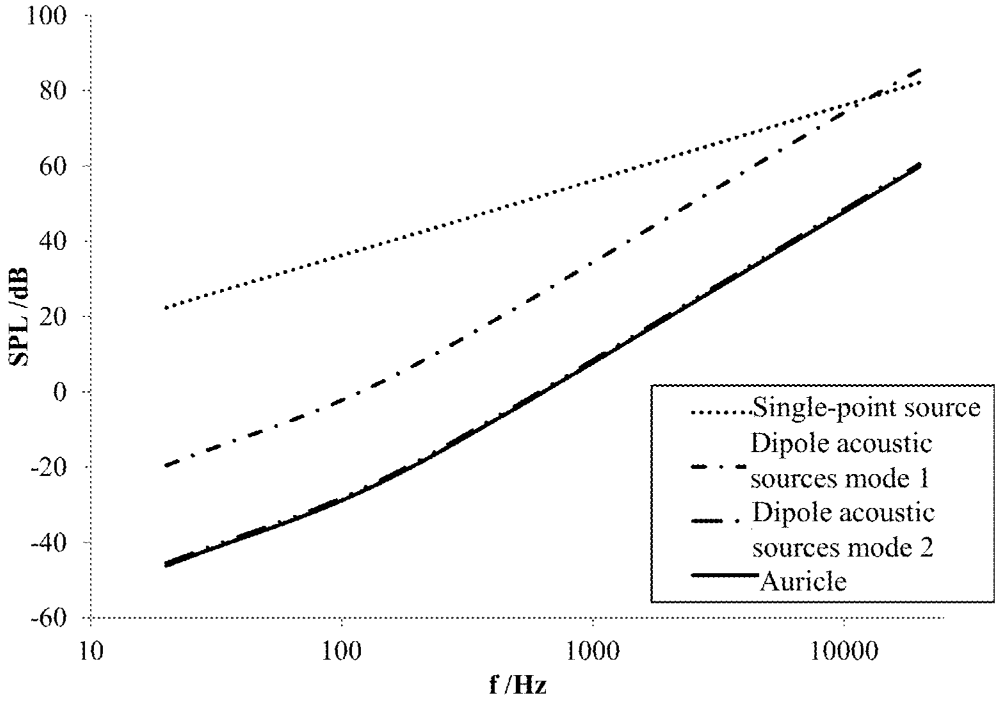
FIG. 8 is a schematic diagram illustrating exemplary frequency response curves in a far field when an auricle is located between dipole acoustic sources according to some embodiments of the present disclosure.

FIG. 7 is a schematic diagram illustrating exemplary frequency response curves in a near field when an auricle is located between dipole acoustic sources according to some embodiments of the present disclosure. FIG. 8 is a schematic diagram illustrating exemplary frequency response curves in a far field when an auricle is located between dipole acoustic sources according to some embodiments of the present disclosure. According to some embodiments of the present disclosure, when the dipole acoustic source is located on both sides of the auricle, the auricle may perform a function of a baffle, and the auricle may be referred to as a baffle for convenience. Merely by way of example, due to the existence of the auricle, in the near field, the sound field of the point source on a rear side of the auricle needs to bypass the auricle to reach the listening position, which is equivalent to increasing a sound path distance from the point source on the rear side of the auricle to the listening position. For the far field, the sound field of the point source on both sides of the auricle may reach the far field without bypassing the auricle, and thus the result when the auricle performs a function of the baffle may be equated to a near-field heard sound being generated by a distance D1 of the dipole acoustic source (also referred to as mode 1) and a far-field sound being generated by a distance D2 of the dipole acoustic source (also referred to as mode 2), and D1>D2. As shown in FIG. 7, when a frequency is low (e.g., when the frequency is less than 1000 Hz), the volume of the near-field heard sound (i.e., the sound heard by the ear of the user) when the dipole acoustic source is distributed on both sides of the auricle is essentially the same as that of the near-field heard sound in mode 1, which may be greater than that of mode 2 and may be close to that of the near-field heard sound from a single-point source. As the frequency increases (e.g., at 2000 Hz-7000 Hz), the volume of near-field heard sound in mode 1 and that generated by the dipole acoustic sources distributed on both sides of the auricle may be greater than that of the single-point source. It should be understood that, when the auricle is located between the dipole acoustic sources, the volume of the near-field heard sound transmitted from an acoustic source to the ear may be effectively increased. As shown in FIG. 8, as the frequency increases, the volume of the far-field sound leakage may be increased. When the dipole acoustic sources are distributed on both sides of the auricle, the volume of the far-field sound leakage generated by the dipole acoustic sources may be the same as (or substantially the same as) the volume of the far-field sound leakage in mode 2, which may be less than the volume of the far-field sound leakage in mode 1 and/or the volume of the far-field sound leakage generated by the single-point source. Therefore, when the auricle is located between the dipole acoustic sources, the sound transmitted from the acoustic source to the far field may be effectively reduced, that is, the sound leakage from the acoustic source to the surroundings may be effectively reduced.

More descriptions regarding the sound leakage index may be found in the following descriptions. In the application of the open-ear headphone, a sound pressure transmitted to the listening position may be large enough to meet the listening requirements, and a sound pressure of the sound radiated to the far field may be small enough to reduce the sound leakage. Therefore, the sound leakage index a may be designated as an index for evaluating the sound leakage reduction capability:

$$\alpha = \frac{|P_{far}|^2}{|P_{ear}|^2}, \tag{4}$$

where $P_{far}$ denotes the sound pressure of sound of the open-ear headphone in the far field (i.e., the sound pressure of the far-field sound leakage), and Pear denotes the sound pressure around the ear of the user (i.e., a sound pressure of a near-field listening).

Figure 9:
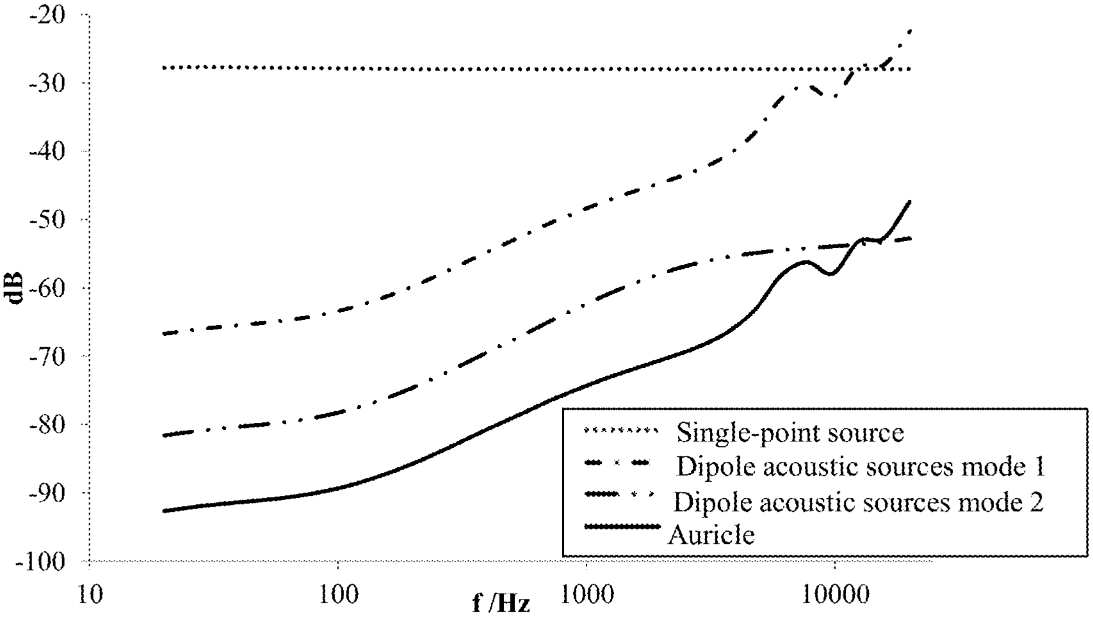
FIG. 9 is a schematic diagram illustrating sound leakage index curves in different modes according to some embodiments of the present disclosure.

As may be known from equation (4), the smaller the sound leakage index, the stronger the sound leakage reduction capability of the open-ear headphone, and the smaller the far-field sound leakage when a volume of a near-field heard sound at the listening position is the same. As shown in FIG. 9, when the frequency is less than 10000 Hz, the sound leakage index when the dipole acoustic sources are distributed on both sides of the auricle may be smaller than that in mode 1 (no baffle is provided between the dipole acoustic sources and the distance is D1), the mode 2 (no baffle is provided between the dipole acoustic sources and the distance is D2), and the single-point source. Therefore, the open-ear headphone may have a better sound leakage reduction capability when the dipole acoustic sources are located on both sides of the auricle.

Figure 10:
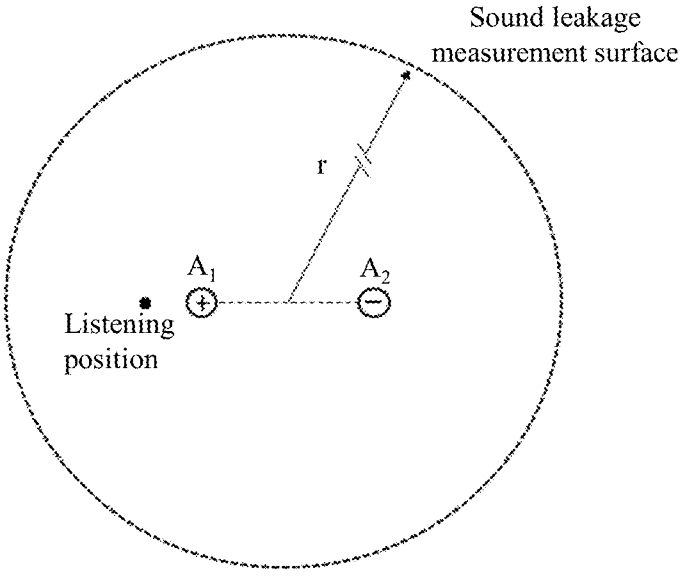
FIG. 10 is a schematic diagram illustrating a measurement of a sound leakage index according to some embodiments of the present disclosure.

FIG. 10 is a schematic diagram illustrating a measurement of a sound leakage index according to some embodiments of the present disclosure. A method for measuring the sound leakage may include selecting an average value of sound pressure amplitudes of points located on a spherical surface with a center of the dipole acoustic sources (e.g., denoted by A1 and A2 as shown in FIG. 10) as a center and the radius r as a value of the sound leakage. It should be noted that the method for measuring the sound leakage in this embodiment is merely an example of the principle and effect, and is not intended to limit the scope of the present disclosure. The method for measuring the sound leakage may also be adjusted according to an actual situation. For example, the center of the dipole acoustic sources may be taken as a center of a circle, two or more points are uniformly taken in the far-field according to a certain spatial angle, and the acoustic pressure amplitudes of the points may be averaged as the value of the sound leakage. In some embodiments, a method for measuring a heard sound may include selecting a position near the point sources as the listening position, and an amplitude of an acoustic pressure measured at the listening position as a value of the heard sound. In some embodiments, the listening position may or may not be on a connection line connecting two point sources. The method for measuring the heard sound may be reasonably adjusted according to the actual situation. For example, acoustic pressure amplitudes of one or more other points in the near field may be averaged as the value of the heard sound. As another example, one of the point sources may be taken as a center of a circle, two or more points may be uniformly taken in the near field according to a certain spatial angle, and the acoustic pressure amplitudes of the points may be averaged as the value of the heard sound. In some embodiments, a distance between the listening position in the near field and the point source may be less than a distance between the point source and the spherical surface.

To further explain an effect on the sound output of the sound output device 100 with or without a baffle between two point sources or two sound guiding holes, a volume of a sound at the listening position in the near field and/or a volume of sound leakage in the far field under different conditions may be described below.

Figure 11:
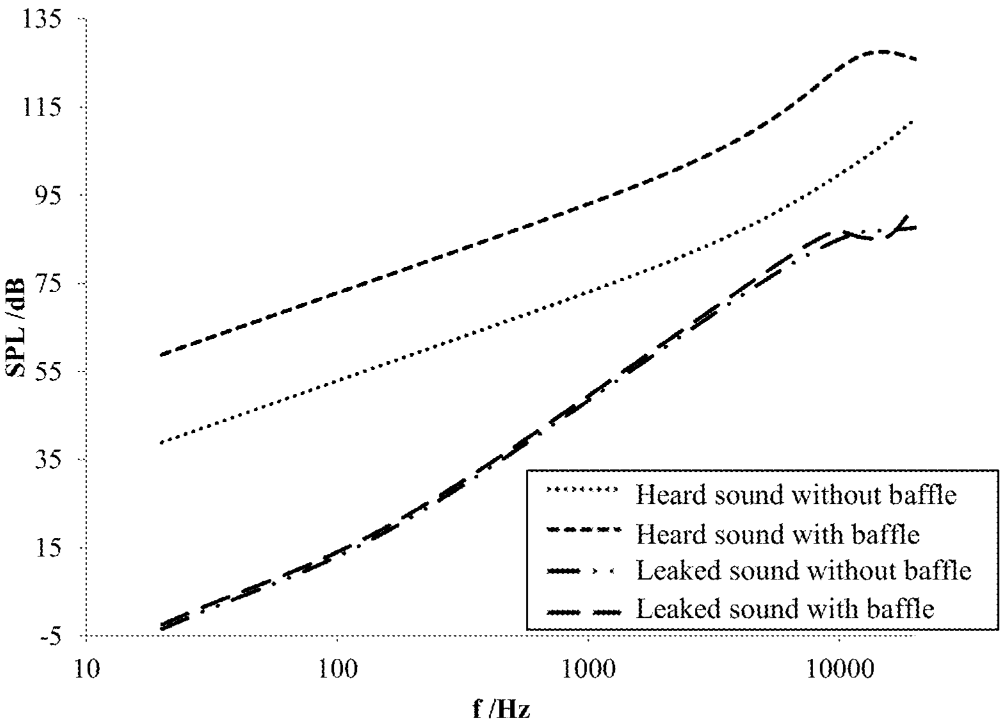
FIG. 11 is a schematic diagram illustrating exemplary frequency response curves of two point sources when a baffle is provided and not provided between the two point sources.

FIG. 11 is a schematic diagram illustrating exemplary frequency response curves of two point sources when a baffle is provided and not provided between the two point sources. As shown in FIG. 11, when the baffle is provided between the two point sources (i.e., two sound guiding holes) of the open-ear headphone, a distance between the two point sources may be increased in the near field, and a volume of the sound at the listening position in the near field may be equivalent to being generated by a set of dipole acoustic sources with a relatively large distance, thereby increasing the volume of the sound in the near field compared to a case without the baffle. In the far field, the interference of acoustic waves generated by the two point sources may be not significantly affected by the baffle, the sound leakage may be regarded as being generated by a set of dipole acoustic sources with a relatively small distance, and the sound leakage may be not changed significantly with or without the baffle. As can be seen, by providing the baffle between two sound guiding holes (the dipole acoustic source), the volume of the sound in the near field may be significantly increased while the sound leakage reduction capability of the open-ear headphone may be effectively enhanced. Therefore, the requirements for a component that plays an acoustic role in the open-ear headphone may be greatly reduced. At the same time, due to a simple structure of the circuit, the electrical losses of the open-ear headphone may be reduced, thus prolonging a working time of the open-ear headphone in the event of a certain amount of power.

Figure 12:
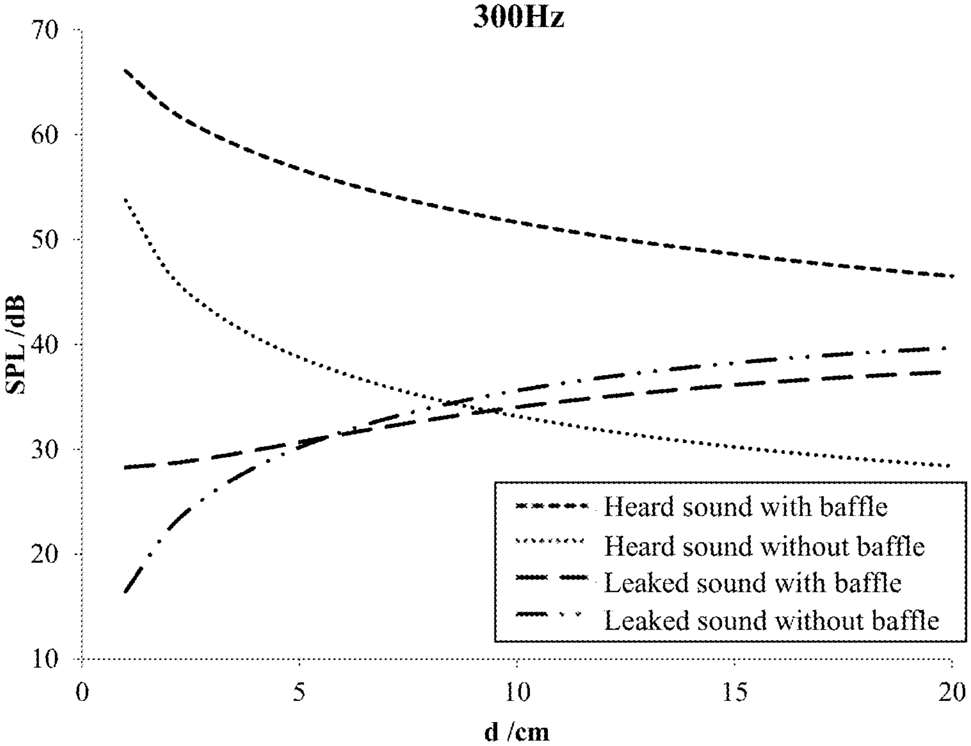
FIG. 12 is a schematic diagram illustrating exemplary sound pressure-amplitude curves corresponding to dipole acoustic sources with different distances at a frequency of 300 Hz according to some embodiments of the present disclosure.
Figure 13:
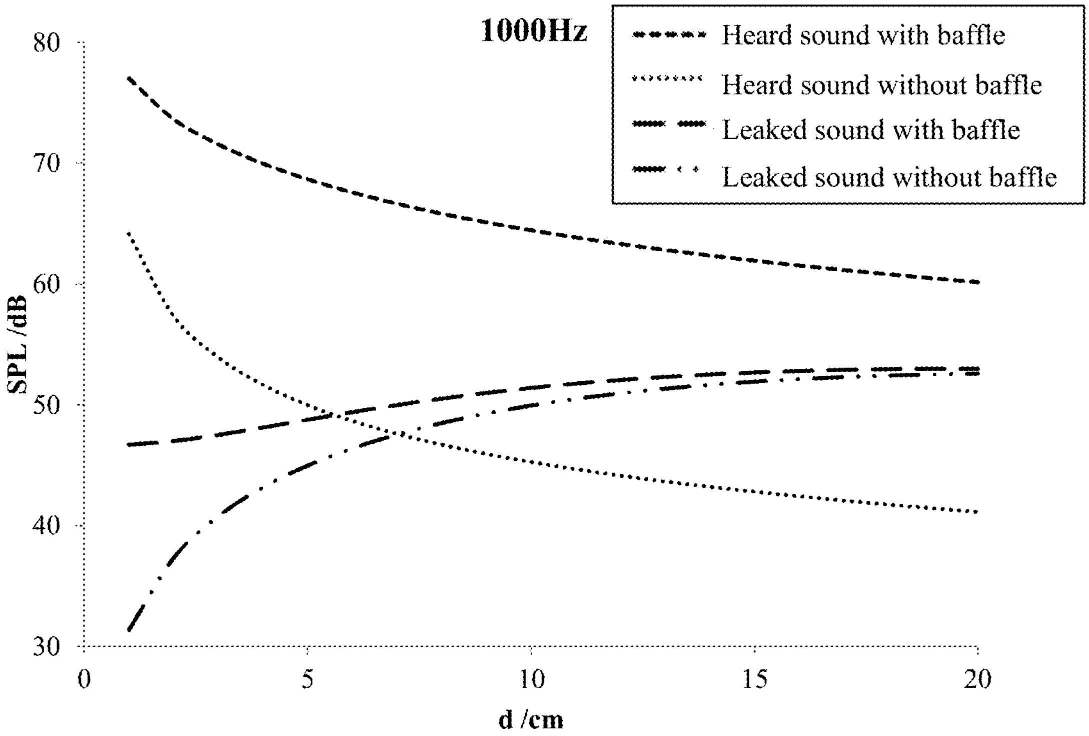
FIG. 13 is a schematic diagram illustrating exemplary sound pressure-amplitude curves corresponding to dipole acoustic sources with different distances at a frequency of 1000 Hz according to some embodiments of the present disclosure.

FIG. 12 is a schematic diagram illustrating exemplary sound pressure-amplitudes-curves corresponding to dipole acoustic sources with different distances at a frequency of 300 Hz according to some embodiments of the present disclosure. FIG. 13 is a schematic diagram illustrating exemplary sound pressure-amplitudes-curves of dipole acoustic sources with different distances at a frequency of 1000 Hz according to some embodiments of the present disclosure. As shown in FIG. 12 and FIG. 13, in the near field, when the frequency is 300 Hz or 1000 Hz, a volume of a heard sound when a baffle is provided between the dipole acoustic sources is greater than a volume of a heard sound when the baffle is not provided between the dipole acoustic sources as the distance d of the dipole acoustic sources is increased, which indicates that at this frequency, the baffle provided between dipole acoustic sources may effectively improve the volume of the near-field heard sound. In the far field, a volume of a sound leakage when the baffle is provided between the dipole acoustic sources is comparable to a volume of a sound leakage when the baffle is not provided between the dipole acoustic sources, which indicates that at this frequency, the effect of whether or not to provide the baffle between the dipole acoustic sources on the sound leakage in the far field is not significant.

Figure 14:
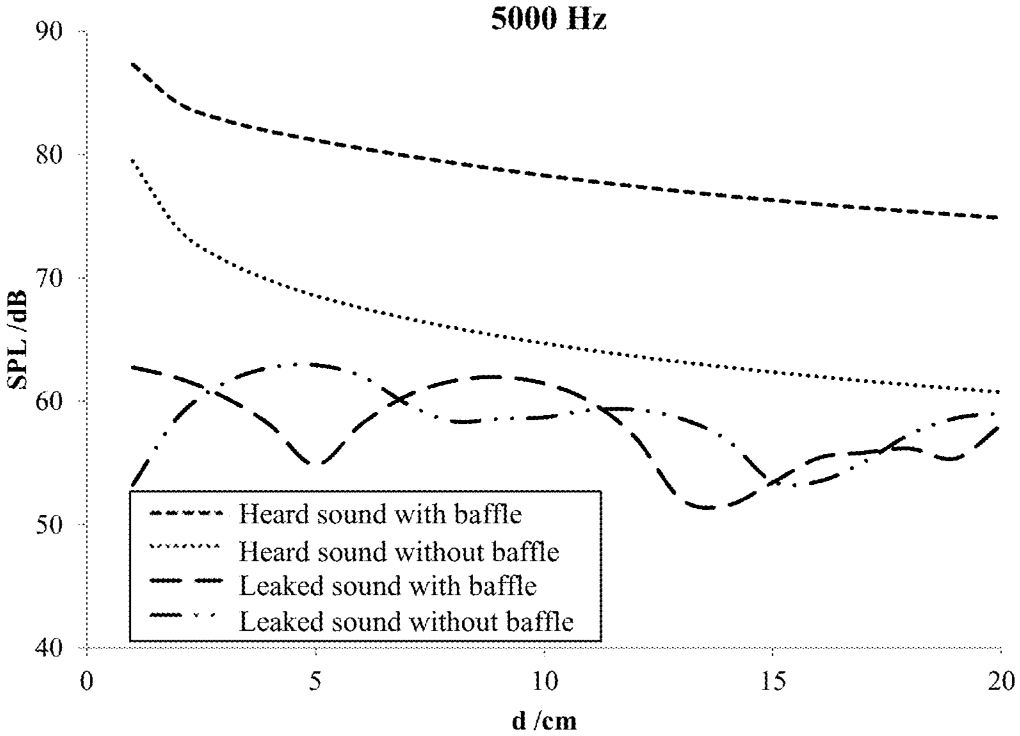
FIG. 14 is a schematic diagram illustrating exemplary sound pressure-amplitude curves corresponding to dipole acoustic sources with different distances at a frequency of 5000 Hz according to some embodiments of the present disclosure.

FIG. 14 is a schematic diagram illustrating exemplary sound pressure-amplitudes-curves of dipole acoustic sources with different distances at a frequency of 5000 Hz according to some embodiments of the present disclosure. As shown in FIG. 14, in the near field, when the frequency is 5000 Hz, a volume of a heard sound when a baffle is provided between the dipole acoustic sources is greater than a volume of a heard sound when the baffle is not provided between the dipole acoustic sources as the distance d of the dipole acoustic sources is increased. In the far field, a volume of a sound leakage when the dipole acoustic sources with and without baffles fluctuates with the change of the distance d. However, it may be seen that the effect of whether or not to provide the baffle between the dipole acoustic sources on the sound leakage in the far field is not significant.

Figure 15:
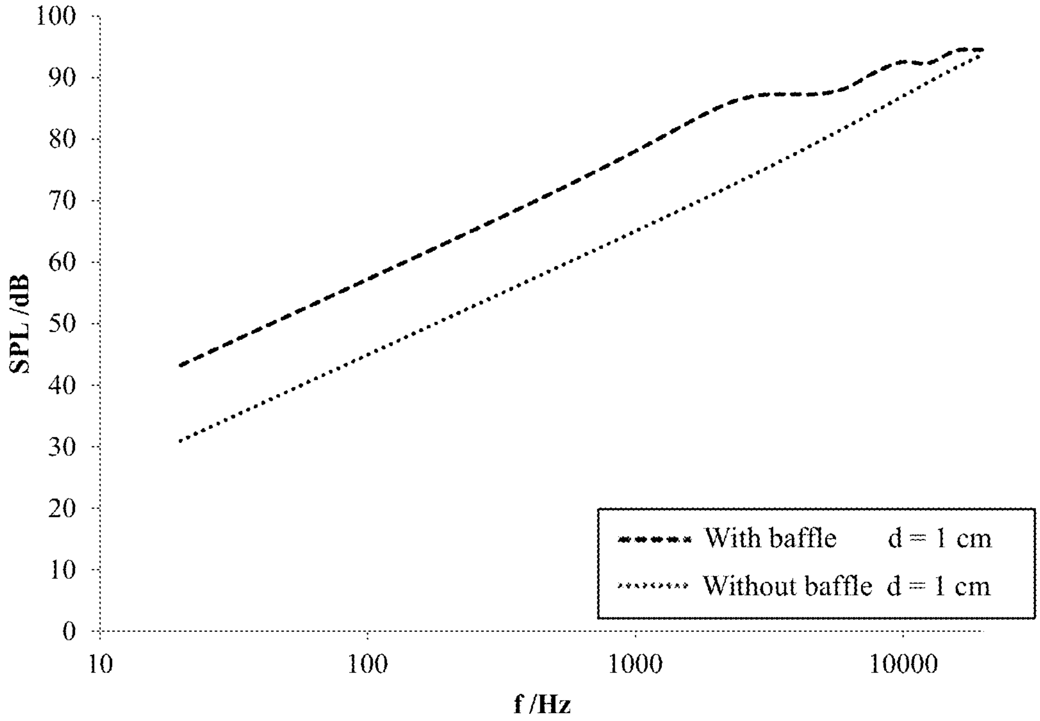
FIG. 15 is a schematic diagram illustrating exemplary frequency response curves in a near field when a distance d between dipole acoustic sources is 1 cm according to some embodiments of the present disclosure.
Figure 16:
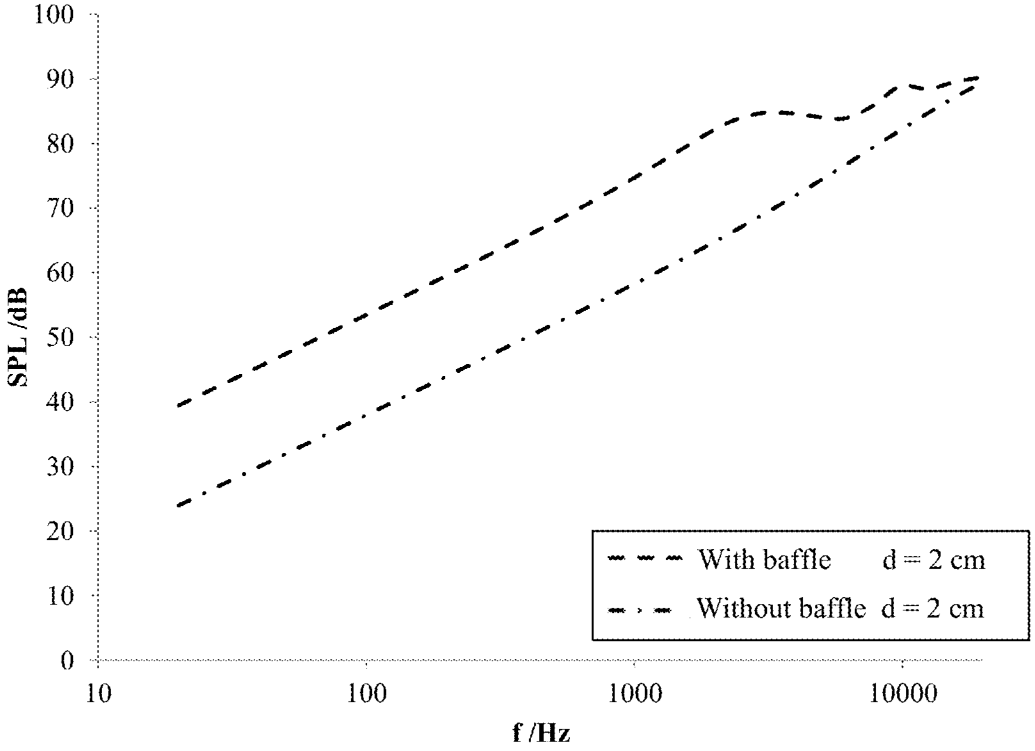
FIG. 16 is a schematic diagram illustrating exemplary frequency response curves in a near field when a distance d between dipole acoustic sources is 2 cm according to some embodiments of the present disclosure.
Figure 17:
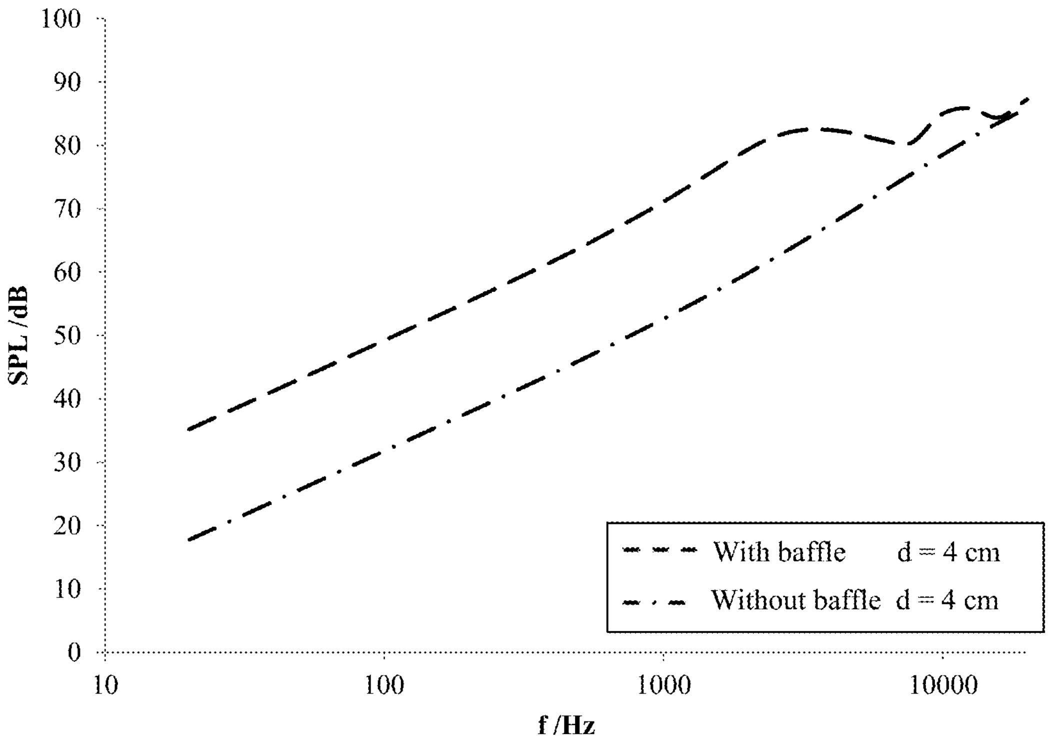
FIG. 17 is a schematic diagram illustrating exemplary frequency response curves in a near field when a distance d between dipole acoustic sources is 4 cm according to some embodiments of the present disclosure.
Figure 18:
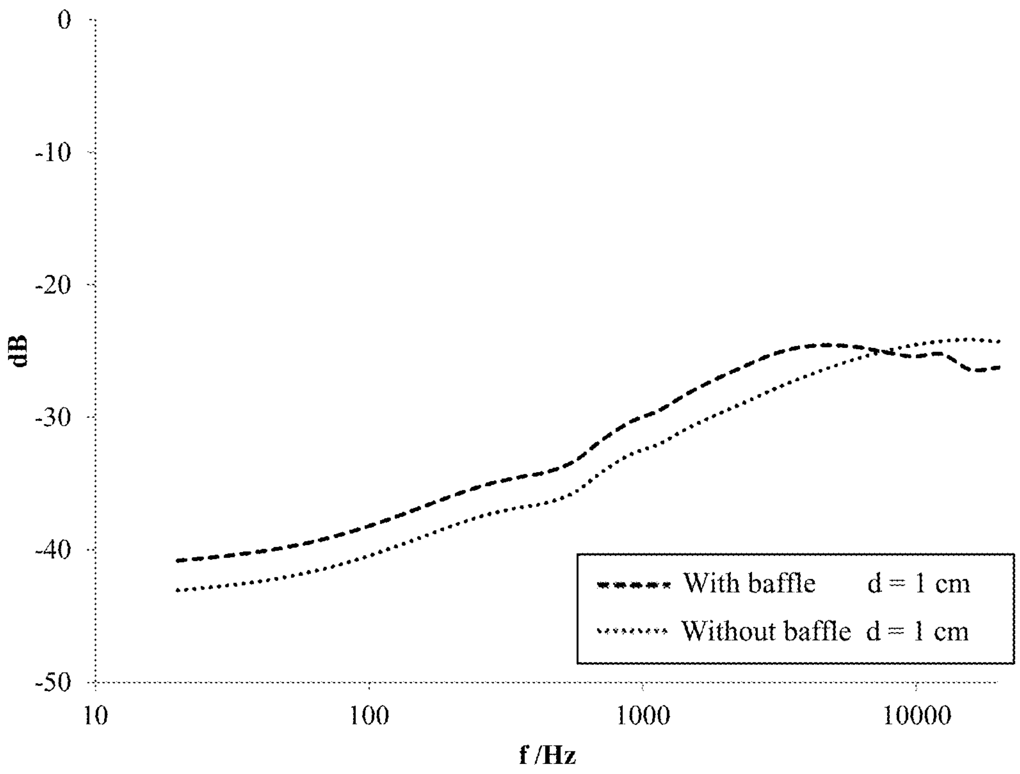
FIG. 18 is a schematic diagram illustrating exemplary sound leakage index curves in a far field when a distance d between dipole acoustic sources is 1 cm according to some embodiments of the present disclosure.
Figure 19:
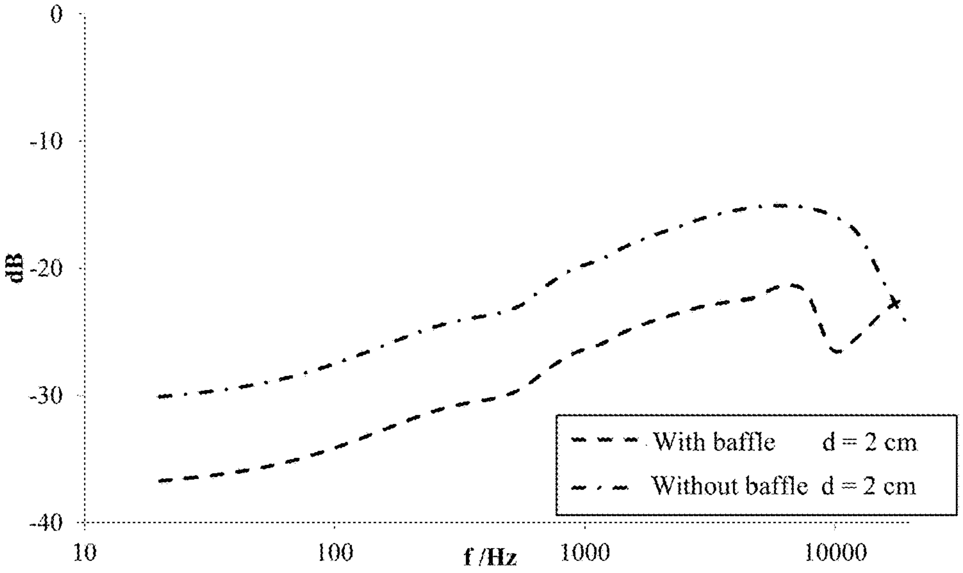
FIG. 19 is a schematic diagram illustrating exemplary sound leakage index curves in a far field when a distance d between dipole acoustic sources is 2 cm according to some embodiments of the present disclosure.
Figure 20:
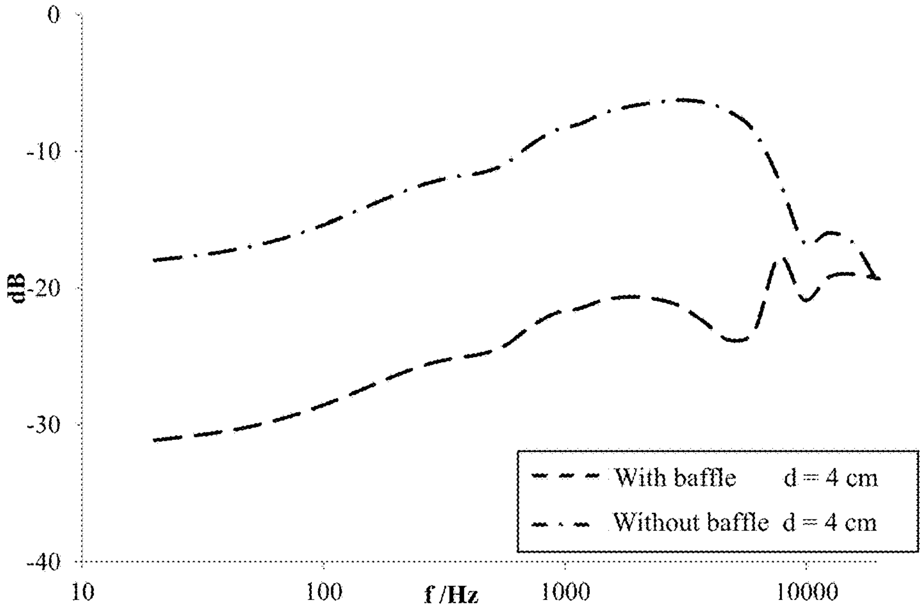
FIG. 20 is a schematic diagram illustrating exemplary sound leakage index curves in a far field when a distance d between dipole acoustic sources is 4 cm according to some embodiments of the present disclosure.

FIG. 15 is a schematic diagram illustrating exemplary frequency response curves in a near field when a distance d between dipole acoustic sources is 1 cm according to some embodiments of the present disclosure; FIG. 16 is a schematic diagram illustrating exemplary frequency response curves in a near field when a distance d between dipole acoustic sources is 2 cm according to some embodiments of the present disclosure; FIG. 17 is a schematic diagram illustrating exemplary frequency response curves in a near field when a distance d between dipole acoustic sources is 4 cm according to some embodiments of the present disclosure; FIG. 18 is a schematic diagram illustrating exemplary sound leakage index curves in a far field when a distance d between dipole acoustic sources is 1 cm according to some embodiments of the present disclosure; FIG. 19 is a schematic diagram illustrating exemplary sound leakage index curves in a far field when a distance d between dipole acoustic sources is 2 cm according to some embodiments of the present disclosure; and FIG. 20 is a schematic diagram illustrating exemplary sound leakage index curves in a far field when a distance d between dipole acoustic sources is 4 cm according to some embodiments of the present disclosure. As shown in FIGS. 15-17, for different distances d (e.g., 1 cm, 2 cm, 4 cm) between sound guiding holes, at a certain frequency, in a near-field listening position (e.g., an ear of a user), a volume of a sound generated by two sound guiding holes which may be provided on both sides of the auricle (i.e., in the case of "without baffle" shown in FIGS. 15-17) may be greater than a volume of a sound generated by two sound guiding holes which may be not provided on both sides of the auricle. The certain frequency referred to herein may be below 10,000 Hz or, preferably, below 5,000.

As shown in FIGS. 18-20, for different distances d (e.g., 1 cm, 2 cm, 4 cm, etc.) between sound guiding holes, at a certain frequency, in the far field (e.g., a position away from the ear of the user), a volume of a leaked sound generated by the two sound guiding holes provided on both sides of the auricle may be smaller than that generated by the two sound guiding holes not provided on both sides of the auricle. It should be noted that as the distance between the two sound guiding holes or the dipole acoustic sources increases, the interference cancellation of sound at a position in the far field may be weakened, the sound leakage in the far field may be increased, and the sound leakage reduction capability may be weakened. The distance d between the two sound guiding holes or the dipole acoustic sources may not be too large. In some embodiments, to maintain that the open-ear headphone may output as high volume as possible in the near field while suppressing sound leakage in the far field, the distance d between the two sound guiding holes may be set to be no less than 1 cm and no more than 20 cm. For example, the distance d between the two sound guiding holes may be set to be no less than 1 cm and no greater than 12 cm.

Figure 21A:
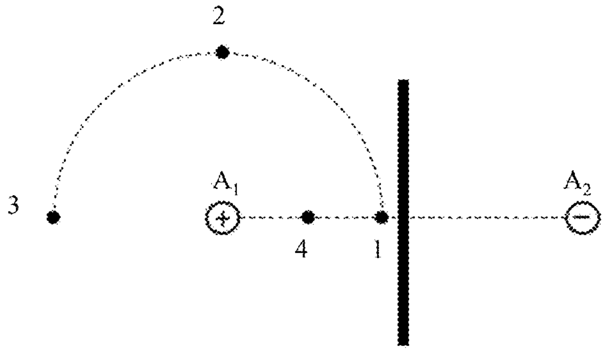
FIG. 21A is a schematic diagram illustrating different listening positions of dipole acoustic sources with a baffle in a near field according to some embodiments of the present disclosure.

In some embodiments, the listening position relative to the dipole acoustic sources affects the volume of the near-field heard sound and the far-field sound leakage, while keeping a certain distance between the dipole acoustic sources. To improve the output effect of the open-ear headphone, in some embodiments, two sound guiding holes may be provided on the open-ear headphone, and the two sound guiding holes are located on a front side and a rear side of the ear of the user when the user wears the headphone. In some embodiments, given that the sound emitted from the sound guiding hole located on the rear side of the auricle of the user needs to bypass the auricle to reach the ear canal of the user, an acoustic route from the sound guiding hole located on the front side of the auricle to the ear canal of the user (i.e., an acoustic distance from the sound guiding hole to the opening of the ear canal of the user) is shorter than the acoustic route from the sound guiding hole located on the rear side of the auricle to the ear of the user. To further explain the effect of the listening position on the sound output effect, merely by way of example, in some embodiments of the present disclosure, FIG. 21A is a schematic diagram illustrating different listening positions of dipole acoustic sources without a baffle in a near field according to some embodiments of the present disclosure. As shown in FIG. 21A, four listening positions (i.e., a listening position 1, a listening position 2, a listening position 3, and a listening position 4) may be selected, which may be used to describe the effect and criteria of the listening positions. A distance between each of the listening position 1, the listening position 2, and the listening position 3 and a point source A1 may be equal, which may be denoted by r1. A distance between the listening position 4 and the point source A1 may be denoted by r2, and r2<r1. The point source A1 and a point source A2 may generate sounds with opposite phases.

Figure 21B:
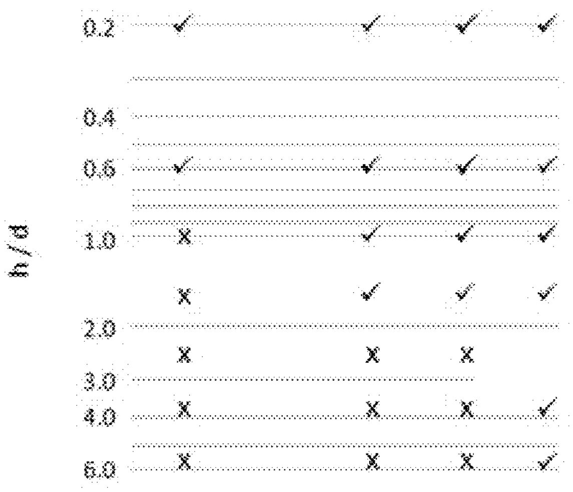
FIG. 21B is a schematic diagram illustrating variations of a sound leakage reduction capability at each listening position in a case with different heights of baffles compared to a case without a baffle according to some embodiments of the present disclosure.

FIG. 21B is a schematic diagram illustrating variations of a sound leakage reduction capability at each listening position in a case with different heights of baffles compared to a case without a baffle according to some embodiments of the present disclosure. An effect of the baffle on the volume of the near-field heard sound primarily includes changing the sound path distance difference between the two point sources and the listening position, the effect of the baffle on the volume of the near-field heard sound and far-field leakage of the headphone is necessarily affected by the height of the baffle. FIG. 21B shows the effect of different heights of the baffle at different listening positions relative to the case without the baffle. From the above results, it may be seen that for different listening positions, after adding the baffle, the volume of the listening position may increase relative to the case without the baffle, and the sound leakage reduction capability may be increased or decreased. Thus, FIG. 21B only shows the variation of the sound leakage reduction capability at each listening position with different heights of baffle compared to the case without the baffle. "✓" indicates an increase in sound leakage reduction (a decrease in the sound leakage index) and "x" indicates a decrease in sound leakage reduction (increase in sound leakage index). At the listening position 1 (and a position near the listening position 1, and an axisymmetric position), i.e., a listening position close to the baffle, baffles with different heights may have an effect on the enhancement of sound leakage reduction. At the listening position 2 and the listening position 4 (and positions near the listening position 2 and the listening position 4, and an axisymmetric position), baffles that are not too high (h/d<2) may have an effect on the enhancement of sound leakage reduction. At the listening position 3, baffles with small heights (h/d<0.6) may have an effect on the enhancement of sound leakage reduction. The baffle is tilted at a certain angle, and the angle varies within a range of 15 deg-165 deg. A total length of the baffle may be equal to the distance d between the two point sources, and an apex of the baffles intersects at a center of the dipole acoustic source. The listening position is 0.025 d from the center of the two point sources.

Figure 22:
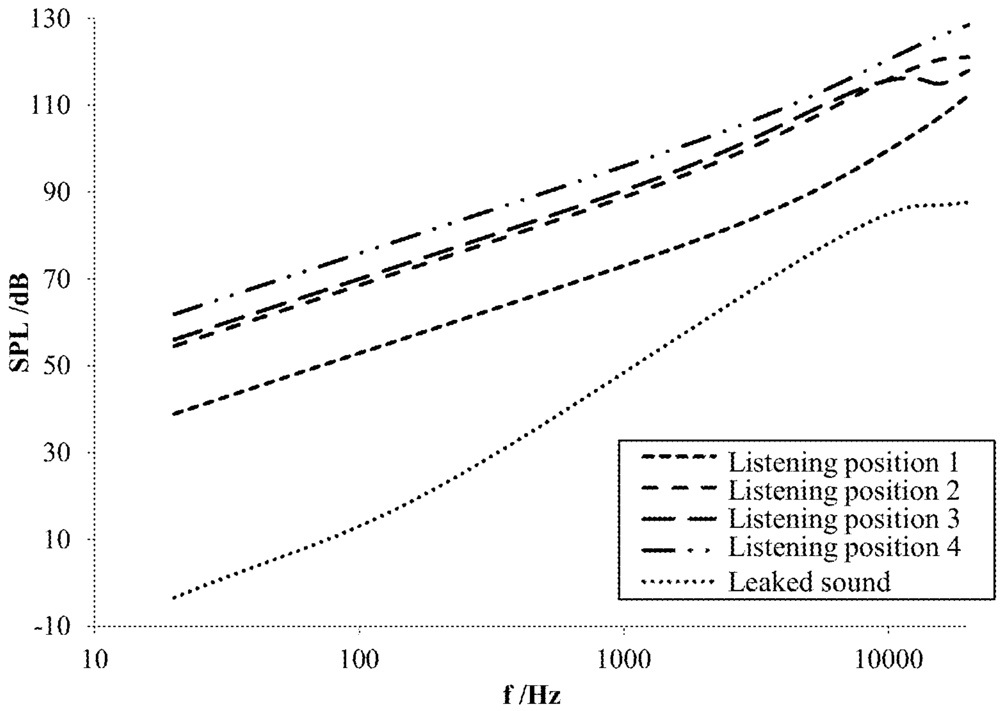
FIG. 22 is a schematic diagram illustrating exemplary frequency response curves of dipole acoustic sources without a baffle at different listening positions in a near field according to some embodiments of the present disclosure.
Figure 23:
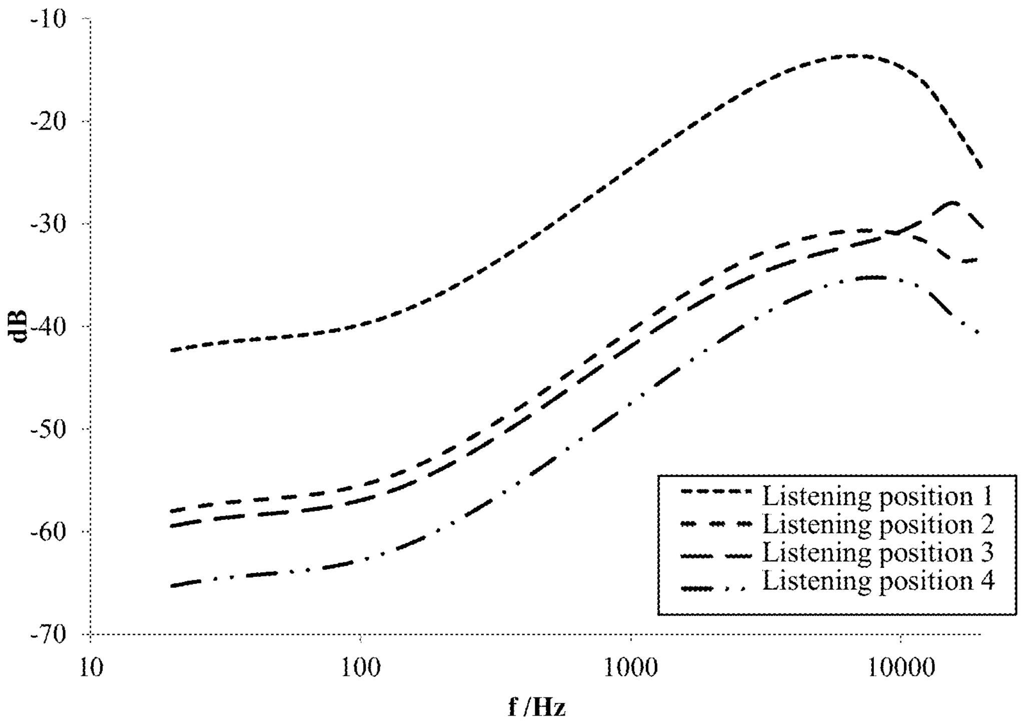
FIG. 23 is a schematic diagram illustrating exemplary sound leakage index curves of dipole acoustic sources without a baffle at different listening positions in a near field according to some embodiments of the present disclosure.

FIG. 22 is a schematic diagram illustrating exemplary frequency response curves of dipole acoustic sources without a baffle at different listening positions in a near field according to some embodiments of the present disclosure. FIG. 23 is a schematic diagram illustrating exemplary sound leakage index curves of dipole acoustic sources without a baffle at different listening positions in a near field according to some embodiments of the present disclosure. As shown in FIGS. 22 and 23, for the listening position 1, the amplitude difference between sounds generated by the two point sources at the listening position 1 is small due to the small sound path distance difference between the point source A1 and the point source A2 at the listening position 1, and accordingly, an interference of sounds generated by the two point sources at the listening position 1 may decrease a volume of a heard sound at the listening position 1 to be relatively smaller than that of other listening positions. For listening position 2, compared to listening position 1, a distance between the listening position and the point source A1 remains unchanged, i.e., a sound path distance from the point source A1 to the listening position 2 is unchanged. However, a distance between the listening position 2 and the point source A2 becomes larger, a sound path distance from the point source A2 to the listening position 2 is increased, and the amplitude difference between the sound generated by the point source A1 and the point source A2 at this position is increased, so the volume of the heard sound of the two point sources interfering at the listening position 2 is larger than the volume of the heard sound at the listening position 1. Among a plurality of positions on an arc with a radius of r1, a difference between a sound path distance from the point source A1 to the listening position 3 and a sound path distance from the point source A2 to the listening position 3 may be larger, thus, compared to the listening position 1 and the listening position 2, the volume of the heard sound at the listening position 3 may be the largest. For the listening position 4, as a distance between the listening position 4 and the point source A1 is smaller, the amplitude of the sound of point source A1 is greater at this position, and a volume of the heard sound at the listening position 4 may be larger. In closing, the volume of the heard sound at the near-field listening position may be changed when the listening position and/or a relative position of the two-point sources are changed. When the listening position (e.g., listening position 3) is on a line connecting the two point sources and at a same side of the two point sources, the sound path difference between the two point sources at the listening position may be the largest (the sound path distance difference may be the distance d between the two point sources). In this case (i.e., when the auricle is not used as a baffle), the volume of the heard sound at the listening position may be greater than that at other positions. According to equation (4), when the sound leakage in the far-field is constant, the sound leakage index corresponding to the listening position may be the smallest, and the sound leakage reduction capability may be the strongest. Further, the distance r1 between the listening position (e.g., the listening position 4) and the point source A1 may be decreased to increase the volume of the heard sound at the listening position reduce the sound leakage index, and improve the sound leakage reduction capability.

Figure 24:
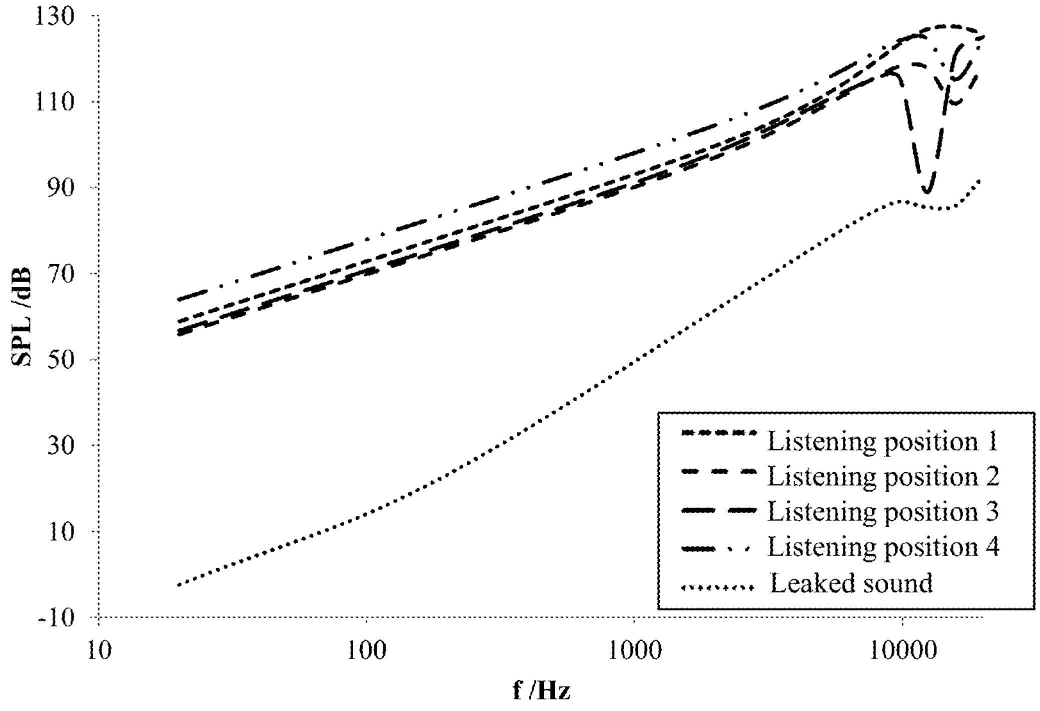
FIG. 24 is a schematic diagram illustrating exemplary frequency response curves of dipole acoustic sources with a baffle (as shown in FIG. 21) at different listening positions in a near field according to some embodiments of the present disclosure.
Figure 25:
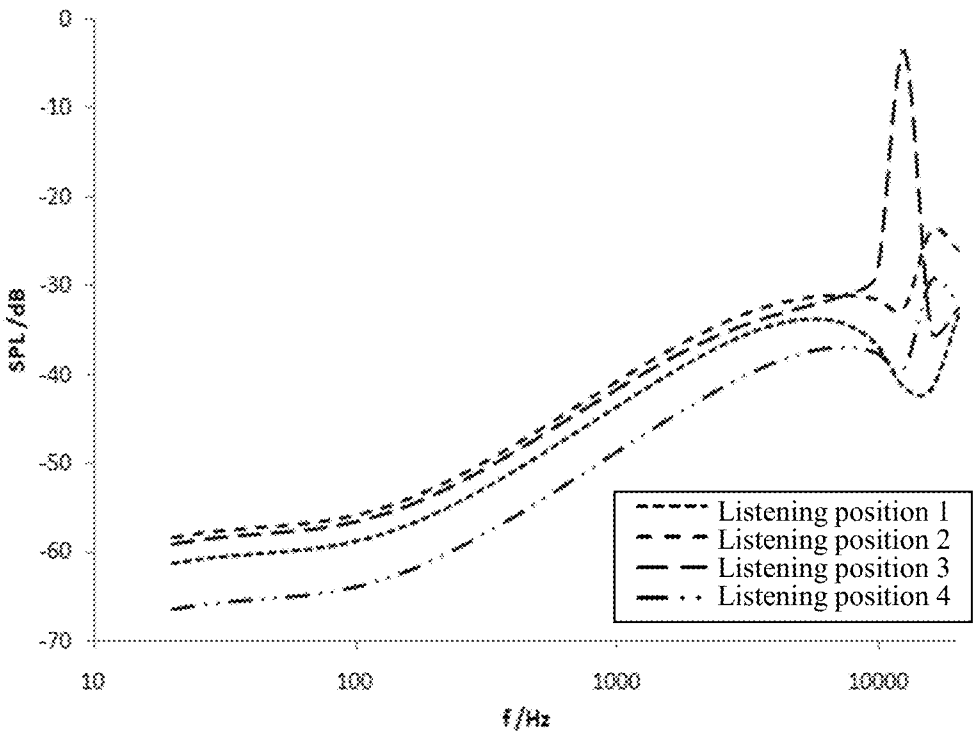
FIG. 25 is a schematic diagram illustrating sound leakage index curves at different listening positions according to some embodiments of the present disclosure.

FIG. 24 is a schematic diagram illustrating exemplary frequency response curves of dipole acoustic sources with a baffle (as shown in FIG. 21) at different listening positions in a near field. FIG. 25 is a schematic diagram illustrating sound leakage index curves at different listening positions, which may be obtained with reference to equation (4) on the basis of FIG. 24. As shown in FIGS. 23 and 24, compared with a case without the baffle, a volume of the heard sound generated by the dipole acoustic sources at the listening position 1 is significantly increased, and the volume of the heard sound at listening position 1 exceeds the volume of the heard sound at listening position 2 and listening position 3. A sound path distance from the point source A2 to the listening position 1 may be increased when the baffle is provided between the two point sources, and accordingly, a sound path distance difference from the two point sources to the listening position 1 may be increased. An amplitude difference between the sounds generated by the two point sources at the listening position 1 may be increased, and the sound interference cancellation may be not formed, thereby increasing the volume of the heard sound generated at the listening position 1. At the listening position 4, since a distance between the listening position 4 and the point source A1 may be decreased, the sound amplitude of the point source A1 at the listening position may be relatively great. The volume of the heard sound at the listening position 4 may be greater than that at other listening positions (i.e., the listening position 1, the listening position 2, and/or the listening position 3). For the listening position 2 and the listening position 3, since an effect of the baffle on the sound path distance from the point source A2 to the listening positions may be not obvious, the increase of the volumes of the heard sound at the listening position 2 and the listening position 3 may be less than that at the listening position 1 and the listening position 4 which are located close to the baffle.

The volume of the leaked sound in the far field may not change when the listening position is changed, and the volume of the heard sound at the listening position in the near field may be changed when the listening position is changed. In this case, according to equation (4), the sound leakage index of the open-ear headphone may be different at different listening positions. Specifically, a listening position with a relatively large volume of the heard sound (e.g., the listening position 1 and/or the listening position 4) may correspond to a small sound leakage index and a strong sound leakage reduction capability. A listening position with a low volume of the heard sound (e.g., the listening position 2 and listening position 3) may correspond to a large sound leakage index and a weak sound leakage reduction capability.

Therefore, according to the actual application scenario of the open earphone, the auricle of the user may be used as the baffle, the two sound guiding holes on the open-ear headphone may be set on the front and rear sides of the auricle, respectively, and the ear canal may be located as a listening position between the two sound guiding holes. In some embodiments, a distance from the sound guiding hole on the front side of the auricle to the ear canal may be smaller than a distance from the sound guiding hole on the rear side of the auricle to the ear canal by adjusting positions the two sound guiding holes on the open-ear headphones. In this case, due to the sound guiding hole on the front side of the auricle being closer to the ear canal, the sound guiding hole on the front side of the auricle may produce a relatively large sound amplitude at the ear canal. The sound amplitude formed by the sound guiding hole on the rear side of the auricle may be relatively small at the ear canal, which may avoid the interference cancellation of the sounds from the two sound guiding holes at the ear canal, thereby ensuring a relatively large volume of the heard sound at the ear canal.

Figure 26:
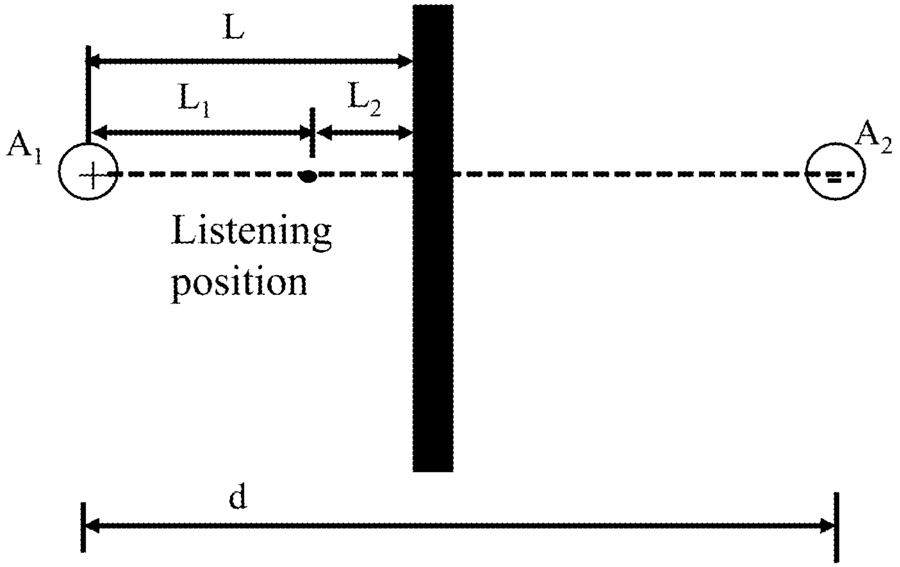
FIG. 26 is a schematic diagram illustrating an exemplary distribution of two sound guiding holes and an auricle according to some embodiments of the present disclosure.

FIG. 26 is a schematic diagram illustrating an exemplary distribution of two sound guiding holes and an auricle according to some embodiments of the present disclosure. In some embodiments, a position of the auricle (also referred to as a baffle in FIGS. 26-29) between the two sound guiding holes (i.e., the point sources) may also affect a sound output. Merely by way of example, the baffle may be provided between the point source A1 and the point source A2 as shown in FIG. 26, the listening position is located on a connection line connecting the point source A1 and the point source A2, and the listening position is located between the point source A1 and the baffle. A distance between the point source A1 and the baffle plate is L, a distance between the point source A1 and the point source A2 is d, a distance between the point source A1 and a heard sound is L1, and a distance between the listening position and the baffle is L2. When the distance L1 between the listening position and the point source A1 is constant, the position of the baffle is moved (equivalent to the two sound guiding holes being moved relative to the auricle) to change a ratio of the distance L between the point source A1 and the baffle to the distance d between the dipole acoustic sources, thereby obtaining the volumes of the heard sound and the volume of the far-field leaked sound at the listening positions with different ratios.

Figure 27:
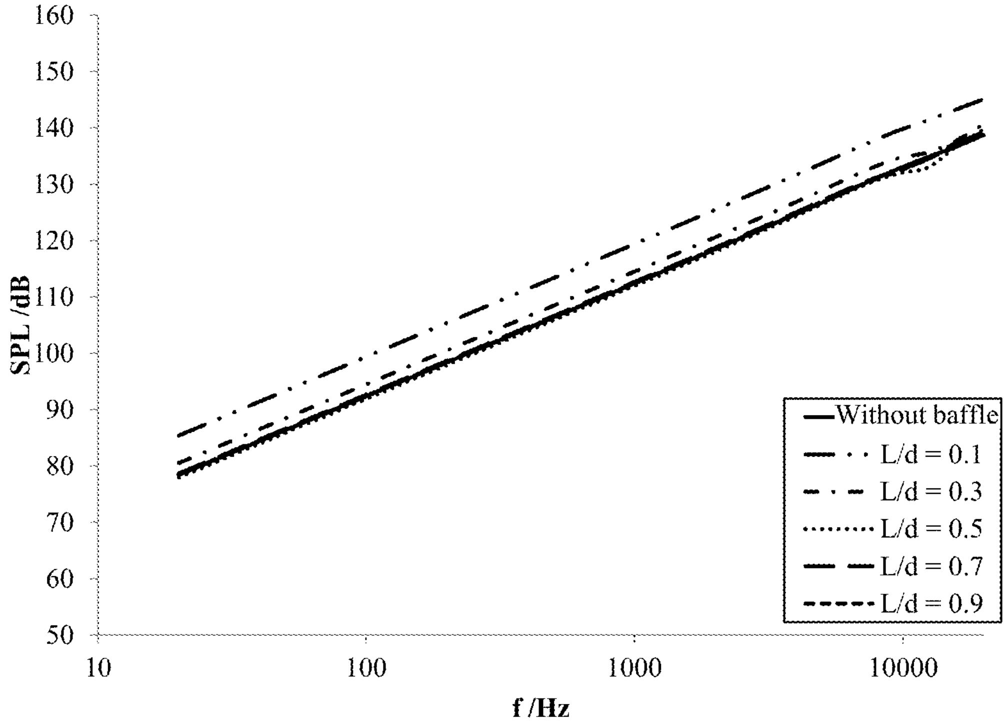
FIG. 27 is a schematic diagram illustrating exemplary frequency response curves in a near field when a baffle is provided at different positions according to some embodiments of the present disclosure.
Figure 28:
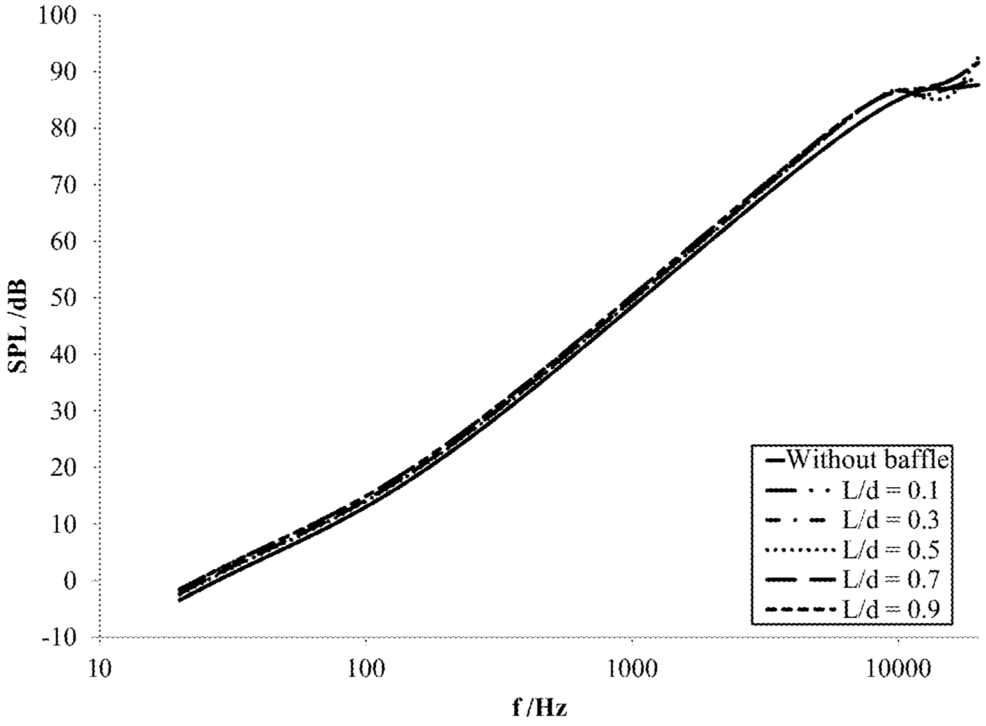
FIG. 28 is a schematic diagram illustrating exemplary frequency response curves in a far field when a baffle is provided at different positions according to some embodiments of the present disclosure.
Figure 29:
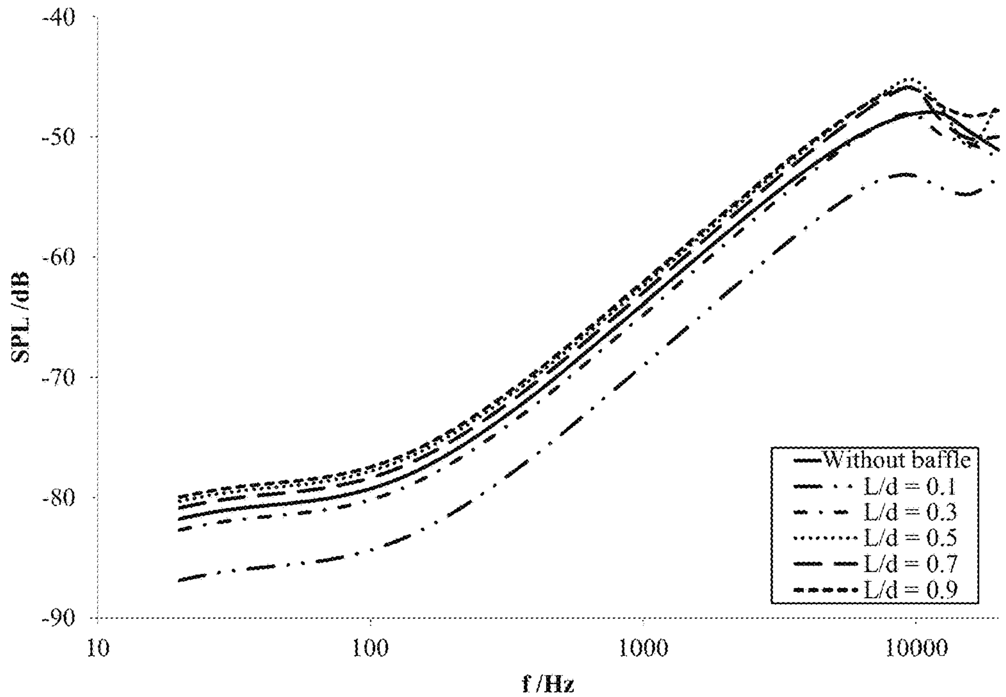
FIG. 29 is a schematic diagram illustrating sound leakage index curves in a near field when a baffle is at different positions according to some embodiments of the present disclosure.

FIG. 27 is a schematic diagram illustrating exemplary frequency response curves in a near field when a baffle is provided at different positions according to some embodiments of the present disclosure; FIG. 28 is a schematic diagram illustrating exemplary frequency response curves in a far field when a baffle is provided at different positions according to some embodiments of the present disclosure; FIG. 29 is a schematic diagram illustrating sound leakage index curves in a near field when a baffle is at different positions according to some embodiments of the present disclosure. As shown in FIGS. 26-29, a sound leakage in the far field may vary only slightly with a position of the baffle between the dipole acoustic sources. When the distance d between the point source A1 and the point source A2 is constant, a volume at the listening position may be increased, the leakage index may be decreased, and a sound leakage reduction capability may be enhanced. When L is increased, the volume at the listening position may be increased, the sound leakage index may be increased, and the sound leakage reduction capability may be weakened. When L is relatively small, the listening position may be close to the baffle, and a sound path distance of an acoustic wave from the point source A2 to the listening position may be increased in the existence of the baffle. In this case, a sound path distance difference between a sound path distance from the point source A1 to the listening position and a sound path distance from the point source A2 to the listening position may be increased and the interference cancellation of the sound may be reduced. The volume of the sound at the listening position may be increased in the existence of the baffle. When L is relatively large, the listening position may be far away from the baffle. The baffle may not affect (or barely affect) the sound path distance difference. The volume at the listening position may be not changed when the baffle is provided.

As described above, by adjusting a position of the sound guiding holes on the open-ear headphone, the auricle of the user may be served as the baffle to separate sound guiding holes when the user wears the open-ear headphone. In this case, a structure of the open-ear headphone may be simplified, and the output effect of the open-ear headphone may be further improved. In some embodiments, the positions of the two sound guiding holes may be configured so that a ratio of a distance between the sound guiding hole on the front side of the auricle and the auricle (or a contact point on the open-ear headphone for contact with the auricle) to a distance between the two sound guiding holes may be less than or equal to 0.5 when the user wears the open-ear headphone.

It should be noted that the sound path distance from a loudspeaker to the sound guiding hole in open-ear headphone may affect a volume in the near field and a sound leakage in the far field. The sound path distance may be changed by adjusting a length of a cavity between a diaphragm and the sound guiding hole in the open-ear headphone. In some embodiments, the loudspeaker includes the diaphragm, and a front side and a rear side of the diaphragm may be coupled to the two sound guiding holes through a front chamber and a rear chamber, respectively. A sound path distance from the diaphragm to each of the two sound guiding holes may be different. In some embodiments, a ratio of the sound path distance from the diaphragm to one of the two sound guiding holes to the sound path distance from the diaphragm to another of the two sound guiding holes may be within a range of 0.5-2.

In some embodiments, when the two sound guiding holes transmit the sounds with opposite phases, amplitudes of the sounds may be adjusted to improve the output performance of the open-ear headphone. Specifically, the amplitude of the sound transmitted by each of the two sound guiding holes may be adjusted by adjusting the impedance of a sound path between each of the two sound guiding holes and the loudspeaker. In some embodiments, pressure amplitudes of the sound emitted from the two sound guiding holes of the loudspeaker may be different due to different impedances of structures between the loudspeaker and the two sound guiding holes. In some embodiments, the impedance may refer to a resistance that an acoustic wave overcomes when the acoustic wave is transmitted in a medium. In some embodiments, the sound path may or may not be filled with a damping material (e.g., a tuning net, tuning cotton, etc.) to adjust the sound amplitude. For example, a resonant cavity, a sound hole, a sound slit, a tuning net, a tuning cotton, or the like, or any combination thereof, may be provided in the acoustic route to adjust the acoustic resistance, thereby changing the impedance of the acoustic route. As another example, a hole size of each of the two sound guiding holes may be adjusted to change the acoustic resistance of the acoustic route. Preferably, a ratio of acoustic impedances between the loudspeaker (e.g., the diaphragm of the loudspeaker) and the two sound guiding holes may be within a range of 0.5-2.

In some embodiments, the acoustic path through which the sound produced by the loudspeaker (or the diaphragm) radiates to the external environment may serve as an acoustic transmission structure of the open-ear headphone. The acoustic transmission structure may have a resonant frequency. The acoustic transmission structure may resonate when a frequency of a sound transmitted by the acoustic transmission structure is near the resonant frequency. The resonance may change the frequency component of the transmitted sound (e.g., by adding additional resonance peaks to the transmitted sound) or change a phase of the sound transmitted by the acoustic transmission structure, which may weaken the effect of an interference cancellation of the sound in the far field, or even increase the sound leakage in the far field near the resonant frequency.

In some embodiments, the open-ear headphone may include a filtering structure, and the filtering structure may have a modulating effect on the frequency characteristics of the acoustic waves. For example, the filtering structure may include an acoustic absorbing structure for absorbing sound transmitted by the acoustic transmission structure in a target frequency range. The target frequency range may include a resonant frequency of the acoustic transmission structure. Merely by way of example, a filtering structure (or an acoustic absorption structure) may be provided in an acoustic transmission structure between the loudspeaker and a sound guiding hole having a long sound path to an opening of an ear canal, to absorb sound transmitted near the resonant frequency therein, thereby avoiding increasing resonance peaks and/or increasing sound leakage in the far field due to the resonance of the acoustic transmission structure. In some embodiments, the resonant frequency of the acoustic transmission structure may be in a middle-to-high frequency range (e.g., 1 kHz-10 kHz). In a high-frequency range greater than the resonant frequency, due to a short wavelength of high-frequency sound, a distance between the two sound guiding holes may affect the phase difference between the sounds radiated by the two sound guiding holes in the far field. In this case, a sound leakage reduction effect of dipole acoustic sources formed by the two sound guiding holes may be weakened in the high-frequency range. Therefore, the target frequency range may include a frequency greater than the resonant frequency of the acoustic transmission structure, which allows for the absorption of high-frequency sounds and reduces sound leakage of the dipole acoustic sources in the high-frequency range. For frequencies outside the target frequency range, e.g., frequencies smaller than the resonant frequency, the dipole acoustic sources formed by the two sound guiding holes may achieve better sound leakage reduction. More descriptions regarding the filtering structure may be found in FIGS. 75-86 and related descriptions thereof, which may not be repeated here.

It should be noted that the above descriptions regarding the filtering structure and the target frequency range do not limit the actual application scenarios of the open-ear headphone. In some embodiments, the open-ear headphone may have different sound effects at spatial points by setting the filtering structure (e.g., a position of the filtering structure, a sound absorbing frequency, etc.). For example, the filtering structure may absorb a middle-high frequency sound within a specific frequency range and may be provided in an acoustic transmission structure between the loudspeaker and the sound guiding hole close to the ear. In this case, the middle-high frequency sound within the specific frequency range may be reduced from being output from the sound guiding hole close to the ear, avoiding interference enhancement in the far field between the middle-high frequency sound within the specific frequency range and a middle-high frequency sound within the same frequency range output from a sound guiding hole away from the ear. As another example, the filtering structure may absorb the middle-high frequency sound within the specific frequency range and be provided in the acoustic transmission structure between the loudspeaker and the sound guiding hole close to the ear and the sound guiding hole away from the ear, respectively, to better reduce leakage of the middle-high frequency sound within the specific frequency range in the far field. As another example, the filtering structure may absorb a low-frequency sound within a specific frequency range and may be provided in an acoustic transmission structure between the loudspeaker and the sound guiding hole away from the ear. In this case, the low-frequency sound within the specific frequency range may be reduced from being output from the sound guiding hole away from the ear, avoiding an interference cancellation in the near field between the low-frequency sound within the specific frequency range and a low-frequency sound within the same frequency range output from the sound guiding hole close to the ear. Thus, a volume of the open-ear headphone in the near field may be increased in the specific frequency range (i.e., to the ear of the user). As yet another example, the filtering structure may further include sub-filtering structures configured to absorb sound in different frequency ranges. For example, the sub-filtering structures may absorb sound in the mid-high frequency band and the low-frequency band.

Figure 30:
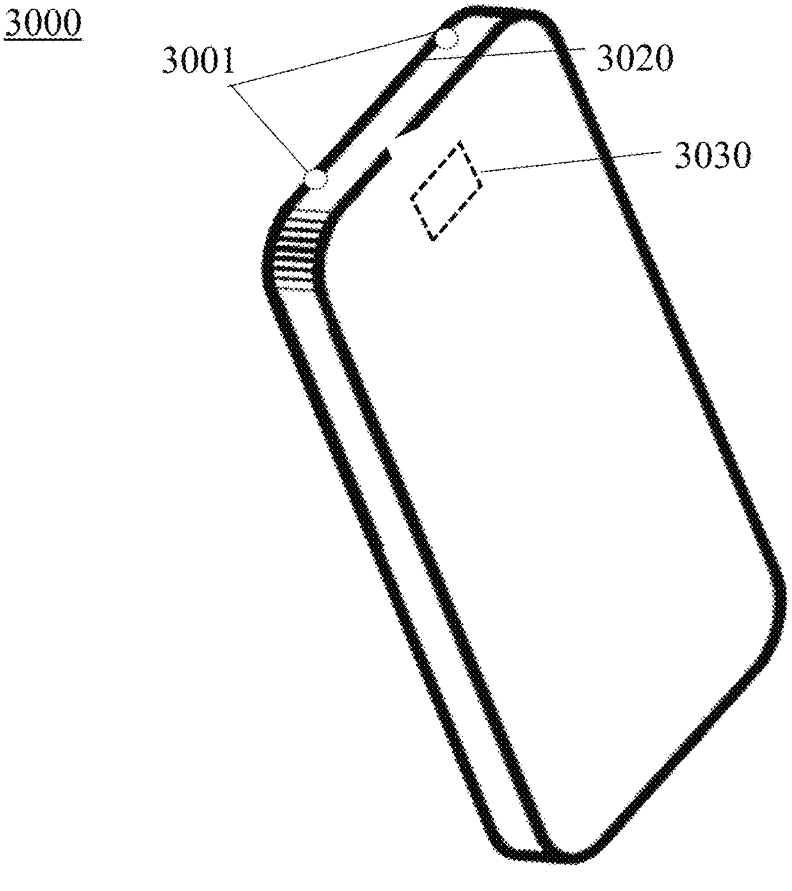
FIG. 30 is a schematic diagram illustrating a cellphone including sound guiding holes according to some embodiments of the present disclosure.

It should be noted that the above descriptions (FIGS. 1-29) do not limit the actual application scenarios of the open-ear headphone. The open-ear headphone may be any device or a part thereof that requires sound output to a user. For example, the open-ear headphone may be used in a cellphone. FIG. 30 is a schematic diagram illustrating a cellphone including aperture portions according to some embodiments of the present disclosure. As shown in FIG. 30, a plurality of sound guiding holes are provided at a top 3020 of the cellphone 3000 (i.e., an upper surface of the cellphone "vertical" to a display screen of the cellphone). Merely by way of example, the sound guiding hole 3001 may form a set of dipole acoustic sources (or a point source array) for outputting sound. One sound guiding hole in the plurality of sound guiding holes 3001 may be close to a left end of the top 3020, and the other sound guiding hole in the plurality of sound guiding holes 3001 may be close to a right end of the top 3020. A distance may be formed between the two sound guiding holes. A loudspeaker 3030 may be provided inside a housing of the cellphone 3000. The sound generated by the loudspeaker 3030 may be transmitted outwardly through the sound guiding holes 3001.

In some embodiments, the two sound guiding holes 3001 may emit a set of sounds with opposite (or substantially opposite) phases and/or a same (or substantially the same) amplitude. When the user places the cellphone near the ear to answer voice information, the sound guiding hole 3001 may be located on both sides of an ear of the user, which may be equivalent to that a sound path distance difference between two sound path distances from the two sound guiding holes 3001 to the ear of the user may be added according to some embodiments in FIGS. 1-29. The sound guiding holes 3001 may emit a relatively strong sound in the near field to the user. At the same time, the ear of the user may barely affect the sound radiated by the sound guiding holes 3001 in the far field. The sound guiding holes 3001 may reduce the sound leakage to the surroundings due to an interference cancellation of the sounds. In addition, by providing the sound guiding hole 3001 on the top of the cellphone instead of an upper end of the display screen of the cellphone, a space for providing the sound guiding hole 3001 on the front of the cellphone may be saved, an area of the display screen of the cellphone may be increased, and the appearance of the cellphone may be optimized.

In some embodiments, the two sound guiding holes of the open-ear headphone may also be located on the same side of the ear of the user. A baffle is provided between the two sound guiding holes, which may increase a sound path distance from one of the two sound guiding holes to the ear of the user.

In some embodiments, the two sound guiding holes may include a first sound guiding hole and a second sound guiding hole, and a sound path distance from the first sound guiding hole to the ear of the user may be less than a sound path distance from the second sound guiding hole to the ear of the user. The first sound guiding hole and the second sound guiding hole may be located on the same side of the ear of the user. A baffle may be provided between the first sound guiding hole and the second sound guiding hole, which increases the sound path distance from the second sound guiding hole to the ear of the user. In some embodiments, the first sound guiding hole and the second sound guiding hole may be provided on a front side of the ear of the user, such as a sound guiding hole 3111 and a sound guiding hole 3112 described below.

Figure 31:
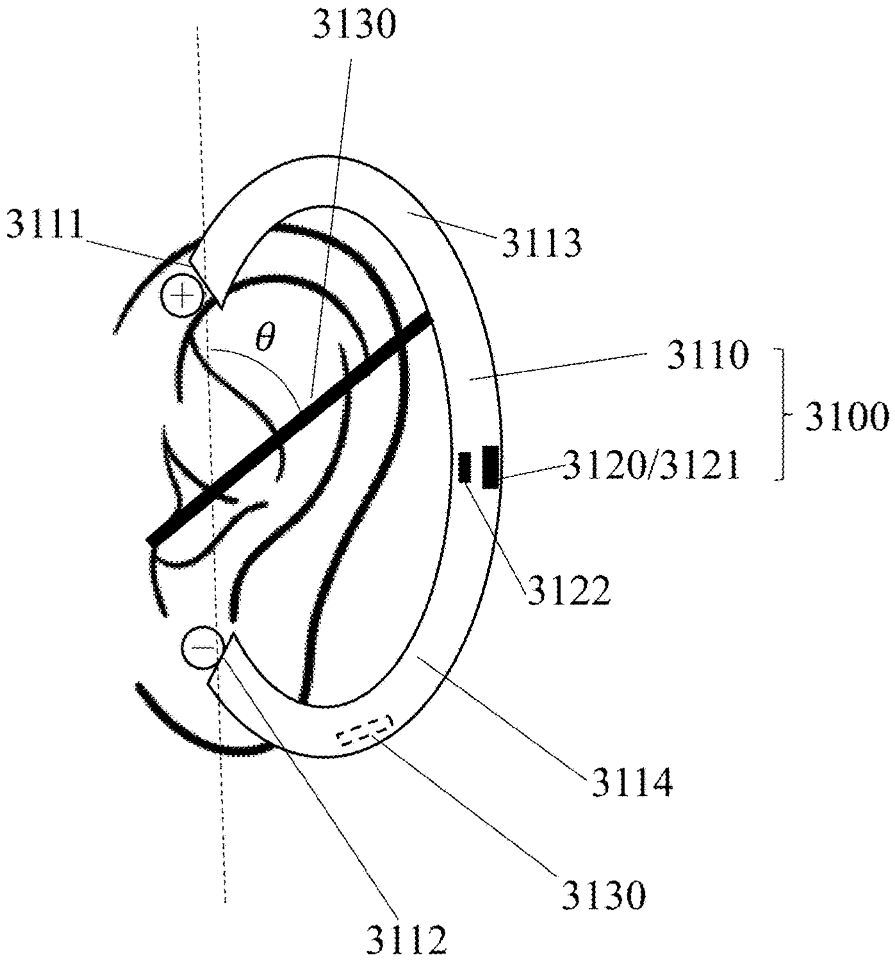
FIG. 31 is a schematic diagram illustrating an exemplary structure of an open-ear headphone according to some embodiments of the present disclosure.

FIG. 31 is a schematic diagram illustrating an exemplary structure of an open-ear headphone according to some embodiments of the present disclosure. The structure of the open-ear headphone 3100 shown in FIG. 31 is substantially the same as the structure of the open-ear headphone 100 shown in FIG. 1. For example, the open-ear headphone 3100 may include a housing 3110 and a loudspeaker 3120. The housing 3110 may be configured to accommodate the loudspeaker 3120 and have the sound guiding hole 3111 and the sound guiding hole 3112 acoustically connected to the loudspeaker 3120. A core 3121 and a main board 3122 may be provided inside the housing 3110. The core 3121 may form at least a part of the structure of the loudspeaker 3120, and the loudspeaker 3120 may generate sounds using the core 3121. The main board 3122 may be electrically connected to the core 3121 to control the sound generation of the core 3121. As another example, the open-ear headphone 3100 may also include a power supply 3140, and the power supply 3140 may provide electrical power to various components of the open-ear headphone 3100 (e.g., the loudspeaker 3120, the core 3121, etc.). The loudspeaker 3120 may include a diaphragm, and a front chamber 3113 for transmitting sound may be provided at a front side of the diaphragm. The front chamber 3113 may be acoustically connected to the sound guiding hole 3111. The sound at the front side of the diaphragm may be emitted from the sound guiding hole 3111 through the front chamber 3113. A rear side of the diaphragm may be provided with a rear chamber 3114 for transmitting sound. The rear chamber 3114 may be acoustically connected to the sound guiding hole 3112, and sound at the rear side of the diaphragm may be emitted from the sound guiding hole 3112 through the rear chamber 3114. The difference is that when the user wears the open-ear headphone 3100, the housing 3110 is configured such that the two sound guiding holes (the sound guiding hole 3111 and the sound guiding hole 3112) may be located on the front side of the ear of the user, and the baffle 3130 is provided between the two sound guiding holes.

Referring to FIG. 31, the sound guiding hole 3111 and the sound guiding hole 3112 may be provided on each side of baffle 3130. An included angle θ may be formed between the baffle 3130 and a connection line connecting the sound guiding hole 3111 and the sound guiding hole 3112. In this case, the baffle 3130 may be configured to adjust distances from the sound guiding hole 3111 and the sound guiding hole 3112 to the ear of the user (i.e., the listening position). In some embodiments, a first sound guiding hole in the two sound guiding holes (e.g., the sound guiding hole 3111) and the ear of the user may be on one side of the baffle 3130 and a second sound guiding hole (e.g., sound guiding hole 3112) may be provided on the other side of the baffle 3130. A sound path distance from the first sound guiding hole to the ear of the user may be less than a sound path distance from the second sound guiding hole to the ear of the user. The sound guiding holes and the ear of the user being located on one side of the baffle refers to that the sound guiding hole and the opening of the ear canal are located on one side of the baffle.

A count of baffles 3130 may be one or more. For example, one or more baffles 3130 may be provided between the sound guiding hole 3111 and the sound guiding hole 3112. As another example, when the open-ear headphone 3100 includes sound guiding holes other than the sound guiding hole 3111 and the sound guiding hole 3112, one or more baffles 3130 may be provided between each two sound guiding holes, respectively (detailed descriptions may be found in FIGS. 49-52 and related descriptions thereof). In some embodiments, the baffle 3130 may be fixedly connected to the housing 3110. For example, the baffle 3130 may be q part of the housing 3110 or integrally molded with the housing 3110.

The sound guiding hole 3111 and the sound guiding hole 3112 distributed on both sides of the baffle 3130 similarly to a principle of distributing the two sound guiding holes on both sides of the ear as described above, which implements similarly an effect on the sound output performance of the open-ear headphone. Detailed descriptions may be found hereinabove, and may not be repeated here. The effect of structural parameters of the baffle 3130 on the sound output effect of the open-ear headphone 3100 is described below.

Figure 32:
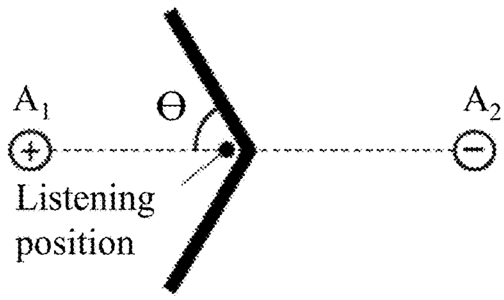
FIG. 32 is a schematic diagram illustrating an exemplary distribution of a baffle provided with different inclination angles between dipole acoustic sources according to some embodiments of the present disclosure.

In some embodiments, the magnitude of the included angle formed between the baffle and the connection line connecting the two sound guiding holes (i.e., the dipole acoustic sources) may affect a volume of the near-field heard sound and a volume of the far-field leaked sound of the open-ear headphone. To further illustrate the effect of the magnitude of the included angle formed between the baffle and the connection line connecting the two sound guiding holes on the sound output performance, a specific illustration is given in terms of the volume of the near-field heard sound or/and the volume of the far-field leaked sound at the listening position under different conditions. FIG. 32 is a schematic diagram illustrating an exemplary distribution of a baffle provided with different inclination angles between dipole acoustic sources according to some embodiments of the present disclosure. For illustration purposes, as shown in FIG. 32, the baffle is a plate structure of a V-shape structure. The baffle is provided between the point source A1 and the point source A2, a total length of the baffle is equal to a distance between the two point sources, and an intersection between the baffle and a connection line connecting the dipole acoustic source is located at a center of the dipole acoustic source. In this embodiment, the included angle θ formed between the baffle and the connection line connecting the dipole acoustic sources (the point source A1 and the point source A2) may be within a range of 15°-165°. It should be noted that the listening position, the structure of the baffle, and the included angle formed between the baffle and the connection line connecting the dipole acoustic sources in the present embodiment are selected only as an exemplary illustration of the principle and the effect, and are not limiting. The listening position may be reasonably adjusted according to an actual situation.

Figure 33:
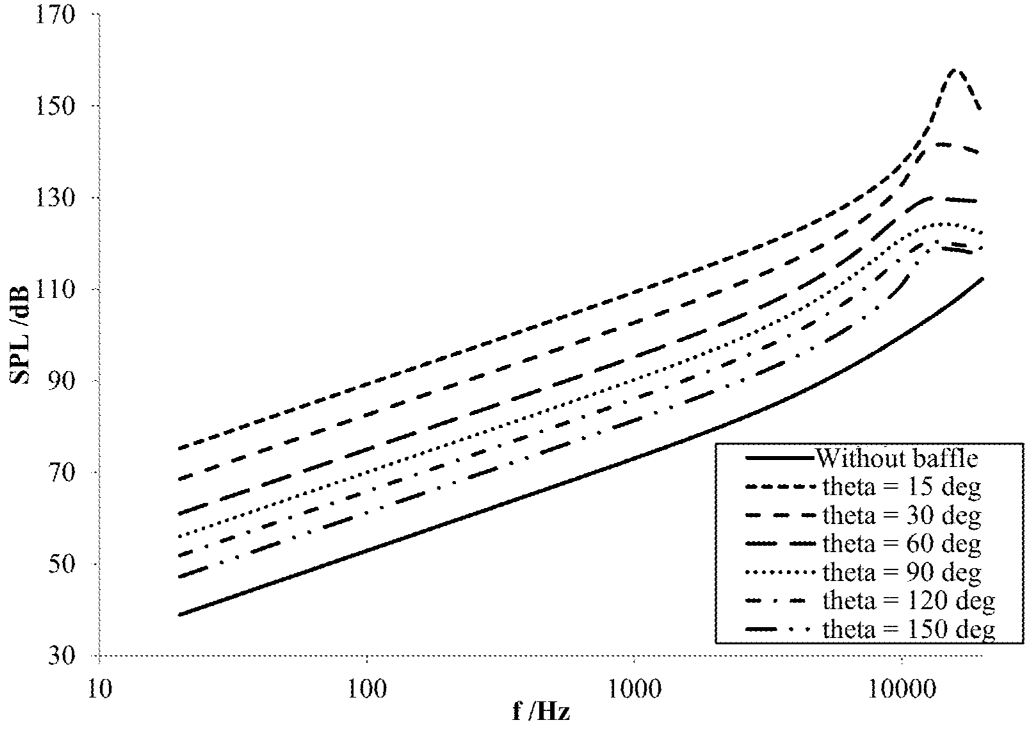
FIG. 33 is a schematic diagram illustrating exemplary frequency response curves in a near field of dipole acoustic sources with a baffle having different inclination angles in FIG. 32.
Figure 34:
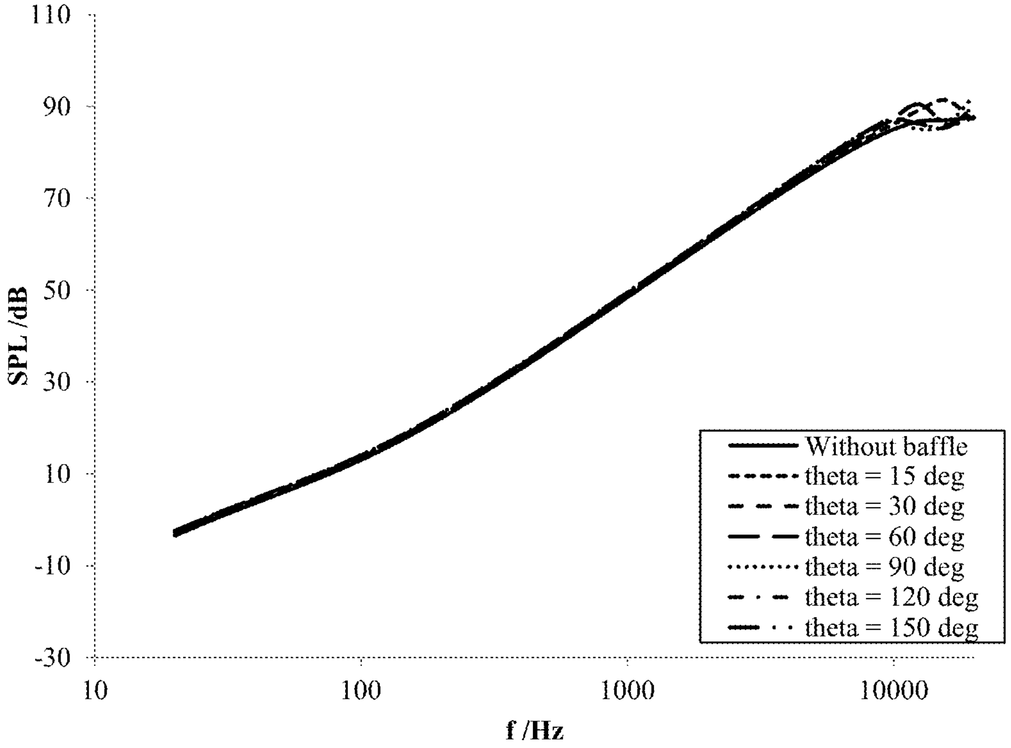
FIG. 34 is a schematic diagram illustrating exemplary frequency response curves in a far field of dipole acoustic sources with a baffle having different inclination angles in FIG. 32.
Figure 35:
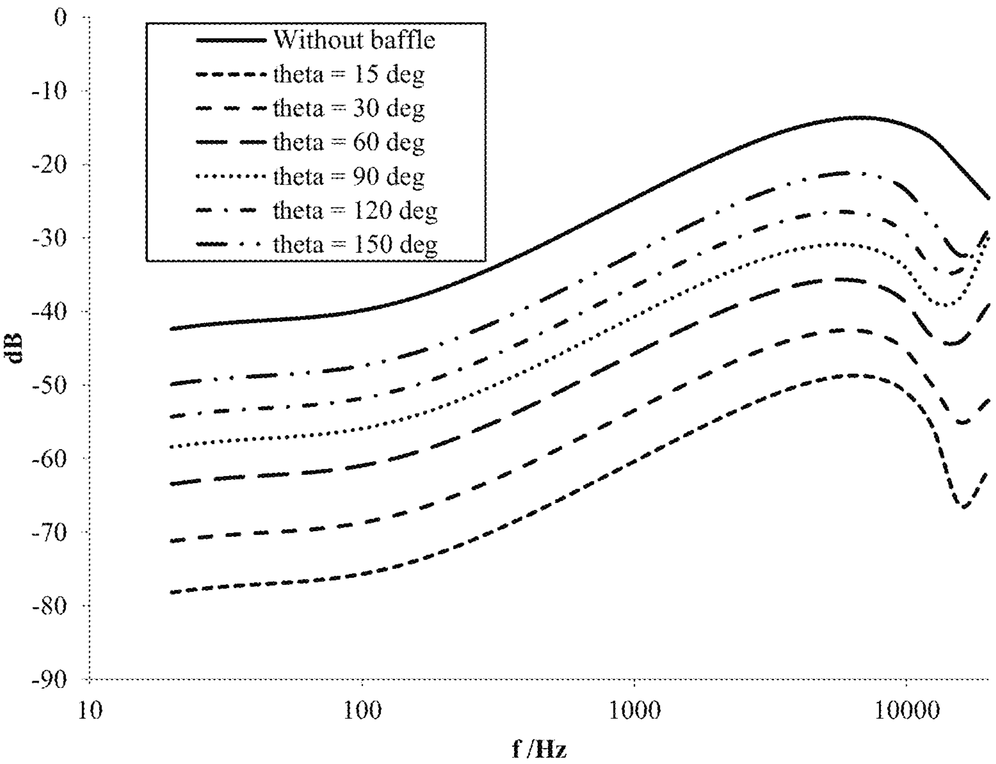
FIG. 35 is a schematic diagram illustrating sound leakage index curves generated according to FIG. 32 and FIG. 33.

FIG. 33 is a schematic diagram illustrating exemplary frequency response curves in a near field of dipole acoustic sources with a baffle having different inclination angles in FIG. 32. As shown in FIG. 33, at a listening position in the near field, a volume when an arbitrary included angle θ (that is, "theta" shown in FIG. 33) is formed between the baffle and the connection line connecting the dipole acoustic sources may be greater than a volume when no baffle is provided between the dipole acoustic sources (that is, the "without baffle" shown in FIG. 33). It may be concluded that the baffle provided between the dipole acoustic sources may effectively increase the volume of the near-field heard sound. Furthermore, the volume of the heard sound may change significantly with the change of the included angle θ. In a certain range, the smaller the included angle θ is, the larger the volume at the listening position may be. As used herein, the certain range may be the included angle θ being less than 150°. FIG. 34 is a schematic diagram illustrating exemplary frequency response curves in a far field of dipole acoustic sources with a baffle having different inclination angles in FIG. 32. As shown in FIG. 34, the included angle formed between the baffle and the connection line connecting the dipole acoustic sources has little effect on the sound leakage in the far field. FIG. 35 is a schematic diagram illustrating sound leakage index curves generated according to FIG. 32 and FIG. 33. As shown in FIG. 35, sound leakage indices when the arbitrary included angle θ formed between the baffle and the connection line connecting the dipole acoustic sources may be smaller than sound leakage index when no baffle is provided between the dipole acoustic sources. It may be concluded that the setting of the baffle between the dipole acoustic sources may effectively reduce the sound leakage indices of the dipole acoustic sources. Further, the sound leakage indices may change significantly with the change of a spatial position relationship (for example, the included angle θ) between the baffle and the dipole acoustic sources. Within a certain range, the smaller the included angle θ is, the smaller the sound leakage indices may be, that is, the stronger the sound leakage reduction capability of the dipole acoustic sources may be. In some embodiments, the baffle may be provided between the two sound guiding holes of the open-ear headphone, and the included angle formed between the baffle and the connection line connecting the two sound guiding holes may be designed reasonably, so that the open-ear headphone may have a strong sound leakage reduction capability. In some embodiments of the present disclosure, the included angle may refer to an angle between a vector pointing from the intersection of the baffle and the connection line connecting the dipole acoustic sources to a point source closer to the listening position and a vector pointing to the exterior (for example, surrounding environment) along a line where the baffle is located. In some embodiments, the included angle formed between the baffle and the connection line connecting the two sound guiding holes may be less than 150°. In some embodiments, the included angle formed between the baffle and the connection line connecting the two sound guiding holes may be no greater than 90°.

Figure 36:
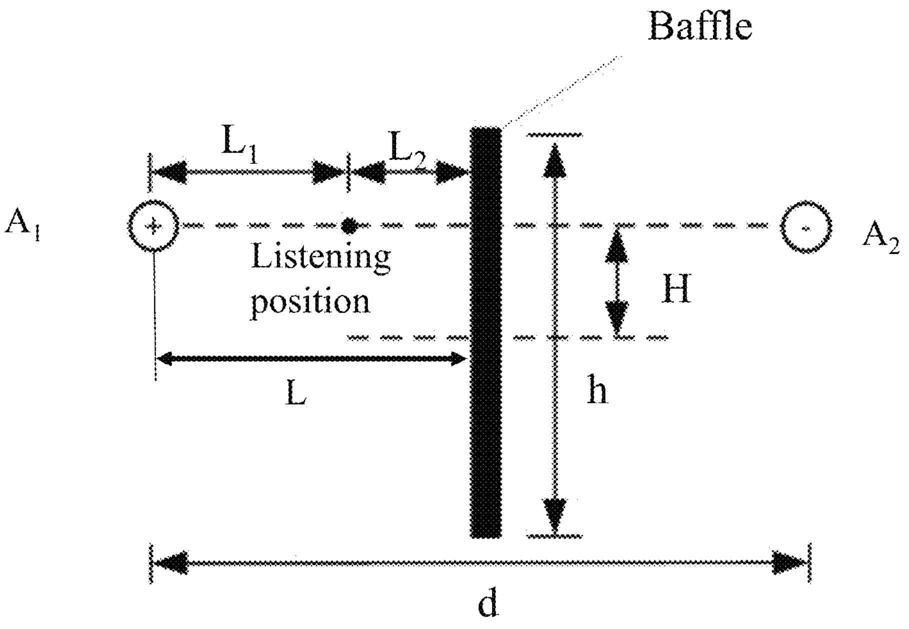
FIG. 36 is a schematic diagram illustrating an exemplary distribution of dipole acoustic sources with a baffle according to some embodiments of the present disclosure.

In some embodiments, the size of the baffle may also affect the sound output performance of the dipole acoustic sources. FIG. 36 is a schematic diagram illustrating an exemplary distribution of dipole acoustic sources with a baffle according to some embodiments of the present disclosure. Merely by way of example, as shown in FIG. 36, the baffle may be provided at a center between the point source A1 and the point source A2. The listening position (for example, a user's ear hole) may be located on the connection line connecting the point source A1 and the point source A2, and the listening position may be between the point source A1 and the baffle. A distance between the point source A1 and the baffle may be L. A distance between the point source A1 and the point source A2 may be d. A distance between the point source A1 and the listening position may be L1, and a distance between the listening position and the baffle may be L2. A height of the baffle in a direction perpendicular to the connection line connecting the dipole acoustic sources may be h. A distance from a center of the baffle to the connection line between the two point sources may be H. When the distance d between the two dipole acoustic sources remains constant, the height h of the baffle may be changed to make the height h of the baffle have different ratios with the distance d between the dipole acoustic sources. In such cases, a volume of the heard sound at the listening position and a volume of the far-field leaked sound under the different ratios may be obtained.

Figure 37:
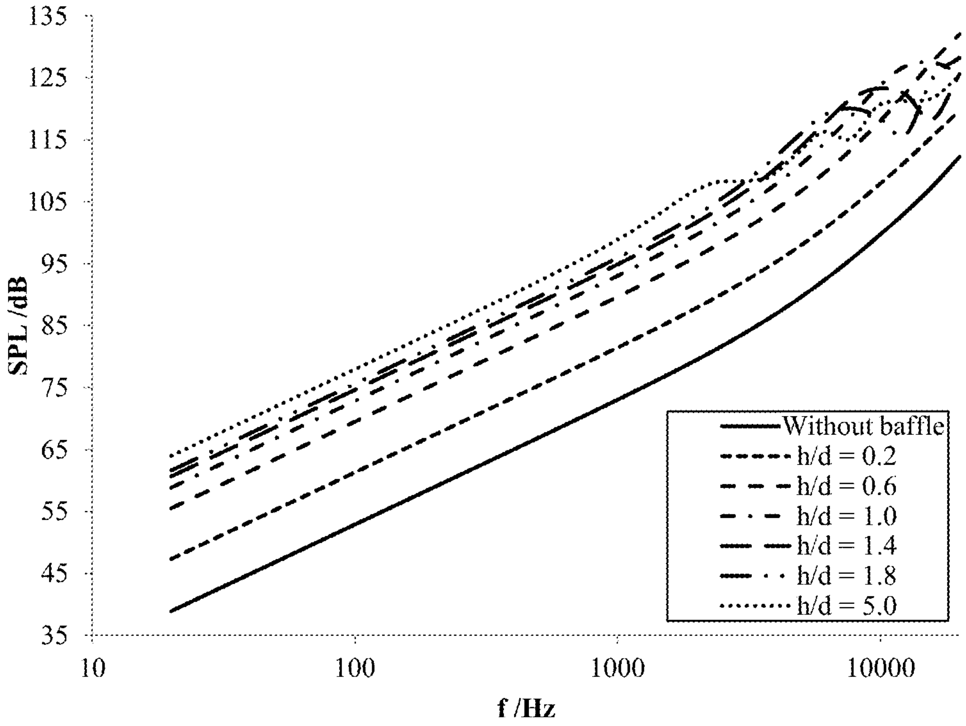
FIG. 37 is a schematic diagram illustrating exemplary frequency response curves in a near field of dipole acoustic sources in FIG. 36 when baffles of different heights are selected.

FIG. 37 is a diagram illustrating exemplary frequency response curves in a near field of dipole acoustic sources in FIG. 36 when different heights of baffles are selected. As shown in FIG. 37, in a near field listening position, the volume when the baffles of different heights are provided between the dipole acoustic sources (i.e., the "h/d" shown in FIG. 37) may be greater than a volume when no baffle (that is, "without baffle" shown in FIG. 37) is provided between the two sound guiding holes. Furthermore, as the height of the baffle increases, i.e., as a ratio of the height of the baffle to the distance between the dipole acoustic sources increases, the volume provided by the dipole acoustic sources at the listening position may gradually increase. It may be concluded that an appropriate increase in the height of the baffle may effectively increase the volume at the listening position.

Figure 38:
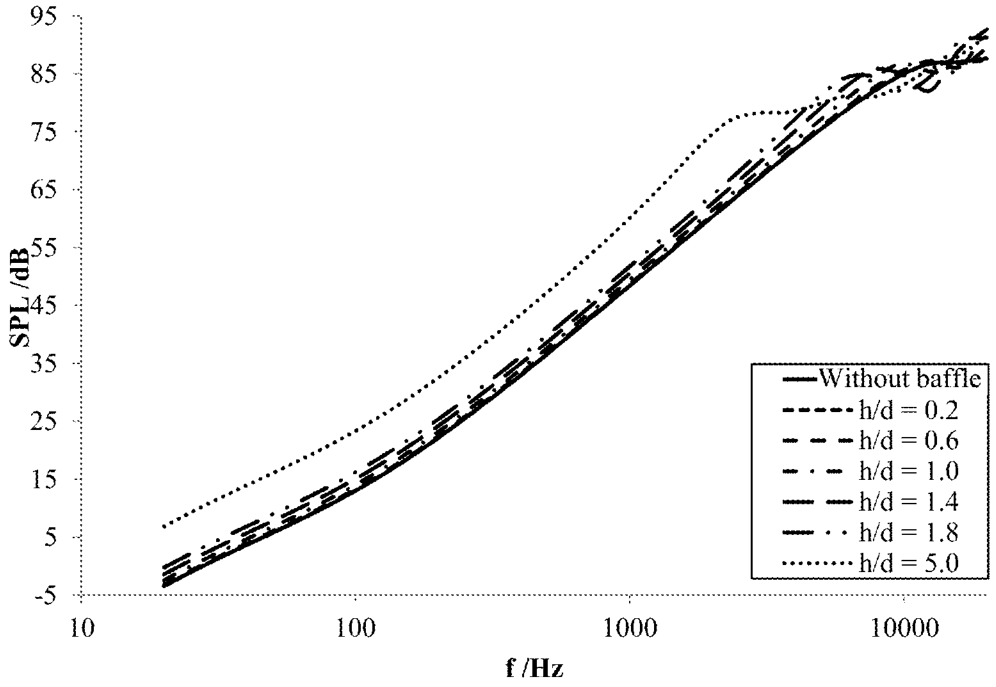
FIG. 38 is a schematic diagram illustrating exemplary frequency response curves in a far field of dipole acoustic sources in FIG. 36 when baffles of different heights are selected.

FIG. 38 is a schematic diagram illustrating exemplary frequency response curves in a far field of dipole acoustic sources in FIG. 36 when baffles of different heights are selected. As shown in FIG. 38, in the far field (for example, positions in the environmental far away from the ear of the user), when the ratio h/d of the height of the baffle to the distance between the dipole acoustic sources changes within a certain range (for example, as shown in FIG. 38, h/d is equal to 0.2, 0.6, 1.0, 1.4, 1.8), a volume of the leaked sound generated by the dipole acoustic sources may be similar to a volume of the leaked sound generated by the dipole acoustic sources without the baffle. When the ratio h/d of the height of the baffle to the distance between the dipole acoustic sources increases to a certain amount (for example, h/d is equal to 5.0), the volume of the leaked sound generated by the dipole acoustic sources at the far field may be larger than the volume of the leaked sound generated by the dipole acoustic sources without the baffle. Therefore, to avoid a relatively large sound leakage in the far field, the size of the baffle between the dipole acoustic sources should not be too large. The ratio of the height of the baffle to the distance between the two sound guiding holes (i.e., the distance between the dipole acoustic sources) may be no less than 0.2.

Figure 39:
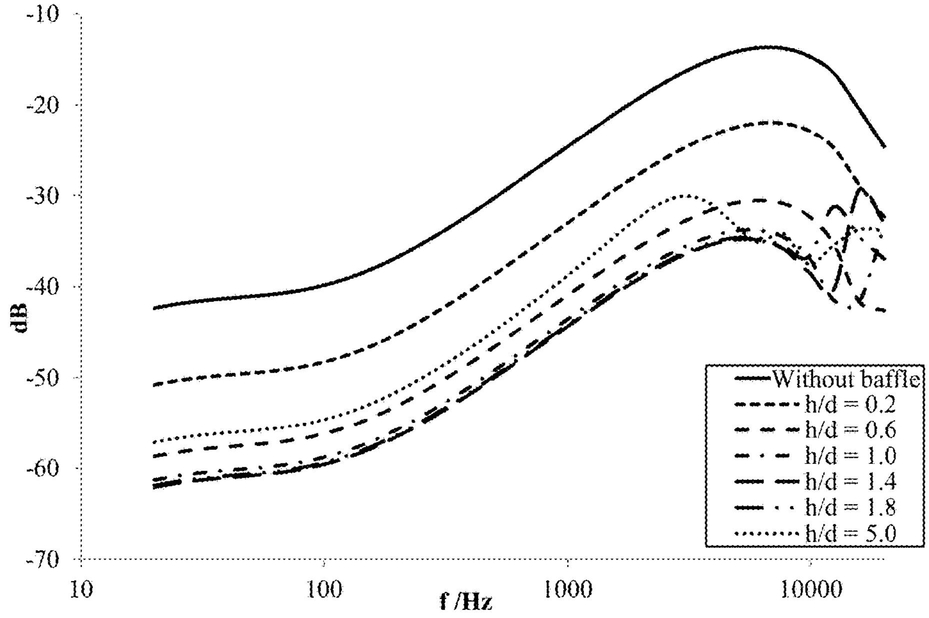
FIG. 39 is a schematic diagram illustrating sound leakage index curves of dipole acoustic sources in FIG. 36 when baffles of different heights are selected.

FIG. 39 is a schematic diagram illustrating sound leakage index curves of dipole acoustic sources in FIG. 36 when baffles of different heights are selected. As shown in FIG. 39, the sound leakage indices when the baffles of different heights are provided between the dipole acoustic sources may be smaller than the sound leakage index when no baffle is provided et between the dipole acoustic sources. Therefore, in some embodiments, to keep the sound output by the open-ear headphone as loud as possible in the near field and suppress the sound leakage in the far field, a baffle may be provided between the two sound guiding holes, and a ratio of the height of the baffle to the distance between the two sound guiding holes may be less than or equal to 5. Preferably, the ratio of the height of the baffle to the distance between the two sound guiding holes may be less than or equal to 1.8. More preferably, the ratio of the height of the baffle to the distance between the two sound guiding holes may be less than or equal to 4.

Figure 40A:
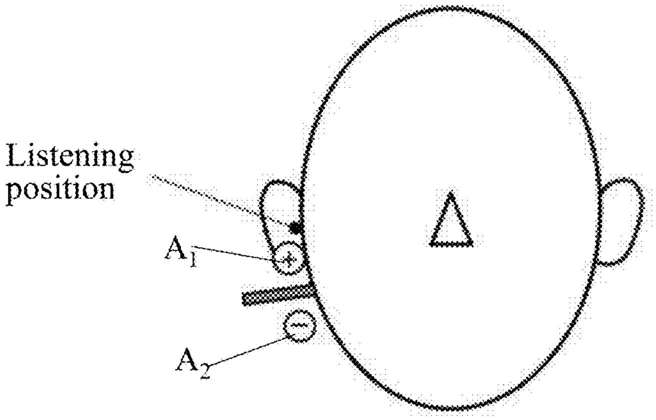
FIG. 40A and FIG. 40B are schematic diagrams illustrating a positional relationship between sound guiding holes and listening positions according to some embodiments of the present disclosure.
Figure 40B:
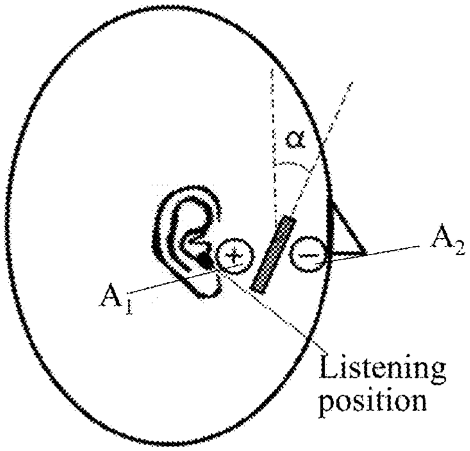

In some embodiments, the two sound guiding holes of the open-ear headphones may also be simultaneously located on the same side of the listening position. Merely by way of example, as shown in FIG. 40A, two sound guiding holes (e.g., the point source A1 and the point source A2) of the open-ear headphone may be simultaneously located below the listening position (e.g., the user's ear hole). As another example, the two sound guiding hole of the open-ear headphone may be simultaneously located in front of the listening position, as shown in FIG. 40B. It should be noted that the two sound guiding holes of the open-ear headphone may not limited to being located below and in front of the listening position, but the two sound guiding holes may also be located in other directions of the listening position, e.g., above the listening position, etc.

When two sound guiding holes of the open-ear headphone are simultaneously located on one side of the listening position and the distance between the two sound guiding holes is constant, a relatively large sound amplitude may be produced by the sound guiding hole closer to the listening position, while the sound guiding hole on the other side of the baffle may produce a relatively small sound amplitude at the listening position, the two sound amplitudes may be less cancelled out, thus ensuring a relatively large volume of the heard sound at the listening position. In some embodiments, a ratio of a distance between the sound guiding hole close to the listening position and the listening position to the distance between the two sound guiding holes may be less than or equal to 3.

When the two sound guiding holes of the open-ear headphone are simultaneously located on one side of the listening position and the distance between the two sound guiding holes is constant, the height of the baffle may affect the volume of the near-field heard sound and the volume of the leaked sound in the far field of the open-ear headphone. In some embodiments, the height of the baffle may be no greater than the distance between the two sound guiding holes. For example, a ratio of the height of the baffle plate to the distance between the two sound guiding holes may be less than or equal to 2.

When the listening position is constant and the positions of the dipole acoustic sources are constant, a distance between a center of the baffle and a connection line connecting the dipole acoustic sources may also affect the volume of the near-field heard sound and the volume of the far-field leaked sound of the open-ear headphone. As shown in FIG. 36, the height of the baffle is h, and a distance between the center of the baffle to a connection line connecting the two point sources is H. When the distance d between the dipole acoustic sources is constant, the distance H between the center of the baffle and the connection line connecting the two point sources may be changed to make the distance H between the center of the baffle and the connection line connecting the two point sources have different ratios with the height h of the baffle. In such cases, the volume of the heard sound at the listening position and the volume of the leaked sound in the far field under the different ratios may be obtained. In some embodiments, the center of the baffle may refer to a centroid or a center of the baffle.

Figure 41:
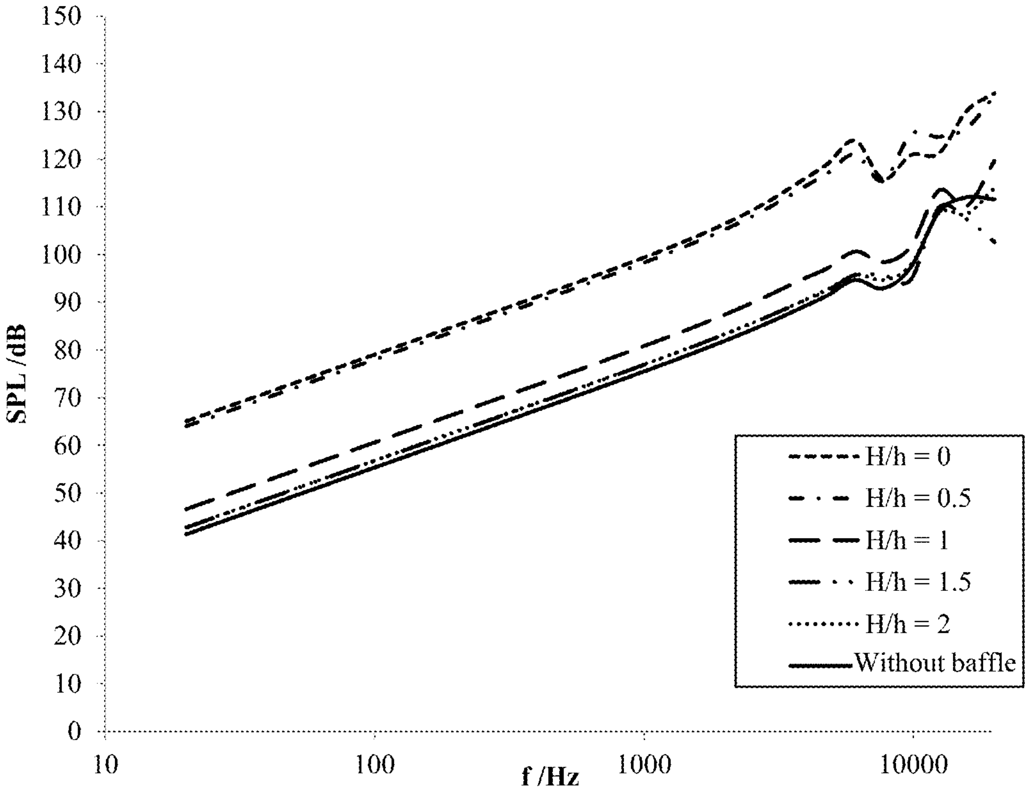
FIG. 41 is a schematic diagram illustrating exemplary frequency response curves in a near field of dipole acoustic sources in FIG. 36 when a ratio of a distance between a center of a baffle and a connection line connecting the dipole acoustic sources to a height of the baffle takes different values.
Figure 42:
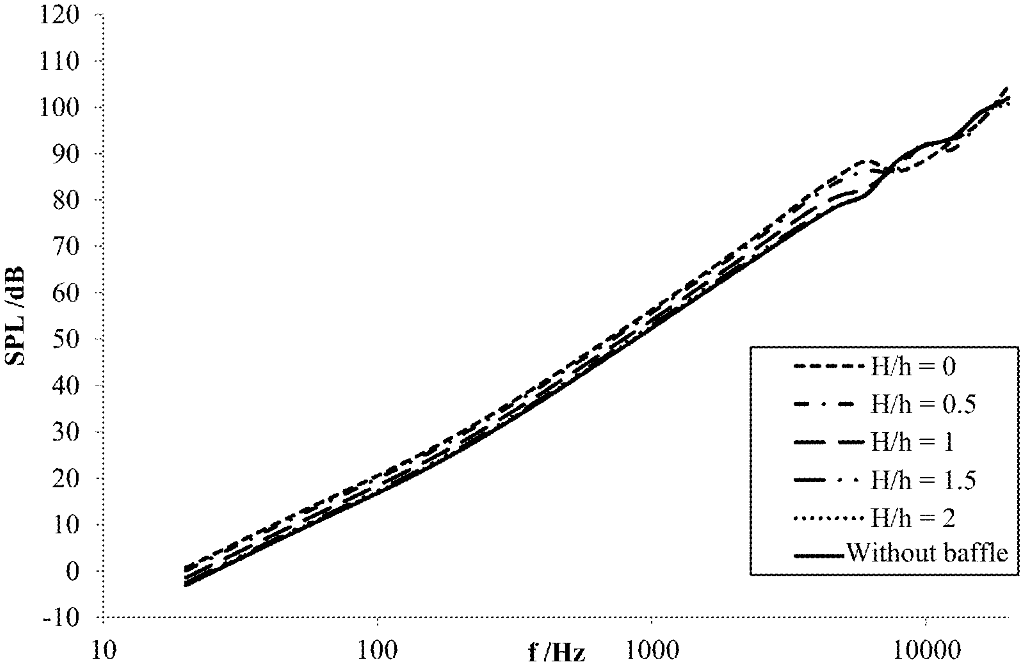
FIG. 42 is a schematic diagram illustrating exemplary frequency response curves in a far field of dipole acoustic sources in FIG. 36 when a ratio of a distance between a center of a baffle and a connection line connecting the dipole acoustic sources to a height of the baffle takes different values.
Figure 43:
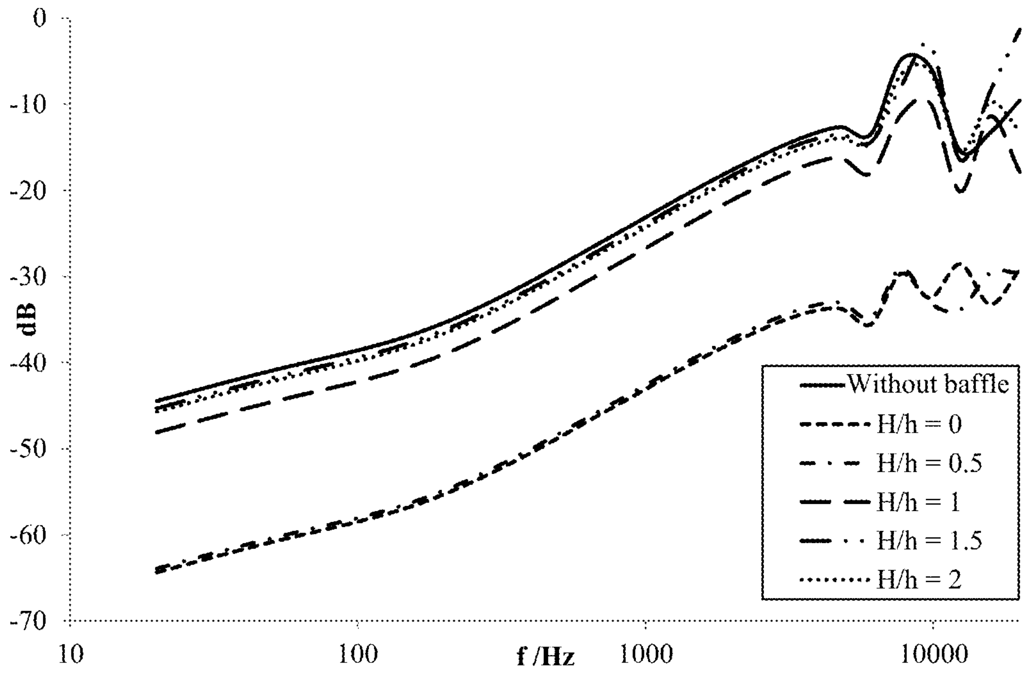
FIG. 43 is a schematic diagram illustrating sound leakage index curves of dipole acoustic sources in FIG. 36 when a ratio of a distance between a center of a baffle and a connection line connecting the dipole acoustic sources to a height of the baffle takes different values.

FIG. 41 is a schematic diagram illustrating exemplary frequency response curves in a near field of dipole acoustic sources in FIG. 36 when a ratio of a distance between a center of a baffle and a connection line connecting the dipole acoustic sources to a height of the baffle takes different values. As shown in FIG. 41, at a near-field listening position, a volume provided when the dipole acoustic sources with baffles with different positions (i.e., "H/h" shown in FIG. 41) may be higher than a volume provided by the dipole acoustic sources without the baffle (i.e., "without baffle" shown in FIG. 41). Furthermore, as the distance between the center of the baffle to the connection line connecting the dipole acoustic sources gradually increases, the volume of the sound at the near-field listening position may gradually decrease. The reason may be that when the center of the baffle is far away from the connection line connecting the dipole acoustic sources, the barrier effect of the baffle on the sounds from the dipole acoustic sources to the listening position may be weakened. As a result, the degree of interference cancellation of the sounds of the dipole acoustic sources at the listening position may become larger, which results in a decrease in the volume of the heard sound at the listening position. FIG. 42 is a schematic diagram illustrating exemplary frequency response curves in a far field of dipole acoustic sources in FIG. 36 when a ratio of a distance between a center of a baffle and a connection line connecting the dipole acoustic sources to a height of the baffle takes different values. At a far-field position, the volumes of the leaked sound generated when the dipole acoustic sources are provided with baffles with different positions is not much different from a volume of the leaked sound generated by the dipole acoustic sources without a baffle. FIG. 43 is a schematic diagram illustrating sound leakage index curves of dipole acoustic sources in FIG. 36 when a ratio of a distance between a center of a baffle and a connection line connecting the dipole acoustic sources to a height of the baffle takes different values. As shown in FIG. 43, the sound leakage indices when the baffles with different positions (that is, different "H/h" shown in FIG. 43) are provided between the dipole acoustic sources are less than that when no baffle (that is, "without baffle" shown in FIG. 43) is provided between the dipole acoustic sources, which may indicate that the sound leakage reduction capability may be stronger when the baffles with different positions are provided between the dipole acoustic sources. Further, as the center of the baffle gradually approaches, that is, as the distance between the center of the baffle and the connection line connecting the dipole acoustic sources gradually decreases, the sound leakage indices gradually decrease, that is, the sound leakage reduction capability may be gradually enhanced. In some embodiments, to keep the sound output by the open-ear headphone as loud as possible in the near field and suppress the sound leakage in the far field, a ratio of the distance between the center of the baffle and the connection line connecting the two sound guiding holes to the height of the baffle may be less than or equal to 2.

The material chosen for the baffle also affects the volume of the near-field heard sound and the volume of the far-field leaked sound of the open-ear headphone. In some embodiments, the baffle may be made of an acoustic resistance material that suppresses/absorbs sound at specific frequencies. For example, if the volume of high-frequency sound in the near field needs to be reduced, the interference cancellation of high-frequency sound in the near field may need to be promoted, that is, it may be necessary to make sounds with opposite phases output by the two sound guiding holes on both sides of the baffle reach the near field. Therefore, the baffle may be made of material that can block low-frequency sounds and allow high-frequency sounds to pass through, such that the baffle may be weak in blocking high-frequency sounds, and the high-frequency sounds output by the sound guiding holes on both sides of the baffle may have similar amplitude but opposite phases at the listening position. As a result, the high-frequency sounds may be suppressed due to the interference cancellation of the high-frequency sounds at the listening position. The material that can block low-frequency sounds and allow high-frequency sounds to pass through may refer to a material that has a larger impedance to low-frequency sounds but a smaller impedance to high-frequency sounds. In some embodiments, the material that can block low-frequency sounds and allow high-frequency sounds to pass through may include resonance sound-absorbing materials, polymer particle sound-absorbing materials, or the like. As another example, to reduce a low-frequency sound in the near field, the baffle may be made of material that can block high-frequency sounds and allow low-frequency sounds to pass through. In this case, the baffle may be weak in blocking the low-frequency sounds, and the low-frequency sounds output by the sound guiding holes on both sides of the baffle may have close amplitude but opposite phases at the listening position. As a result, the low-frequency sounds may be suppressed due to the interference cancellation of the low-frequency sounds at the listening position. The material that can block high-frequency sounds and allow low-frequency sounds to pass through may refer to material that has a relatively large impedance to high-frequency sounds but a relatively small impedance to low-frequency sounds. In some embodiments, the material that can block high-frequency sounds and allow low-frequency sounds to pass through may include porous acoustic absorbing materials with a foam type or a fiber type. It should be known that the acoustic resistance material may be not limited to the material that can block low-frequency sounds and allow high-frequency to pass through and the material that can block high-frequency sounds and allow low-frequency to pass through. Different acoustic resistance materials may be used in the open-ear headphone according to the requirements of the open-ear headphone for the sound frequency band.

To further illustrate the effect of the acoustic resistance material of the baffle on the sound output performance of the open-ear headphone, the low-frequency resistance baffle may be taken as an example to explain the volume of the near-field heard sound at the listening position or/and the volume of the far-field leaked sound. The low-frequency resistance baffle is a baffle made of a material that has a high impedance to low-frequency sounds and a low impedance to high-frequency sounds.

Figure 44:
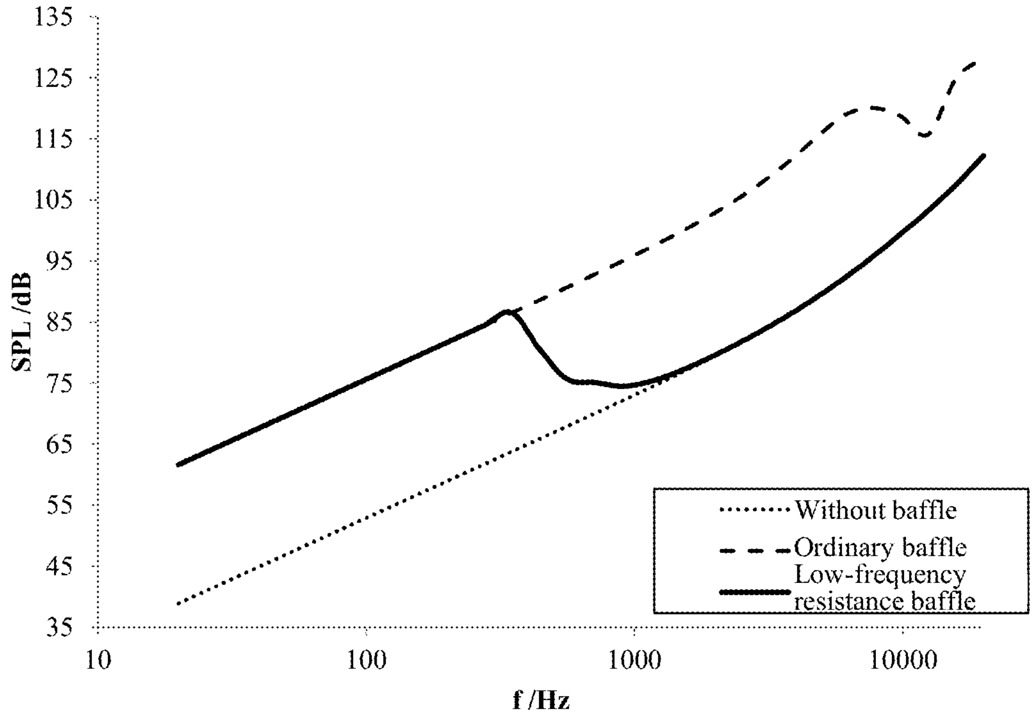
FIG. 44 is a schematic diagram illustrating exemplary frequency response curves in a near field when a low-frequency resistance baffle is located between dipole acoustic sources according to some embodiments of the present disclosure.

FIG. 44 is a schematic diagram illustrating exemplary frequency response curves in a near field when a low-frequency resistance baffle is located between dipole acoustic sources according to some embodiments of the present disclosure. As shown in FIG. 44, in the near field, in a certain frequency range (for example, 20-1000 Hz), the volume of the heard sound when an ordinary baffle (that is, a baffle made of material that has a large impedance to low-frequency sounds and high-frequency sounds) or the low-frequency resistance baffle is provided between the dipole acoustic sources is greater than the volume of the heard sound when no baffle is provided between the dipole acoustic sources. When the frequency is greater than 1000 Hz, there is little change in the volumes of the heard sound when the low-frequency resistance baffle and no baffle is provided between the dipole acoustic sources. The volume of the heard sound when the ordinary baffle is provided between the dipole acoustic sources is greater than the volumes of the heard sounds when the low-frequency resistance baffle and no baffle is provided between the dipole acoustic sources. The reason may be that the low-frequency resistance baffle has a large acoustic resistance to low-frequency sounds. Further, when the sound output by the two sound guiding holes of the open-ear headphone is low-frequency sounds, the low-frequency resistance baffle may serve as a baffle to reduce the interference cancellation of the sound output by the two sound guiding holes at the listening position, thereby ensuring that the volume of the heard sound at the listening position is large. When the sounds output by the two sound guiding holes of the open-ear headphone are high-frequency sounds, the blocking effect of the low-frequency resistance baffle may be weakened, and the high-frequency sounds output by the two sound guiding holes may directly pass through the low-frequency resistance baffle to interfere and cancel at the listening position, thereby reducing the volume of the high-frequency sounds output by the open-ear headphone at the listening position.

Figure 45:
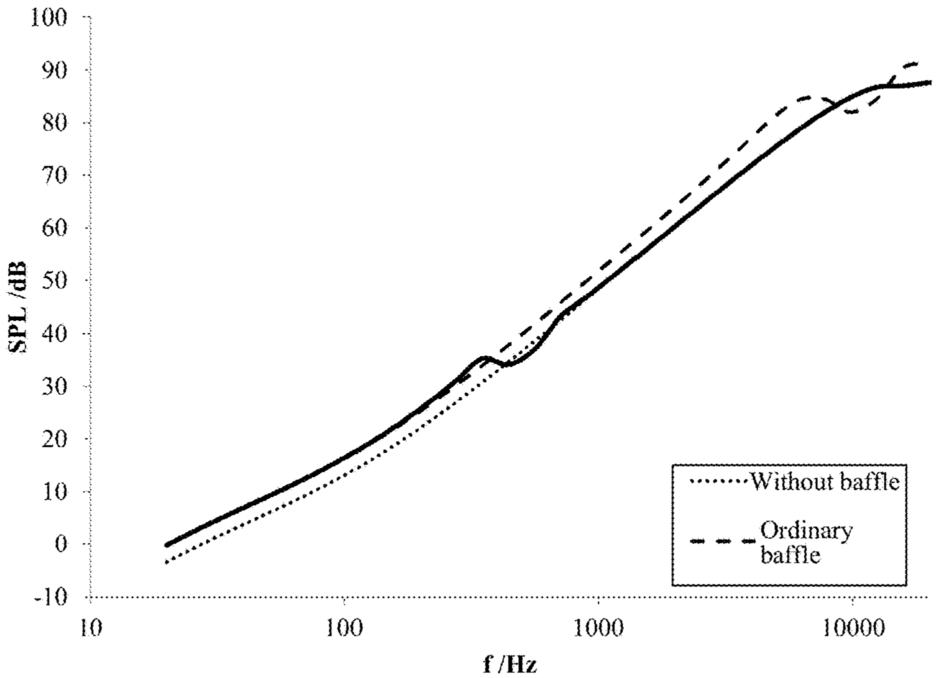
FIG. 45 is a schematic diagram illustrating exemplary frequency response curves in a far field when a low-frequency resistance baffle is located between dipole acoustic sources according to some embodiments of the present disclosure.

FIG. 45 is a schematic diagram illustrating exemplary frequency response curves in a far field when a low-frequency resistance baffle is located between dipole acoustic sources according to some embodiments of the present disclosure. As shown in FIG. 45, in the far field, in a certain frequency range (for example, 20-700 Hz), the volume of the leaked sound when the low-frequency resistance baffle or an ordinary baffle is provided between the dipole acoustic sources is similar to the volume of the leaked sound when no baffle is provided between the dipole acoustic sources. As the frequency increases (for example, when the frequency is greater than 700 Hz), the volumes of the leaked sound when the low-frequency resistance baffle is provided between the dipole acoustic sources is similar to that when no baffle is provided between the dipole acoustic sources, and the volume of the leaked sound when the low-frequency resistance baffle is provided between the dipole acoustic sources is smaller than that when the ordinary baffle is provided between the dipole acoustic sources, which may indicate that, in mid-high-frequencies, the sound leakage reduction capability of the low-frequency resistance baffle may be stronger than that of the ordinary baffle.

A structure of the baffle may affect the volume of the near-field heard sound and the volume of leaked sound in the far field of the acoustic open-ear headphone. In some embodiments, the baffle may be provided with a specific acoustic structure. The specific acoustic structure may act on (for example, absorb, block, etc.) sound passing the baffle to adjust the sound at the listening position, such as increasing the volume of the sound at the listening position, enhancing or weakening the sound in a specific frequency band (e.g., the low-frequency band, the high-frequency band, etc.

described in the present disclosure), etc. To further illustrate the effect of the acoustic structure of the baffle on sound effects, a detailed description may be given below in connection with (a), (b), (c), and (d) in FIG. 46.

Figure 46:
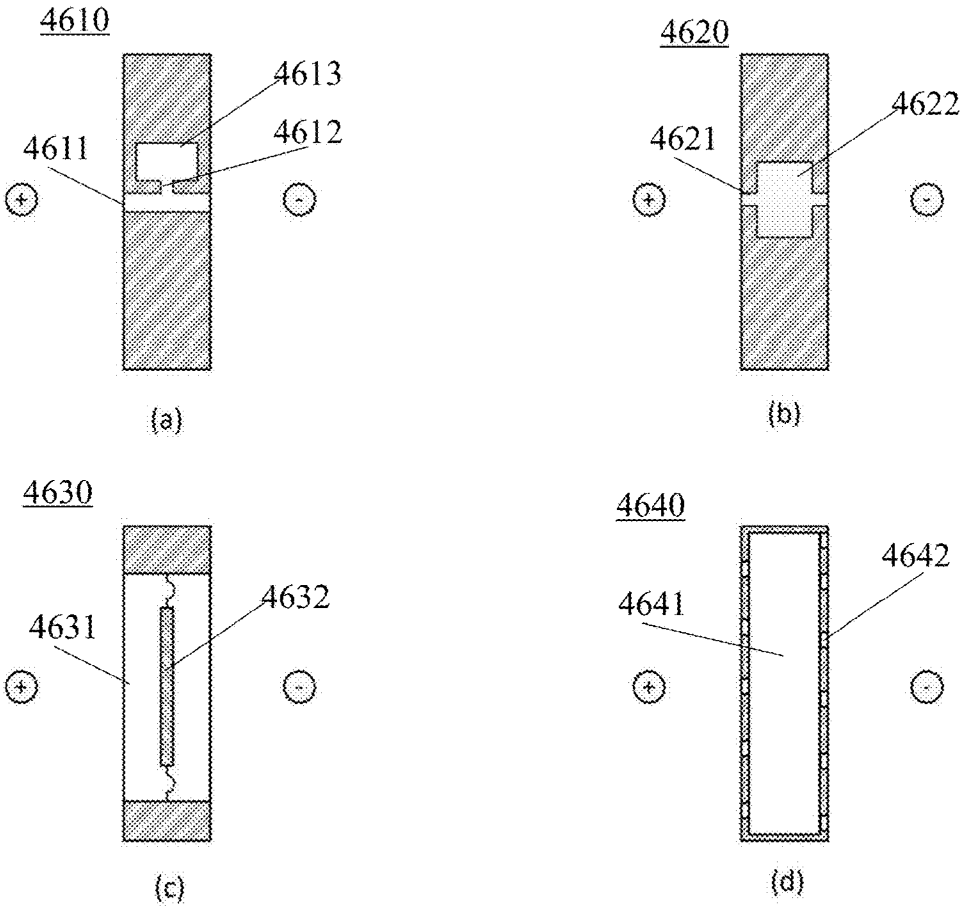
FIG. 46 is a schematic diagram illustrating structures of several acoustic structures according to some embodiments of the present disclosure.

FIG. 46 is a schematic diagram illustrating structures of several acoustic structures according to some embodiments of the present disclosure. As shown in (a) of FIG. 46, the acoustic structure 4610 may include a sound guiding channel 3211 and a sound cavity structure. The sound guiding channel 4611 may penetrate through the baffle. The sound cavity structure may be arranged along the circumference of the sound guiding channel 4611. The sound cavity structure may be in communication with the sound guiding channel 4611. The sound cavity structure may include a first cavity 4612 and a second cavity 4613. Two ends of the first cavity 4612 may be respectively communicated with the sound guiding channel 4611 and the second cavity 4613. A volume of the second cavity 4613 may be larger than a volume of the first cavity 4612. A count of the sound cavity structures may be one or more. When a sound from one side of the baffle passes through the sound guiding channel 4611, sounds with a specific frequency (for example, sounds with a frequency equal to a resonant frequency of the sound cavity structure) may be absorbed by the sound cavity structure, which may reduce the interference cancellation of the sounds in the specific frequency at the listening position, thereby increasing the volume at the listening position. In some embodiments, by adjusting a size of the sound cavity structure, the resonant frequency of the acoustic cavity structure may be changed, thereby changing the frequency band that the baffle may absorb. In some embodiments, a layer of air-permeable material (for example, cotton cloth, sponge) may be provided at a connection between the sound guiding channel 4611 and the sound cavity structure to widen a range of the resonant frequency of the sound cavity structure, thereby improving the effect of absorbing the sound of the sound cavity structure.

As shown in (b), the acoustic structure 4620 may include a sound guiding channel 4621 and a sound cavity structure 4622. The sound guiding channel 4621 may penetrate through the baffle. The sound cavity structure 4622 may surround an outer side of the sound guiding channel 4621. The sound cavity structure 4622 may be in communication with the sound guiding channel 4621. The sound cavity structure 4622 may be one or more. When a sound from a side of the baffle passes through the acoustic structure 4620, the sound cavity structure 4622 may act as a band-pass filter for the sound, that is, the acoustic structure 4622 may allow sounds with a specific frequency band to pass through and absorb sounds with other frequency bands. Since the passed sounds may cancel other sounds at the listening position, the acoustic structure 4620 may reduce the sounds with the specific frequency band at the listening position. For the absorbed sounds, since the cancellation of the absorbed sounds and other sounds at the listening position is avoided, the acoustic structure 3220 may improve the sounds with the other frequency bands at the listening position.

As shown in (c), the acoustic structure 4630 may include a sound guiding channel 4631 and a passive diaphragm structure 4632. The passive diaphragm structure 4632 may be vertically arranged inside the sound guiding channel 3231. Two ends of the passive diaphragm structure 4632 may be respectively fixedly connected to an inner wall of the baffle. A count of the passive diaphragm structure 4632 may be one or more. When a sound from a side of the baffle passes through the acoustic structure 4630, the passive diaphragm structure 4632 may filter the sound, thereby enhancing or reducing a sound with a specific frequency in a near field.

As shown in (d), an acoustic structure 4640 may include a sound cavity structure 4641. The sound cavity structure 4641 may be a cavity that is wholly or partially hollow within the baffle. In some embodiments, a plurality of through holes 4642 may be provided on both sidewalls of the baffle. When sounds from a side of the baffle enter the sound cavity structure 4641 through the plurality of through holes 4642, sounds with a specific frequency may directly pass through the acoustic structure 4640, and sounds with other frequencies (for example, the sounds with the same frequency as a resonant frequency of the acoustic structure 4640) may be lost due to the vibration of the air inside the acoustic structure 4640 after entering the sound cavity structure 4641. The sounds with the specific frequency that passes directly through the acoustic structure 4640 may interfere with and cancel sounds output by other sound guiding holes at the listening position, thereby reducing the volume at the listening position. It should be noted that the count and distribution positions of the through holes 4642 in the acoustic structure 4640 may be adjusted according to specific requirements, which may not be described in detail herein.

The baffle only blocks sounds from the sound guiding hole on one side of the baffle, if sounds with a specific frequency need to be enhanced at the listening position, the acoustic structure of the baffle may be set according to one or more of the above manners, so that the acoustic structure may absorb the sounds with the specific frequency, which may prevent the sounds with the specific frequency output by the sound guiding holes on both sides of the baffle from being interfered and canceled at the listening position. Conversely, if the sounds with the specific frequency need to be reduced at the listening position, the acoustic structure of the baffle may be configured to allow the sounds with the specific frequency to pass through directly.

In some embodiments, the baffle may be provided with an acoustic structure that alters the acoustic impedance of the baffle. The acoustic structure may be an acoustic resistance material, and the acoustic resistance material may absorb a portion of the sound passing through the baffle. The acoustic resistance material may include plastic, textile, metal, permeable material, woven material, screen material or mesh material, porous material, granular material, polymer material, or the like, or any combination thereof. The acoustic resistance material may have an acoustic impedance. The impedance may be within a range of 5 MKS Rayleigh-500 MKS Rayleigh.

In some embodiments, similar to the acoustic structure provided in the baffle for changing the acoustic impedance of the baffle, a filtering structure may also be provided in the acoustic transmission structure of the open-ear headphone. The filtering structure may include an acoustic absorbing structure for absorbing the sound in a target frequency range to modulate the sound effect of the open-ear headphone in a spatial point (e.g., to reduce the sound leakage of the open-ear headphone in the far field at high frequencies). The acoustic absorbing structure may include a resistance-type acoustic absorbing structure or an impedance-type acoustic absorbing structure. The resistance-type acoustic absorbing structure may include a porous acoustic absorbing material or an acoustic gauze. The impedance-type acoustic absorbing structure may include but is not limited to, perforated plates, microperforated plates, thin plates, thin membranes, ¼ wavelength resonance pipes, etc., or any combination thereof. More descriptions regarding the filtering structure may be found in FIGS. 75-86 and related descriptions thereof, which are not repeated here.

Figure 47:
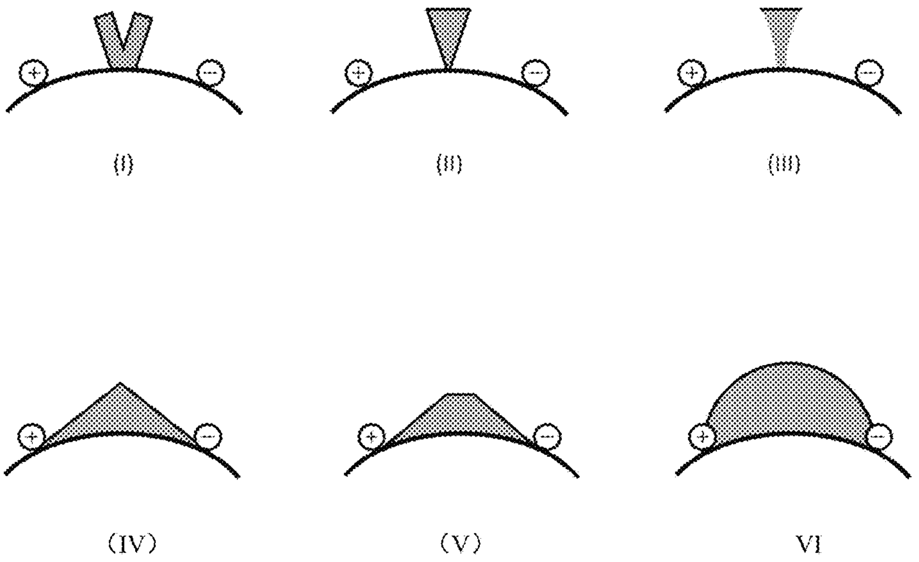
FIG. 47 is a schematic diagram illustrating structures of baffles of different shapes according to some embodiments of the present disclosure.

FIG. 47 is a schematic diagram illustrating structures of baffles of different shapes according to some embodiments of the present disclosure. As shown in FIG. 47, in some embodiments, the baffle may be a plate of uniform width, or a plate that is sequentially decreasing or increasing from top to bottom. The baffle may be a symmetrically shaped structure. For example, the baffle may be shaped in the form of a V-shape, a wedge, an isosceles triangle, a trapezoid, a semicircle, or the like, or any combination thereof. The baffle may also be an asymmetrically shaped structure. For example, the shape of the baffle may be wavy, right-angled triangular, L-shaped, or the like, or any combination thereof.

Figure 48:
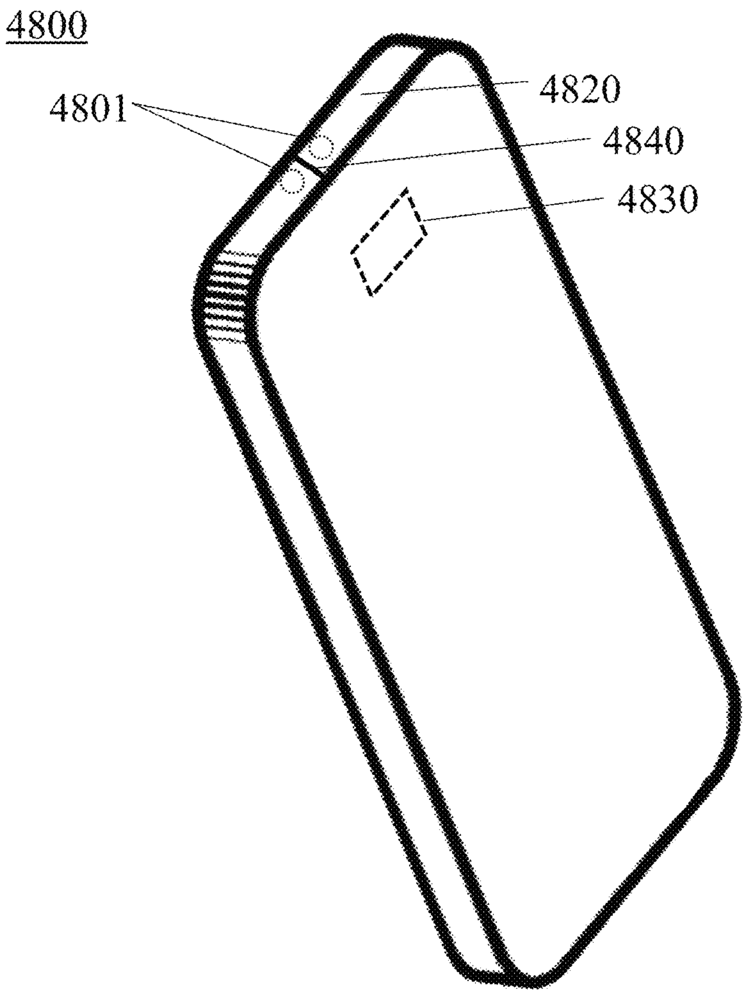
FIG. 48 is a schematic diagram illustrating a cellphone including sound guiding holes and a baffle according to some embodiments of in the present disclosure.

FIG. 48 is a schematic diagram illustrating a cellphone including sound guiding holes and a baffle according to some embodiments of in the present disclosure. As shown, a plurality of sound guiding holes are provided on the top 4820 of the cellphone 4800 (i.e., an upper surface of the cellphone "vertical" to a display screen of the cellphone). Merely by way of example, the sound guiding holes 4801 may form a set of dipole acoustic sources (or a point source array) for outputting sound. A baffle 4840 may be provided between the sound guiding holes 4801. A loudspeaker 4830 may be provided inside a housing of the cellphone 4800. The sound generated by the loudspeaker 4830 may be transmitted outwardly through the sound guiding holes 4801.

In some embodiments, the sound guiding hole 4801 may emit a set of sounds with opposite phases (or substantially opposite) and of the same amplitude (or substantially the same). When a user places the sound guiding holes 3801 near an ear to receive voice information, according to the descriptions of the embodiments in FIGS. 31-47 in the present disclosure, the baffle 4840 may "block" between one of the sound guiding holes 3801 and the ear of the user, which may be equivalent to increasing a sound path distance from the sound guiding hole to the ear of the user, so that the sound guiding holes 3801 may output strong near-field heard sound to the user. Meanwhile, the baffle 4840 may have little effect on sounds output by the sound guiding holes in a far field, so that due to the interference cancellation of the sounds in the far field, the sound guiding holes 4801 may reduce sound leakage to the surrounding environment.

In some embodiments, there may be a plurality of sound guiding holes on the open-ear headphone. When the sound guiding holes of the open-ear headphone are more than two, i.e., when there are more than two point sources in the open-ear headphone, a plurality of point sources may be provided with baffles between any two of the plurality of point sources. Through the cooperation of the plurality of point sources and the plurality of baffles, the open-ear headphone may achieve a better sound output effect. In some embodiments, the plurality of point sources may include at least one set of two point sources with opposite phases. To further explain the coordination of the plurality of point sources and the plurality of baffles in the open-ear headphone, a detailed description may be given below in connection with FIG. 49.

Figure 49:
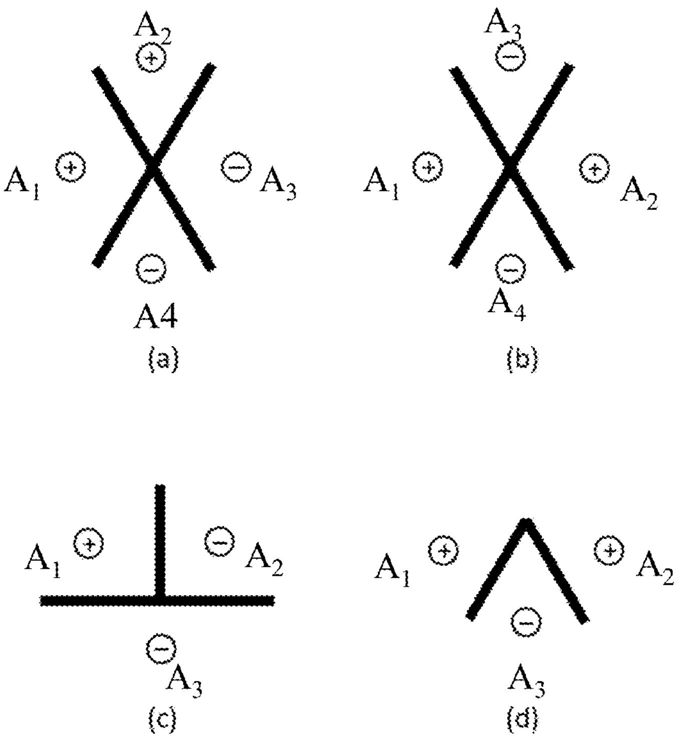
FIG. 49 is a schematic diagram illustrating distributions of point sources and baffles according to some embodiments of the present disclosure.

FIG. 49 is a schematic diagram illustrating distribution of point sources with baffles according to some embodiments of the present disclosure. As shown in (a) and (b) of FIG. 49, the open-ear headphone has four-point sources (corresponding to the four sound guiding holes on the open-ear headphone, respectively). A point source A1 and a point source A2 may have a same phase. A point source A3 and a point source A4 may have a same phase. The point source A1 and the point source A3 may have opposite phases. The point source A1, the point source A2, the point source A3, and the point source A4 may be separated by two cross-arranged baffles or a plurality of spliced baffles. The point source A1 and the point source A3 (or the point source A4), and the point source A2 and the point source A3 (or the point source A4) may respectively form the dipole acoustic sources as described elsewhere in the present disclosure. As shown in (a), the point source A1 and the point source A3 may be arranged opposite to each other, and may be arranged adjacent to the point source A2 and the point source A4. As shown in (b), the point source A1 and the point source A2 are arranged opposite to each other and may be arranged adjacent to the point source A3 and the point source A4. As shown in (c), the open-ear headphone may include three point sources (respectively corresponding to three sound guiding holes on the open-ear headphone). The point source A1 and the point source A2 may have opposite phases, and the point source A1 and the point source A3 may have opposite phases, which may form two sets of dipole acoustic sources as described elsewhere in the present disclosure. The point source A1, the point source A2, and the point source A3 may be separated by two intersecting baffles. As shown in (d), the open-ear headphone may have three point sources (corresponding to the three sound guiding holes on the open-ear headphone, respectively). A point source A1 and a point source A2 may have a same phase, and the point source A1 and a point source A3 may have opposite phases. The point source A1 and the point source A3, and the point source A2 and the point source A3 may respectively form dipole acoustic sources as described elsewhere in the present disclosure. The point source A1, the point source A2, and the point source A3 may be separated by a V-shaped baffle.

Figure 50:
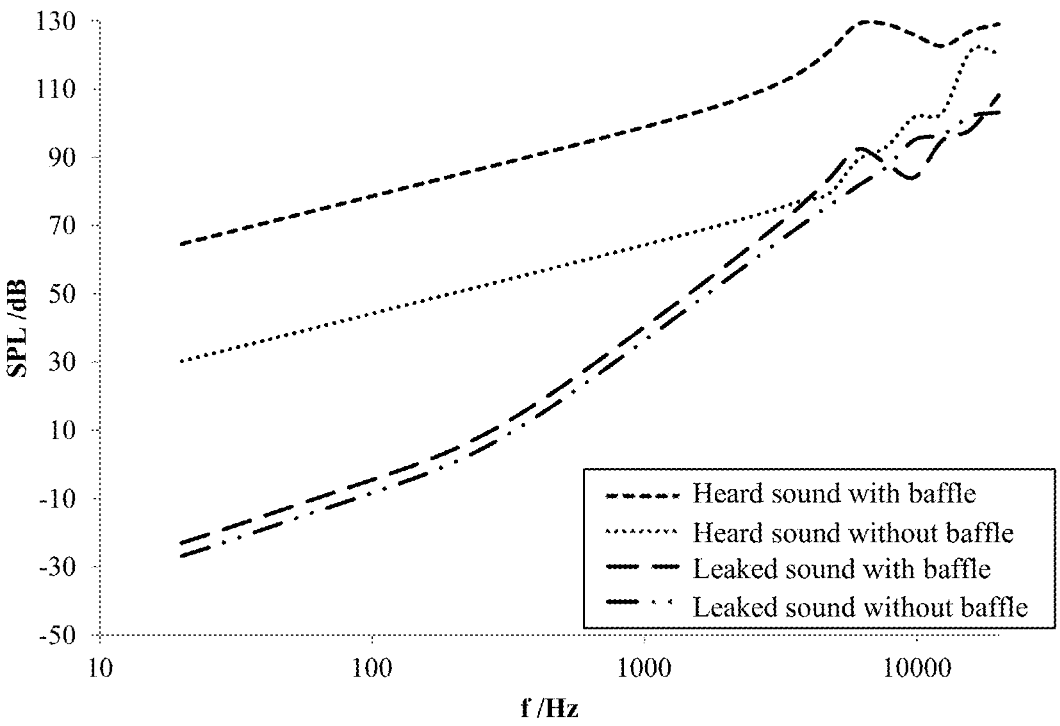
FIG. 50 is a schematic diagram illustrating exemplary frequency response curves in a near field and a far field of the point sources with or without baffles in FIG. 49.
Figure 51:
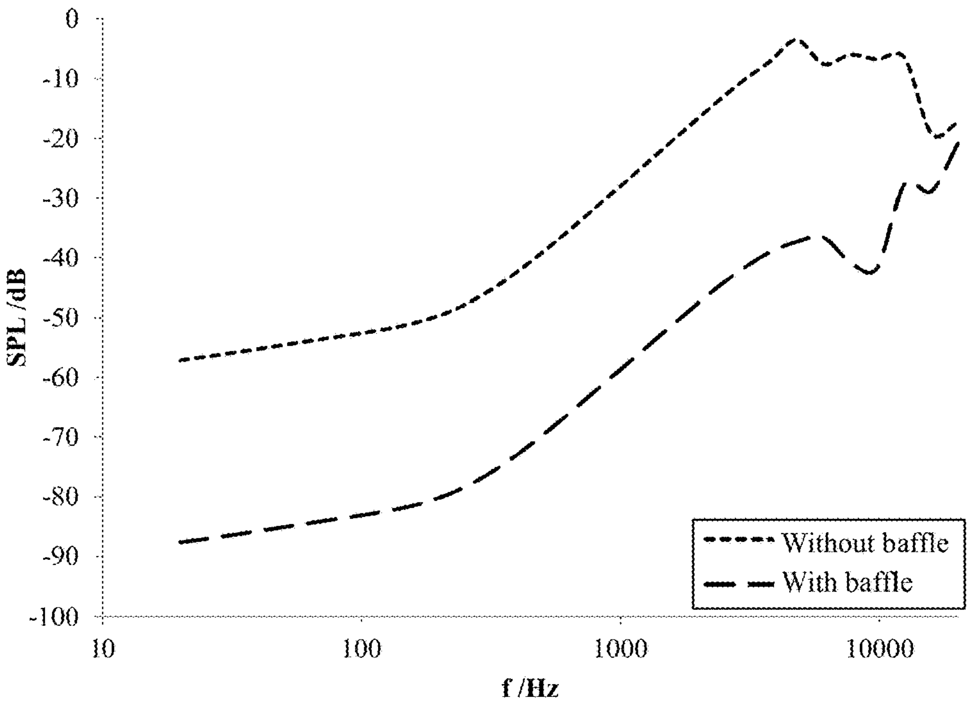
FIG. 51 is a schematic diagram illustrating sound leakage index curves of the point sources with or without baffles in FIG. 49.
Figure 52:
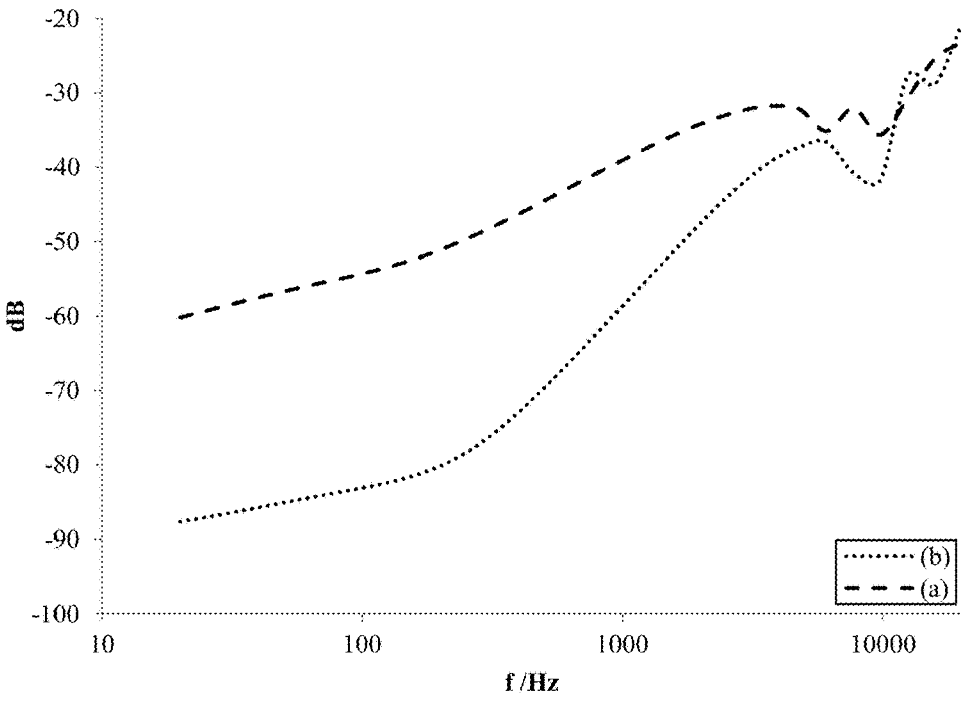
FIG. 52 is a schematic diagram illustrating sound leakage index curves corresponding to two distribution manners of the point sources illustrated in (a) and (b) of FIG. 49.

FIG. 50 is a schematic diagram illustrating exemplary frequency response curves in a near field and a far field of point sources with or without baffles in FIG. 49. As shown in FIG. 50, in the near field, a volume of the heard sound when baffles are provided between the multi-point sources (for example, the point source A1, the point source A2, the point source A3, and the point source A4) is significantly greater than a volume of the heard sound when no baffle is provided between the multi-point sources, which may indicate that the baffles provided between multi-point sources may increase the volume of the near-field heard sound. In the far field, a volume of the leaked sound when the baffles are provided between the multi-point sources is similar to a volume of the leaked sound when the baffles are not provided between the multi-point sources. FIG. 51 is a schematic diagram illustrating sound leakage index curves of point sources with or without baffles in FIG. 49. As shown in FIG. 51, on the whole, the sound leakage indices when the baffles are provided between the multi-point sources are significantly reduced compared to the sound leakage indices when no baffle is provided between the multi-point sources, which may indicate that the sound leakage reduction capability may be significantly enhanced when the baffles are provided between the multi-point sources. FIG. 52 is a schematic diagram illustrating sound leakage index curves corresponding to two distribution manners of the point sources illustrated in (a) and (b) of FIG. 49. As shown in FIG. 52, in a specific frequency range, among the four point sources, the sound leakage indices (shown in (b) of FIG. 52) when two point sources (for example, the point source A1 and the point source A2, the point source A3 and the point source A4 in (b) of FIG. 49) with the same phase are arranged opposite to each other on the periphery of the baffle are significantly smaller than the sound leakage indices (shown in (a) of FIG. 52) when two point sources (for example, the point source A1 and the point source A3, the point source A2 and the point source A4 in (a) of FIG. 49) with opposite phases are arranged opposite to each other on the periphery of the baffle, which may indicate that the sound leakage reduction capability of the two point sources with the same phase arranged opposite to each other on the periphery of the baffle is stronger than the sound leakage reduction capability of the two point sources with the opposite phases arranged adjacently.

According to the above contents, in some embodiments, when the open-ear headphone includes a plurality of sound guiding holes, to keep the sound output by the open-ear headphone in the near field as loud as possible and suppress the sound leakage in the far field, a baffle may be provided between any two of the plurality of sound guiding holes, that is, any two of the plurality of sound guiding holes may be separated by the baffle. Preferably, sounds with the same phase (or approximately the same) or opposite (or approximately opposite) phases may be output by the plurality of sound guiding holes. More preferably, the sound guiding holes that output sounds with the same phase may be arranged oppositely, and the sound guiding holes that output sounds with opposite phases may be arranged adjacently.

In some embodiments, to further improve the sound performance of the open-ear headphone, the open-ear headphone may include two loudspeakers. The two loudspeakers are controlled by the same or different controllers, respectively, and may produce sound having phases and amplitudes that satisfy certain phase and amplitude conditions. In some embodiments, the open-ear headphone may include a first loudspeaker and a second loudspeaker. The controller may control, by a control signal, the first loudspeaker and the second loudspeaker to generate sounds having phases and amplitudes that satisfy the phase and amplitude conditions (e.g., sounds having the same amplitude but having a phase difference (e.g., opposite phases), sounds having different amplitudes and having a phase difference (e.g., opposite phases), etc.). The first loudspeaker outputs sound through two first sound guiding holes, and the second loudspeaker outputs sound through two second sound guiding holes.

For the human ear to listen to the sound, the frequency band of the sound may be mainly concentrated in the low-middle frequency band, an optimization goal of which is mainly to increase the volume of the heard sound. If the listening position is constant, parameters of the two sets of sound guiding holes may be adjusted through certain manners such that the volume of the heard sound is significantly increased while the volume of the leaked sound is constant (the increment of the volume of the heard sound is greater than the increment of the volume of the leaked sound). In the high-frequency band, the sound leakage reduction effect of the two sets of sound guiding holes may be weaker, and an optimization goal in this band is mainly to reduce the sound leakage. The parameters of the two sets of sound guiding holes at different frequencies may be adjusted in certain manners, which may further decrease the sound leakage and expand the frequency band of the sound leakage reduction.

Figure 53:
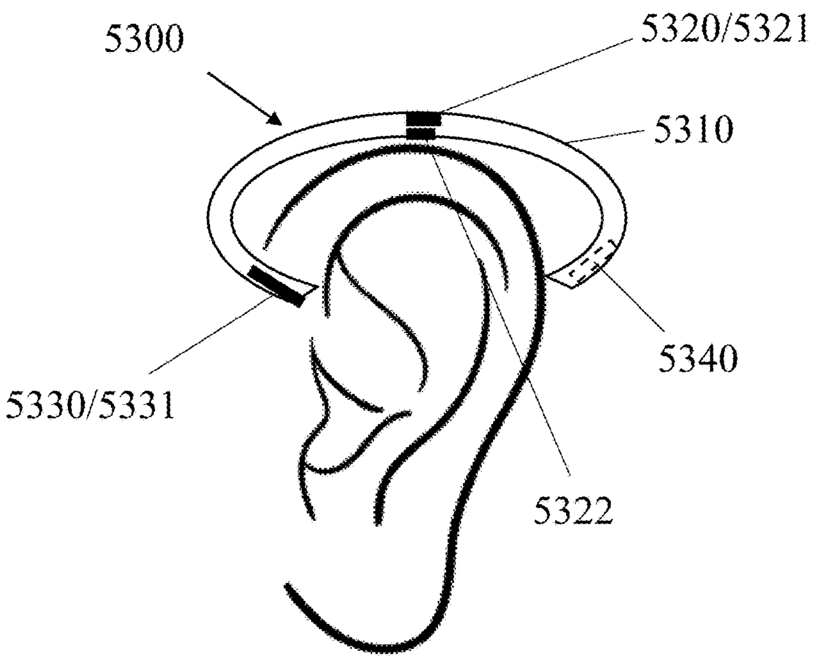
FIG. 53 is a schematic diagram illustrating another exemplary structure of an open-ear headphone according to some embodiments of the present disclosure.

FIG. 53 is a schematic diagram illustrating another exemplary structure of open-ear headphone according to some embodiments of the present disclosure. In some embodiments, the open-ear headphone 5300 may include a housing 5310, a first loudspeaker 5320, a second loudspeaker 5330, and a controller. The first loudspeaker 5320 may output sound from two first sound guiding holes. The second loudspeaker 5330 may output sound from the two second sound guiding holes. Detailed descriptions regarding the first loudspeaker 5320 with the first sound guiding hole, the second loudspeaker 5330 with the second sound guiding hole, and the structure in between may be found in specific descriptions regarding the loudspeaker and the two sound guiding holes hereinabove. In some embodiments, an interior of the housing 5310 may be provided with a core and a main board 5322, the core may form at least a portion of the structure of the loudspeaker, and the loudspeaker may use the core to generate sound, which is transmitted along corresponding sound paths to corresponding sound guiding holes and output from the sound guiding holes. In some embodiments, the open-ear headphone 5300 may include two cores, i.e., a first core 5321 and a second core 5331. The first core 5321 may form at least a portion of the structure of the first loudspeaker 5320. The second core 5331 may form at least a portion of the structure of the second loudspeaker 5330. The first loudspeaker 5320 may use the first core 5321 to generate sound, which is passed along a corresponding sound path to the first sound guiding hole and output from the first sound guiding hole. The second loudspeaker 5330 may use the second core 5331 to generate sound, which is passed along a corresponding sound path to and output from the second guiding hole. In some embodiments, a count of the main board 5322 may be one, which is electrically connected to two cores (e.g., the first core 5321 and the second core 5331) to control the two cores for sound generation. In some embodiments, the count of the main board 5322 may also be two, with the two main boards electrically connected to the two cores to enable separate control of the two cores for sound generation. In some embodiments, the open-ear headphone 5300 may also include a power supply 5340. The power supply 5340 may provide power to various components of the open-ear headphone 5300 (e.g., the loudspeaker, the core, etc.). The power supply 5340 may be electrically connected to the first loudspeaker 5320 and/or the second loudspeaker 5330 and/or the core to provide power thereto. In some embodiments, the first loudspeaker 5320 and the second loudspeaker 5330 may output sound at different frequencies, respectively. The controller may be configured to cause the first loudspeaker 5320 to output sound from the two first sound guiding holes in a first frequency range, and to cause the second loudspeaker 5330 to output sound from the two second sound guiding holes in a second frequency range. The second frequency range may include frequencies that are higher than the first frequency range. For example, the first frequency is within a range of 100 Hz-1000 Hz, and the second frequency is within a range of 1000 Hz-10000 Hz.

In some embodiments, the first loudspeaker 5320 may be a low-frequency loudspeaker and the second loudspeaker 5330 is a middle-high frequency loudspeaker. Since the frequency response characteristics of the low-frequency loudspeaker and the middle-high frequency loudspeaker are different, the sound bands may also be different, and the use of the low-frequency loudspeaker and the middle-high frequency loudspeaker may realize a frequency division of the high-frequency and low-frequency bands. Further, low-frequency dipole acoustic sources and middle-high frequency dipole acoustic sources may be constructed to output the near-field heard sound and reduce the far-field sound leakage. For example, the first loudspeaker 5320 may provide dipole acoustic sources for outputting low-frequency sound through two first sound guiding holes, and the dipole acoustic sources primarily output sound in the low-frequency band. The two first sound guiding holes may be distributed on both sides of the auricle and used to increase the volume near the ear in the near field. The second loudspeaker 5330 may provide dipole acoustic sources for outputting the middle-high frequency sound through the two second sound guiding holes, and sound leakage of the middle-high frequency sound may be reduced by controlling the distance between the two second sound guiding holes. The two second sound guiding holes may be distributed on both sides of the auricle or the same side of the auricle. When the user wears the open-ear headphone 5300, the housing 5310 may cause the two second sound guiding holes to be closer to the ear of the user than the two first sound guiding holes.

Figure 54:
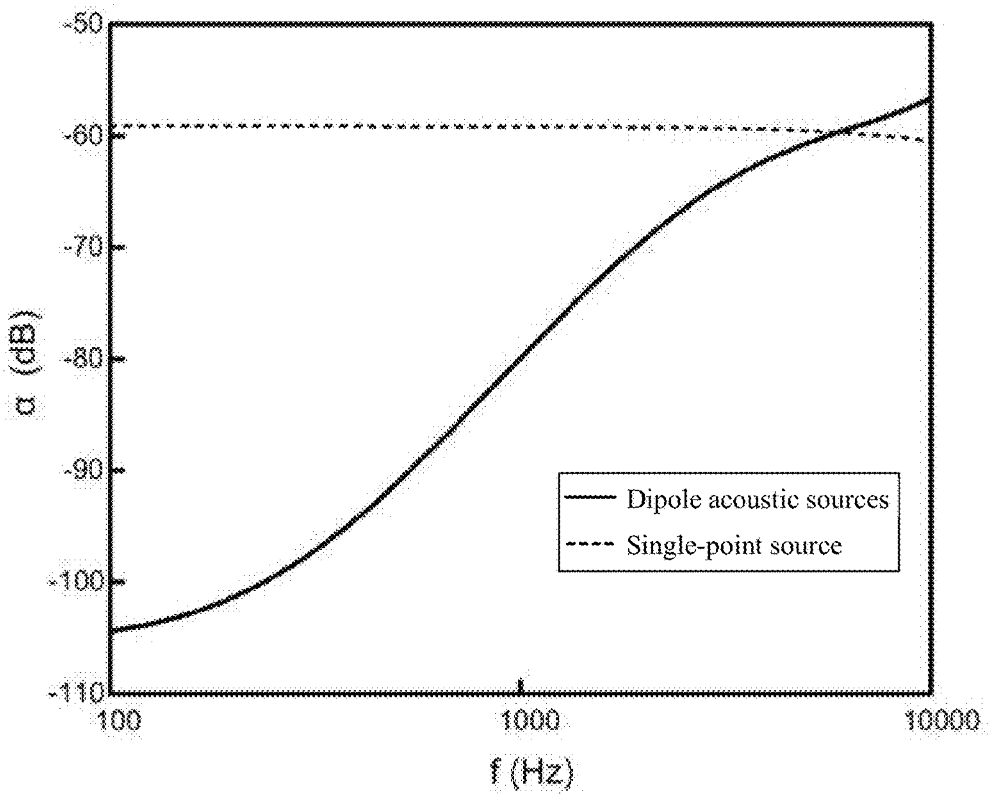
FIG. 54 is a schematic diagram illustrating curves of sound leakages of dipole acoustic sources and a single-point source changing with frequency according to some embodiments of the present disclosure.

FIG. 54 is a schematic diagram illustrating curves of sound leakages of dipole acoustic sources and a single-point source changing with a frequency according to some embodiments of the present disclosure. Under certain conditions, compared to a volume of a far-field sound leakage of a single-point source, a far-field sound leakage generated by the dipole acoustic source may increase with the increase of the frequency. In other words, the sound leakage reduction capability of the dipole acoustic sources in the far field may decrease with the increase of the frequency. For further description, a curve illustrating a relationship between a far-field sound leakage and a frequency may be described in connection with FIG. 54.

The dipole acoustic sources in FIG. 54 are spaced at a constant distance and the two point sources have the same amplitude and opposite phase. The dashed line represents the curve of the volume of the leaked sound of the single-point source at different frequencies, and the solid line represents the curve of the volume of the leaked sound of the dipole acoustic sources at different frequencies. The horizontal coordinate represents the sound frequency (f) in hertz (Hz), and the vertical coordinate uses a normalization parameter $\alpha$ as an indicator for evaluating the volume of the leaked sound.

As shown in FIG. 54, when the frequency is below 6000 Hz, the far-field sound leakage produced by the dipole acoustic sources is smaller than the far-field sound leakage produced by the single-point source, and the far-field sound leakage increases with the increase of the frequency. When the frequency approaches 10,000 Hz (e.g., above about 8,000 Hz), the far-field sound leakage produced by the dipole acoustic sources is larger than the far-field sound leakage produced by the single-point source. In some embodiments, according to the above content, a frequency corresponding to an intersection of the curves of the dipole acoustic sources and the single-point source may be determined as an upper limit frequency that the dipole acoustic sources can reduce the sound leakage.

For illustration purposes, when the frequency is relatively small (for example, within a range of 100 Hz-1000 Hz), the sound leakage reduction capability of the dipole acoustic source may be strong (e.g., below −80 dB) (i.e., the value of a is small). In such a frequency band, an increase in the volume of the heard sound may be an optimization goal. When the frequency is relatively large (for example, within a range of 1000 Hz-8000 Hz), the sound leakage reduction capability of the dipole acoustic source may be weak (e.g., above −80 dB). In such a frequency band, a decrease in the sound leakage may be the optimization goal.

According to FIG. 54, a frequency division point may be determined based on the variation tendency of the sound leakage reduction capability of the dipole acoustic source. Parameters of the dipole acoustic sources may be adjusted according to the frequency division point to reduce the sound leakage of the open-ear headphone. For example, the frequency corresponding to $\alpha$ of a specific value (for example, −60 dB, −70 dB, −80 dB, −90 dB, etc.) may be used as the frequency division point. Parameters of the dipole acoustic sources may be determined to improve the near-field heard sound in a frequency band below the frequency division point, and/or to reduce the far-field sound leakage in a frequency band above the frequency division point. In some embodiments, a high-frequency band with a high frequency (for example, a sound output from a high-frequency loudspeaker) and a low-frequency band with a low frequency (for example, a sound output from a low-frequency loudspeaker) may be determined based on the frequency division point. More descriptions regarding the frequency division point may be found elsewhere in the present disclosure (e.g., FIG. 57 and related descriptions thereof).

It may be seen from FIG. 54 that the dipole acoustic sources may have a relatively weak sound leakage reduction capability in the high-frequency band (the higher-frequency band determined based on a frequency division point), and a relatively strong sound leakage reduction capability in a low-frequency band (the lower-frequency band determined based on the frequency division point). At a certain sound frequency, if a distance between the dipole acoustic sources changes, the sound leakage reduction capability may be changed, and a difference between a volume of the heard sound and a volume of the leaked sound may also be changed. For a clearer description, curves of the leaked sound changing along with the distance between the dipole acoustic sources may be described in connection with FIG. 55A and FIG. 55B.

Figure 55A:
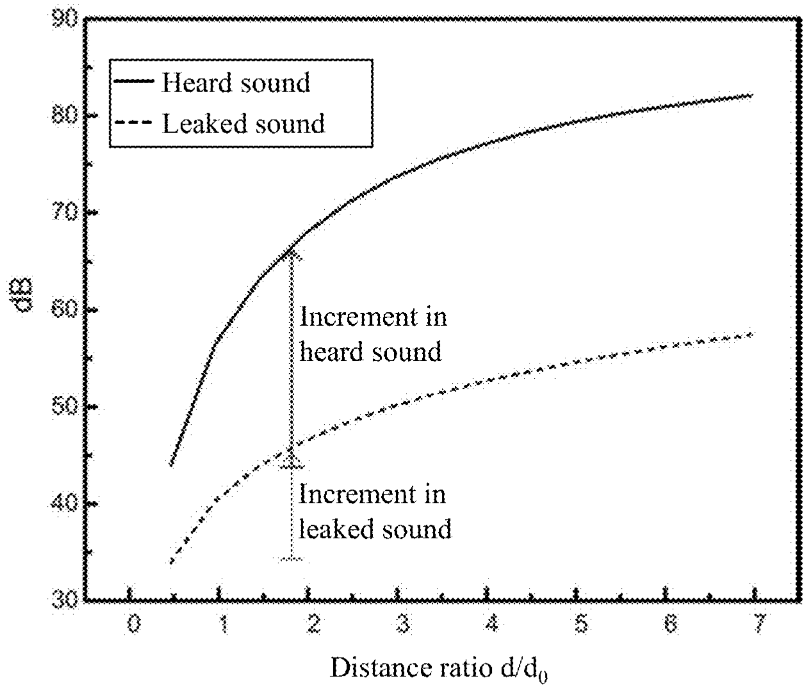
FIG. 55A and FIG. 55B are schematic diagrams illustrating exemplary curves of a volume of a near-field heard sound and a volume of a far-field leaked sound changing with a distance between dipole acoustic sources according to some embodiments of the present disclosure.
Figure 55B:
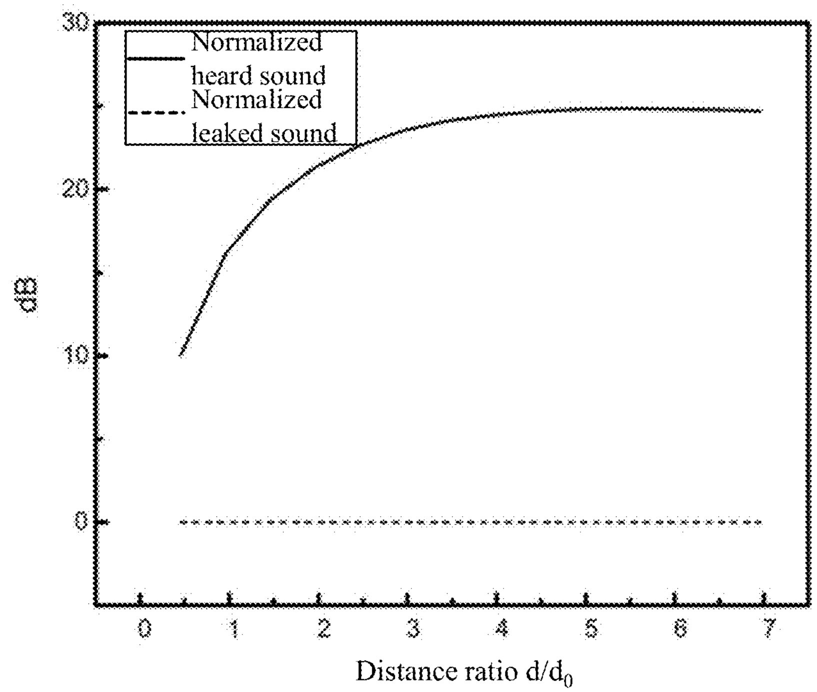

FIG. 55A and FIG. 55B are schematic diagrams illustrating exemplary curves of a near-field heard sound and a volume of a far-field leaked sound changing with a distance between dipole acoustic sources according to some embodiments of the present disclosure. FIG. 55B may be generated by performing a normalization on the sound in FIG. 55A.

In FIG. 55A, a solid line may represent a curve of the volume of the heard sound of the dipole acoustic sources changing with the distance between the dipole acoustic sources, and the dotted line may represent the curve of the volume of the leaked sound of the dipole acoustic sources changing with the distance between the dipole acoustic sources. The abscissa may represent a distance ratio d/d0 of the distance d of the dipole acoustic sources to a reference distance d0. The ordinate may represent a sound volume (the unit is decibel dB). The distance ratio d/d0 may reflect a variation of the distance between the dipole acoustic sources. In some embodiments, the reference distance d0 may be selected within a specific range. For example, d0 may be a specific value in the range of 2.5 mm-10 mm. In some embodiments, the reference distance d0 may be determined based on a listening position. Merely by way of example, d0 equal to 5 mm is taken in FIG. 55A as a reference value for the variation of the distance between the dipole acoustic sources.

When the sound frequency is constant, the volume of the heard sound and the volume of the leaked sound of the dipole acoustic sources may increase as the distance between dipole acoustic sources increases. When the distance ratio d/d0 of the distance d between the dipole acoustic sources to the reference distance d0 is less than a threshold ratio, as the distance between the dipole acoustic sources increases, an increment in the volume of the heard sound may be larger than an increment in the volume of the leaked sound, i.e., the increase of the volume of the heard sound is more significant than the increase in the volume of the leaked sound. For example, as shown in FIG. 55A, when the distance ratio d/d0 is 2, the difference between the volume of the heard sound and the volume of the leaked sound is about 20 dB. When the distance ratio d/d0 is 4, the difference between the volume of the heard sound and the volume of the volume of the leaked sound is about 25 dB. In some embodiments, when the distance ratio d/d0 reaches the threshold ratio, the ratio of the volume of the heard sound to the volume of the leaked sound of the dipole acoustic sources may reach a maximum value. At this time, as the distance between the dipole acoustic sources further increases, the curve of the volume of the heard sound and the curve of the volume of the leaked sound may gradually go parallel, that is, the increase in volume of the heard sound and the increase in the volume of the leaked sound may remain substantially the same. For example, as shown in FIG. 55B, when the distance ratio d/d0 is 5, 6, or 7, the difference between the volume of the heard sound of the sound heard by the user and the volume of the leaked sound may remain substantially the same, which is about 25 dB. That is, the increase in the volume of the heard sound may be the same as the increase in the volume of the leaked sound. In some embodiments, the threshold ratio of the distance ratio d/d0 of the dipole acoustic sources may be within a range of 0-7.

In some embodiments, the threshold ratio may be determined based on the variation of the difference between the volume of the heard sound and the volume of the leaked sound of the dipole acoustic sources in FIG. 55A. For example, a ratio corresponding to the maximum difference between the volume of the heard sound and the volume of the leaked sound may be determined as the threshold ratio. As shown in FIG. 55B, when the distance ratio d/d0 is less than the threshold ratio (e.g., 4), a curve of a normalized heard sound may show an upward trend (the slope of the curve is larger than 0) as the distance between the dipole acoustic sources. That is, the increase in the volume of the heard sound may be greater than the increase in the volume of the leaked sound. When the distance ratio d/d0 is greater than the threshold ratio, the slope of the curve of the normalized heard sound may gradually approach 0 as the distance between the dipole acoustic sources. That is to say, the increase in the volume of the heard sound may be no longer greater than the increase in the volume of the leaked sound as the distance between the dipole acoustic sources increases.

It may be seen from the above that if a listening position is constant, one or more parameters of the dipole acoustic sources may be adjusted in certain manners such that a volume of the near-field heard sound may be significantly increased while a leaked sound volume in the far field may be only slightly increased (i.e., an increment in the volume of the near-field heard sound may be greater than an increment in the leaked sound volume in the far field). For example, two sets of dipole acoustic sources (e.g., a set of high-frequency dipole acoustic sources and a set of low-frequency dipole acoustic sources) may be provided. A distance between dipole acoustic sources in each set may be adjusted separately such that a distance between the high-frequency dipole acoustic sources is smaller than a distance between the low-frequency dipole acoustic sources. Since a sound leakage of the low-frequency dipole acoustic sources is relatively small (stronger sound leakage reduction capability) and a sound leakage of the high-frequency is relatively large (weaker sound leakage reduction capability), a smaller distance between the dipole acoustic sources may be selected in the high-frequency band, which may make the volume of the heard sound significantly larger than the volume of the leaked sound, thus reducing the sound leakage.

In some embodiments, when the open-ear headphone includes two loudspeakers, the two sound guiding holes corresponding to each of the two loudspeakers may have a certain distance, and the distance may affect the volume of the near-field heard sound that is transmitted by the open-ear headphone to the ear of the user and the volume of the leaked sound in the far field that is transmitted to the environment. In some embodiments, when the distance between the sound guiding holes corresponding to the high-frequency loudspeaker is less than the distance between the sound guiding holes corresponding to the low-frequency loudspeakers, the volume of the sound heard by the ear of the user may be increased, and less sound leakage may be produced, thereby avoiding the sound from being heard by others near the user of the open-ear headphone. According to the above description, the headphone may be effectively used as the open-ear headphone even in a relatively quiet environment.

Figure 56:
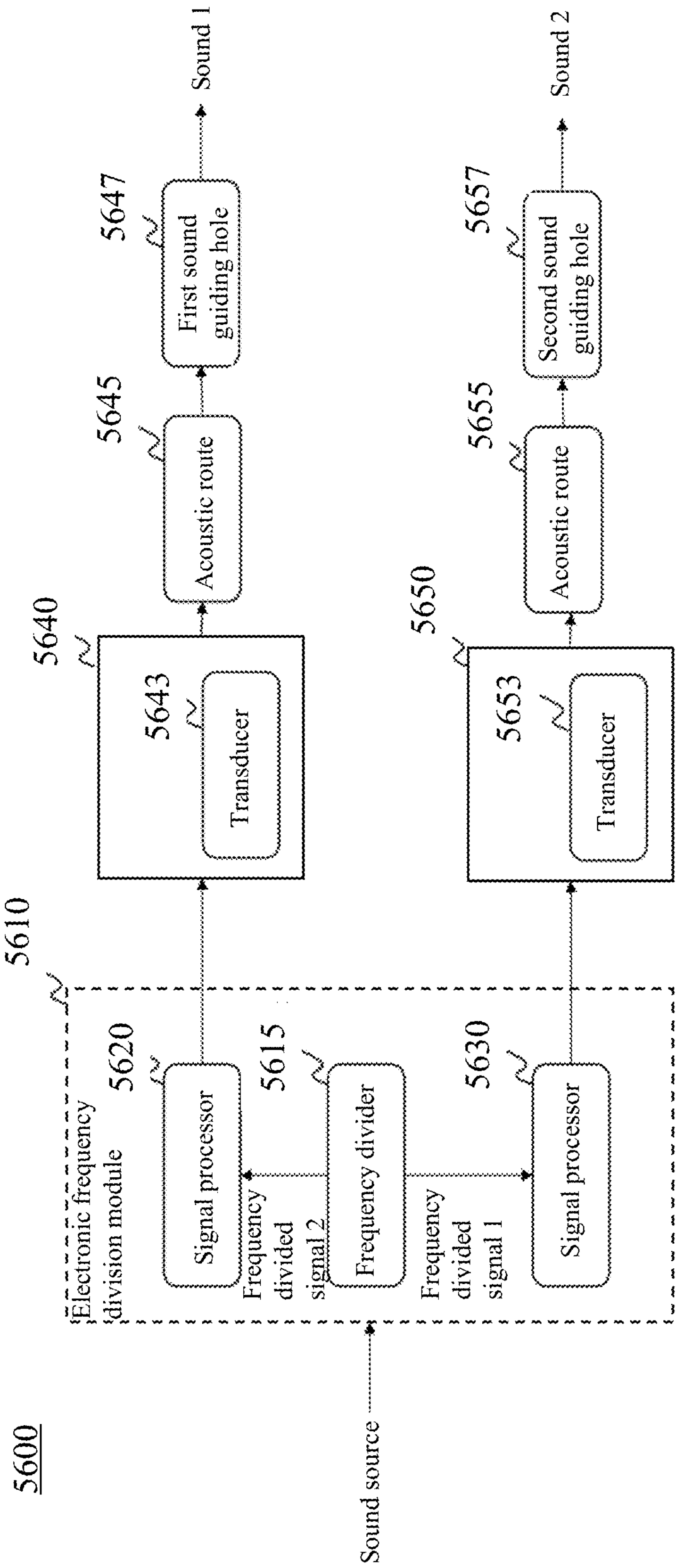
FIG. 56 is a block diagram illustrating an exemplary structure of an open-ear headphone according to some embodiments of the present disclosure.

FIG. 56 is a block diagram illustrating an exemplary structure of an open-ear headphone according to some embodiments of the present disclosure. As shown in FIG. 56, the open-ear headphone 5600 may include an electronic frequency division module 5610, a first loudspeaker 5640, a second loudspeaker 5650, an acoustic route 5645, an acoustic route 5655, two first sound guiding holes 5647, and two second sound guiding holes 5657. In some embodiments, the open-ear headphone 5600 may also include a controller (not shown in the figures), and the electronic frequency division module 5610 is used as part of the controller to generate electrical signals input into different loudspeakers. The connection between different components in the open-ear headphone 100 may be wired or wireless.

The electronic frequency division module 5610 may perform frequency division on a source signal. The source signal may be from one or more audio devices integrated within the open-ear headphone 5600 (e.g., a memory storing audio data). The source signal may also be an audio signal received by the open-ear headphone 5600 by wired or wireless means. In some embodiments, the electronic frequency division module 5610 may decompose the input source signal into two or more frequency-divided signals containing different frequencies. For example, the electronic frequency division module 5610 may decompose the source signal into a first frequency-divided signal (or frequency-divided signal 1) with high-frequency sound and a second frequency-divided signal (or frequency-divided signal 2) with low-frequency sound. For convenience, a frequency-divided signal with high-frequency sound may be referred to as a high-frequency signal, and a frequency-divided signal with low-frequency sound may be directly referred to as a low-frequency signal.

The low-frequency signal may refer to a sound signal with frequencies in a first frequency range. The high-frequency signal may refer to a sound signal with frequencies in a second frequency range. The first frequency range and the second frequency range may include or not include overlapping frequency ranges. The second frequency range may include frequencies higher than the first frequency range. Merely by way of example, the first frequency range may include frequencies lower than a first frequency threshold, and the second frequency range may include frequencies higher than a second frequency threshold. The first frequency threshold may be lower than, equal to, or higher than the second frequency threshold. For example, the first frequency threshold may be less than the second frequency threshold (for example, the first frequency threshold may be 600 Hz and the second frequency range may be 700 Hz), which indicates that there is no overlap between the first frequency range and the second frequency range. As another example, the first frequency threshold may be equal to the second frequency threshold (for example, both the first frequency threshold and the second frequency threshold may be 650 Hz or other arbitrary frequency values). As a further example, the first frequency threshold may be greater than the second frequency threshold, which indicates that there is an overlap between the first frequency range and the second frequency range. In such cases, a difference between the first frequency threshold and the second frequency threshold may not exceed a third frequency threshold. The third frequency threshold may be a constant value (for example, 20 Hz, 50 Hz, 100 Hz, 150 Hz, 200 Hz), or may be a value related to the first frequency threshold and/or the second frequency threshold (for example, 5%, 10%, 15%, etc. of the first frequency threshold), or a value flexibly set by the user according to the actual scene, which is not limited here. It should be noted that the first frequency threshold and the second frequency threshold may be flexibly set according to different situations, which are not limited here.

In some embodiments, the electronic frequency division module 5610 may include a frequency divider 5615, a signal processor 5620, and a signal processor 5630. The frequency divider 5615 may be used to decompose the source signal into two or more frequency-divided signals containing different frequency components, for example, a frequency-divided signal 1 with high-frequency sound components and a frequency-divided signal 2 with low-frequency sound components. In some embodiments, the frequency divider 5615 may be an electronic device that may implement the signal decomposition function, including but not limited to one of a passive filter, an active filter, an analog filter, a digital filter, or any combination thereof.

The signal processor 5620 and the signal processor 5630 may respectively further process the frequency-divided signals to meet the requirements of subsequent sound output. In some embodiments, the signal processor 5620 or the signal processor 5630 may include one or more signal processing components. For example, the signal processor may include, but not be limited to, an amplifier, an amplitude modulator, a phase modulator, a delayer, or a dynamic gain controller, or the like, or any combination thereof.

After signal processing of the frequency-divided signal by the signal processor 5620 or the signal processor 5630, respectively, the frequency-divided signals may be transmitted to the first loudspeaker 5640 and the second loudspeaker 5650, respectively. In some embodiments, the sound signal transmitted into the first loudspeaker 5640 may be a sound signal including a lower frequency range (e.g., the first frequency range). Therefore, the first loudspeaker 5640 may also be referred to as a low-frequency loudspeaker. The sound signal transmitted into the second loudspeaker 5650 may be a sound signal including a higher frequency range (e.g., the second frequency range). Therefore, the second loudspeaker 5650 may also be referred to as a high-frequency loudspeaker. The first loudspeaker 5640 and the second loudspeaker 5650 may convert sound signals into a low-frequency sound and a high-frequency sound, respectively, and then propagate the converted signals outwards.

In some embodiments, two acoustic routes 5645 (also referred to as first acoustic routes) may be formed between the first loudspeaker 5640 and the two first sound guiding holes 5647. The first loudspeaker 5640 may be acoustically coupled to each of the two first sound guiding holes 5647 via the two acoustic routes 5645 and transmit the sound from the two first sound guiding holes 5647. Two acoustic routes 5650 (also referred to as second acoustic routes) may be formed between the second loudspeaker 5650 and the two second sound guiding holes 5657. The second loudspeaker 5650 may be acoustically coupled to each of the two second sound guiding holes 5657 via the two acoustic routes 5655 and transmits the sound from the two second sound guiding holes 5657. In some embodiments, to reduce the far-field sound leakage of the open-ear headphone 5600, the first loudspeaker 5640 may be used to generate low-frequency sounds with equal (or approximately equal) amplitude and opposite (or approximately opposite) phases at the at least two first sound guiding holes, respectively. The second loudspeaker 5640 may be used to generate high-frequency sounds with equal (or approximately equal) amplitude and opposite (or approximately opposite) phases at the at least two second sound guiding holes, respectively. In this way, the far-field sound leakage of low-frequency sounds (or high-frequency sounds) may be reduced according to the principle of acoustic interference cancellation. In some embodiments, according to FIG. 54, FIG. 55A, and FIG. 55B, further considering that the wavelength of the low-frequency sound is longer than that of the high-frequency sound, and to reduce the interference cancellation of the sound in the near field (for example, the position of the ear of the user), a distance between the first sound guiding holes and a distance between the second sound guiding holes may be set to different values. For example, assuming that there is a first distance between the two first sound guiding holes and a second distance between the two second sound guiding holes, the first distance may be greater than the second distance. In some embodiments, the first distance and the second distance may be any value. Merely by way of example, the first distance may be less than or equal to 40 mm and the second distance may be less than or equal to 7 mm. More descriptions regarding the first distance and the second distance may be found elsewhere in the present disclosure (e.g., related descriptions in FIG. 57).

As shown in FIG. 56, the first loudspeaker 5640 may include a transducer 5643. The transducer 5643 may transmit sound to the first sound guiding hole 5647 via the acoustic route 5645. The second loudspeaker 5650 may include a transducer 5653. The transducer 5653 may transmit sound to the second sound guiding hole 5657 via the acoustic route 5655. In some embodiments, the transducer may include, but is not limited to, one of a transducer for an air-conducting loudspeaker, a transducer for a bone-conducting loudspeaker, a hydroacoustic transducer, an ultrasonic transducer, or the like, or any combination thereof. In some embodiments, the transducer may be of a moving coil type, a moving iron type, a piezoelectric type, an electrostatic type, a magneto strictive type, or the like, or any combination thereof.

In some alternative embodiments, the open-ear headphone 5600 may utilize the transducer to achieve signal frequency division. The first loudspeaker 5640 and the second loudspeaker 5650 may convert the incoming source signal into a low-frequency signal and a high-frequency signal, respectively. Specifically, the first loudspeaker 5640 may convert the source signal into low-frequency sound with a low-frequency component via the transducer 5643. The low-frequency sound may be transmitted along two different acoustic routes 5645 to the two first sound guiding holes 5647 and emitted to the outside world through the first sound guiding holes 5647. The second loudspeaker 5650 may convert the source signal into high-frequency sound with a high-frequency component via the transducer 5653. The high-frequency sound may be transmitted along two different acoustic routes 5655 to the two second sound guiding holes 5657 and emitted to the outside world through the second sound guiding holes 5657.

In some alternative embodiments, an acoustic route connecting the transducer and the sound guiding hole (e.g., the acoustic route 5645 and the acoustic route 5655) may affect the nature of the transmitted sound. For example, the acoustic route may attenuate the transmitted sound to some degree or change the phase of the transmitted sound. In some embodiments, the acoustic route may include a sound guiding tube, a sound cavity, a resonant cavity, a sound hole, a sound slit, a tuning network, or the like, or any combination thereof. In some embodiments, the acoustic route may also include an acoustic resistance material, which may have a specific acoustic impedance. For example, the acoustic impedance may be within a range of 5 MKS Riley-500 MKS Riley. The acoustic resistance materials may include, but not be limited to, plastic, textile, metal, permeable material, woven material, screen material or mesh material, porous material, particulate material, polymer material, or the like, or any combination thereof. By setting the acoustic routes of different acoustic impedances, the sound output of the transducer may be acoustically filtered, such that the sounds output through different acoustic routes may have different frequency components.

In some alternative embodiments, the open-ear headphone 5600 may utilize the acoustic routes to achieve signal frequency division. Specifically, the source signal may be input into a particular loudspeaker, converted to sound with high-frequency and low-frequency components, and the sound signal may be transmitted along the acoustic routes with different frequency selection characteristics. For example, the sound signal may be propagated along the acoustic route with a low-pass characteristic to the corresponding sound guiding hole to generate low-frequency sound. In this process, the high-frequency sound may be absorbed or attenuated by the acoustic route with a low-pass characteristic. Similarly, the sound signal may be propagated along the acoustic route with a high-pass characteristic to the corresponding sound guiding hole to generate a high-frequency sound. In this process, the low-frequency sound may be absorbed or attenuated by the acoustic route with the high-pass characteristic.

In some embodiments, the controller in the open-ear headphone 5600 may allow the first loudspeaker 5640 to output sound in a first frequency range (i.e., the low-frequency sound) and allow the second loudspeaker 5650 to output sound in a second frequency range (i.e., the high-frequency sound). In some embodiments, the open-ear headphone 5600 may further include a housing. The housing may be configured to accommodate the first loudspeaker 5640 and the second loudspeaker 5650 and have two first sound guiding holes 5647 and second sound guiding holes 5657 acoustically connected with the first loudspeaker 5640 and the second loudspeaker 5650. The housing may be placed on the head of the user such that the two loudspeakers may be located near the ear of the user and do not block the ear canal of the user. In some embodiments, the housing may enable the second sound guiding holes 5657 acoustically coupled to the second loudspeaker 5650 to be closer to an intended position of the ear of the user (e.g., the opening of the ear canal), while the first sound guiding holes 5647 acoustically coupled to the first loudspeaker 5640 to be farther away from the intended position. In some embodiments, the housing may encapsulate the loudspeaker and may be defined by a core to form a front chamber and a rear chamber corresponding to the loudspeaker. The front chamber may be acoustically coupled to one of the two sound guiding holes, and the rear chamber may be acoustically coupled to the other one of the two sound guiding holes. For example, the front chamber of the first loudspeaker 5640 may be acoustically coupled to one of the two first sound guiding holes 5647, and the rear chamber of the first loudspeaker 5640 may be acoustically coupled to the other one of the two first sound guiding holes 5647. The front chamber of the second loudspeaker 5650 may be acoustically coupled to one of the two second sound guiding holes 5657, and the rear chamber of the second loudspeaker 5650 may be acoustically coupled to the other one of the two second sound guiding holes 5657. In some embodiments, the sound guiding holes (e.g., the first sound guiding hole 5647 and the second sound guiding hole 5657) may be provided on the housing.

Figure 57:
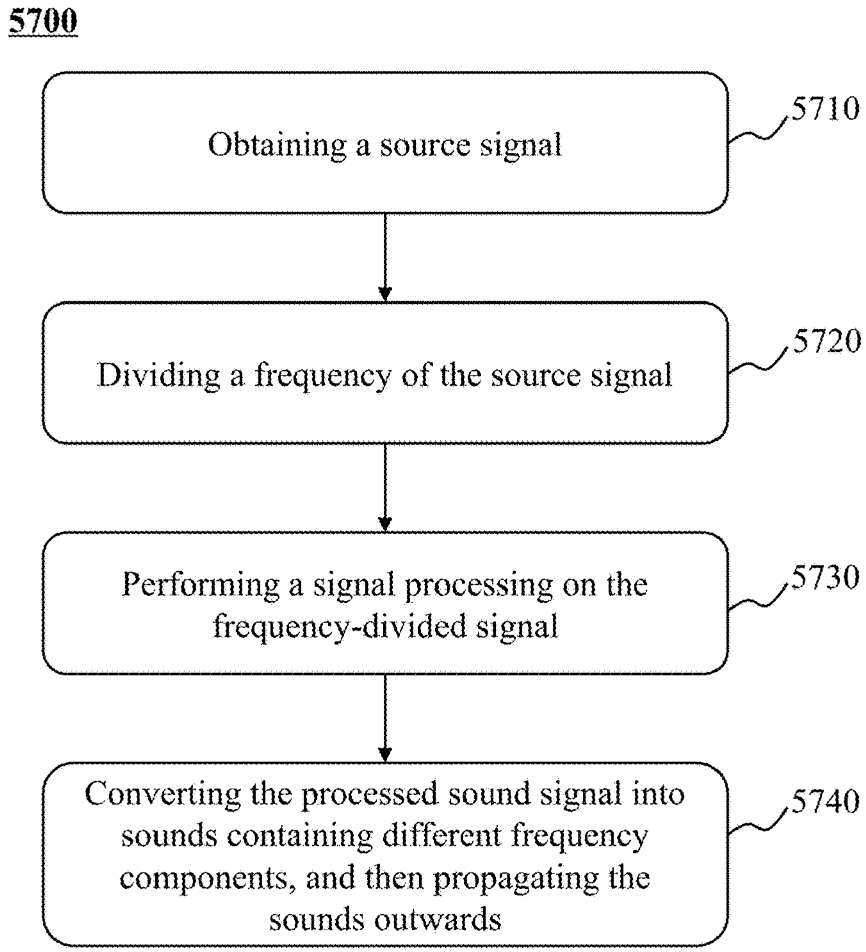
FIG. 57 is a flowchart illustrating an exemplary sound output process according to some embodiments of the present disclosure.

FIG. 57 is a flowchart illustrating an exemplary sound output process according to some embodiments of the present disclosure. In some embodiments, process 5700 may be implemented by an open-ear headphone 5300 (and/or an open-ear headphone 5600).

In 5710, the open-ear headphone 5300 may obtain a source signal output from an audio device.

In some embodiments, the open-ear headphone 5300 may be connected to the audio device by wired (e.g., via a data cable connection) or wireless manner (e.g., via Bluetooth) and receive the source signal. The audio device may include a mobile device, e.g., a computer, a cellphone, a wearable device, or other carriers that may process or store audio data.

In 5720, the open-ear headphone 5300 may divide the frequency of the source signal.

The source signal may be decomposed into two or more sound signals containing different frequency components after the frequency division processing. For example, the source signal may be decomposed into a low-frequency signal with a low-frequency sound component and a high-frequency signal with a high-frequency sound component. In some embodiments, the low-frequency signal may refer to a sound signal with a frequency in a lower first frequency range, and the high-frequency signal may refer to a sound signal having a frequency in a higher second frequency range. In some embodiments, the first frequency range may include frequencies below 650 Hz, and the second frequency range may include frequencies above 53,000 Hz.

In some embodiments, the open-ear headphone 5300 may divide the frequency of the source signal via an electronic frequency division module (e.g., an electronic frequency division module 5610). For example, the source signal may be decomposed into one or more sets of high-frequency signals and one or more sets of low-frequency signals by the electronic frequency division module.

In some embodiments, the open-ear headphone 5300 may divide the frequency of the source signal based on one or more frequency division points. The frequency division point refers to a signal frequency that distinguishes a first frequency range from a second frequency range. For example, when there is an overlapping frequency between the first frequency range and the second frequency range, the frequency division point may be a feature point within the overlapping frequency range (for example, a low-frequency boundary point, a high-frequency boundary point, a center frequency point, etc. of the overlapping frequency range). In some embodiments, the frequency division point may be determined according to a relationship between the frequency and the sound leakage of the open-ear headphone (for example, the curves shown in FIG. 54, FIGS. 55A and 55B), or the user may directly specify a particular frequency as the frequency division point.

In 5730, the open-ear headphone 5300 may perform signal processing on the frequency-divided signal.

In some embodiments, the open-ear headphone 5300 may further process the frequency-divided signal (such as the high-frequency signal and the low-frequency signal) to meet the requirements of the subsequent output of sound. For example, the open-ear headphone 100 may further process the frequency-divided signal through a signal processor (such as the signal processor 5620, the signal processor 5630, or the like). The signal processor may include one or more signal processing components. Merely by way of example, processing of the frequency-divided signal by the signal processor may include adjusting an amplitude corresponding to some frequencies in the frequency-divided signal. Specifically, in the case where the first frequency range and the second frequency range overlap, the signal processor may adjust the intensity (amplitude) of the sound signal corresponding to the frequency in the overlapping frequency range to avoid excessive volume in the overlapping frequency range in the subsequent output sound caused by the superposition of multiple sound signals.

In 5740, the open-ear headphone 5300 may convert the processed sound signal into a sound containing different frequency components, and then propagate the converted signals outwards.

In some embodiments, the open-ear headphone 5300 may output sound through a first loudspeaker 5640 and/or a second loudspeaker 5650. In some embodiments, the first loudspeaker 5640 may output a low-frequency sound only containing low-frequency sound components, and the second loudspeaker 5650 may output a high-frequency sound only containing high-frequency sound components.

In some embodiments, the first loudspeaker 5640 may propagate low-frequency sound through at least two first sound guiding holes 5647, and the second loudspeaker 5650 may propagate high-frequency sound through at least two second sound guiding holes 5657. In some embodiments, the acoustic routes between the same loudspeaker and its corresponding different sound guiding holes may be designed differently. For example, by setting the shape and/or size of the first sound guiding hole (or the second sound guiding hole), or by setting a cavity structure or acoustically damping material with a certain damping in the acoustic route, the acoustic route between the same acoustic driver and its corresponding different sound guiding hole may be configured to have approximately same equivalent acoustic impedance. In this case, as the same loudspeaker outputs two groups of sounds with the same amplitude and opposite phases, these two groups of sounds may still have the same amplitude and opposite phases when they reach the corresponding sound guiding holes through different acoustic routes.

In combination with the structure of the open-ear headphone described in FIG. 56, the first loudspeaker 5640 may propagate two sets of low-frequency sound signals with opposite phases through two first sound guiding holes 5647. The second loudspeaker 5650 may output two sets of high-frequency sound signals with opposite phases through two second sound guiding holes 5657. Based on this, the first loudspeaker 5640 and the second loudspeaker 5650 constitute low-frequency dipole acoustic sources and high-frequency dipole acoustic sources, respectively. In this way, based on the principle of acoustic interference cancellation, the sound leakage of the low-frequency dipole acoustic sources (or high-frequency dipole acoustic sources) in the far field may be reduced.

Further considering that the wavelength of the low-frequency sound is longer than that of the high-frequency sound, and to reduce the interference cancellation of the sound in the near field (for example, the listening position of the ear of the user), a distance between the first sound guiding holes and a distance between the second sound guiding holes may be different values. In some embodiments, when the first distance between the two first sound guiding holes corresponding to the first loudspeaker 5640 becomes larger, the increment in volume of the near-field heard sound of the open-ear headphone is greater than the increment in sound leakage in the far field, which may obtain a relatively high sound volume in the near field and a relatively low sound leakage in the far field in the low-frequency range. In addition, the second distance between the two second sound guiding holes corresponding to the second loudspeaker 5650 may be reduced. Although it may affect the sound volume in the near field in the high-frequency range to some extent, it may significantly reduce the sound leakage in the far field in the high-frequency range. Therefore, by properly designing the distance between the two second sound guiding holes and the distance between the two first sound guiding holes, the open-ear headphones may have a stronger sound leakage reduction capability.

For the purpose of illustration, there is a first distance between the two first sound guiding holes and a second distance between the two second sound guiding holes, and the first distance may be larger than the second distance. In some embodiments, the first distance and the second distance may be arbitrary values. Merely by way of example, the first distance may not be less than 8 mm, the second distance may not be greater than 12 mm, and the first distance may be greater than the second distance. In some embodiments, the first distance may be at least two times greater than the second distance.

In some embodiments, the amplitude and phase parameters of the output sound of the two sets of sound guiding holes may be adjusted to improve the sound leakage reduction capability of the open-ear headphone in the far field. Descriptions regarding the regulation of the amplitude and phase of the output sound of the two sets of sound guiding holes may be found in FIG. 63A-FIG. 69B of the present disclosure and their related descriptions.

It should be noted that the foregoing description of the process 5700 is intended to be exemplary and illustrative only and does not limit the scope of application of the present disclosure. For those skilled in the art, various corrections and changes may be made to process 5700 under the guidance of the present disclosure. However, these corrections and changes remain within the scope of the present disclosure. For example, the processing of the frequency-divided signal in operation 5730 may be omitted, and the frequency-divided signal may be directly output through the sound guiding hole to an external environment.

Figure 58:
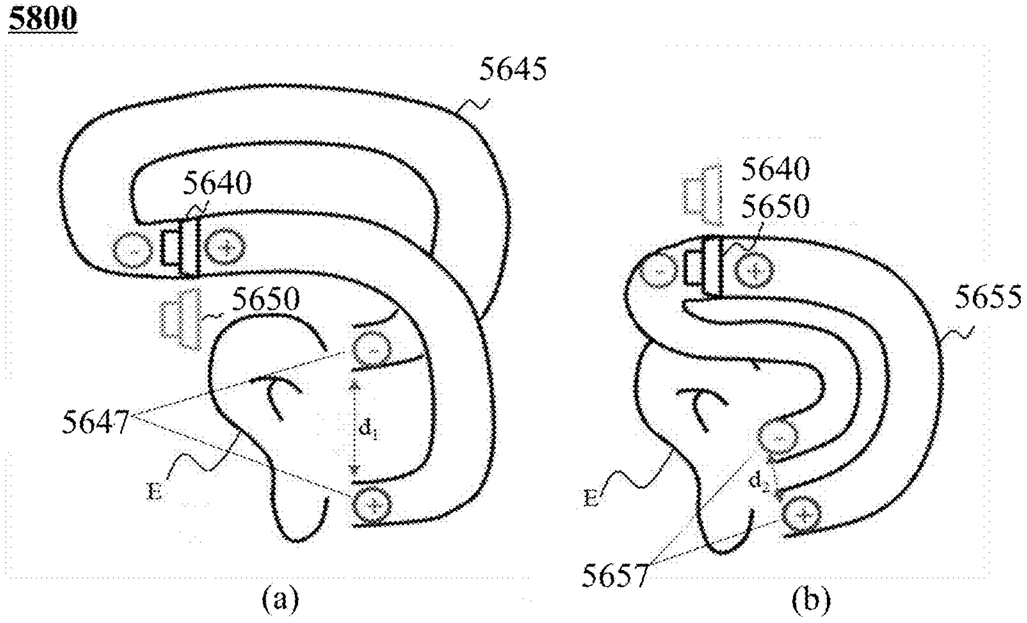
FIG. 58 is a schematic diagram illustrating an open-ear headphone according to some embodiments of the present disclosure.

FIG. 58 is a schematic diagram illustrating an open-ear headphone according to some embodiments of the present disclosure.

FIG. 58 illustrates a simplified representation of a loudspeaker in the open-ear headphone. In FIG. 58, each loudspeaker has a front side and a rear side, and the corresponding front chamber (i.e., a first acoustic route) and rear chamber (i.e., a second acoustic route) may exist on the front or rear side of the loudspeaker, respectively. In some embodiments, these structures may have the same or approximately the same equivalent acoustic impedance, such that the loudspeaker may be loaded symmetrically. The symmetrical load of the loudspeaker may form acoustic sources that satisfy an amplitude and phase relationship at different sound guiding holes (such as the "two point sources" having the same amplitude and opposite phases as described above), such that a specific sound field may be formed in high-frequency and/or low-frequency (for example, the sound in the near field may be enhanced and the sound leakage in the far field may be suppressed).

To more clearly describe the actual application scenarios of the open-ear headphone 5800, the position of the ear of the user E is shown in FIG. 58 for illustration. The left diagram (a) in FIG. 58 primarily illustrates an application scenario for the first loudspeaker 5640. The first loudspeaker 5640 may be acoustically coupled to the two first sound guiding holes 5647 via the acoustic routes 5645. The right diagram (b) in FIG. 58 primarily illustrates an application scenario for the second loudspeaker 5650. The second loudspeaker 5650 may be acoustically coupled to the two second sound guiding holes 5657 via the acoustic routes 5655.

The first loudspeaker 5640 may be driven by an electrical signal to vibrate, and the vibration produces a set of sounds of equal amplitude and opposite phases (180 degrees phase difference). In some embodiments, the first loudspeaker 5640 may include a diaphragm that vibrates when actuated by an electrical signal, and the front side and the back side of the diaphragm may output a normal-phase sound and a reverse-phase sound. In FIG. 58, "+" and "−" may be used to exemplify sounds with different phases, wherein "+" may represent a normal-phase sound, and "−" may represent a reverse-phase sound.

In some embodiments, the loudspeaker may be encapsulated by a housing, and the interior of the housing may be provided with sound channels connected to the front and rear sides of the loudspeaker, respectively, thereby forming an acoustic route. For example, the front chamber of the first loudspeaker 5640 may be coupled to one of the two first sound guiding holes 5647 via the first acoustic route (i.e., the first half of the acoustic routes 5645). The rear chamber of the first loudspeaker 5640 may be acoustically coupled to the other of the two first sound guiding holes 5647 via a second acoustic route (i.e., the second half of the acoustic routes 5645). The normal-phase sound and reverse-phase sound that output from the first loudspeaker 5640 may be output from the two first sound guiding holes 5647, respectively. As another example, the front chamber of the second loudspeaker 5650 may be coupled to one of the two sound guiding holes 157 through a third acoustic route (i.e., the first half of the acoustic routes 5655), and the rear chamber of the second loudspeaker 5650 may be coupled to another sound guiding hole of the two second sound guiding holes 5657 through a fourth acoustic route (i.e., the second half of the acoustic route 5655). The normal-phase sound and the reverse-phase sound output from the second loudspeaker 5650 may be output from the two second sound guiding holes 5657, respectively.

In some embodiments, the acoustic routes may affect the characteristics of the sound transmitted therein. For example, an acoustic route may attenuate or change the phase of the transmitted sound to some extent. In some embodiments, the acoustic route may be composed of one of a sound guiding tube, a sound cavity, a resonant cavity, a sound hole, a sound slit, a tuning network, or the like, or any combination thereof. In some embodiments, the acoustic route may further include an acoustic resistance material having a specific acoustic impedance. For example, the acoustic impedance may be within a range of 5 MKS Riley-500 MKS Riley. In some embodiments, to prevent the sound transmitted from the front and rear chambers of the loudspeaker from being disturbed (or the same change caused by disturbance), the front chamber and rear chamber corresponding to the loudspeaker may be configured to have approximately the same equivalent acoustic impedance. For example, the same acoustic resistance material, the sound guiding holes with the same size or shape, etc., may be used.

The distance between the two first sound guiding holes 5647 of the first loudspeaker 5640 may be expressed as $d_1$ (i.e., the first distance). The distance between the two second sound guiding holes 5657 of the second loudspeaker 5650 may be expressed as d2 (i.e., the second distance). By setting the distances between the sound guiding holes corresponding to the first loudspeaker 5640 and the second loudspeaker 5650, a relatively high sound volume output in the low-frequency band and a relatively high sound leakage reduction capability in the high-frequency band may be achieved. For example, the distance between the two first sound guiding holes 5647 is greater than the distance between the two second sound guiding holes 5657 (i.e., $d_1>d_2$).

Figure 59A:
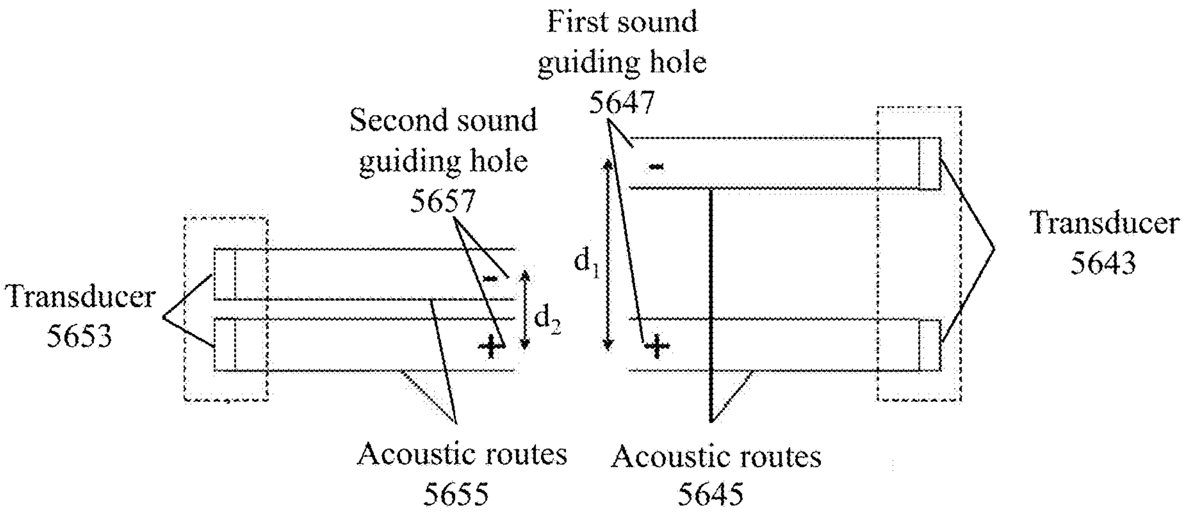
FIG. 59A and FIG. 59B are schematic diagrams illustrating sound output according to some embodiments of the present disclosure.
Figure 59B:
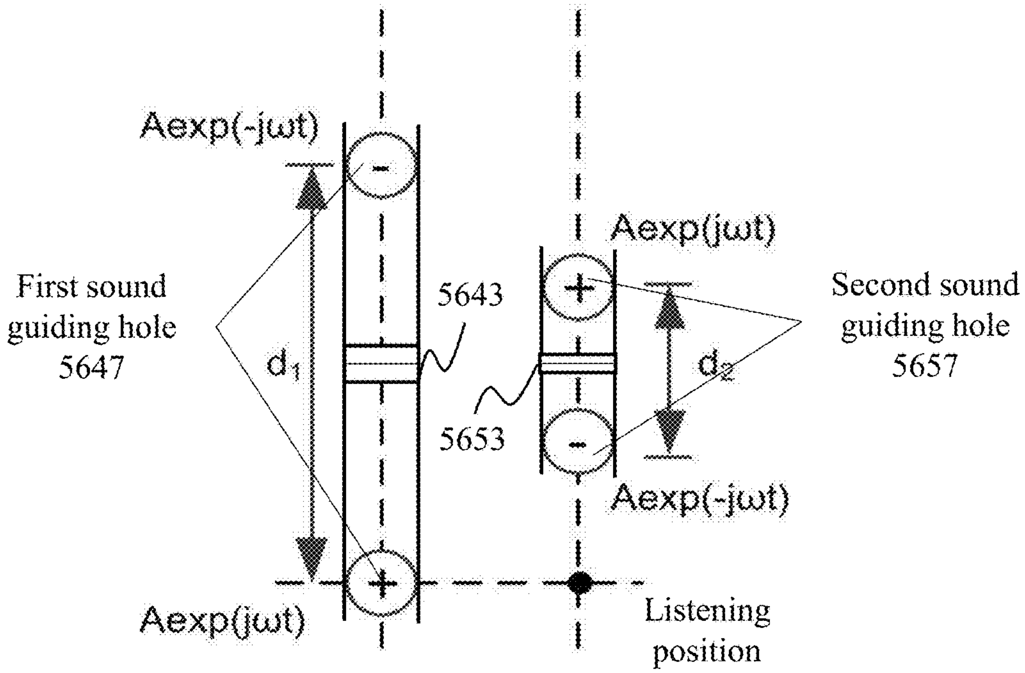

FIG. 59A and FIG. 59B are schematic diagrams illustrating a process for sound output according to some embodiments of the present disclosure.

In some embodiments, the open-ear headphone may generate sound in the same frequency range through two transducers and propagate the sound outward through different sound guiding holes. In some embodiments, different transducers may be controlled by the same or different controllers, respectively, and may produce sounds that satisfy certain phase and amplitude conditions (for example, sounds with the same amplitude but opposite phases, sounds with different amplitudes and opposite phases, etc.). For example, the controller may make the electrical signals input to two low-frequency transducers of the loudspeaker have the same amplitude and opposite phases. In this way, when a sound is formed, the two low-frequency transducers may output low-frequency sounds with the same amplitude but opposite phases.

Specifically, the two transducers in the loudspeaker (such as the first loudspeaker 5640, and the second loudspeaker 5650) may be arranged side by side in the open-ear headphone, one of which may be used to output the normal-phase sound, and the other may be used to output the reverse-phase sound. As shown in FIG. 59A, the first loudspeaker 5640 on the right may include two transducers 5643, two acoustic routes 5645, and two first sound guiding holes 5647. The second loudspeaker 5650 on the left may include two transducers 5653, two acoustic routes 5655, and two second sound guiding holes 5657. Driven by electrical signals with opposite phases, the two transducers 5643 may generate a set of low-frequency sounds with opposite phases (180-degree phase difference). One (such as the transducer located below) of the two transducers 5643 may output the normal-phase sound, and the other (such as the transducer located above) may output the reverse-phase sound. The two sets of low-frequency sounds with opposite phases may be transmitted to the two first sound guiding holes 5647 along the two acoustic routes 5645, respectively, and propagate outwards through the two first sound guiding holes 5647. Similarly, driven by electrical signals with opposite phases, the two transducers 153 may generate a set of high-frequency sounds with opposite phases (180-degree phase difference). One (such as the transducer located below) of the two transducers 5653 may output a normal-phase high-frequency sound, and the other (such as the transducer located above) may output a reverse-phase high-frequency sound. The normal-phase high-frequency sound may be transmitted to the two second sound guiding holes 5657 along the two acoustic routes 5655, respectively, and propagate outwards through the two second sound guiding holes 5657.

In some embodiments, the two transducers in the loudspeaker (e.g., the first loudspeaker 5640 and the second loudspeaker 5650) may be arranged relatively close to each other along the same straight line, and one of them may be used to output a normal-phase sound and the other may be used to output a reverse-phase sound. As shown in FIG. 59B, the left side may be the first loudspeaker 5640, and the right side may be the second loudspeaker 5650. The two transducers 5643 of the first loudspeaker 5640 may generate a set of low-frequency sounds of equal amplitude and opposite phases under the control of the controller, respectively. One of the transducers may output normal low-frequency sound and transmit the normal low-frequency sound along a first acoustic route to a first sound guiding hole 5647. The other transducer may output reverse-phase low-frequency sound and transmit the reverse-phase low-frequency sound along the second acoustic route to another first sound guiding hole 5647. The two transducers 5653 of the second loudspeaker 5650 may generate a high-frequency sound of equal amplitude and opposite phases under the control of the controller, respectively. One of the transducers may output normal-phase high-frequency sound and transmit the normal-phase high-frequency sound along a third acoustic route to a second sound guiding hole 5657. The other transducer may output reverse-phase high-frequency sound and transmit the reverse-phase high-frequency sound along the fourth acoustic route to another second sound guiding hole 5657.

In FIGS. 59A and 59B, the distance between the dipole acoustic sources of the first loudspeaker 5640 may be $d_1$, and the distance between the dipole acoustic sources of the second loudspeaker 5650 may be $d_2$, and $d_1$ may be greater than $d_2$. As shown in FIG. 59B, the listening position (i.e., the position of the ear canal when the user is wearing the open-ear headphone) may be located in a connection line connecting the dipole acoustic sources. In some alternative embodiments, the listening position may be any suitable position. For example, the listening position may be located on a circle centered on the center point of the dipole acoustic sources.

Figure 60:
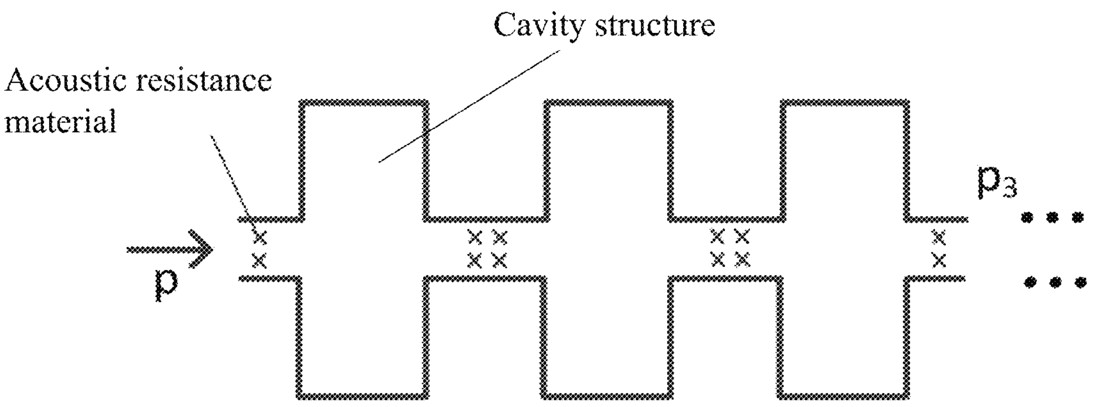
FIG. 60-FIG. 61B are schematic diagrams illustrating acoustic routes according to some embodiments of the present disclosure.
Figure 61A:
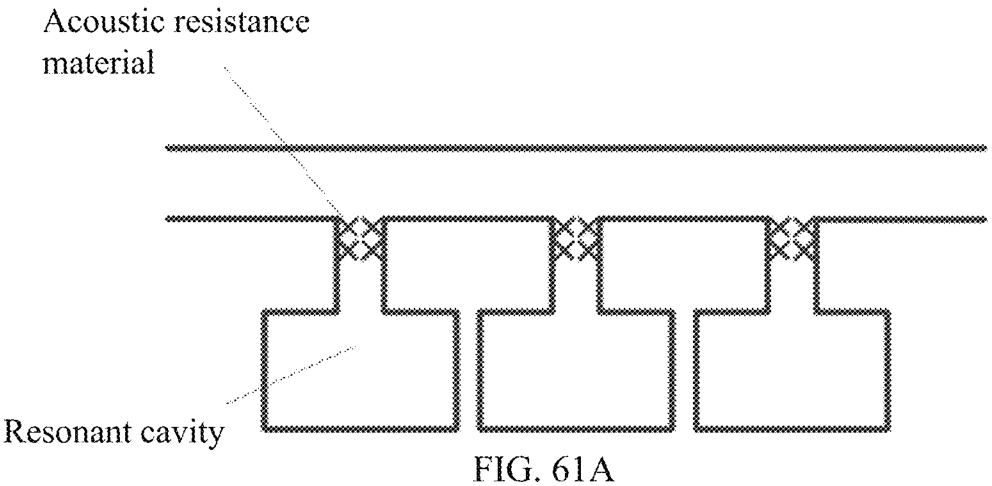
Figure 61B:
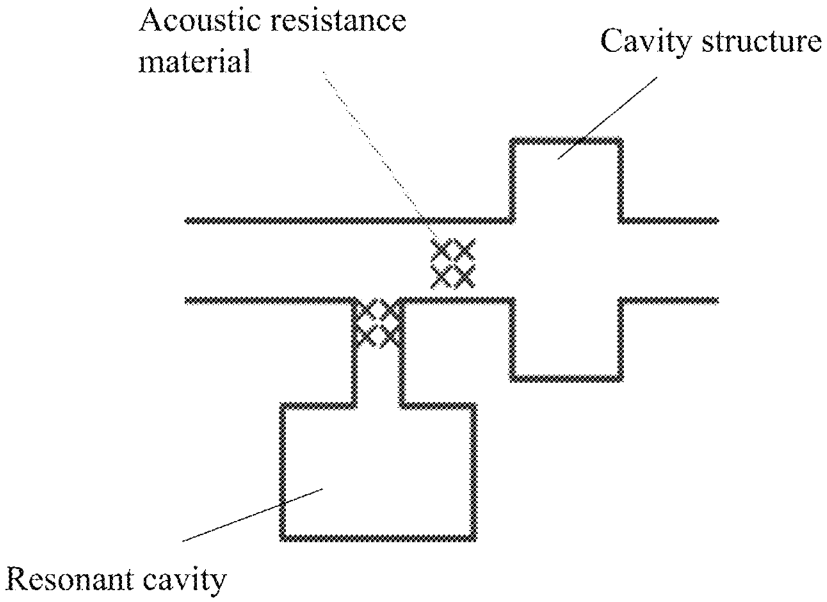

FIG. 60-FIG. 61B are schematic diagrams illustrating acoustic routes according to some embodiments of the present disclosure.

As described above, a corresponding acoustic filtering network may be constructed by setting structures such as a sound guiding tube, a sound cavity, and a sound resistance in an acoustic route to achieve frequency division of sound. FIGS. 60-61 show a schematic diagram of frequency division of a sound signal using an acoustic route.

As shown in FIG. 60, an acoustic route may be composed of one or more groups of cavity structures connected in series, and an acoustic resistance material may be provided in the cavity structure to adjust the acoustic impedance of the entire structure to achieve a filtering effect. In some embodiments, a band-pass filtering or a low-pass filtering may be performed on the sound by adjusting the size of the structures in the cavity and the acoustic resistance material to achieve frequency division of the sound. As shown in FIG. 61A, a structure with one or more sets of resonant cavities (for example, a Helmholtz resonant cavity) may be constructed in a branch of the acoustic route, and the filtering effect may be achieved by adjusting the size of each structure and the acoustic resistance material. As shown in FIG. 61B, a combination of a cavity and a resonant cavity (for example, a Helmholtz resonant cavity) structure may be constructed in an acoustic route, and a filtering effect may be achieved by adjusting the size of each structure and the acoustic resistance material.

In some embodiments, the acoustic route may serve as an acoustic transmission structure for the open-ear headphone, and a filtering structure may be provided in the acoustic transmission structure. The filtering structure may include an acoustic absorbing structure for absorbing sound in a target frequency range, thereby modulating the sound effect (e.g., to reduce the high-frequency sound leakage of the open-ear headphone in the far field) of the open-ear headphone in a spatial point. The acoustic absorbing structure may include a resistance-type acoustic absorbing structure or an impedance-type acoustic absorbing structure. The resistance-type acoustic absorbing structure may include a porous acoustic absorbing material or an acoustic gauze. The impedance-type acoustic absorbing structure may include but is not limited to, perforated plates, microperforated plates, thin plates, thin membranes, ¼ wavelength resonance pipes, etc., or any combination thereof. More detailed descriptions regarding the filtering structure (or the acoustic absorbing structure) may be found in FIGS. 75-86 and related descriptions thereof, which may not be repeated here. In some embodiments, the filtering structure may absorb middle-high frequency sounds in a specific frequency range and be provided in an acoustic transmission structure corresponding to a high-frequency loudspeaker. For example, the filtering structure may be provided in an acoustic transmission structure between the high-frequency loudspeaker and a sound guiding hole away from the ear to reduce the middle-high frequency sounds in a specific frequency range outputted from the sound guiding hole away from the ear to avoid interference enhancement in the far field between the middle-high frequency sound within the specific frequency range and a middle-high frequency sound within the same frequency range output from a sound guiding hole near the ear. As yet another example, the filtering structure may be provided in an acoustic transmission structure between the high-frequency loudspeaker and the sound guiding hole near the ear to reduce the middle-high frequency sound output from the sound guiding hole near the ear in the specific frequency range to avoid interference enhancement in the far field between the middle-high frequency sound within the specific frequency range and the middle-high frequency sound within the same frequency range output from a sound guiding hole away from the ear. As another example, the filtering structure may be provided in a transmission structure between the loudspeaker and the sound guiding hole near the ear and the sound guiding hole away from the ear, respectively, to better reduce the sound leakage of the middle-high frequency sound within the specific frequency range in the far field. In some embodiments, the filtering structure may absorb low-frequency sounds within the specific frequency range and be provided in the acoustic transmission structure corresponding to the low-frequency loudspeaker. For example, the filtering structure may be provided in the acoustic transmission structure between the low-frequency loudspeaker and the sound guiding hole away from the ear to reduce the low-frequency sound within the specific frequency range output from the sound guiding hole away from the ear, avoiding an interference cancellation in the near field between the low-frequency sound within the specific frequency range and a low-frequency sound within the same frequency range output from the sound guiding hole close to the ear. Thus, a volume of the open-ear headphone in the near field (i.e., to the ear of the user) may be increased in the specific frequency range. In some embodiments, the filtering structure may further include sub-filtering structures configured to absorb different frequency ranges, such as a mid-high frequency band and a low-frequency band, may be provided in an acoustic transmission structure corresponding to the low-frequency loudspeaker and an acoustic transmission structure corresponding to the high-frequency loudspeaker, for absorbing sounds within different frequency ranges.

Figure 62A:
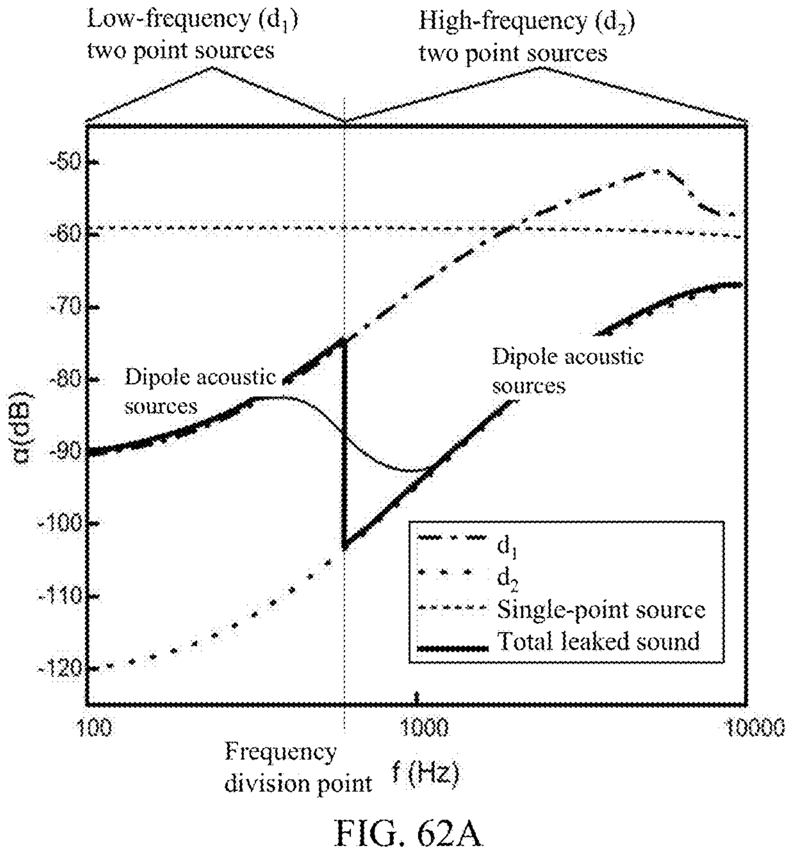
FIG. 62A is a schematic diagram illustrating exemplary curves of sound leakages under actions of two sets of dipole acoustic sources according to some embodiments of the present disclosure.

FIG. 62A is a schematic diagram illustrating exemplary curves of sound leakages under actions of two sets of dipole acoustic sources according to some embodiments of the present disclosure.

FIG. 62A shows curves of the sound leakages of an open-ear headphone (e.g., open-ear headphone 5300, open-ear headphone 5600, open-ear headphone 5800, etc.) under the combined action of two sets of dipole acoustic sources (i.e., one set of high-frequency dipole acoustic sources and one set of low-frequency dipole acoustic sources). The frequency division points of the two sets of dipole acoustic sources may be 700 Hz.

The normalization parameter $\alpha$ may be used to evaluate the volume of the leaked sound (for calculation of $\alpha$, see equation (4)). As shown in FIG. 62A, compared with the case of a single-point source, the dipole acoustic sources may have a stronger sound leakage reduction capability. In addition, compared with the open-ear headphone provided with only one set of dipole acoustic sources, the two sets of dipole acoustic sources may output high-frequency sounds and low-frequency sounds, respectively, and a distance between the low-frequency dipole acoustic sources may be greater than that of the high-frequency dipole acoustic sources. In such cases, in the low-frequency range, by setting a larger distance ($d_1$) between the dipole acoustic sources, the increase in the volume of the near-field heard sound may be greater than the increase in the volume of the far-field sound leakage and a relatively high volume of the near-field heard sound output in the low-frequency band may be obtained. At the same time, in the low-frequency range, the sound leakage of the dipole acoustic sources may originally be very small. After the distance between the dipole acoustic sources is increased, the slightly increased sound leakage may still maintain a low level. In the high-frequency range, by setting a small distance ($d_2$) between the dipole acoustic sources, the problems of the cutoff frequency of high-frequency sound leakage reduction being too low and the audio band of the sound leakage reduction being too narrow may be overcome. Therefore, by setting the distance between the dipole acoustic sources in the low-frequency band the distance between the dipole acoustic sources in the high-frequency band, the open-ear headphone provided in the embodiments of the present disclosure may obtain a stronger sound leakage reduction capability than a single-point source and one set of dipole acoustic sources.

In some embodiments, affected by factors such as the filter characteristics of the actual circuit, the frequency characteristics of the transducer, and the frequency characteristics of the acoustic channel, the actual low-frequency and high-frequency sounds of the open-ear headphone may differ from those shown in FIG. 62A. In addition, low-frequency and high-frequency sounds may have a certain crossover (aliasing) in the frequency band near the frequency division point, causing the total sound leakage reduction of the open-ear headphone not to have a mutation at the frequency division point as shown in FIG. 62A. Instead, there may be gradients and transitions in the frequency band near the frequency division point, as shown in the solid line in FIG. 62A. It may be understood that these differences may not affect the overall leakage reduction effect of the open-ear headphone provided by the embodiment of the present disclosure.

Figure 62B:
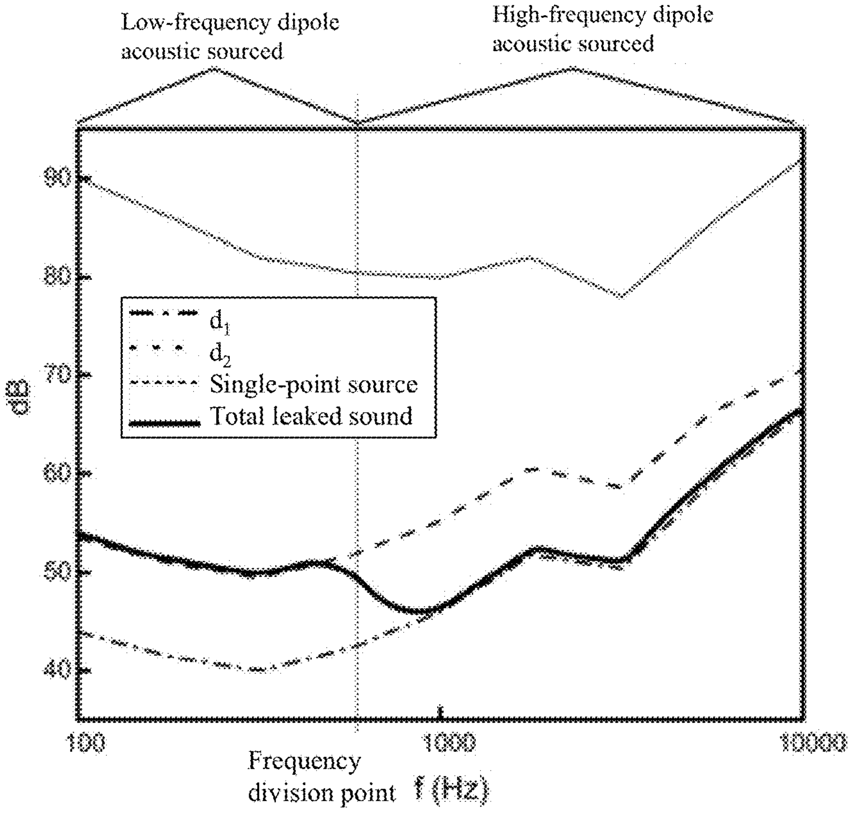
FIG. 62B is a schematic diagram illustrating normalized curves of sound leakages according to some embodiments of the present disclosure.

FIG. 62B is a schematic diagram illustrating normalized curves of sound leakages according to some embodiments of the present disclosure. In some embodiments, the human ear is not equally sensitive to sounds of different frequencies. For actual listening situations, it is often necessary to ensure that the human ear perceives the loudness of sounds of different frequencies as the same. In such a case, volumes (a sound pressure value) output under different frequencies are different. As shown in FIG. 62B, different leakage reduction effects may be realized by adjusting different distances to set low-frequency dipole acoustic sources and high-frequency dipole acoustic sources. The actual sound leakage is shown in the total sound leakage curve in FIG. 62B. There is a certain overlap of the frequency bands of the high-frequency and low-frequency sounds near a frequency division point, which leads to the gradual gradients and transitions of a total sound leakage curve in this frequency band.

Figure 63A:
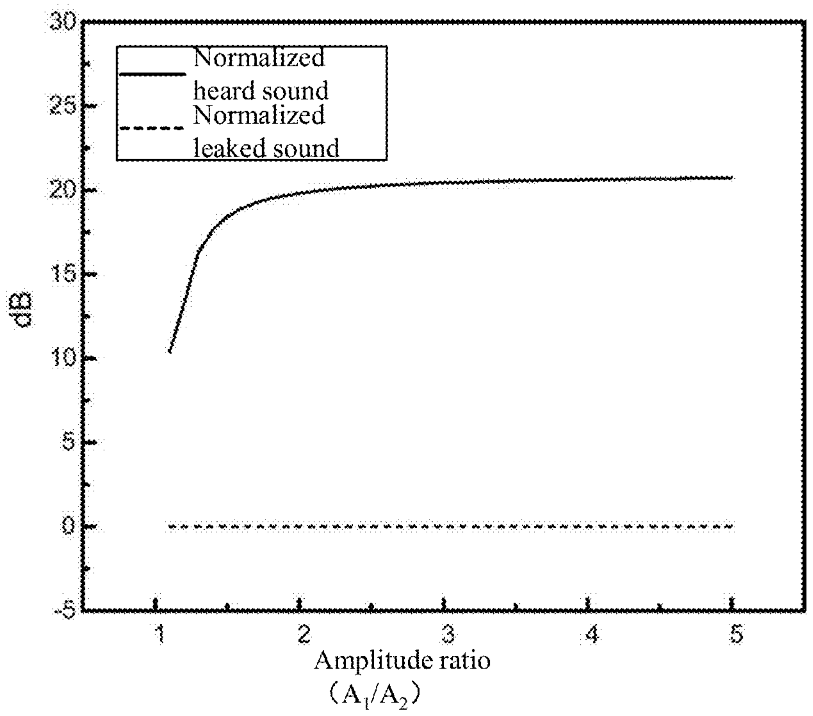
FIG. 63A is a schematic diagram illustrating curves of a heard sound and a leaked sound of dipole acoustic sources at a particular frequency when a ratio of amplitudes of two point sources changes according to some embodiments shown in the present disclosure.

In some embodiments, a heard sound and a leaked sound produced by the dipole acoustic sources are related to an amplitude of two point sources. For example, curves of the heard sound and the leaked sound of the dipole acoustic sources at a specific frequency changing along with an amplitude ratio of the two point sources are illustrated in FIG. 63A. The amplitude ratio in the present disclosure refers to a ratio of a larger amplitude to a smaller amplitude of the two point sources. In FIG. 63A, the solid line may represent a curve of a near-field heard sound of the dipole acoustic sources changing along with the amplitude, and the dashed line may represent a curve of a far-field leaked sound of the dipole acoustic sources changing along with the amplitude. The horizontal coordinate indicates the amplitude ratio between the dipole acoustic sources, and the vertical coordinate indicates the magnitude of the sound volume. To better reflect relative changes between the heard sound and the leaked sound, the sound volume may be normalized by the volume of the leaked sound, i.e., the vertical coordinate reflects the magnitude of a ratio of an actual volume to the volume of the leaked sound (i.e., $|P|/|P_{far}|$).

At the specific frequency, when the amplitude ratio between the two point sources is increased within a certain range, the increase in the volume of the heard sound of the dipole acoustic sources may be significantly greater than the increase in the volume of the leaked sound. As shown in FIG. 63A, when the amplitude ratio $A_2/A_1$ between the two point sources varies within a range of 1-1.5, the increase in the volume of the heard sound may be significantly greater than that of the volume of the leaked sound. That is, in this case, the larger the amplitude ratio between the two point sources, the more favorable it is for the dipole acoustic sources to produce a higher volume of a near-field heard sound while reducing the volume of the far-field leaked sound. In some embodiments, as the amplitude ratio between the two point sources increases further, a slope of the normalized curve of the volume of the heard sound gradually tends to 0 and tends to be parallel to that of the volume of the leaked sound, which indicates that the increment in the volume of the heard sound is the same as the increment in the volume of the leaked sound. As shown in FIG. 63A, when the amplitude ratio $A_2/A_1$ between the two point sources varies within a range greater than 2, the increment in the volume of the heard sound may be the same as the increment in the volume of the leaked sound.

In some embodiments, to ensure that the dipole acoustic sources produce a large volume of a near-field heard sound and a small volume of a far-field leaked sound, the amplitude ratio between the two point sources may be within a suitable range. In some embodiments, assuming that the low-frequency dipole acoustic sources (e.g., the two first sound guiding holes 5647 of the first loudspeaker 5640) have a first amplitude ratio of a low-frequency sound having a larger amplitude to a low-frequency sound having a smaller amplitude, and that the high-frequency dipole acoustic sources (e.g., the two first sound guiding holes 5657 of the second loudspeaker 5650) have a second amplitude ratio of the high-frequency sound having a larger amplitude and a high-frequency sound having a smaller amplitude, the first amplitude ratio may be at least two times greater than the second amplitude ratio. In some embodiments, the first amplitude ratio may be not less than 1, the second amplitude ratio may be not greater than 5, and the first amplitude ratio may be greater than the second amplitude ratio. For example, the first amplitude ratio may be within a range of 1-3 and the second amplitude ratio may be within a range of 1-2.

Figure 63B:
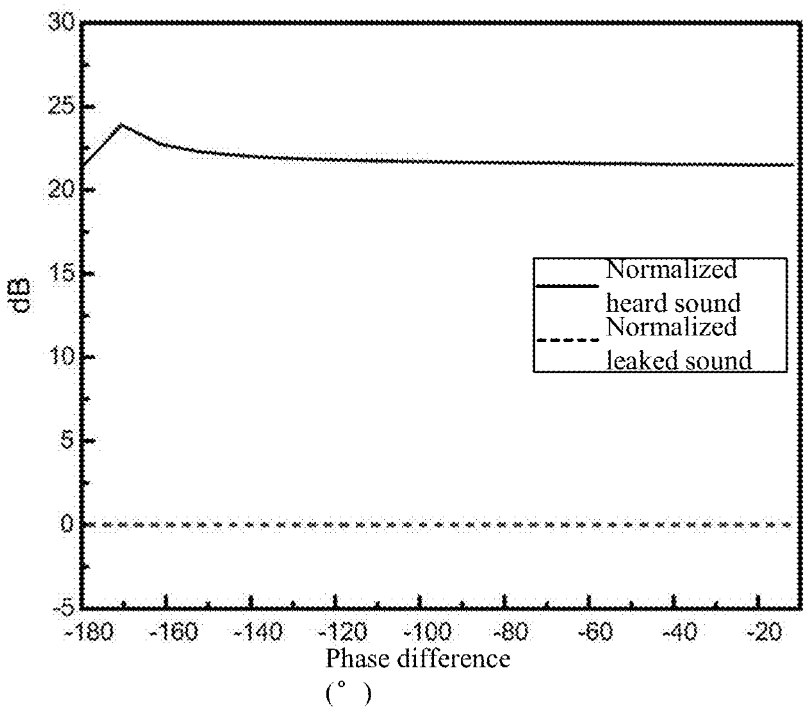
FIG. 63B is a schematic diagram illustrating curves of a heard sound and a leaked sound of dipole acoustic sources at a particular frequency when a phase difference between two point sources changes according to some embodiments shown in the present disclosure.

In some embodiments, the heard sound and the leaked sound produced by the dipole acoustic sources may be related to phases of the two point sources. For example, FIG. 63B illustrates curves of the heard sound and the leaked sound of the dipole acoustic sources at a specific frequency changing along with a phase difference between the two point sources. Similar to FIG. 63A, in FIG. 63B, the solid line represents a curve of the near-field heard sound of the dipole acoustic sources changing along with the phase difference, and the dashed line represents a curve of the far-field leaked sound of the dipole acoustic sources changing along with the phase difference. The horizontal coordinate represents the phase difference between the two point sources, and the vertical coordinate represents the magnitude of the sound volume. To better reflect the relative changes of the heard sound and the leaked sound, the sound volume may be normalized by the volume of the leaked sound, i.e., the vertical coordinate reflects the magnitude of the ratio of the actual volume to the volume of the leaked sound (i.e., $|P|/|P_{far}|$).

At the specific frequency, a peak may be formed in the normalized curve corresponding to the volume of the heard sound of the dipole acoustic source as the phase difference between the two point sources changes. As shown in FIG. 63B, the peak may correspond to the absolute value of the phase difference between the two point sources in about 170 degrees. At the peak, the dipole acoustic sources may have a maximum normalized volume of the heard sound, which indicates that the dipole acoustic sources may produce a larger volume of the heard sound while holding the volume of the leaked sound constant. Thus, the dipole acoustic sources may produce a smaller volume of the leaked sound while keeping the volume of the heard sound constant.

It should be noted that the phase difference corresponding to the peaks of the normalized curves of the volume of the heard sound described above may be shifted at different frequencies. In some embodiments, to ensure that the dipole acoustic sources produce a large volume of the near-field heard sound and a small volume of the far-field leaked sound within a certain range of sound frequencies (e.g., a range of frequencies audible to the human ear), the absolute value of the phase difference between the dipole acoustic sources may be within a certain range. In some embodiments, the absolute value of the phase difference between the dipole acoustic sources may be within a range of 180 degrees-120 degrees. For example, the absolute value of the phase difference between the dipole acoustic sources may be within a range of 180 degrees-160 degrees.

To further characterize the effect of amplitude ratios between dipole acoustic sources on the output sound of the open-ear headphone, the following is illustrated with reference to the two sets of dipole acoustic sources illustrated in FIG. 64A.

Figure 64A:
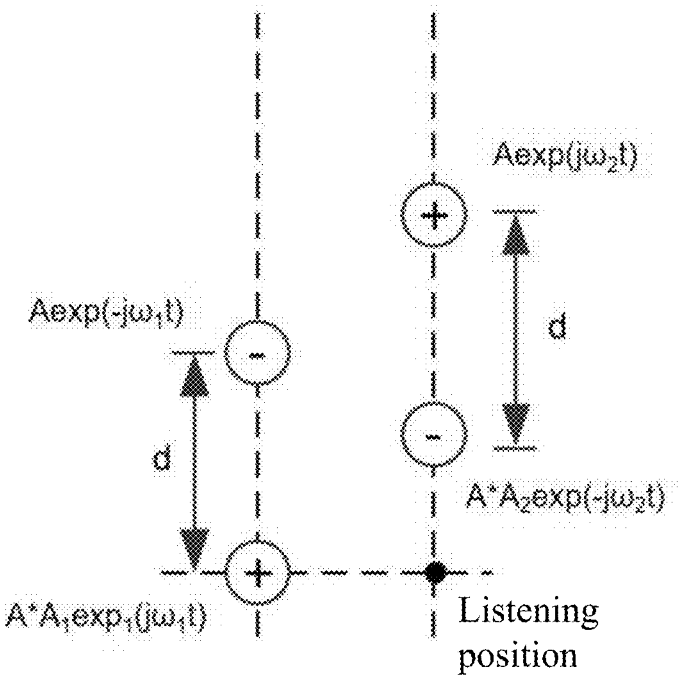
FIG. 64A is a schematic diagram illustrating a position distribution of two sets of dipole acoustic sources according to some embodiments of the present disclosure.

In FIG. 64A, dipole acoustic sources on the left side represent dipole acoustic sources (outputting a low-frequency sound with a frequency of $\omega_1$) equivalent to two sound guiding holes (e.g., the first sound guiding holes 5647) corresponding to a low-frequency loudspeaker (e.g., the first loudspeaker 5640), and dipole acoustic sources on the right side represents dipole acoustic sources (outputting a high-frequency sound with a frequency of $\omega_1$) equivalent to two sound guiding holes (e.g., the second sound guiding holes 5657) corresponding to a high-frequency loudspeaker (e.g., the second loudspeaker 5650). For simplicity, assuming that the high-frequency dipole acoustic sources and the low-frequency dipole acoustic sources have the same distance d.

The high-frequency dipole acoustic sources and the low-frequency dipole acoustic sources may output a set of high-frequency sounds with opposite phases and a set of low-frequency sounds with opposite phases, respectively. An amplitude ratio of a point source with a larger amplitude to a point source with a smaller amplitude in the low-frequency dipole acoustic source is $A_1$, an amplitude ratio of a point source with a larger amplitude to a point source with a smaller amplitude in the high-frequency dipole acoustic source is $A_2$, and $A_1 > A_2$. In FIG. 64A, a listening position is located on a straight line where the high-frequency dipole acoustic sources are located, and a connection line connecting the listening position and one of the low-frequency dipole acoustic sources is perpendicular to a straight line where the low-frequency dipole acoustic sources are located. It is to be understood that the selection of the listening position herein is intended to be an example only and is not a limitation of the present disclosure. In some alternative embodiments, the listening position may be any suitable position. For example, the listening position may be located at a centerline of the dipole acoustic sources.

In some embodiments, amplitude ratios that satisfy the requirements may be obtained by adjusting structural parameters of the different components in the open-ear headphone. For example, the amplitude of the sound output at the sound guiding hole may be changed by adjusting an acoustic impedance of an acoustic route (e.g., by adding a damping material such as tuning mesh, tuning cotton, or the like to the acoustic route 5645 or 5655 to change its acoustic impedance). Assuming that a value of an acoustic impedance ratio of a front chamber to a rear chamber of the low-frequency loudspeaker is a first acoustic impedance ratio, and a value of an acoustic impedance ratio of the front chamber to the rear chamber of the high-frequency loudspeaker is a second acoustic impedance ratio, in some embodiments, the first acoustic impedance ratio and the second acoustic impedance ratio may be arbitrary values, and the first acoustic impedance ratio may be greater than, less than, or equal to the second acoustic impedance ratio. In some embodiments, the first acoustic impedance ratio may be not less than 0.1 and the second acoustic impedance ratio may be not greater than 3. Preferably, the first acoustic impedance ratio and the second acoustic impedance ratio may be within a range of 0.8-1.2.

In some embodiments, the acoustic impedance of the acoustic route may be changed by adjusting a diameter of a sound guiding tube that corresponds to the acoustic route in the open-ear headphone to adjust the amplitude of the sound at the sound guiding holes. In some embodiments, a ratio of diameters of the two sound guiding tubes in the low-frequency loudspeaker (a ratio of a diameter of a smaller radius sound guiding tube to a diameter of a larger radius sound guiding tube) may be set within a range of 0.8-1.0. Preferably, the diameter of the two sound guiding tubes in the low-frequency loudspeaker may be set to be the same.

In some embodiments, internal friction or viscous forces of a medium within the sound guiding tube may have a large impact on the propagation of sound, and too small a diameter of the sound guiding tube may lead to excessive loss of sound, reducing the volume of sound at the sound guiding hole. To more clearly describe the effect of the diameter of the sound guiding tube on the sound volume, the following may describe the diameter of the sound guiding tube at different frequencies in combination with FIGS. 64B and 64C.

Figure 64B:
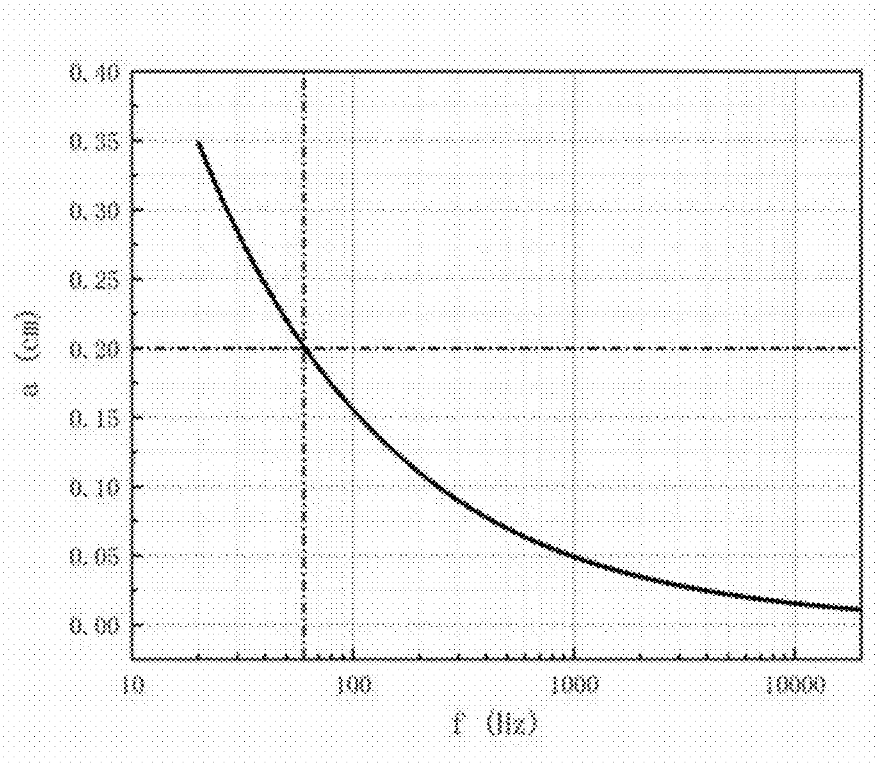
FIG. 64B and FIG. 64C are schematic diagrams illustrating curves of parameters of a sound guiding tube when a sound frequency changes according to some embodiments of the present disclosure.
Figure 64C:
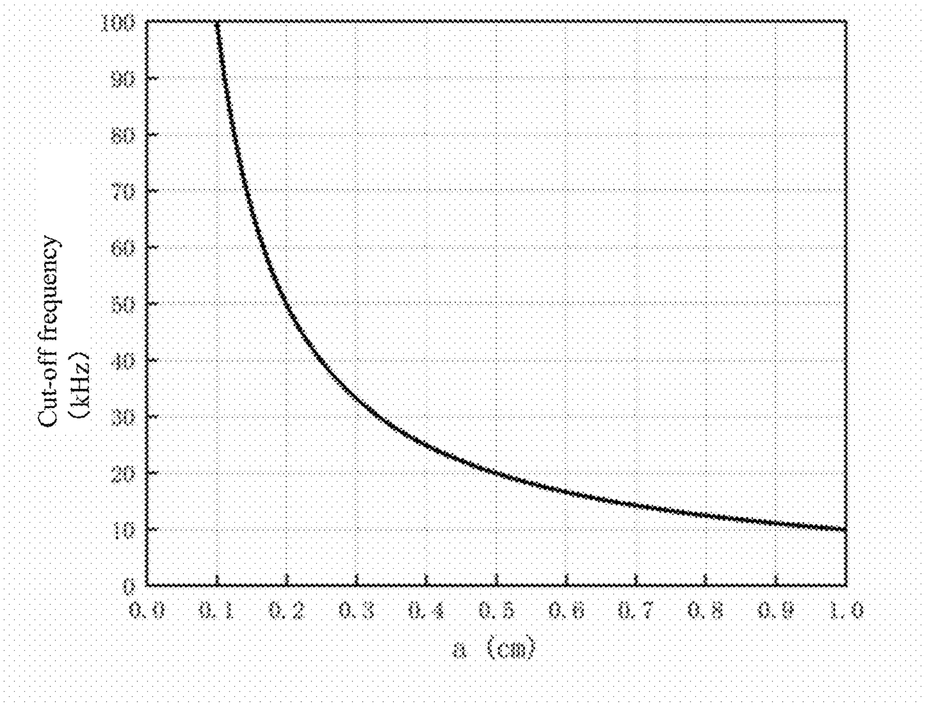

FIG. 64B and FIG. 64C are schematic diagrams illustrating curves of parameters of a sound guiding tube when a sound frequency changes according to some embodiments of the present disclosure. FIG. 64B shows a minimum value of the diameter of the sound guiding tube corresponding to different sound frequencies. The ordinate is the minimum value of the diameter of the sound guiding tube in centimeters (cm) and the abscissa is the frequency of the sound in hertz (Hz). As shown in FIG. 64B, the diameter (or equivalent radius) of the sound guiding tube should be not less than 3.5 mm when the sound frequency is within a range of 20 Hz-20 kHz. When the sound frequency is within a range of 60 Hz-20 KHz, the diameter (or equivalent radius) of the sound guiding tube should be not less than 2 mm. Therefore, to reduce the loss of the sound within the audible range of the human ear output by the headphone due to the sound guiding tube with a small diameter, the diameter of the sound guiding tube corresponding to the acoustic route in the headphone may be not less than 1.5 mm, and preferably not less than 2 mm.

In some embodiments, if the diameter of the sound guiding tube is too large, and a frequency of the transmitted sound is higher than a certain frequency, high-order waves may be generated in the sound guiding tube, which may affect the sound that eventually propagates outward from the sound guiding hole. Therefore, the design of the sound guiding tube needs to ensure that no high-order waves are generated in the frequency range of the sound to be transmitted, but only plane waves propagating in the direction of the sound guiding tube. FIG. 64C shows a maximum value of the diameter of the sound guiding tube corresponding to different upper cut-off frequencies of sound transmission. The abscissa is the maximum value of the diameter of the sound guiding tube, in centimeters (cm), and the ordinate is the upper cut-off frequency of sound transmission, in kilohertz (kHz). As shown in FIG. 64C, when the upper cut-off frequency of sound transmission is 20 kHz, the diameter (or equivalent radius) of the sound guiding tube should not be greater than 5 mm. When the upper cut-off frequency of sound transmission is 10 kHz, the diameter (or equivalent radius) of the sound guiding tube should not be greater than 9 mm. Therefore, to ensure that the headphone does not generate high-order waves when outputting sounds within the audible range of human cars, the diameter of the sound guiding tube corresponding to the acoustic route in the headphone may not be greater than 10 mm, and preferably not greater than 8 mm, etc.

In some embodiments, the acoustic impedance of the acoustic route may be changed by adjusting a length of the sound guiding tube corresponding to the acoustic route in the open-ear headphone, to achieve the purpose of adjusting the sound amplitude at the sound guiding hole. The length and the aspect ratio (i.e., a ratio of length to diameter) of the sound guiding tube may affect the transmitted sound. Merely by way of example, a sound pressure of the sound transmitted by the sound guiding tube, the length, and the radius of the sound guiding tube may satisfy equation (5):

$$|P| = |P_0| \exp(-\beta L), \tag{5}$$

where $P_0$ denotes the sound pressure of the acoustic source, L denotes the length of the sound guiding tube, and β may satisfy equation (6):

$$\beta = \frac{1}{ac_0}\sqrt{\frac{\omega}{2}\cdot\frac{\eta}{\rho_0}}, \tag{6}$$

where a denotes the radius of the sound guiding tube, c0 denotes a propagation speed of sound, ω denotes an angular frequency of the acoustic wave, and $\eta/\rho_0$ denotes the dynamic viscosity of the medium. For different diameters of the sound guiding tube, the attenuation degree of sounds with different frequencies may be related to the length and aspect ratio of the sound guiding tube.

In some embodiments, when the diameter of the sound guiding tube is constant, the greater the length (or aspect ratio) of the sound guiding tube, the greater the attenuation degree of sounds transmitted in the sound guiding tube may be, and the sound in the high-frequency band may have a greater attenuation degree than the sound in the low-frequency band. Therefore, to ensure that the sound attenuation of the open-ear headphone is not too large to affect the heard sound volume, the aspect ratio of the sound guiding tube corresponding to the acoustic route in the open-ear headphone may be not greater than 200, and preferably not greater than 150.

Figure 65A:
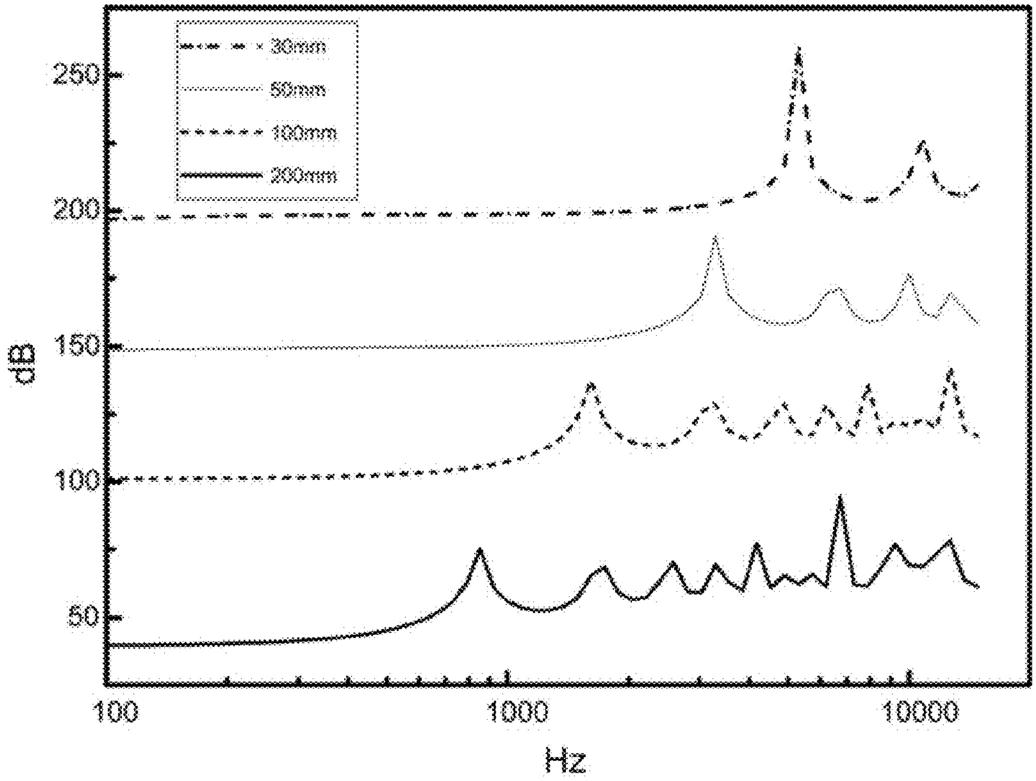
FIG. 65A is a schematic diagram illustrating a sound pressure of sound output from sound guiding tubes with different lengths according to some embodiments of the present disclosure.

In some embodiments, due to the interaction between the sound guiding tube and the radiation impedance of the opening of the sound guiding tube, a sound of a specific frequency transmitted in the sound guiding tube may form a standing wave therein, causing the output sound to form peaks or valleys at certain frequencies, and affecting the sound output performance. The length of the sound guiding tube may affect the formation of standing waves. For a clearer description, a relative magnitude of the sound pressure of the sound output from different lengths of sound guiding tubes is shown in FIG. 65A. According to FIG. 65A, the longer the length of the sound guiding tube, the lower the minimum frequency of the peaks/valleys of sound outputted by the sound guiding tube may be, and the greater the count of the peaks/valleys may be. To reduce the influence of the peaks/valleys on the sound output effect, the length of the sound guiding tube may be adjusted to meet certain conditions. In some embodiments, the length of the sound guiding tube may not be greater than 200 mm, so that the output sound is relatively flat in a range of 20 Hz-800 Hz. In some embodiments, the length of the sound guiding tube may not be greater than 100 mm, so that the output sound is flat and without peaks and valleys in a range of 20 Hz-1500 Hz. In some embodiments, the length of the sound guiding tube may not be greater than 50 mm, so that the output sound is flat and without peaks and valleys in a range of 20 Hz-3200 Hz. In some embodiments, the length of the sound guiding tube may not be greater than 30 mm, so that the output sound is flat and without peaks and valleys in a range of 20 Hz-5200 Hz.

Figure 65B:
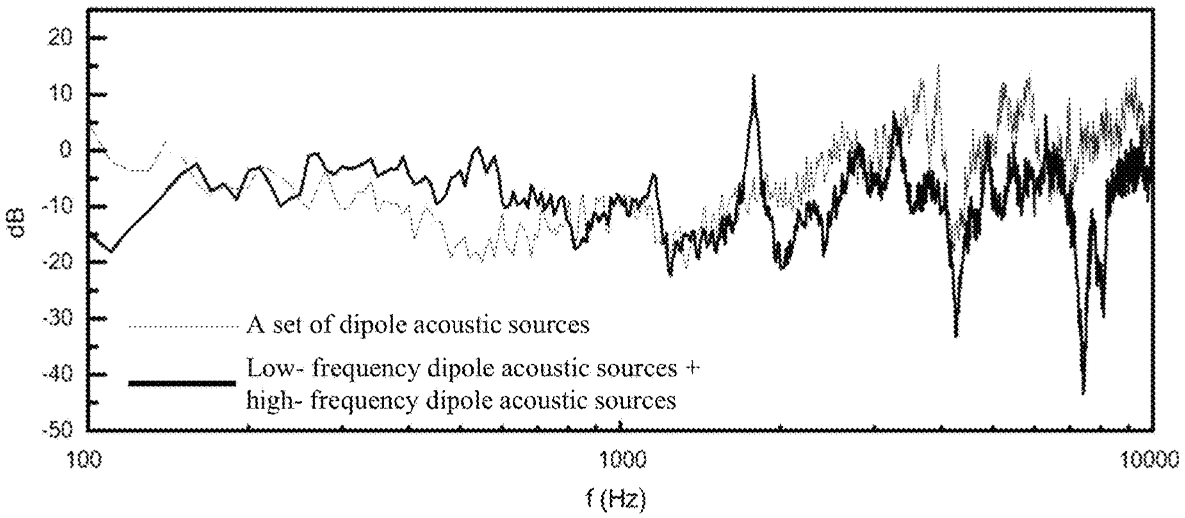
FIG. 65B is a schematic diagram illustrating a leakage reduction effect in an experiment according to some embodiments of the present disclosure.

FIG. 65B is a schematic diagram illustrating a leakage reduction effect in an experiment according to some embodiments of the present disclosure. A frequency division point of a low frequency and a high frequency is selected to be 1.2 kHz, the radius of the sound guiding tube is 2 mm, and the length of each sound guiding tube is 105 mm. An output sound pressure of the headphone was measured using a microphone at a distance of 10 mm from the headphone in the direction of a connection line connecting the dipole acoustic sources, the measured sound pressure was taken as a sound pressure of a heard sound of the human ear. A sound pressure was measured at a distance of 150 mm from the headphone in the direction of a line perpendicular to the connection line connecting the dipole acoustic sources, and the measured sound pressure was taken as a sound pressure of a leaked sound of the headphone. For reference, 0 dB is a volume of the leaked sound of a point source. From the results of the actual test, a scheme of a set of dipole acoustic sources has a greater leakage reduction volume in the low-frequency band, but the leakage reduction frequency range is relatively narrow, and the sound leakage in the range of about 2 kHz or more is greater than that of a point source. A scheme containing the low-frequency dipole acoustic sources and the high-frequency dipole acoustic sources has a certain sound leakage reduction capability in the low-frequency band before the frequency division point, and the sound leakage reduction capability is stronger than that of the scheme with one set of dipole acoustic sources in the high-frequency band after the frequency division point. At the same time, the frequency range of sound leakage reduction is wider, and sound leakage reduction may be realized in a range of 100 Hz-9 kHz.

In some embodiments, both the length and the diameter (i.e., radius) of the sound guiding tube may be adjusted to meet certain conditions. In some embodiments, the diameter of the sound guiding tube may be no less than 0.5 mm and the length of the sound guiding tube may be no greater than 150 mm.

In some embodiments, an amplitude ratio of the dipole acoustic sources may be adjusted by adjusting the structure of the sound guiding hole in the open-ear headphone. For example, the two sound guiding holes corresponding to each loudspeaker of the open-ear headphone may be set to different sizes, areas, and/or shapes, etc., respectively. As another example, the sound guiding holes corresponding to different loudspeakers of the open-ear headphone may be provided in different counts.

In some embodiments, when the loudspeakers (e.g., the first loudspeaker 5640 and the second loudspeaker 5650) output sound through two sound guiding holes (e.g., two first sound guiding holes 5647 and two second sound guiding holes 5657), the two sound guiding holes may output sound having the same or different phases. For example, considering that when low-frequency sounds having different phases are output from the two first sound guiding holes 5647, and when the absolute value of the phase difference tends to be 170 degrees, the open-ear headphone, according to the description of FIG. 63B, may produce a greater volume of the heard sound while maintaining the same volume of the far-field leaked sound. As another example, considering that when high-frequency sounds having different phases arc output from the two second sound guiding holes 5657, and when the absolute value of the phase difference tends to 170 degrees, the open-ear headphone may, according to the description of FIG. 63B, produce a smaller volume of leaked sound while keeping the volume of a near-field heard sound constant. Therefore, by reasonably designing the structure of the electronic frequency division module, the transducer, the acoustic route, or the sound guiding hole, the phase difference between the high-frequency sound at the sound guiding hole corresponding to a high-frequency loudspeaker and the low-frequency sound at the sound guiding hole corresponding to a low-frequency loudspeaker satisfies a certain phase difference, which may make the open-ear headphone have better sound output performance.

Figure 66:
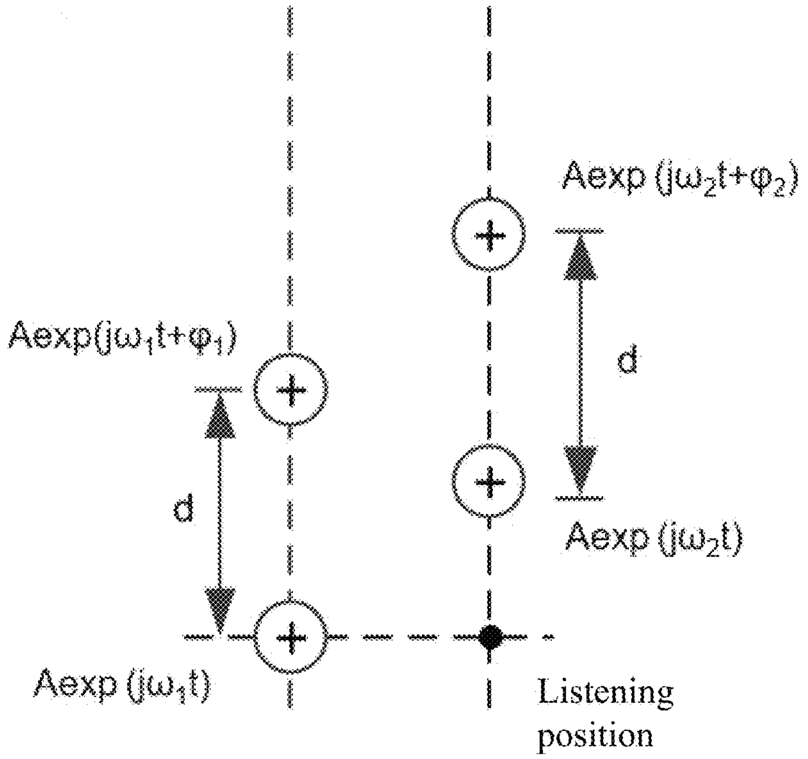
FIG. 66 is a schematic diagram illustrating an effect of a phase difference between two sets of dipole acoustic sources on a sound output from a headphone according to some embodiments of the present disclosure.

To further describe the effect of the phase difference between dipole acoustic sources on the output sound of the open-ear headphone, the following is illustrated in combination with the two sets of dipole acoustic sources shown in FIG. 66.

In FIG. 66, dipole acoustic sources on the left side represent dipole acoustic sources equivalent to the two sound guiding holes corresponding to the low-frequency loudspeaker, and dipole acoustic sources on the right side represent dipole acoustic sources equivalent to the two sound guiding holes corresponding to the high-frequency loudspeaker. For simplicity, assuming that the high-frequency dipole acoustic sources and the low-frequency dipole acoustic sources have the same distance d.

For simplicity, the high-frequency dipole acoustic sources and the low-frequency dipole acoustic sources may output a set of high-frequency sounds and low-frequency sounds of the same amplitude and with a certain phase difference, respectively. In some embodiments, by reasonably designing the phase difference between the high-frequency dipole acoustic sources and the phase difference between the low-frequency dipole acoustic sources, the dipole acoustic sources may obtain a stronger sound leakage reduction capability than a single-point source. In FIG. 66, merely by way of example, the listening position is located on a straight line where the high-frequency dipole acoustic sources are located, and a connection line connecting the listening position and one of the low-frequency dipole acoustic sources is perpendicular to a straight line where the low-frequency dipole acoustic sources are located.

As shown in FIG. 66, the phase difference of an acoustic source away from the ear (i.e., a point source on the upper left side) relative to the acoustic source near the ear (i.e., a point source on the lower left side) in the low-frequency dipole acoustic sources is $\varphi_1$, the phase difference of the acoustic source away from the ear (i.e., the point source on the upper right side) relative to the acoustic source near the ear (i.e., the point source on the lower right side) in the high-frequency dipole acoustic sources is $\varphi_2$, and $\varphi_1$ and $\varphi_2$ satisfy equation (7):

$$|180^0-\varphi_2|>|180^0-\varphi_1|, \quad (7)$$

In some embodiments, a phase difference that meets the requirements may be obtained by adjusting structural parameters of different components in the open-ear headphone. For example, a sound path distance from the loudspeaker to the sound guiding hole in the open-ear headphone may be adjusted to change the phase of the output sound at the sound guiding hole. In some embodiments, a sound path distance ratio of the two sound guiding tubes corresponding to the low-frequency loudspeaker may be within a range of 0.4-2.5, and a sound path distances of the two sound guiding tubes corresponding to the high-frequency loudspeaker may be the same.

In some embodiments, a phase difference between two sound guiding holes on the open-ear headphone corresponding to one loudspeaker may be adjusted by adjusting the sound signal input to the loudspeaker. In some embodiments, the absolute value of the phase difference of the low-frequency sounds output through the two first sound guiding holes may be less than the absolute value of the phase difference of the high-frequency sounds output through the two second sound guiding holes. In some embodiments, the phase difference of the low-frequency sounds output through the two first sound guiding holes may be within a range of 0 degrees-180 degrees, and the phase difference of the high-frequency sounds output through the two second sound guiding holes may be within a range of 120 degrees-180 degrees. Preferably, the phase difference of the low-frequency sounds outputted through the two first sound guiding holes and the phase difference of the high-frequency sounds outputted through the two second sound guiding holes may both be 180 degrees.

FIG. 67-FIG. 69B are schematic diagrams illustrating exemplary sound leakage curves under actions of two sets of dipole acoustic sources according to some embodiments of the present disclosure.

Figure 67:
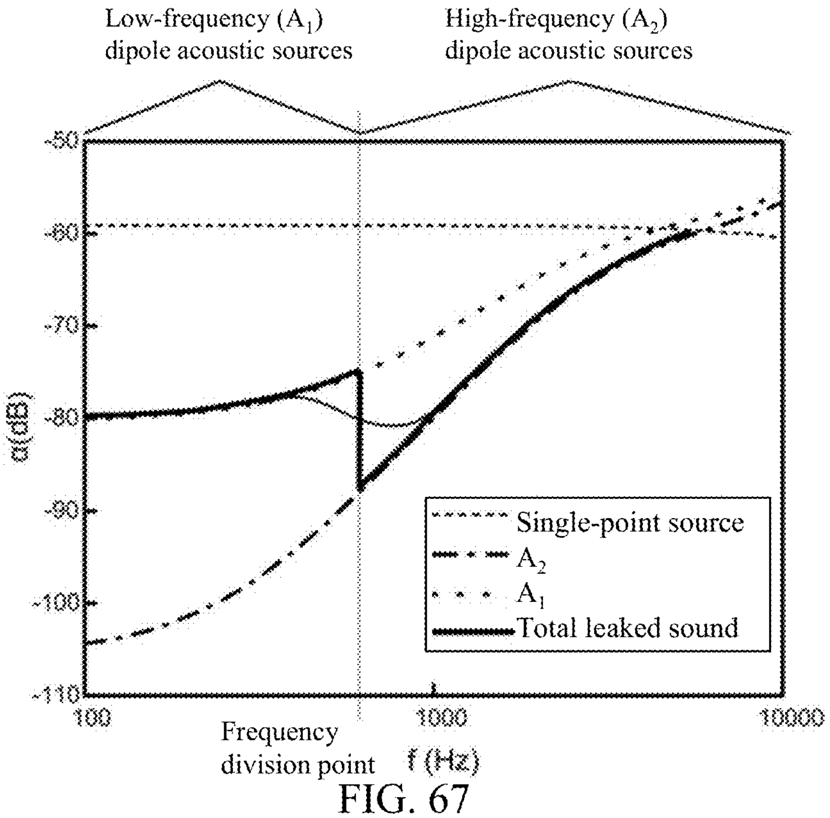
FIG. 67-FIG. 69B are schematic diagrams illustrating exemplary sound leakage curves under actions of two sets of dipole acoustic sources according to some embodiments of the present disclosure.

As shown in FIG. 67, compared to a single-point source, the sound leakage reduction capability may be improved by setting two sets of dipole acoustic sources with different amplitude ratios. For example, the amplitude ratio of the low-frequency dipole acoustic sources is $A_1$, and the amplitude ratio of the high-frequency dipole acoustic sources is $A_2$. In a low-frequency range, after adjusting an amplitude ratio of each set of dipole acoustic sources (for example, $A_1$ is set to a value greater than 1), an increment of the near-field heard sound may be greater than an increment of the far-field leaked sound, which may produce a higher volume of near-field heard sound in the low-frequency range. Since in the low-frequency range, the far-field leaked sound of the dipole acoustic sources is originally very low, after adjusting the amplitude ratio of the dipole acoustic sources, the slightly increased leaked sound may still be kept low. In the high-frequency band, $A_2$ may be equal to or close to 1 by setting the amplitude ratio of the dipole acoustic sources, so that a stronger sound leakage reduction capability may be obtained in the high-frequency band to meet the needs of the open-ear headphone. According to FIG. 69A, the total sound leakage generated by the system including two sets of dipole acoustic sources may remain at a relatively low level below 7000 Hz and is smaller than the sound leakage generated by a single-point source.

Figure 68:
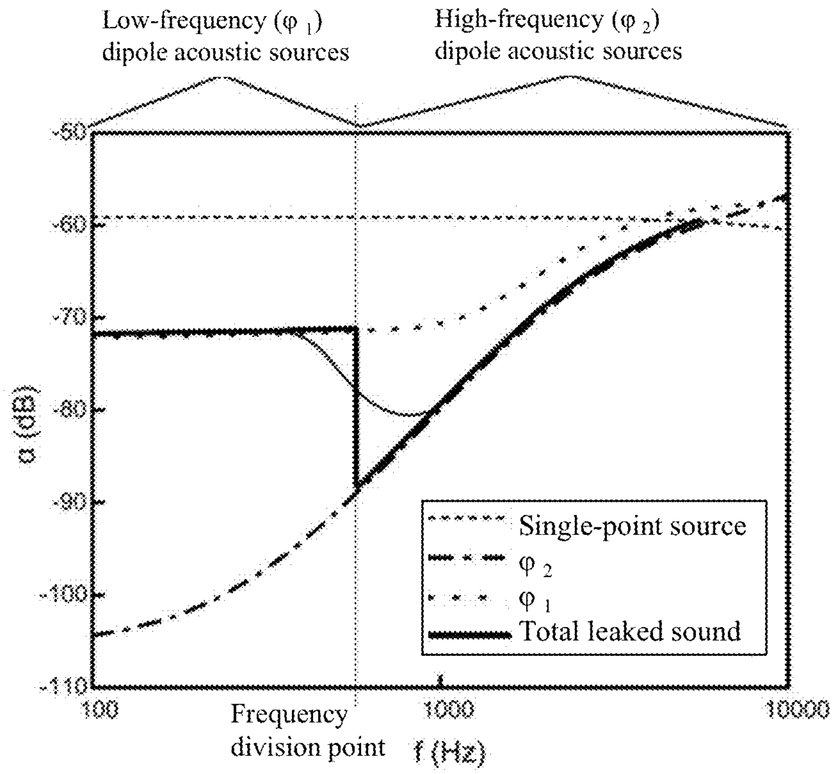

As shown in FIG. 68, compared to the single-point source, the two sets of dipole acoustic sources with different phase differences may have a stronger leakage reduction capability. For example, a phase difference of the low-frequency dipole acoustic sources may be $\varphi_1$, and a phase difference of the high-frequency dipole acoustic sources may be $\varphi_2$. In the low-frequency band, after adjusting a phase difference of each set of dipole acoustic sources, an increment of the near-field heard sound may be greater than an increment of the far-field leaked sound, which may produce a relatively high volume of near-field heard sound in the low-frequency range. Since in the low-frequency band, the far-field leaked sound of the dipole acoustic sources is originally very low, after adjusting the phase difference of the dipole acoustic sources, the slightly increased leaked sound may still be kept low. In the high-frequency range, $\varphi_2$ may be equal to or close to 180 degrees by setting the phase difference of the dipole acoustic sources, so that a stronger sound leakage reduction capability may be obtained in the high-frequency band to meet the needs of the open-ear headphone.

It should be noted that the total sound leakage reduction curves of in FIGS. 67 and 68 are ideal situations, and just to illustrate the principle and effect. Affected by one or more factors such as actual circuit filter characteristics, transducer frequency characteristics, and sound channel frequency characteristics, the actual output low-frequency sound and high-frequency sound may be different from sounds shown in FIGS. 67 and 68. Understandably, these differences do not affect the overall sound leakage reduction effect of the open-ear headphone provided by embodiments of the present disclosure.

Figure 69A:
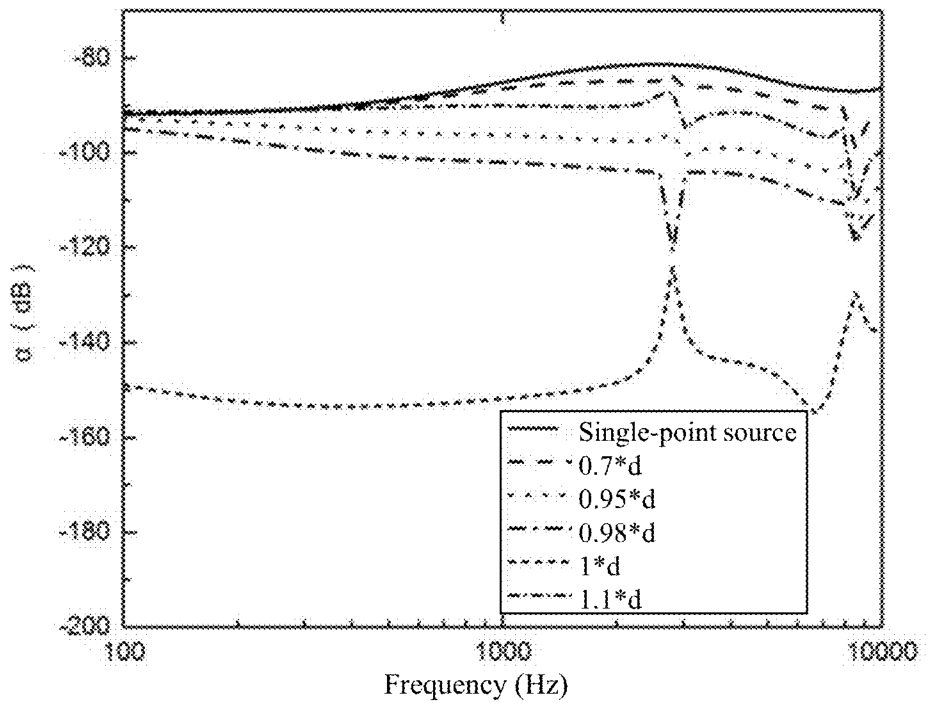
FIG. 69C is a schematic diagram illustrating frequency response curves of a low-frequency loudspeaker and a high-frequency loudspeaker according to some embodiments of the present disclosure.

FIG. 69A shows sound leakage reduction curves of dipole acoustic sources under different diameter ratios of sound guiding tubes. As shown in FIG. 69A, within a certain frequency range (for example, in the range of 800 Hz-10 kHz), the sound leakage reduction capability of the dipole acoustic source may be better than that of a single-point source. For example, when a diameter ratio of sound guiding tubes of the dipole acoustic sources is 1, the dipole acoustic sources may have a stronger sound leakage reduction capability. As another example, when the diameter ratio of the sound guiding tubes of the dipole acoustic sources is 1.1, the sound leakage reduction capability of the dipole acoustic sources may be better than that of the single-point source in the range of 800 Hz-10 KHz.

Figure 69B:
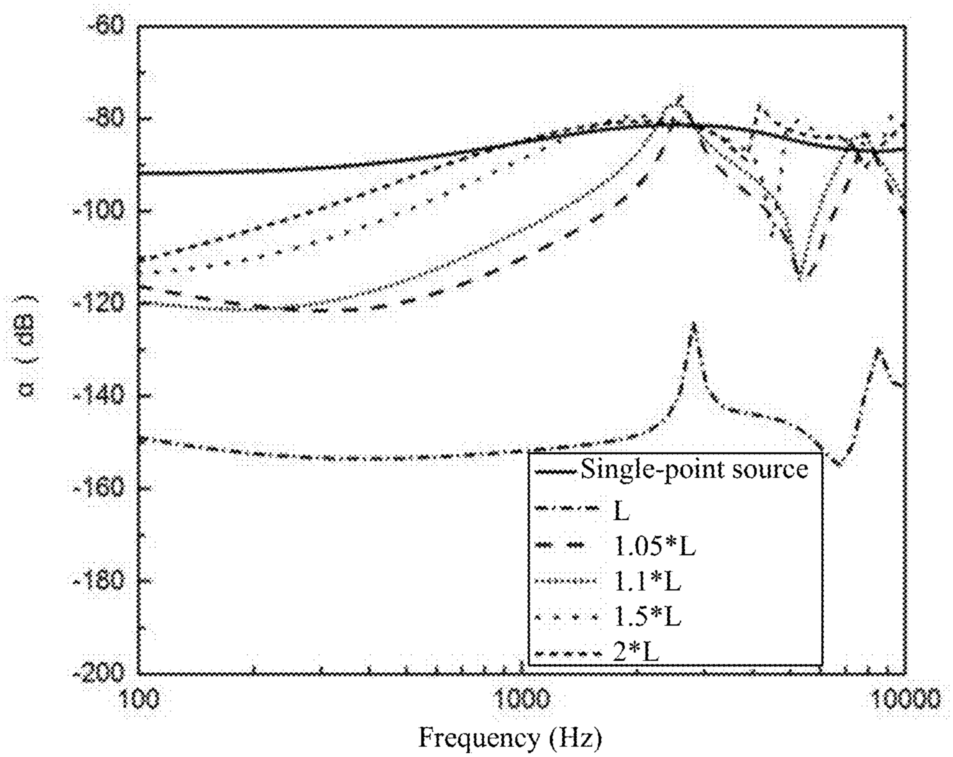

FIG. 69B shows sound leakage reduction curves of dipole acoustic sources under different length ratios of sound guiding tubes. As shown in FIG. 69B, in the range of 100 Hz-1 kHz, the sound leakage reduction capability of the dipole acoustic source may be better than a single-point source by adjusting a length ratio (i.e., a ratio of the length of a longer sound guiding tube to the length of a shorter sound guiding tube) of the sound guiding tubes of the dipole acoustic sources. For example, the length ratio may be 1, 1.05, 1.1, 1.5, 2, etc. In the range of 1 kHz-10 kHz, by adjusting the length ratio (i.e., the ratio of the length of the longer sound guiding tube to the length of the shorter sound guiding tube) of the sound guiding tubes of the dipole acoustic sources close to or equal to 1 (e.g., a length ratio of 1), the sound leakage reduction capability of the dipole acoustic sources may be better than that of the single-point source.

Figure 69C:
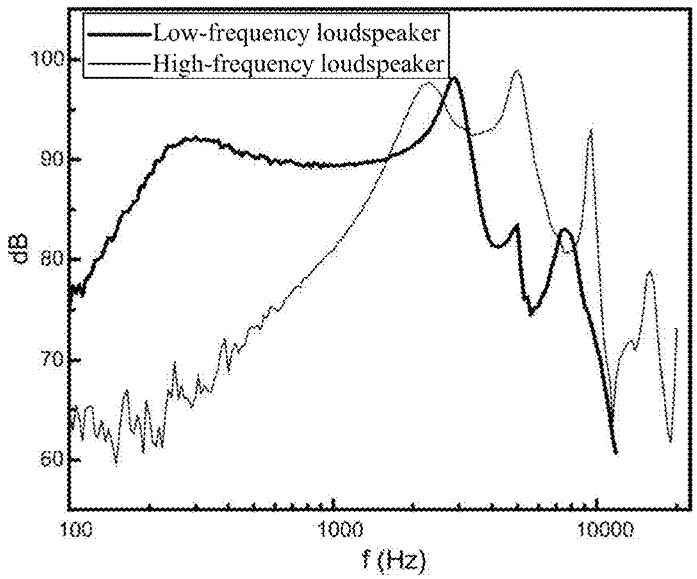

FIG. 69C is a schematic diagram illustrating frequency response curves of a low-frequency loudspeaker and a high-frequency loudspeaker according to some embodiments of the present disclosure. In some embodiments, the low-frequency loudspeakers and the high-frequency loudspeakers may form low-frequency dipole acoustic sources and high-frequency dipole acoustic sources, respectively. Due to differences in the frequency response characteristics of the loudspeakers, the frequency bands of the sound output from the loudspeakers may be different. Typical frequency response curves of the low-frequency loudspeaker and the high-frequency loudspeaker are shown in FIG. 69C, and the output sound is in the low-frequency and high-frequency bands, respectively. Using the low-frequency loudspeaker and the high-frequency loudspeaker, the frequency division of the high-frequency and low-frequency bands may be realized. Then the high-frequency dipole acoustic sources and the low-frequency dipole acoustic sources may be constructed to output sound and reduce the leaked sound. In this case, the frequency division of the signal is not required, or the frequency division of the signal in the front end is simplified. In some embodiments, the loudspeaker may be a moving-coil loudspeaker, which is characterized by a high low-frequency sensitivity, a large low-frequency downward depth, and a small distortion. In some embodiments, the loudspeaker may be a moving-iron loudspeaker, which is characterized by a small size, high sensitivity, and a large high-frequency range. In some embodiments, the loudspeaker may be an air conduction loudspeaker or a bone conduction loudspeaker. In some embodiments, the loudspeaker may include an air conduction loudspeaker, a bone conduction loudspeaker, a hydroacoustic transducer, an ultrasonic transducer, etc.

In some embodiments, when certain conditions (e.g., distance, amplitude, phase) arc satisfied between the two first sound guiding holes of the first loudspeaker and the two second sound guiding holes of the second loudspeaker, the sound leakage reduction effect of the open-ear headphone in the far field may be further improved. For example, the two first sound guiding holes and the two second sound guiding holes may output sound of a certain frequency range, i.e., there is an overlapping frequency range between the high-frequency sound and the low-frequency sound. In the overlapping frequency range, the sound produced by the two first sound guiding holes and the two second sound guiding holes may be viewed as the sound produced by four-point sources. When certain conditions are met between the four-point sources, the open-ear headphone may produce a higher volume of near-field heard sound while producing a smaller volume of far-field leaked sound. To further describe the effect of the four-point sources on the output sound of the open-ear headphone, two sets of four-point sources are illustrated in FIG. 70A and FIG. 70B.

Figure 70A:
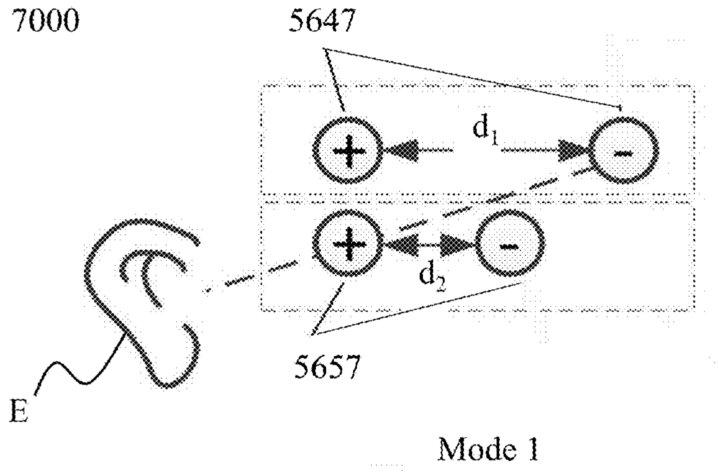
FIG. 70A and FIG. 70B are schematic diagrams illustrating four-point sources according to some embodiments of the present disclosure.
Figure 70B:
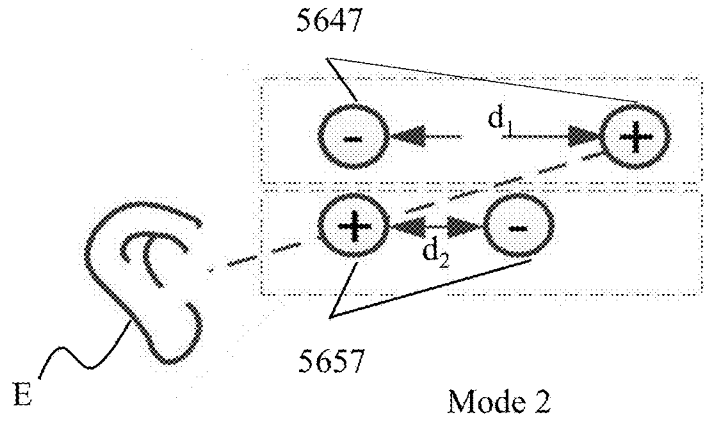

FIG. 70A and FIG. 70B are schematic diagrams illustrating four-point sources according to some embodiments of the present disclosure.

In FIG. 70A and FIG. 70B, symbols "+" and "−" may correspond to phases of sounds generated by sound guiding holes on an open-ear headphone. The two first sound guiding holes 5647 may correspond to a same loudspeaker (e.g., the first loudspeaker 5640), which may be equivalent to the first dipole acoustic sources. The two second sound guiding holes 5657 may also correspond to a same loudspeaker (e.g., the second loudspeaker 5650), which may be equivalent to second dipole acoustic sources. When the first dipole acoustic sources and the second dipole acoustic sources jointly output sound of the same frequency, the two sets of dipole acoustic sources may together form four-point sources. For illustration purposes, an ear E of a user wearing the open-ear headphone is shown in the figure.

A first distance $d_1$ may be a distance between the two first sound guiding holes 5647. A second distance $d_2$ may be a distance between the two second sound guiding holes 5657. In some embodiments, the first distance $d_1$ and the second distance de may be any value. The first distance $d_1$ may be greater than the second distance $d_2$. Descriptions regarding the first distance and the second distance may be found elsewhere in the present disclosure.

In some embodiments, the four sound guiding holes described above (i.e., the two first sound guiding holes 5647 and the two second sound guiding holes 5657) may be provided at different locations of the open-ear headphone. Merely by way of example, the first sound guiding holes 5647 and the first sound guiding holes 5647, as well as the second sound guiding hole 5657 and the second sound guiding hole 5657, may be provided on the same or different sides of the housing of the open-ear headphone. The four sound guiding holes may be set along a straight line or a plurality of straight lines on the housing. As shown in FIG. 70A or FIG. 70B, the first sound guiding holes 5647 may be arranged at intervals along a first direction, and the second sound guiding holes 565 may be arranged at intervals along a second direction. The first direction may be parallel to the second direction.

In some embodiments, a specific relationship may be satisfied between the location of the sound guiding holes and the ear of the user when the user is wearing the open-ear headphone 7000. For example, with the listening position (i.e., the ear of the user) as a vertex, an included angle formed between each of the two first sound guiding holes 5647 and the listening position (i.e., an included angle formed by a vector from the listening position to each of the first sound guiding holes 5647) may not be greater than 150 degrees, and an included angle formed between each of the second sound guiding holes 5657 and the listening position (i.e., an included angle formed by a vector from the listening position to each of the second sound guiding holes 5657) may not be less than 0 degrees. In some embodiments, the included angle formed between each of the two first sound guiding holes 5647 and the listening position may be not greater than 100 degrees, and the included angle formed between each of the two second sound guiding holes 5657 and the listening position may be not less than 10 degrees. More descriptions regarding the relationship between the sound guiding holes and the listening position may be found elsewhere in the present disclosure (e.g., FIG. 71 and related descriptions thereof).

It may be understood that the sound guiding hole may be provided in any reasonable position of the open-ear headphone, which is not limited in the present disclosure. For example, one of the first sound guiding holes 5647 (also referred to as the first sound guiding hole near the ear) may be provided at a position closer to the ear relative to the other (also referred to as the first sound guiding hole away from the ear). One of the second sound guiding holes 5657 (also referred to as the second sound guiding hole near the ear) may be provided at a position closer to the ear relative to the other (also referred to as the second sound guiding hole away from the ear). In some embodiments, the sound guiding holes near the ear (e.g., the first sound guiding hole 5647 near the ear and the second sound guiding hole 5657 near the ear) may be provided on a side of the housing of the open-ear headphone facing the ear of the user. The sound guiding holed away from the ear (e.g., the first sound guiding hole 5647 away from the ear and the second sound guiding hole 5657 away from the ear) may be provided on a side of the housing of the open-ear headphone away from the ear of the user.

In some embodiments, sounds output by the first dipole acoustic sourced through the two first sound guiding holes 5647 may have a first phase difference. Sounds output by the second dipole acoustic sourced through the second sound guiding holes 5657 may have a second phase difference. In some embodiments, the absolute value of the first phase difference may be within a range of 160 degrees-180 degrees, and the absolute value of the second phase difference may be within a range of 160 degrees-180 degrees. In some embodiments, the absolute value of the second phase difference may be greater than the absolute value of the first phase difference. In some embodiments, the absolute value of the second phase difference may be within a range of 170 degrees-180 degrees and the absolute value of the first phase difference may be within a range of 160 degrees-180 degrees. In some embodiments, the phase difference between a normal-phase sound and a reverse-phase sound may be 180 degrees. For example, as shown in FIG. 70A, the open-ear headphone 7000 may output the normal-phase sound through the first sound guiding hole near the ear in the first sound guiding holes 5647 and output the reverse-phase sound through the first sound guiding hole away from the ear in the first sound guiding holes 5647. Further, the open-ear headphone 7000 may output the normal-phase sound through the second sound guiding hole near the ear in the second sound guiding holes 5657 and output reverse-phase sound through the second sound guiding hole away from the ear in the second sound guiding holes 5657.

In some embodiments, the sound output by the open-ear headphone from the sound guiding hole of the two first sound guiding holes that are closer to the ear of the user (i.e., the first sound guiding hole near the ear) may have a third phase difference from the sound output from the sound guiding hole of the two second sound guiding holes that are closer to the ear of the user (i.e., the second sound guiding hole near the ear). In some embodiments, the value of the third phase difference may be 0. For example, as shown in FIG. 70A, the open-ear headphone 7000 may output a normal-phase sound through the first sound guiding hole near the ear in the first sound guiding holes 5647 and output a normal-phase sound through the second sound guiding hole near the ear in the second sound guiding holes 5657. The two sets of sounds may have the same phase or approximately the same phase (e.g., the absolute value of the phase difference between the two sets of sounds is within a range of 0 degrees-10 degrees). The open-ear headphone 7000 may output a reverse-phase sound through the first sound guiding hole away from the ear in the first sound guiding holes 5647, and output a reverse-phase sound through the second sound guiding hole away from the ear in the second sound guiding holes 5657, which are in opposite phases (with a 180-degree phase difference) to the sound output by the first sound guiding hole near the ear and the second sound guiding hole near the ear. In some embodiments, the absolute value of the third phase difference may be within a range of 160 degrees-180 degrees. Preferably, the absolute value of the third phase difference may be 180 degrees.

For example, as shown in FIG. 70B, the open-ear headphone may output a reverse-phase sound through the first sound guiding hole near the ear in the first sound guiding holes 5647 and output a normal-phase sound through the second sound guiding hole near the ear in the second sound guiding holes 5657. The phase difference between the two sets of sound signals may be 180 degrees. The open-ear headphone may output the normal-phase sound through the first sound guiding hole away from the ear in the first sound guiding holes 5647, which is opposite in phase (with a phase difference of 180 degrees) to the sound output through the first sound guiding hole near the ear in the first sound guiding holes 5647. The open-ear headphone may output the reverse-phase sound through the second sound guiding hole away from the ear in the second sound guiding holes 5657, which is opposite in phase (with a phase difference of 180 degrees) to the sound output through the second sound guiding hole near the ear in the second sound guiding holes 5657.

Further, an arrangement of the sound guiding holes on the open-ear headphone may affect sound transmission of the open-ear headphone in different directions. In some embodiments, a connection line connecting a first sound guiding hole of the two first sound guiding holes 5647 away from the ear of the user and a second sound guiding hole of the two second sound guiding holes 5657 close to the ear of the user may point to a region where the ear of the user is located. For example, in FIG. 70A and/or FIG. 70B, a connection line (the dashed line in the figure) connecting the first sound guiding hole 5647 and the second sound guiding hole 5657 may point to the ear E of the user or a region where the ear E is located (i.e., a region where the listening position is located). In such cases, a sound pressure of the sound transmitted by the open-ear headphone along a direction of the dashed line (i.e., a direction pointing to the ear E of the user) may be higher than sound pressures of sounds transmitted along other directions (e.g., a direction perpendicular to the dashed line). In some embodiments, an included angle between the connection line (e.g., the dashed line in FIG. 70A and/or FIG. 70B) and a connection line of the two second sound guiding holes 5647 may not be greater than 90 degrees. In some embodiments, an included angle between the connection line and a connection line of the two second sound guiding holes 5657 may be not greater than 90 degrees.

For illustration purposes, in FIG. 70A, sounds output by two near-ear point sources of the four-point sources may have a same phase, and sounds output by two far-ear point sources may have a same phase, which may be referred to as Mode 1. In FIG. 70B, sounds output by the two near-ear point sources of the four-point sources may have opposite phases, and sounds output by the two far-ear point sources may have opposite phases, which may be referred to as Mode 2. In some embodiments, Mode 2 and Mode 1 may have different sound leakage reduction effects. More descriptions regarding the sound leakage reduction capability of the open-ear headphone including the four-point sources may be found elsewhere in the present disclosure (e.g., FIG. 73 and the descriptions thereof).

In some embodiments, the open-ear headphone may respectively control the phases of sounds output at different sound guiding holes. For example, the sound generated by the first loudspeaker 5640 may be output at the two first sound guiding holes 5647 and the sound generated by the second loudspeaker 5650 may be output at the two second sound guiding holes 5657. The phase of the electrical signals input into the two loudspeakers may be adjusted in the open-ear headphone so that the sound output at the four sound guiding holes may be switched between Mode 1 and Mode 2.

Figure 71:
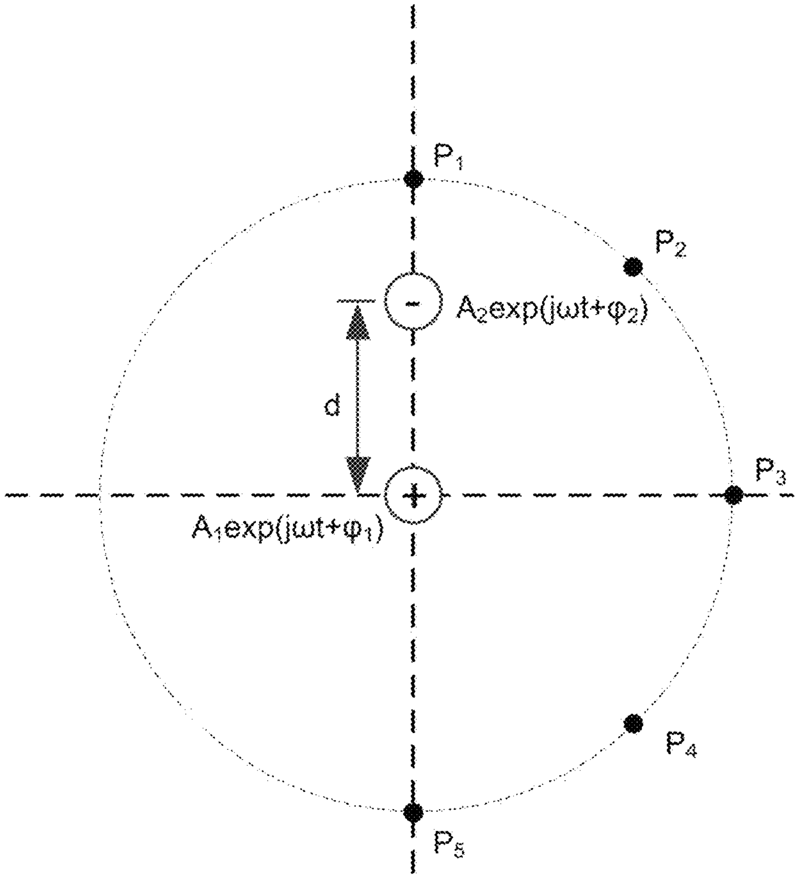
FIG. 71 is a schematic diagram illustrating dipole acoustic sources and a listening position according to some embodiments of the present disclosure.

FIG. 71 is a schematic diagram illustrating dipole acoustic sources and a listening position according to some embodiments of the present disclosure.

In some embodiments, two point sources of the dipole acoustic sources may be arranged at different positions relative to the listening position, which may enable the open-ear headphone to produce different near-field listening effects. FIG. 71 illustrates a relationship between the dipole acoustic sources and the listening position. As used herein, "+" and "−" may represent point sources that output sounds with opposite phases, respectively. "+" may represent a normal-phase sound, and "−" may represent a reverse-phase sound. d may represent a distance between dipole acoustic sources. $P_n$ may represent a listening position. In addition, for the convenience of comparison, distances between one of the dipole acoustic sources in FIG. 71 (e.g., a normal-phase point source in FIG. 71) and listening positions $P_1$ to $P_5$ may be the same, that is, the listening positions may be equivalent to being evenly distributed on a circle centered at the point source. The listening positions $P_1$ and $P_5$ may be located on a connection line of the dipole acoustic sources. A connection line connecting the listening position $P_3$ and the normal-phase point source may be perpendicular to the connection line of the dipole acoustic sources. For clearer illustration, the correlation between a volume of a heard sound of the dipole acoustic sources and the listening position may be described in conjunction with FIG. 71 and FIG. 72. A plurality of points on a spherical surface centered by a center point of the dipole acoustic sources with a radius of 40 centimeters may be identified, and an average value of sound pressure amplitudes at the plurality of points may be determined as the value of the sound leakage. To better reflect relative variations of the heard sound and the leaked sound, a normalization may be performed on the heard sound and the leaked sound in FIG. 72.

Figure 72:
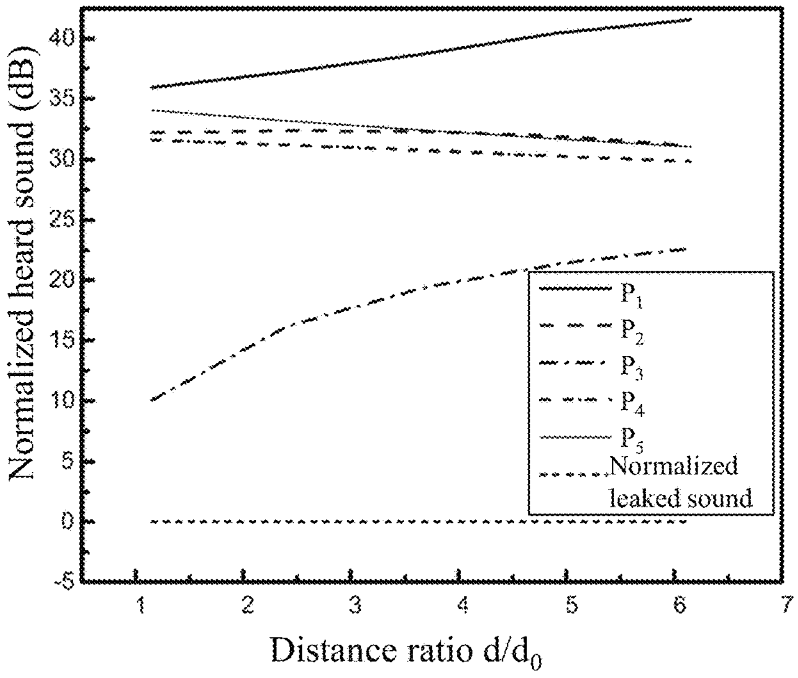
FIG. 72 is a schematic diagram illustrating a result of normalizing heard sound in FIG. 71.

The two point sources of the dipole acoustic sources corresponding to FIG. 71 and FIG. 72 may have the same amplitude and opposite phases. For a constant sound frequency, if angles between the dipole acoustic sources and the listening position are different, the volume of the heard sound may be different (different normalized volumes). When the difference between a distance from one of the two point sources in the dipole acoustic sources to the listening position and a distance from the other one of the two point sources in the dipole acoustic sources to the listening point is large, the open-ear headphone may generate a heard sound with a relatively large volume. As shown in FIG. 72, when the listening position is at $P_1$, since a distance between a point source of the dipole acoustic sources outputting a reverse-phase sound and the listening position $P_1$ is the shortest, a cancellation between the normal-phase sound and the reverse-phase sound output by the dipole acoustic sources at $P_1$ may be very small. Therefore, the dipole acoustic sources may generate a maximum volume of heard sound. Similarly, for the listening positions $P_2$, $P_4$, and $P_5$, since there is a certain difference between a distance from the point source outputting the normal-phase sound to the listening position and a distance from the point source outputting the reverse-phase sound to the listening position, a cancellation between the normal-phase sound and reverse-phase sound output by the dipole acoustic sources may also be small. Therefore, the two dipole acoustic sources may have a relatively large volume of heard sound. When the difference between the distances from the two point sources in the dipole acoustic source to the listening position is small, the open-ear headphone may generate a relatively low volume of heard sound. For example, in FIG. 72, when the listening position is at $P_3$, since a difference between a distance from the point source outputting the normal-phase sound to the listening position $P_3$ and a distance from the point source outputting the reverse-phase sound to the listening position $P_3$ is relatively small, a cancellation effect of opposite phase sounds may be relatively obvious. Therefore, the dipole acoustic sources may have a relatively low volume of heard sound.

According to the above content, when a position relationship between the dipole acoustic sources and the listening position satisfies a certain condition, the open-ear headphone may have a relatively high volume of heard sound. In practical applications, a position of the sound guiding holes may be adjusted to increase the volume of the near-field sound generated by the dipole acoustic sources. In some embodiments, a spatial included angle between a spatial connection line from one of the two sound guiding holes of the dipole acoustic sources to the listening position and a spatial connection line from the other of the two sound guiding holes of the dipole acoustic sources to the listening position may not be greater than 180 degrees, and preferably not greater than 90 degrees. The spatial included angle may be an included angle formed by the spatial connection line from one of the sound guiding holes to the listening position and the spatial connection line from the other of the sound guiding holes to the listening position while taking the listening position as a vertex. In some embodiments, if the four-point sources on the open-ear headphone include a set of high-frequency dipole acoustic sources and a set of low-frequency dipole acoustic sources, the four sound guiding holes of the two sets of dipole acoustic sources may be set in different manners. For example, to increase the volume of the near-field sound, the two sound guiding holes of the low-frequency (or high-frequency) dipole acoustic sources may be set in a manner in FIG. 71, and the listening position (i.e., the ear of the user) may be located at $P_1$ or $P_5$. Meanwhile, when the user wears the open-ear headphone, the connection line of the two sound guiding holes of the low-frequency (or high-frequency) dipole acoustic sources may point to a direction of the ear of the user.

In some embodiments, if the distance between the two point sources of the dipole acoustic sources is different and the positional relationship between the two point sources and the listening position is different, the law of the variation of the volume of the heard sound may be different. For example, when the listening position is at $P_1$ or $P_3$ in FIG. 71 (or nearby positions of the $P_1$ or $P_3$, or positions axisymmetrical to the $P_1$ and $P_3$ with respect to the connection line of the two point sources), as the distance d between the dipole acoustic sources increases, a volume of the normalized heard sound may be increased. Meanwhile, an increment in the volume of the heard sound may be greater than an increment in the volume of the leaked sound. In practical applications, the volume of the heard sound may be increased by increasing the distance d between the dipole acoustic sources while the volume of the leaked sound may not significantly increase. In particular, when the listening position is at $P_1$, the volume of the heard sound is relatively large. In such cases, when the distance d is increased, the volume of the leaked sound may be increased correspondingly. However, the increase in the volume of the leaked sound may not be greater than the increase in the volume of the heard sound. When the listening position is at $P_2$, $P_4$, or $P_5$ (or nearby positions of the $P_2$, $P_4$, or $P_5$, or positions axisymmetrical to the $P_2$, $P_4$, or $P_5$ with respect to the connection line of the two point sources), as the distance d between the dipole acoustic sources increases, the volume of the normalized heard sound may be decreased. In practical applications, a sound leakage reduction effect may be enhanced by decreasing the distance d between the dipole acoustic sources. In particular, when the distance d between the dipole acoustic sources is decreased, the volume of the heard sound may also be decreased. However, the decrease in the volume of the heard sound may be less than the decrease in the volume of the leaked sound.

According to the above descriptions, the volume of the heard sound of the dipole acoustic sources and the sound leakage reduction capability may be improved by adjusting the distance between the dipole acoustic sources and the positional relationship between the dipole acoustic sources and the listening position. In some embodiments, when the listening position is at $P_1$ or $P_3$ (or nearby positions of the $P_1$ or $P_3$, or positions axisymmetrical to the $P_1$ or $P_3$ with respect to the connection line of the two point sources), the distance d between the dipole acoustic sources may be increased to obtain a larger volume of heard sound. In some embodiments, when the listening position is at $P_1$ (or nearby position of the P1, and a position axisymmetrical to the $P_1$ with respect to the connection line of the two point sources), the distance d between the dipole acoustic sources may be increased to obtain a larger volume of heard sound. In some embodiments, when the listening position is at $P_2$, $P_4$, or $P_5$ (or nearby positions of the $P_2$, $P_4$, or $P_5$, or positions axisymmetrical to the $P_2$, $P_4$, or $P_5$ with respect to the connection line of the two point sources), the distance d between the dipole acoustic sources may be decreased to obtain a better sound leakage reduction capability.

Figure 73A:
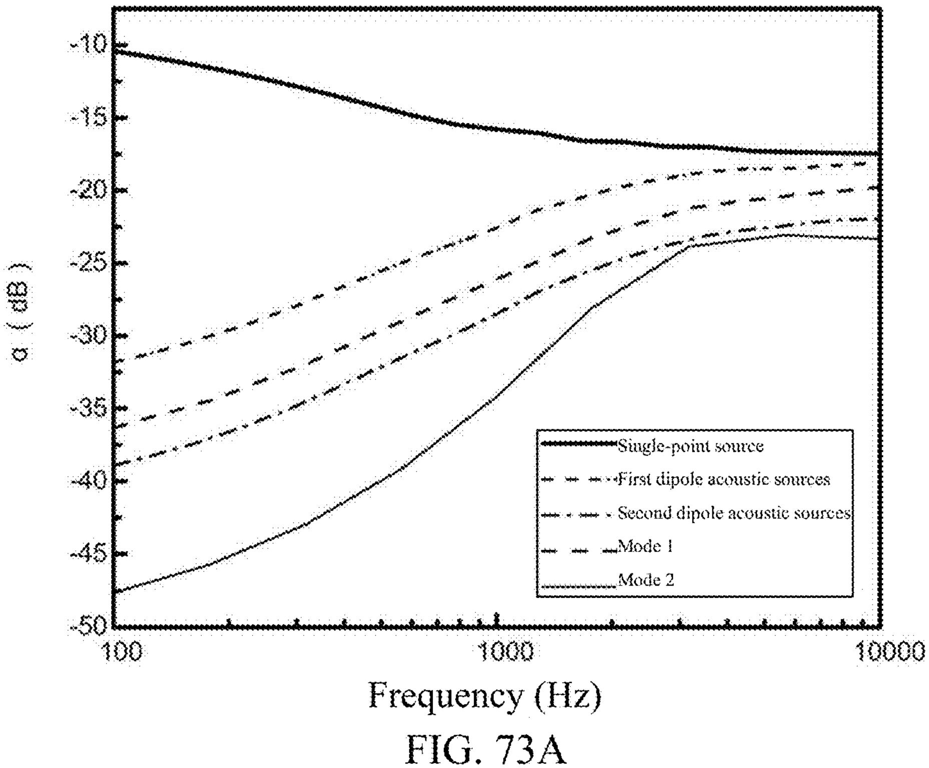
FIGS. 73A and 73B are diagrams illustrating sound leakage curves under actions of two sets of dipole acoustic sources according to some embodiments of the present disclosure.
Figure 73B:
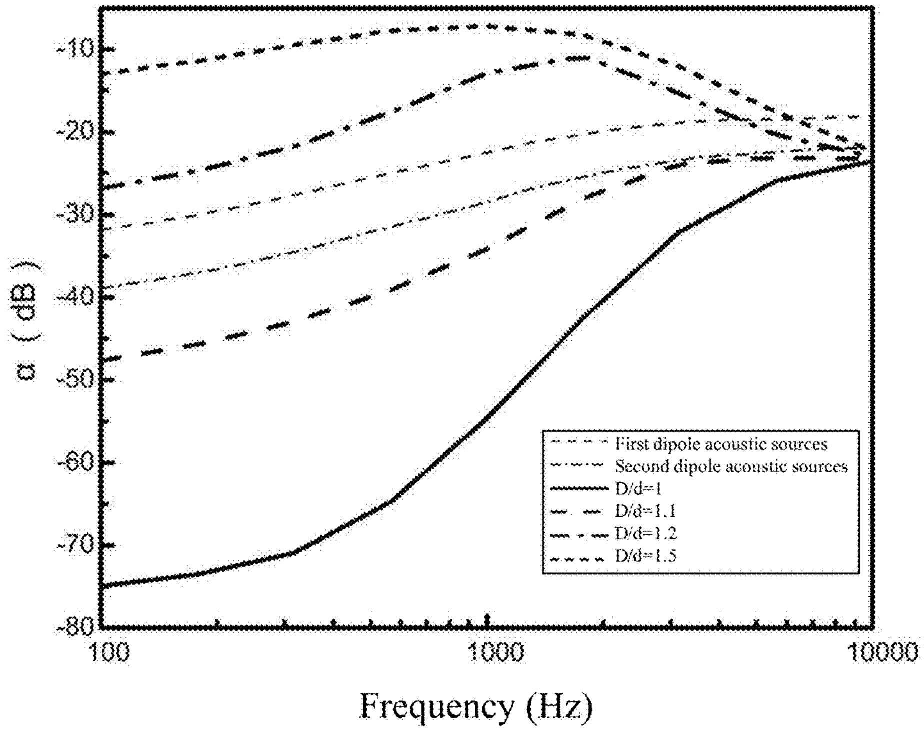

FIGS. 73A and 73B are schematic diagrams illustrating sound leakage curves under actions of two sets of dipole acoustic sources according to some embodiments of the present disclosure.

As shown in FIG. 73A, compared to a single-point source, dipole acoustic sources may have a stronger sound leakage reduction capability. In some embodiments, two sets of dipole acoustic sources (first dipole acoustic sources and second dipole acoustic sources as shown in FIGS. 70A and 70B) may be arranged to output sounds having opposite phases. Further, near-ear point sources of the two sets of dipole acoustic sources may output sounds with opposite phases (i.e., Mode 2), which may have a stronger sound leakage reduction capability than using one set of dipole acoustic sources (e.g., the first dipole acoustic sources or the second dipole acoustic sources). Merely for illustration purposes, FIG. 73A illustrates a leaked sound of the two sets of dipole acoustic sources with an overlapping frequency within a range of 100 Hz-10000 Hz. Specifically, in the overlapping frequency range, it may be considered that a far-field sound leakage generated by the second set of dipole acoustic sources in the four-point sources and a far-field sound leakage generated by the first set of dipole acoustic sources may interfere with each other, such that the far-field sound leakage generated by the first set of dipole acoustic sources or the second set of dipole acoustic sources may be reduced. As shown in FIG. 73A, the leaked sound corresponding to Mode 2 is lower than the leaked sound corresponding to the case including only one set of the first set of dipole acoustic sources or the second set of dipole acoustic sources, which indicates that the leaked sound generated by the two sets of two dipole acoustic sources may be canceled by the interference. In Mode 1 (i.e., the sounds output by near-ear acoustic sources of the two sets of dipole acoustic sources have a same phase), the sound leakage reduction capability of the open-ear headphone may be between that of the first set of two point sources and that of the second set of dipole acoustic source. In such cases, the far-field sound leakage generated by the second set of dipole acoustic sources of the four-point sources and the far-field sound leakage generated by the first set of dipole acoustic sources may interface with each other, such that the far-field sound leakage generated by the first set of two dipole acoustic sources may be reduced. As shown in FIG. 73A, the leaked sound corresponding to Mode 1 is lower than the leaked sound corresponding to the first set of dipole acoustic sources, which indicates that the leaked sound generated by the second set of dipole acoustic sources and the leaked sound generated by the first set of dipole acoustic sources may interface with each other to suppress the leaked sound generated by the first set of dipole acoustic sources.

FIG. 73B shows the sound leakage reduction curves when the four-point sources (two sets of dipole acoustic sources) are set according to Mode 2, and a ratio of a distance between one set of dipole acoustic sources in the four-point sources to a distance between the other set of dipole acoustic sources in the four-point sources changes. When a ratio of a distance d1 of the first set of dipole acoustic sources to a distance d2 of the second set of dipole acoustic sources is within a certain range, the four-point sources may achieve a strong sound leakage reduction capability. For example, as shown in FIG. 73B, when the ratio d1/d2 is 1, 1.1, 1.2, or 1.5, the four-point sources may have a relatively strong sound leakage reduction capability (the parameter α (also referred to as a sound leakage index) is relatively low). When the ratio d1/d2 is 1 or 1.1, the four-point sources may have a stronger sound leakage reduction capability than a single set of dipole acoustic sources (e.g., the first set of dipole acoustic sources or the second set of dipole acoustic sources). Therefore, for an open-ear headphone, the ratio d1/d2 may be set to be within a certain range, such that the four point sources (two sets of dipole acoustic sources) may have a stronger sound leakage reduction capability. For example, the ratio d1/d2 may be within a range of 1-1.5.

Figure 73C:
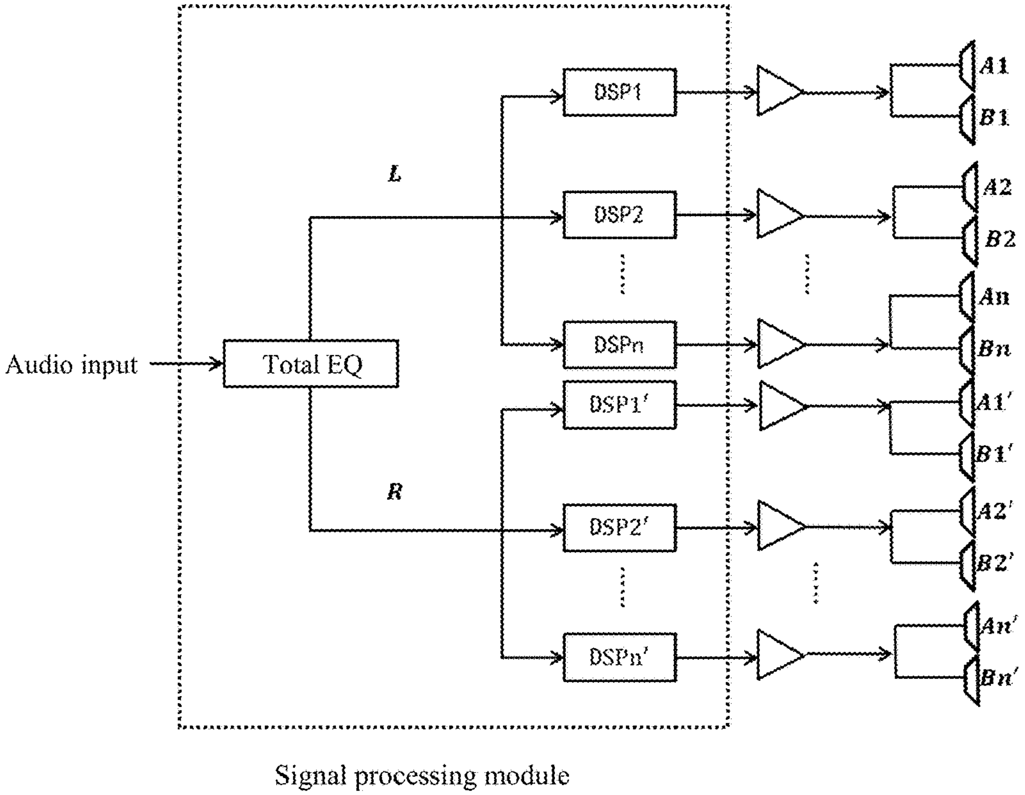
FIG. 73C is a flowchart illustrating an exemplary process of frequency division of dipole acoustic sources of a narrowband loudspeaker according to some embodiments of the present disclosure.
Figure 73D:
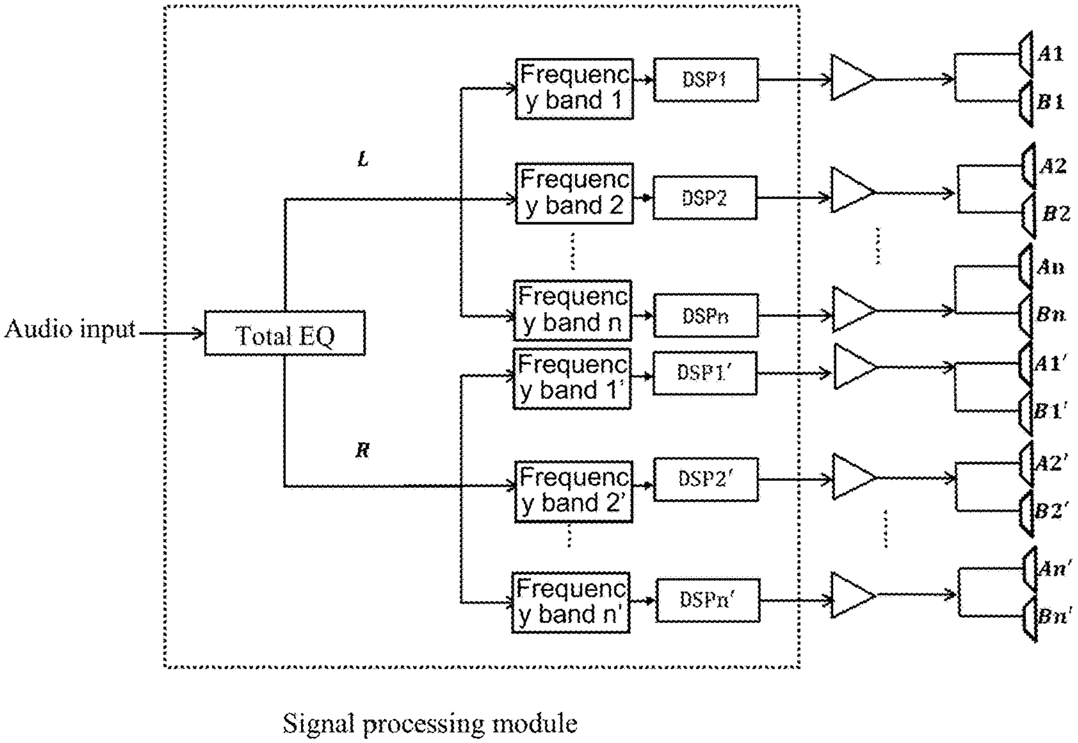
FIG. 73D is a flowchart illustrating an exemplary process of frequency division of dipole acoustic sources of a full-band loudspeaker according to some embodiments of the present disclosure.

FIG. 73C is a flowchart illustrating an exemplary process of frequency division of dipole acoustic sources of a narrowband loudspeaker according to some embodiments of the present disclosure. FIG. 73D is a flowchart illustrating an exemplary process of frequency division of dipole acoustic sources of a full-band loudspeaker according to some embodiments of the present disclosure.

As shown in FIG. 73C, two or more sets of narrowband loudspeakers are provided to construct two or more sets of dipole acoustic sources, which is achieved by using a set of narrowband loudspeaker units (2*n units on a single side, n≥2) and a signal processing module. The frequency responses of the set of narrowband loudspeakers may be complementary and may collectively cover the audible sound frequency band. Taking the loudspeaker units located on the left side as an example: A1~An and B1~Bn form n sets of dipole acoustic sources. By setting the distance $d_n$ between the dipole acoustic sources, the near-field and far-field signal responses of each frequency band may be adjusted. To enhance the near-field low-frequency signal and attenuate the far-field high-frequency signal, a distance between high-frequency dipole acoustic sources may be smaller than a distance between low-frequency dipole acoustic sources. The signal processing module may contain an equalizer (EQ) processing module and a digital signal processing (DSP) module, which may be used to implement signal equalization and other general digital signal processing algorithms. The processed signal may output desired sound signals by being connected to the corresponding acoustic transducer through an amplifier.

As shown in FIG. 74D, two or more sets of full-band loudspeakers are used to construct two or more sets of dipole acoustic sources, which may be achieved by using a set of full-band loudspeaker units (2*n units on one side, n≥2) and the signal processing module. The signal processing module may contain a set of filters for dividing sub-bands. Taking the loudspeaker units located on the left side as an example: A1~An and B1~Bn form n sets of dipole acoustic sources. By setting the distance $d_n$ between the dipole acoustic sources, the near-field and far-field signal responses of each frequency band may be adjusted. To enhance the near-field low-frequency signal and attenuate the far-field high-frequency signal, the distance between the high-frequency dipole acoustic sources may be smaller than the distance between low-frequency dipole acoustic sources. The signal processing module may contain the EQ processing module and the DSP module, which may be used to implement signal equalization and other general digital signal processing algorithms, such as amplitude modulation, phase modulation, time delay on the signal, etc. The processed signal may output desired sound signals by being connected to the corresponding acoustic transducer through an amplifier.

Figure 74:
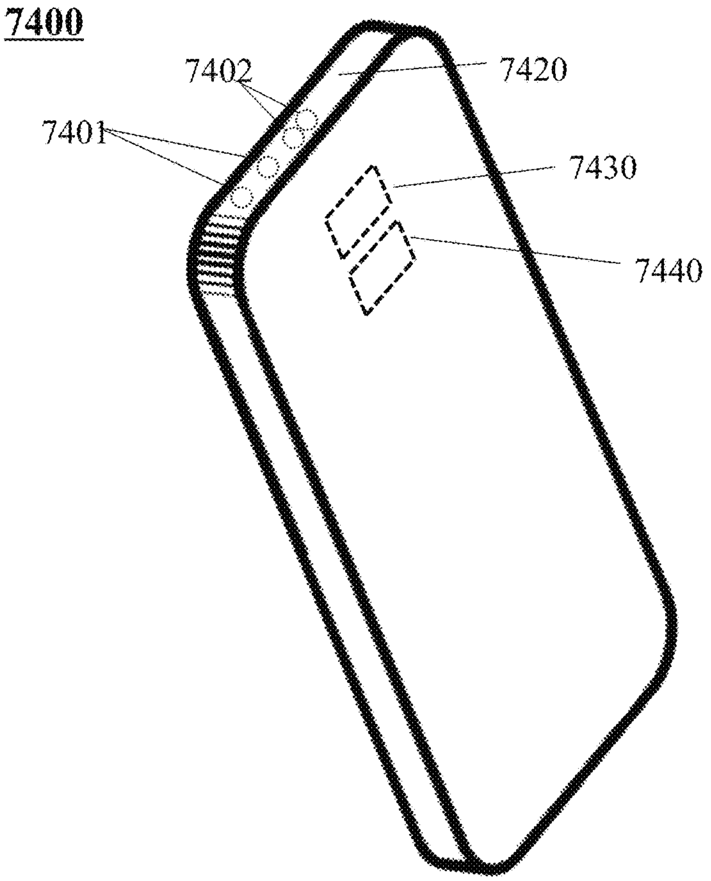
FIG. 74 is a schematic diagram illustrating a cellphone including a plurality of sound guiding holes according to some embodiments of the present disclosure.

FIG. 74 is a schematic diagram illustrating a cellphone including a plurality of sound guiding holes according to some embodiments of the present disclosure. As shown in FIG. 74, a top 7420 of the cellphone 7400 (i.e., an upper surface of the cellphone "vertical" to a display screen of the cellphone) is provided with a plurality of sound guiding holes. Merely by way of example, the sound guiding holes 7401 may constitute a set of dipole acoustic sources for outputting low-frequency sounds, and two sound guiding holes 7402 may constitute another set of dipole acoustic sources for outputting high-frequency sounds. The distance between the sound guiding holes 7401 may be greater than the distance between the sound guiding holes 7402. The cellphone 7400 may be provided with a first loudspeaker 7430 and a second loudspeaker 7440 inside the housing. A low-frequency sound generated by the first loudspeaker 7430 may be propagated outwardly through the sound guiding holes 7401, and a high-frequency sound generated by the second loudspeaker 7440 may be propagated outwardly through the sound guiding holes 7402. When a user places the sound guiding holes 7401 and 7402 near the ear to receive a voice message, the sound guiding holes 7401 and 7402 may emit a stronger near-field heard sound to the user, and at the same time may reduce a sound leakage to the surrounding environment. Moreover, by providing the sound guiding holes on the top of the cellphone instead of the upper part of the display screen of the cellphone, the space required for setting the sound guiding holes on the front side of the cellphone may be eliminated, thus the area of the display screen of the cellphone may be further increased, and the appearance of the cellphone may also be concise and beautiful.

In some embodiments, the headphone may further include a microphone for obtaining environmental noise and converting the obtained environmental noise into an electrical signal. In some embodiments, the controller may further include a noise reduction module configured to adjust a source signal based on the electrical signal to cause the sound output from the first loudspeaker or the second loudspeaker to interfere with the environmental noise, and the interference may reduce the environmental noise.

It should be noted that in all of the above embodiments, a sound playback system constituted by the sets of loudspeakers may be directional, such that a direction of the connection line connecting each pair of loudspeakers may be oriented approximately toward the human ear. In such cases, the volume heard by the wearer may be high and the volume heard by the surrounding people around the wearer hearing may be low. In some embodiments, since the listening effect of an open-ear headphone is susceptible to the interference from surrounding noise, a monitoring microphone that monitors the environmental noise may be added to the system, and a control system may be configured to dynamically adjust a sound signal processing system based on the characteristics of the noise. The control system may dynamically adjust the parameters based on monitoring results obtained by the monitoring microphone, thus adjusting the sound signals to obtain a better listening effect. In some embodiments, since the listening effect of the open-ear headphone is susceptible to the interference from surrounding noise, a microphone for monitoring environmental noise may be added to the system to form an active noise reduction system with the control system to obtain a better listening effect.

Figure 75:
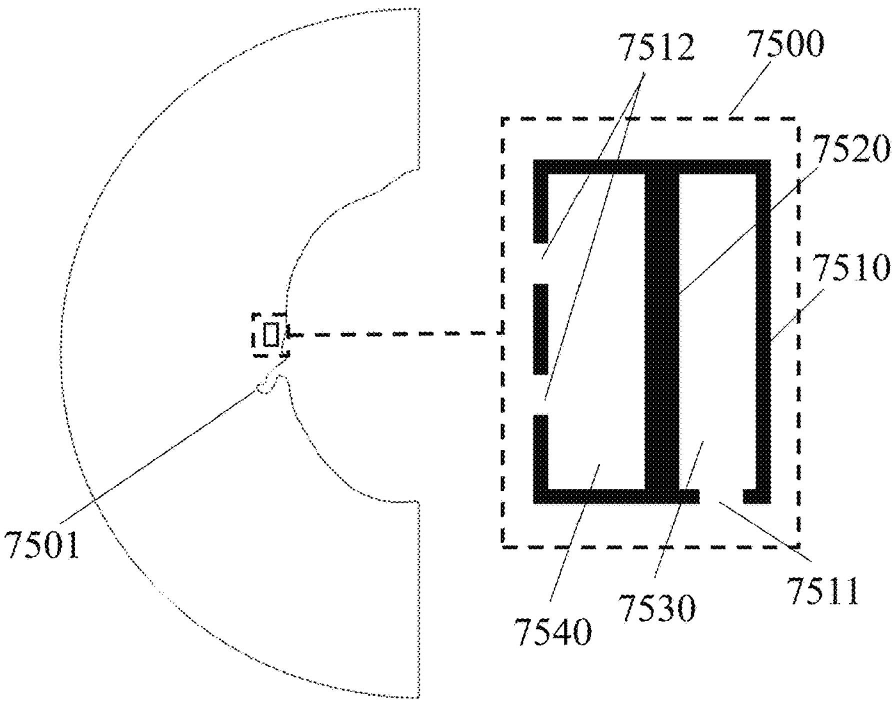
FIG. 75 is a schematic diagram illustrating a headphone according to some embodiments of the present disclosure.

FIG. 75 is a schematic diagram illustrating a headphone according to some embodiments of the present disclosure. As shown in FIG. 75, a headphone 7500 may include a housing 7510 and a diaphragm 7520. The diaphragm 7520 may be provided in a cavity formed by the housing 7510, and a front side and a rear side of the diaphragm 7520 may be provided with a front chamber 7530 and a rear chamber 7540, respectively, for radiating sound. The housing 7510 may be provided with a first sound guiding hole 7511 and a second sound guiding hole 7512. The front chamber 7530 may be acoustically coupled to first sound guiding hole 7511, and the rear chamber 7540 may be acoustically coupled to second sound guiding hole 7512. When the diaphragm 7520 vibrates, acoustic waves on the front side of the diaphragm 7520 may be emitted from the first sound guiding hole 7511 through the front chamber 7530, and acoustic waves on the rear side of the diaphragm 7520 may be emitted from the second sound guiding hole 7512 through the rear chamber 7540. Thus, dipole acoustic sources including the first sound guiding hole 7511 and the second sound guiding hole 7512 may be formed. In some embodiments, as shown in FIG. 75, when a user is using the headphone 7500, the headphone 7500 may be provided near an auricle. The first sound guiding hole 7511 may face an opening 7501 of an ear canal of the user. In such cases, the sound emitted from the first sound guiding hole 7511 may be propagated toward the ear hole of the user. The second sound guiding hole 7512 may be located away from the opening of the ear canal 7501 relative to the first sound guiding hole 7511. A distance between the first sound guiding hole 7511 and the opening 7501 of the ear canal may be less than a distance between the second sound guiding hole 7512 and the opening 7501 of the ear canal.

In some embodiments, when the diaphragm 7520 vibrates, the front side and the rear side of the diaphragm 7520 may respectively act as an acoustic wave generation structure that generates acoustic waves with the same amplitude and opposite phases. In some embodiments, the acoustic waves with the same amplitude and opposite phases may be radiated outwardly through the first sound guiding hole 7511 and the second sound guiding hole 7512, respectively, to form dipole acoustic sources. The dipole acoustic sources may undergo an interference cancellation at a spatial point (e.g., the far field), which effectively reduces the sound leakage in the far field of the headphone 7500.

Figure 76A:
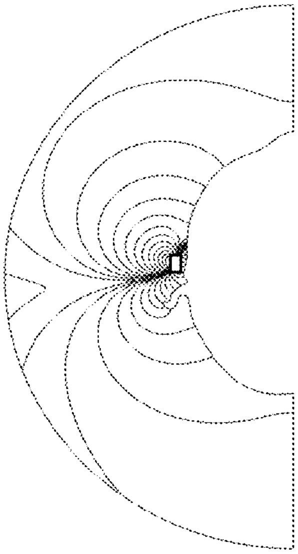
FIG. 76A is a schematic diagram illustrating a sound field distribution of a sound pressure level of the structure in FIG. 75 at a low frequency.

FIG. 76A is a schematic diagram illustrating a sound field distribution of a sound pressure level of the headphone 7500 in FIG. 75 at a low frequency. As shown in FIG. 76A, the sound field distribution of the headphone 7500 may exhibit a good sound leakage reduction effect of the dipole acoustic sources in a low-middle frequency range (e.g., 50 Hz-1 kHz). That is to say, in the low-middle frequency range, the dipole acoustic sources constituted by a first sound guiding hole 7511 and a second sound guiding hole 7512 of the headphone 7500 may output acoustic waves with opposite phases. According to the principle of the phase cancellation of the acoustic waves with opposite phases, two acoustic waves may cancel in the far field, thereby achieving the sound leakage reduction effect in the far field.

In some embodiments, acoustic waves emitted from both sides of the diaphragm 7520 may pass through acoustic transmission structures before being radiated outwardly from the first sound guiding hole 7511 and/or the second sound guiding hole 7512. The acoustic transmission structure may refer to an acoustic route through which the acoustic waves are radiated from the diaphragm 7520 to the outside environment. In some embodiments, the acoustic transmission structure may include a housing 7510 between the diaphragm 7520 and the first sound guiding hole 7511 and/or the second sound guiding hole 7512. In some embodiments, the acoustic transmission structure may include an acoustic cavity. The acoustic cavity may be an amplitude space reserved for the diaphragm 7520. For example, the acoustic cavity may include a cavity formed between the diaphragm 7520 and the housing 7510. As another example, the acoustic cavity may also include a cavity formed between the diaphragm 7520 and a magnetic circuit system (not shown). In some embodiments, the acoustic transmission structure may be acoustically connected to the first sound guiding hole 7511 and/or the second sound guiding hole 7512. The first sound guiding hole 7511 and/or the second sound guiding hole 751 may also serve as a part of the acoustic transmission structure. In some embodiments, when the diaphragm 7520 is far away from the opening 7501 of the ear canal, or a radiation direction of the acoustic waves generated by the diaphragm 7520 does not point in an expected direction or away from the opening 7501 of the ear canal, the acoustic waves may be directed to a desired position using a sound guiding tube, and then the first sound guiding hole 7511 and/or the second sound guiding hole 7512 may be used to radiate the acoustic waves to the external environment. The acoustic transmission structure may also include the sound guiding tube. In some embodiments, the acoustic transmission structure may have a resonant frequency, and the acoustic transmission structure may resonate when the frequency of the acoustic waves generated by the diaphragm 7520 is near the resonant frequency. Under the action of the acoustic transmission structure, the acoustic waves in the acoustic transmission structure may also resonate. The resonance may change the frequency component of the transmitted acoustic waves (e.g., by adding additional resonance peaks to the transmitted acoustic waves) or change the phase of the transmitted acoustic waves in the acoustic transmission structure. Compared to a case where the resonance does not occur, the phase and/or amplitude of the acoustic waves radiated from the first sound guiding hole 7511 and/or the second sound guiding hole 7512 may be changed, which may affect the effect of interference cancellation of the acoustic waves radiated from the first sound guiding hole 7511 and the second sound guiding hole 7512 at the spatial point. For example, when resonance occurs, the phase difference between the acoustic waves radiated from the first sound guiding hole 7511 and the second sound guiding hole 7512 may change. Merely by way of example, when the phase difference between the acoustic waves radiated from the first sound guiding hole 7511 and the second sound guiding hole 7512 is small (e.g., less than 120°, less than 90°, or 0, etc.), the effect of the interference cancellation of the acoustic waves at the spatial point may be weakened, making it difficult to implement the sound leakage reduction effect. Alternatively, acoustic waves with a small phase difference may be superimposed at the spatial point, which increases the amplitude of the acoustic waves generated by the headphone at the spatial point (e.g., the far field) near the resonant frequency, thereby increasing the far-field sound leakage of the headphone 7500. As another example, the resonance may cause the amplitude of the transmitted acoustic waves to increase near the resonant frequency of the acoustic transmission structure (e.g., manifested as a resonance peak near the resonant frequency). At this time, the amplitude difference of the acoustic waves radiated from the first sound guiding hole 7511 and the second sound guiding hole 7512 may be large, and the effect of the interference cancellation of the acoustic wave at the spatial point may be weakened, which makes it difficult to achieve the sound leakage reduction effect.

Figure 76B:
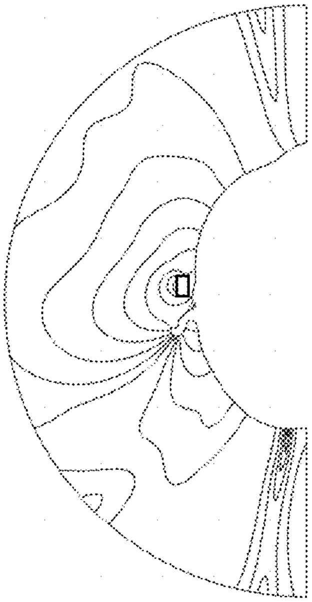
FIG. 76B is a schematic diagram illustrating a sound field distribution of a sound pressure level when the structure illustrated in FIG. 75 resonates.

FIG. 76B is a schematic diagram illustrating a sound field distribution of a sound pressure level when the headphone 7500 in FIG. 75 resonates. As shown in FIG. 76B, when the acoustic transmission structure of the headphone 7500 (e.g., the housing 7510 between the diaphragm 7520 and the second sound guiding hole 7512) resonates, sound signals radiated outwardly by the second sound guiding hole 7512 dominate the overall sound field distribution. That is to say, when the resonance occurs in the acoustic transmission structure, the amplitude or phase of the acoustic waves actually radiated by the headphone 7500 (e.g., the second sound guiding hole 7512) may have a certain difference from the original amplitude or phase of the acoustic waves radiated by the diaphragm 7520. In such cases, the two acoustic waves radiated from the first sound guiding hole 7511 and the second sound guiding hole 7512 not only fail to reduce the far-field sound leakage but also increase the far-field sound leakage. In some embodiments, the problem of increased sound leakage in the far field of the headphone 7500 may be improved by adjusting the structure of the headphone 7500 to eliminate or reduce the resonance of the acoustic transmission structure.

Figure 77A:
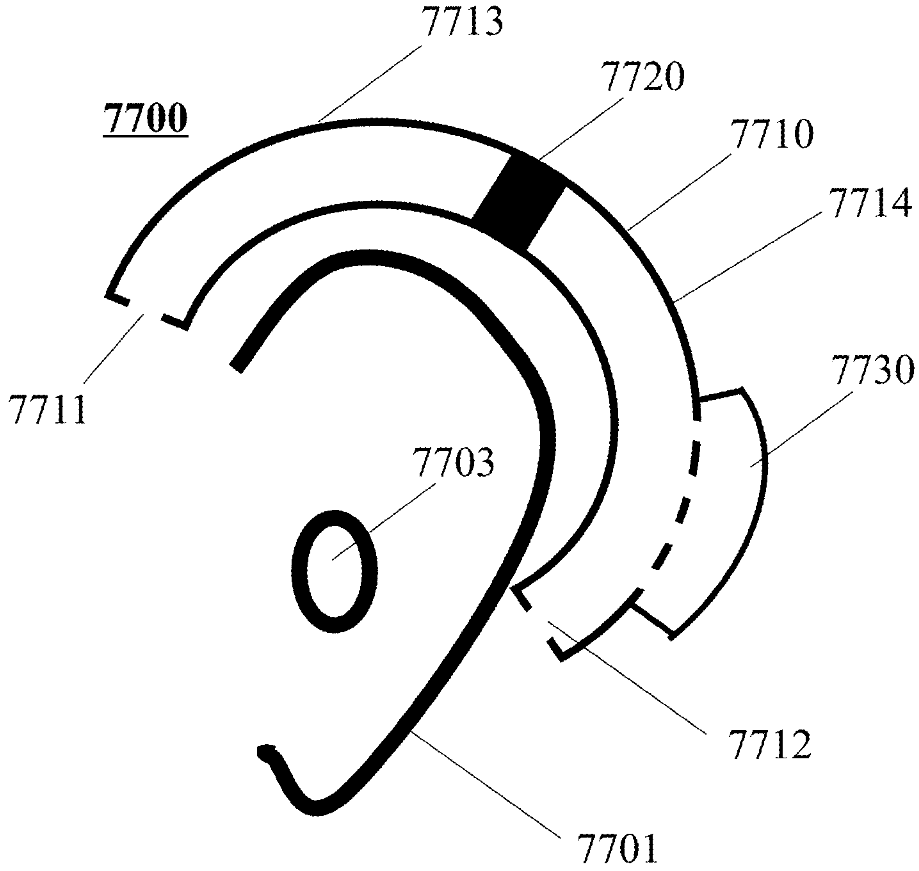
FIG. 77A is a schematic diagram illustrating an exemplary structure of a headphone according to some embodiments of the present disclosure.

FIG. 77A is a schematic diagram illustrating an exemplary structure of a headphone according to some embodiments of the present disclosure. In some embodiments, the headphone 7700 may include a housing 7710, a loudspeaker 7720, and a filtering structure 7730, as shown in FIG. 77A.

The loudspeaker 7720 may be configured to convert an electrical signal into a sound signal (or acoustic wave). The housing 7710 may be configured to accommodate the loudspeaker 7720 and output acoustic waves through the first sound guiding hole 7711 and the second sound guiding hole 7712, respectively, which are acoustically connected to the loudspeaker 7720. For example, the housing 7710 may serve as an acoustic transmission structure that radiates outwardly the acoustic waves generated by the loudspeaker 7720 after transmitting them to the first sound guiding hole 7711 and the second sound guiding hole 7712, respectively. In some embodiments, the first sound guiding hole 7711 and/or the second sound guiding hole 7712 may also serve as a portion of an acoustic transmission structure. The acoustic transmission structure may transmit the acoustic waves generated by the loudspeaker 7720 to a spatial point outside the headphone 7700. In some embodiments, the loudspeaker 7720 may include a first acoustic wave generation structure and a second acoustic wave generation structure. The first acoustic wave generation structure and the second acoustic wave generation structure may generate a first acoustic wave and a second acoustic wave, respectively. The first acoustic wave and the second acoustic wave may be radiated outside the headphone 7700 through the first sound guiding hole 7711 and the second sound guiding hole 7712, respectively. In some embodiments, the first acoustic wave and the second acoustic wave may have a phase difference. The first acoustic wave and the second acoustic wave with the phase difference may interfere at a spatial point, thereby reducing the amplitude of acoustic waves at the spatial point. Thus, the sound leakage reduction effect of the dipole acoustic source may be achieved. In some embodiments, to ensure the effect of interference between the first acoustic wave and the second acoustic wave at the spatial point to effectively reduce the amplitude of the acoustic waves at the spatial point, the phase difference between the first acoustic wave and the second acoustic wave may be within a range of 110°-250°. In some embodiments, the phase difference between the first acoustic wave and the second acoustic wave may be within a range of 120°-240°. In some embodiments, the phase difference between the first acoustic wave and the second acoustic wave may be within a range of 150°-210°. In some embodiments, the phase difference between the first acoustic wave and the second acoustic wave may be within a range of 170°-190°. In some embodiments, the loudspeaker 7720 may include a diaphragm (e.g., the diaphragm 7520 shown in FIG. 75). When the diaphragm vibrated, acoustic waves with opposite (or approximately opposite) phase and the same (or approximately the same) amplitude may be output from a front side and a rear side, respectively. At this time, the front side and the rear side of the diaphragm may serve as the first acoustic wave generation structure and the second acoustic wave generation structure, respectively.

In some embodiments, the first sound guiding hole 7711 and the second sound guiding hole 7712 may be provided on both sides of the auricle of the ear when a user wears the headphone 7700, as shown in FIG. 77A. In some embodiments, the auricle may be equivalent to a baffle. The baffle may increase a sound path distance from the second sound guiding hole 7712 to the opening 7703 of the ear canal, such that the second acoustic wave generation structure may have a greater sound path distance from the opening 7703 of the ear canal than a sound path distance from the first acoustic wave generation structure to the opening 7703 of the ear canal. According to the description in respect to FIGS. 1-52 of the present disclosure, the baffle "blocks" between the second sound guiding hole 7712 and the opening 7703 of the ear canal, which increases the sound path distance from the second acoustic wave generation structure to the opening 7703 and decreases the amplitude of the acoustic waves radiated by the second sound guiding hole 7712 at the opening 7703 of the ear canal. Therefore, compared to a case without the baffle, the amplitude difference between the acoustic wave radiated by the second sound guiding hole 7712 and the acoustic wave radiated by the first sound guiding hole 7711 may be increased, thereby making the degree of interference cancellation of the acoustic waves at the opening 7703 of the ear canal weakened. At the same time, the baffle may have little effect on the sound radiated by the second sound guiding hole 7712 in the far field so that sound leakage to the surroundings may be reduced due to the interference cancellation of the acoustic waves in the far field. In some embodiments, the first sound guiding hole 7711, which has a smaller sound path distance from the opening 7703 of the ear canal, may face the opening 7703 of the ear canal and be used to dominate the listening function, while the second sound guiding hole 7712 may be used to dominate the sound leakage reduction function. It is to be understood that the headphone 7700 shown in FIG. 77A are only exemplary, and in some embodiments, the headphone 7700 may also be configured as described in other embodiments of the present disclosure to increase the sound path distance from the second sound guiding hole 7712 to the opening 7703 of the ear canal. For example, as described in the descriptions in respect to FIG. 31-FIG. 52, the first sound guiding hole 7711 and the second sound guiding hole 7712 may also be provided on a front side of the auricle. The baffle may be provided between the first sound guiding hole 7711 and the second sound guiding hole 7712. As another example, the first sound guiding hole 7711 and the second sound guiding hole 7712 may be provided on the front side of the auricle. A portion of the housing may be provided between the first sound guiding hole 7711 and the second sound guiding hole 7712 as the baffle.

Figure 77B:
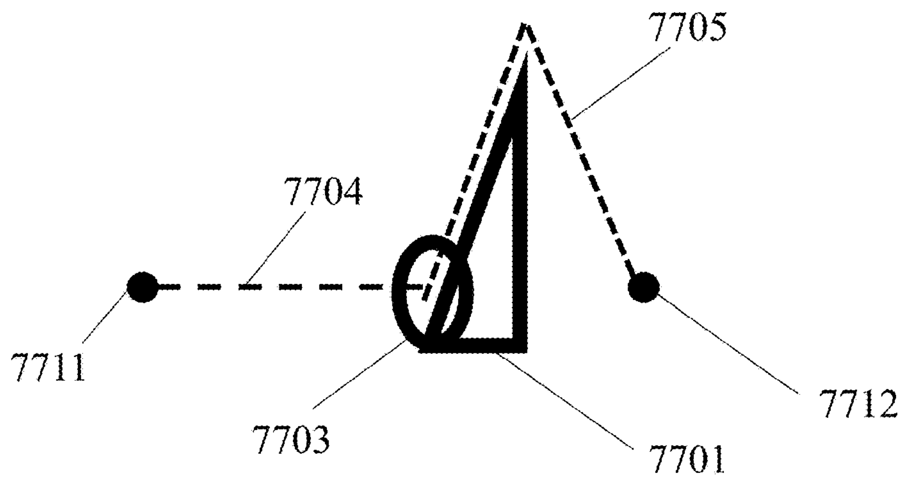
FIG. 77B is a schematic diagram illustrating a first sound path distance and a second sound path distance in a headphone illustrated in FIG. 77A.

It is to be understood that the sound path distance described herein refers to a distance that the acoustic waves travel from an acoustic source (e.g., the first sound guiding hole 7711 and/or the second sound guiding hole 7712) to the opening of the ear canal, but not a straight line distance between the acoustic source and the opening of the ear canal. FIG. 77B is a schematic diagram illustrating a sound path distance from each of the first sound guiding hole 7711 and the second sound guiding hole 7712 in the headphone 7700 illustrated in FIG. 77A to the opening 7702 of the ear canal. As shown in FIG. 77B, if the first sound guiding hole 7711 is provided on the front side of the auricle 7701 and the second sound guiding hole 7712 is provided on the rear side of the auricle 7701, a first sound path distance 7704 from the first sound guiding hole 7711 to the opening 7703 of the ear canal may be a straight line distance of the sound path from the first sound guiding hole 7711 to the opening 7703 of the ear canal. A second sound path distance 7705 from the second sound guiding hole 7712 to the opening 7703 of the ear canal may be a folded distance of the sound path starting from the first sound guiding hole 7711, bypassing the auricle 7701 and then to the opening 7703 of the ear canal. The second sound path distance 7705 may be larger than the first sound path distance 7704.

In some embodiments, in conjunction with FIGS. 75-76B and the description thereof, the acoustic transmission structure of the headphone 7700 may have a resonant frequency, and when the acoustic waves are transmitted by the acoustic transmission structure, the frequency components near the resonant frequency may resonate with the acoustic transmission structure. The resonance may change the frequency component of the transmitted acoustic waves (e.g., change the amplitude of the acoustic waves near the resonant frequency by adding a resonance peak to the transmitted acoustic waves) or change the phase of the transmitted acoustic waves in the acoustic transmission structure. In such a case, the effect of the interference cancellation of the acoustic waves radiated from the first sound guiding hole 7511 and the second sound guiding hole 7512 at the spatial point may be affected. For example, further in conjunction with FIG. 77A, the acoustic transmission structure of the headphone 7700 may include a first acoustic transmission structure 7713 and a second acoustic transmission structure 7714. When the second acoustic transmission structure 7714 resonates, the phase of the second acoustic wave radiated through the second sound guiding hole 7712 may change, and the first and second acoustic waves may not be able to achieve the interference cancellation at the spatial point (e.g., in the far field). Rather, the amplitude of the acoustic waves near the resonant frequency at the spatial point may be even increased, which increases the far-field sound leakage of the headphone 7700. As another example, the resonance may cause the amplitude of the transmitted acoustic wave to increase near the resonant frequency of the acoustic transmission structure (e.g., manifested as a resonance peak near the resonant frequency). At this time, the amplitude of the acoustic wave radiated from the first sound guiding hole 7711 and the second sound guiding hole 7712 may differ greatly, and the effect of the interference cancellation of the acoustic waves at the spatial point may be weakened, which makes it difficult to achieve the sound leakage reduction effect.

The filtering structure 7730 may refer to a structure that may modulate the frequency characteristics of the acoustic waves. For example, a filtering structure may modulate (e.g., absorb, filter, amplitude-modulate, phase-modulate, etc.) the acoustic waves of a particular frequency. In some embodiments, the filtering structure 7730 may include an acoustic absorbing structure. The acoustic absorbing structure (or filtering structure 7730) may be configured to absorb the acoustic waves of the second acoustic wave in a target frequency range, reduce the degree of interference enhancement of the acoustic waves of the first and second acoustic waves in the target frequency range at the spatial point, thereby reducing the amplitude of the acoustic waves in the target frequency range at the spatial point. In some embodiments, the target frequency range may include a resonant frequency of the acoustic transmission structure such that the filtering structure 7730 may absorb acoustic waves near the resonant frequency to avoid a change in the phase and/or amplitude of the second acoustic wave caused by resonance occurring near the resonant frequency, thereby reducing the amplitude of the acoustic waves near the resonant frequency at the spatial point. The resonant frequency of the acoustic transmission structure may be related to parameters of the acoustic transmission structure (e.g., a volume of a cavity formed by the acoustic transmission structure, a material of the acoustic transmission structure, a dimension, cross-sectional area, a length of the sound guiding tube, etc.). In some embodiments, the resonant frequency may occur in the middle-high frequency band, e.g., within a range of 2 kHz-8 kHz. Correspondingly, the target frequency range may include frequencies in the middle-high frequency band. For example, the target frequency range may be within a range of 1 kHz-10 KHz. As another example, the target frequency range may be within a range of 2 kHz-9 kHz. As another example, the target frequency range may be within a range of 2 kHz-8 KHz.

In some embodiments, in a relatively high frequency range, wavelengths of the first acoustic wave and the second acoustic wave are relatively short. At this time, a distance between the dipole acoustic sources including the first sound guiding hole 7511 and the second sound guiding hole 7512 may be non-negligible in comparison to the wavelength. For example, a distance between the first sound guiding hole 7511 and the second sound guiding hole 7512 may make the first acoustic wave and the second acoustic wave have different sound path distances to the spatial point (e.g., the far field) such that the phase difference between the first acoustic wave and the second acoustic wave at the spatial point may be small (e.g., the phase is the same or approximately the same). Further, the first acoustic wave and the second acoustic wave may not cancel each other by the interference at the spatial point but may be superimposed at the spatial point, which increases the amplitude of the acoustic waves at the spatial point. In some embodiments, the target frequency range may also include frequencies greater than the resonant frequency to prevent the first acoustic wave and the second acoustic wave from superimposing each other and increasing the amplitude of the acoustic waves in a relatively high frequency range. As a result, the filtering structure 7730 may absorb the acoustic waves in the relatively high frequency range to reduce or avoid superimposition of the first acoustic wave and the second acoustic wave at the spatial point, thereby decreasing the amplitude of the acoustic waves in the target frequency range at the spatial point. For example, the target frequency range may be within a range of 1 kHz-20 KHz. As another example, the target frequency range may be within a range of 1 kHz-18 KHz. As another example, the target frequency range may be within a range of 1 kHz-15 kHz. As another example, the target frequency range may be within a range of 1 kHz-12 KHz.

In some embodiments, the spatial point may be a far-field spatial point, and the filtering structure 7730 may be configured to absorb the acoustic waves at a target frequency in the second acoustic wave, thereby reducing the amplitude of the acoustic waves in the target frequency range at the far-field spatial point and improving the sound leakage reduction effect of the headphone 7700 in the far field. For example, as shown in FIG. 77A, the filtering structure 7730 may be provided in the second acoustic transmission structure 7714 between the loudspeaker 7720 and the second sound guiding hole 7712, thereby absorbing the second acoustic wave transmitted by the second acoustic transmission structure 7714. It is to be understood that the filtering structure 7730 shown in FIG. 77A is only an exemplary illustration and does not limit the actual application scenarios of the filtering structure 7730. The filtering structure 7730 may be configured (e.g., the position of the filtering structure 7730, an acoustic absorption frequency, etc.) to make the headphone 7700 have different acoustic effects in the spatial point. In some embodiments, the filtering structure 7730 may be provided in a first acoustic transmission structure 7713 between the loudspeaker 7720 and the first sound guiding hole 7711, thereby absorbing acoustic waves of the first acoustic wave transmitted by the first acoustic transmission structure 7713 in the target frequency range. In such a case, interference enhancement between the acoustic waves output from the first sound guiding hole 7711 in the target frequency range and the acoustic waves in the same frequency range output from the second sound guiding hole 7712 may be avoided at the spatial point (e.g., the far field), thereby reducing the amplitude of the acoustic waves in the target frequency range at the spatial point. In some embodiments, the filtering structures 7730 may also be provided in both the first acoustic transmission structure 7713 and the second acoustic transmission structure 7714, thereby absorbing the acoustic waves of the first acoustic wave and the second acoustic wave in the target frequency range, thus better reducing the amplitude of the acoustic waves in the target frequency range at any spatial point. In some embodiments, the filtering structure 7730 may also absorb a low-frequency sound in a particular frequency range. For example, the filtering structure 7730 may be provided in the acoustic transmission structure between the loudspeaker 7720 and the second sound guiding hole 7712 to reduce the low-frequency sound output from the second sound guiding hole 7712 in a specific frequency range to avoid the low-frequency sound in the specific frequency range from interfering with and canceling the low-frequency sound output from the first sound guiding hole 7711 in the same frequency range in the spatial point (e.g., the near-field), thereby increasing the sound volume of the headphone 7700 in the specific frequency range in the near field (i.e., delivered to the ear of the user). In some embodiments, the filtering structure 7730 may also include sub-filtering structures for absorbing sounds in different frequency ranges, e.g., a middle-high frequency band and a low-frequency band.

According to the above embodiments, the filtering structure 7730 may absorb the acoustic waves of the first acoustic wave and/or the second acoustic wave in the target frequency range, thereby reducing the amplitude of the acoustic waves in the target frequency range at the spatial point. For the first acoustic wave and the second acoustic wave outside the target frequency range (e.g., an acoustic wave with a frequency smaller than the resonant frequency), the first acoustic wave and the second acoustic wave may be transmitted through the acoustic transmission structure to the spatial point and interfere with each other at the spatial point. The interference may reduce the amplitude of the acoustic waves that are outside the target frequency range at the spatial point. That is to say, the first acoustic wave and the second acoustic wave outside the target frequency range (or referred to as the first frequency range) may be canceled by interference at the spatial point, realizing the sound leakage reduction effect of the dipole acoustic sources. The first acoustic wave and/or the second acoustic wave within the target frequency range (or referred to as the second frequency range) may be absorbed by the filtering structure 7730, and thus the interference enhancement of the first acoustic wave and/or the second acoustic wave at the spatial point may be reduced or avoided. Alternatively, additional resonance peaks generated by the first acoustic wave or the second acoustic wave under the action of the acoustic transmission structure may be attenuated or absorbed, which in turn may reduce the amplitude of the acoustic waves in the target frequency range at the spatial point. As a result, in the embodiments of the present disclosure, by providing the filtering structure 7730, the headphone 7700 may output the first acoustic wave and the second acoustic wave in the first frequency range, and the output of the acoustic waves near or higher than the resonant frequency of the acoustic transmission structure may be reduced. In such a case, acoustic waves generated by the headphone 7700 may interfere with and cancel each other in the first frequency range, and an increase in the amplitude of the acoustic wave in the second frequency range at the spatial point (e.g., the far field) may also be avoided, thereby ensuring a leakage reduction effect across the full frequency range.

In some embodiments, the filtering structure 7730 may include an acoustic absorbing structure. The acoustic absorbing structure may include at least one of a resistance-type acoustic absorbing structure or an impedance-type acoustic absorbing structure. For example, functions of the filtering structure 7730 may be realized by the resistance-type acoustic absorbing structure. As another example, the function of the filtering structure 7730 may be realized by the impedance-type acoustic absorbing structure. As another example, the functions of the filtering structure 7730 may also be realized by a resistance and impedance hybrid acoustic absorbing structure.

The resistance-type acoustic absorbing structure may refer to a structure that provides an acoustic resistance when the acoustic waves pass through. The acoustic resistance may refer to a resistance that an acoustic wave needs to overcome as it passes through the resistance-type acoustic absorbing structure, and the acoustic resistance may reduce or deplete the acoustic energy of the acoustic wave. For example, when the acoustic wave passes through the resistance-type acoustic absorbing structure, the resistance-type acoustic absorbing structure may utilize friction generated by the movement of air in the structure to convert the acoustic energy into thermal energy and cause the acoustic energy to be consumed, thereby realizing an acoustic absorption effect.

In some embodiments, the resistance-type acoustic absorbing structure may include at least one of a porous acoustic absorbing material or an acoustic gauze. The porous acoustic absorbing material or the acoustic gauze may include a plurality of pores. As the acoustic waves are transmitted through the porous acoustic absorbing material or the acoustic gauze, the air carrying the acoustic waves moves between the plurality of pores and rubs against the porous acoustic absorbing material or the acoustic gauze. Then the acoustic energy may be converted into thermal energy and consumed due to the viscosity and thermal conduction effect of the porous acoustic absorbing material or the acoustic gauze. In some embodiments, the pores may include through holes, bubbles, mesh holes, etc. For example, an interior of the porous acoustic absorbing material may be provided with a plurality of through holes or bubbles. The plurality of through holes or bubbles may be in flow communication with each other and with the external air of the resistance-type acoustic absorbing structure. For example, the acoustic gauze may include a plurality of gauze holes. In some embodiments, the material of the resistance-type acoustic absorbing structure may include an inorganic fiber material (e.g., glass wool, rock wool, etc.), an organic fiber material (e.g., plant fibers such as cotton, hemp, or wood fiber products, etc.), a foam-type material, etc., or any combination thereof.

In some embodiments, an acoustic absorbing coefficient of the porous acoustic absorbing material may be adjusted so that the porous acoustic absorbing material may absorb the acoustic waves of the first acoustic wave and/or the second acoustic wave in a second frequency range. In some embodiments, to enable the porous acoustic absorbing material to absorb the acoustic waves of the first acoustic wave and/or the second acoustic wave in the second frequency range, the absorbing coefficient of the porous acoustic absorbing material in the second frequency range may be greater than 0.2. In some embodiments, the acoustic absorbing coefficient of the porous acoustic absorbing material in the second frequency range may be greater than 0.3. In some embodiments, the acoustic gauze may have an acoustic resistance, which may be altered by adjusting the porosity of the acoustic gauze to enable the acoustic gauze to absorb the acoustic waves of the first acoustic wave and/or the second acoustic wave in the second frequency range. In some embodiments, the acoustic resistance of the acoustic gauze may be within a range of 1 Rayl-1000 Rayl to enable the acoustic gauze to absorb the acoustic waves of the first acoustic wave and/or the second acoustic wave in the second frequency range. In some embodiments, the acoustic resistance of the acoustic gauze may be within a range of 5 Rayl-800 Rayl. In some embodiments, the acoustic resistance of the acoustic gauze may be within a range of 10 Rayl-700 Rayl.

In some embodiments, the resistance-type acoustic absorbing structure may be provided anywhere along transmission routes of the first acoustic wave and/or the second acoustic wave. For example, the porous acoustic absorbing material or the acoustic gauze may be affixed to an inner wall of the acoustic transmission structure. As another example, the porous acoustic absorbing material or the acoustic gauze may form at least a portion of the inner wall of the acoustic transmission structure. As another example, the porous acoustic absorbing material or the acoustic gauze may fill at least a portion of the interior of the acoustic transmission structure.

Figure 78A:
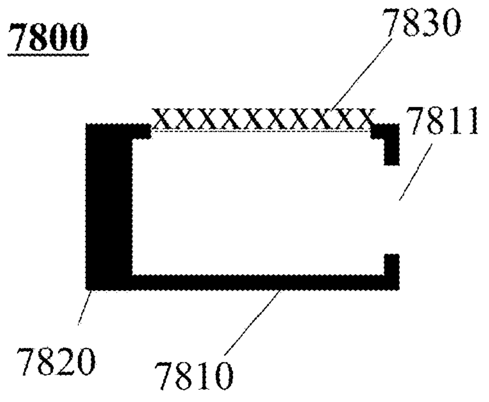
FIGS. 78A-78C are schematic diagrams illustrating resistance-type acoustic absorbing structures according to some embodiments of the present disclosure.
Figure 78B:
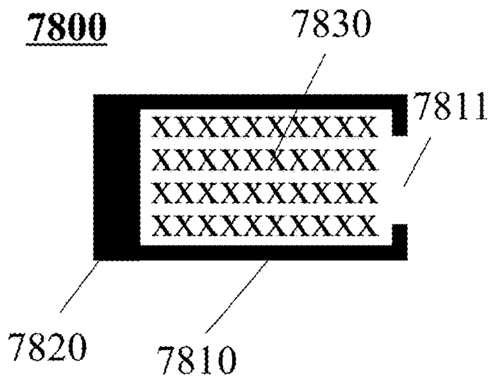
Figure 78C:
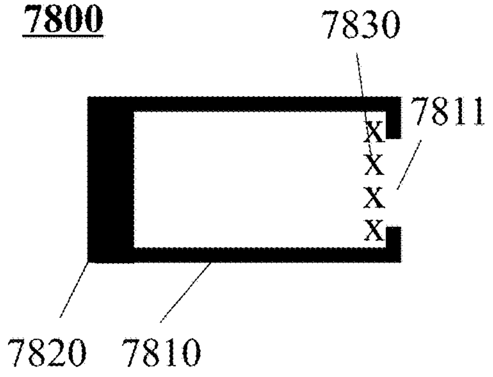

FIG. 78A-78C are schematic diagrams illustrating resistance-type acoustic absorbing structures according to some embodiments of the present disclosure.

In some embodiments, as shown in FIGS. 78A-78C, a headphone 7800 may include a housing 7810 and a loudspeaker 7820. The housing 7810 may be provided with a sound guiding hole 7811 that is acoustically connected to the loudspeaker 7820, and acoustic waves generated by the loudspeaker 7820 may be radiated through the sound guiding hole 7811 to the outside of the headphone 7800. The housing 7810 and the sound guiding hole 7811 may serve as an acoustic transmission structure of the headphone 7800 for transmitting the acoustic waves generated by the loudspeaker 7820 to a spatial point. The resistance-type acoustic absorbing structure 7830 (e.g., a porous acoustic absorbing material or an acoustic gauze) may form at least a portion of an inner wall of the acoustic transmission structure. For example, as shown in FIG. 78A, the inner wall of the housing 7810 may include a resistance-type acoustic absorbing structure 7830 (e.g., a porous acoustic absorbing material or acoustic gauze). The acoustic waves emitted by the loudspeaker 7820 may be absorbed by the resistance-type acoustic absorbing structure 7830 in the target frequency range when the acoustic waves emitted by the loudspeaker 7820 pass through the acoustic transmission structure. In some embodiments, a frequency greater than or equal to the resonant frequency of the acoustic transmission structure may be included in the target frequency range. Thus, the acoustic waves may be prevented from resonating under an action of the acoustic transmission structure, reducing or preventing the acoustic waves greater than or equal to the resonant frequency from being output from the sound guiding hole 7811. In some embodiments, the resistance-type acoustic absorbing structure 7830 may also be affixed to one or more surfaces of the inner wall of the acoustic transmission structure. For example, the resistance-type acoustic absorbing structure 7830 may be affixed to any one or more surfaces of the inner wall on the housing 7810.

In some embodiments, the resistance-type acoustic absorbing structure 7830 may fill at least a portion of the interior of the acoustic transmission structure. For example, as shown in FIG. 78B, the resistance-type acoustic absorbing structure 7830 may completely fill the interior of the housing 7810. Acoustic waves emitted by the loudspeaker 7820 in a target frequency range may be absorbed by the resistance-type acoustic absorbing structure 7830. In some embodiments, the resistance-type acoustic absorbing structure 7830 may also not completely fill the interior of the housing 7810.

In some embodiments, the resistance-type acoustic absorbing structure 7830 may also be affixed near one or more sound guiding holes in the acoustic transmission structure. For example, as shown in FIG. 78C, the resistance-type acoustic absorbing structure 7830 may be affixed to an inner wall on the housing 7810 where the sound guiding hole 7811 is located, and the sound guiding hole 7811 may be covered by the resistance-type acoustic absorbing structure 7830. The acoustic waves in the target frequency range emitted by the loudspeaker 7820 may be absorbed by the resistance-type acoustic absorbing structure 7830. In some embodiments, the resistance-type acoustic absorbing structure 7830 may also be affixed to an outer wall of the housing 7810 and cover the sound guiding hole 7811.

The impedance-type acoustic absorbing structure may refer to a structure that absorbs sound utilizing resonance. In some embodiments, when the frequency of the acoustic wave passing through the impedance-type acoustic absorbing structure is close to the resonant frequency of the impedance-type acoustic absorbing structure, the air within the impedance-type acoustic absorbing structure may resonate and dissipate the energy, achieving an acoustic absorption effect. In some embodiments, the frequency of the acoustic wave absorbed by the impedance-type acoustic absorbing structure may be the same or close to the resonant frequency. For example, the resonant frequency of the impedance-type acoustic absorbing structure may be 3 kHz, and the impedance-type acoustic absorbing structure may absorb acoustic waves at a frequency of 3 kHz, or in a frequency range near 3 kHz. Merely by way of example, the frequency range near 3 kHz may include a frequency range corresponding to an amplitude of ±3 dB on both sides of a resonance peak at 3 kHz on the frequency response curve of the impedance-type acoustic absorbing structure. In such cases, the resonant frequency of the impedance-type acoustic absorbing structure may be adjusted so that the impedance-type acoustic absorbing structure may absorb the acoustic waves in the target frequency range. For example, the adjustment of the resonant frequency may be realized by adjusting the structure, the material, or the like of the impedance-type acoustic absorbing structure.

In some embodiments, the impedance-type acoustic absorbing structure may absorb acoustic waves at a single frequency or may absorb sound at a plurality of frequencies. The single frequency or plurality of frequencies may be within the target frequency range. For example, a single-frequency acoustic wave may be absorbed by an impedance-type acoustic absorbing structure. As another example, a plurality of impedance-type acoustic absorbing structures may be configured to absorb a single-frequency acoustic wave. As another example, a plurality of different frequencies of acoustic waves may be absorbed by a plurality of impedance-type acoustic absorbing structures. In some embodiments, the impedance-type acoustic absorbing structures may include but are not limited to, perforated plates, microperforated plates, thin plates, thin membranes, ¼ wavelength resonance pipes, or the like, or any combination thereof. Merely by way of example, a plurality of exemplary impedance-type acoustic absorbing structures are provided below for illustrating specific embodiments of the impedance-type acoustic absorbing structure in detail.

In some embodiments, the impedance-type acoustic absorbing structure may include a perforated plate structure. The perforated plate structure may include one or more holes and one or more cavities. The one or more cavities may be acoustically connected to the interior of the acoustic transmission structure through the one or more holes. Acoustic waves in the interior of the acoustic transmission structure may enter the one or more cavities of the perforated plate structure through the one or more holes and cause a resonance of the perforated plate structure at a specific frequency, thereby enabling the perforated plate structure to achieve an acoustic absorption effect. In some embodiments, the perforated plate structure may absorb acoustic waves of a frequency near the resonant frequency.

FIGS. 79A-79D are schematic diagrams illustrating perforated plate structures according to some embodiments of the present disclosure. In some embodiments, as shown in FIG. 79A-FIG. 79D, the perforated plate structure 7940 may include one or more holes 7941 and one or more cavities 7942. In some embodiments, the one or more holes 7941 may be provided on an inner wall of an acoustic transmission structure (e.g., a housing 7910) such that the one or more cavities 7942 may be acoustically connected to the interior of the acoustic transmission structure (e.g., the cavity body 7912 of the housing 7910) via the one or more holes 7941. In some embodiments, the one or more cavities 7942 may include a Helmholtz resonant cavity. In some embodiments, the resonant frequency of the perforated plate structure 7940 may include a frequency in a target frequency range. When acoustic waves in the target frequency range enter the cavity 7942 from the cavity body 7912, the cavity 7942 may resonate, thereby realizing an acoustic absorption effect.

In some embodiments, the resonant frequency of the perforated plate structure 7940 may be related to parameters of the perforated plate structure 7940, such as the volume of the cavity 7942, the depth of the hole 7941, and the area of the opening of the hole 7941, etc. In some embodiments, a correspondence between the resonant frequency of the perforated plate structure 7940 and the parameters of the perforated plate structure 7940 may be shown in equation (8):

$$f = \frac{c}{2\pi}\sqrt{\frac{S}{V(t+\delta)}}, \quad (8)$$

where c denotes a sound speed, S denotes the area of the opening of the hole 7941, V denotes the volume of the cavity 7942, t denotes the depth of the hole 7941, and δ denotes a correction amount of the opening end of the hole 7941. In some embodiments, the resonant frequency of the perforated plate structure 7940 may be adjusted by adjusting the parameters of the area of the opening of the hole 7941, the volume of the cavity 7942, the depth of the hole 7941, and the correction amount of the opening end of the hole 7941, etc., thereby adjusting the frequency of the acoustic waves absorbed by the perforated plate structure 7940.

Merely by way of example, in some embodiments, the resonant frequency of the perforated plate structure 7940 may be adjusted by adjusting the diameter of the hole 7941 to control the area of the opening of the hole 7941. In some embodiments, to make the resonant frequency of the perforated plate structure 7940 near the target frequency range and absorb acoustic waves in the target frequency range, the diameter of the hole 7941 may be within a range of 1 mm-10 mm, and correspondingly, the area of the opening of the hole 7941 may be within a range of 0.7 $mm^2$-80 $mm^2$. In some embodiments, the diameter of the hole 7941 may be within a range of 1 mm-8 mm, and correspondingly, the area of the opening of the hole 7941 may be within a range of 0.7 $mm^2$-50 $mm^2$. In some embodiments, the diameter of the hole 7941 may be within a range of 2 mm-6 mm, and correspondingly, the area of the opening of the hole 7941 may be within a range of 3 $mm^2$-30 $mm^2$. In some embodiments, the perforated plate structure 7940 may further include a microperforated plate structure. The microperforated plate structure may refer to a specialized perforated plate structure with relatively small holes. In some embodiments, when the perforated plate structure 7940 is a microperforated plate structure, the diameter of the hole 7941 may be less than 5 mm. In some embodiments, the diameter of the hole 7941 may be less than 3 mm. In some embodiments, the diameter of the hole 7941 may be less than 1 mm. In some embodiments, the diameter of the hole 7941 may be less than 0.5 mm.

Figure 79A:
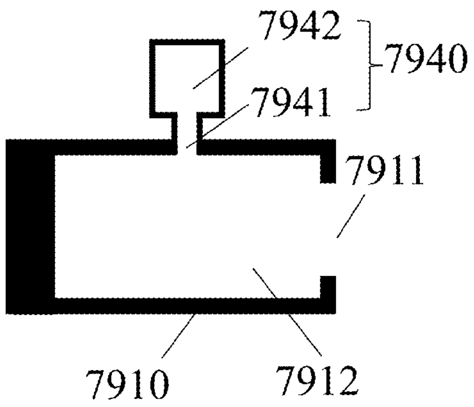
FIGS. 79A-79D are schematic diagrams illustrating perforated plate structures according to some embodiments of the present disclosure.
Figure 79B:
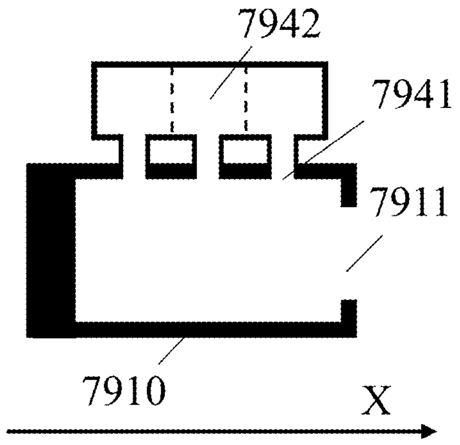

In some embodiments, the one or more cavities 7942 may be configured in a plurality of manners. In some embodiments, as shown in FIG. 79A, the perforated plate structure 7940 may include a hole 7941 and a cavity 7942, which may be connected to the cavity body 7914 through the hole 7941. In some embodiments, as shown in FIG. 79B, the perforated plate structure 7940 may include a plurality of holes 7941 and a plurality of cavities 7942. The plurality of cavities 7942 may be provided side by side along an extension direction of the acoustic transmission structure (e.g., in an X direction shown in FIG. 79B). In some embodiments, one or more of the cavities 7942 shown in FIG. 79B may have the same or similar resonant frequency, such that the perforated plate structure 7940 may absorb acoustic waves having frequencies near the resonant frequency. In some embodiments, when the plurality of cavities 7942 may have the same or similar resonant frequency, the sound absorbing amount of the perforated plate structure 7940 may be related to a count of the cavities 7942. For example, the greater the count of the cavities 7942 with the same resonant frequency, the greater the sound absorbing amount of the perforated plate structure 7940. Conversely, the less the count of the cavities 7942 with the same resonant frequency, the smaller the sound absorbing amount of the perforated plate structure 7940. In some embodiments, a perforation rate of the perforated plate structure 7940 may be increased to increase the sound absorbing amount of the perforated plate structure 7940. In some embodiments, a plate structure that is perforated (e.g., a perforated portion of the housing 7910) in the perforated plate structure 7940 may be referred to as a perforated plate. The perforation rate may refer to a ratio of the area of the plurality of holes 7941 in the perforated plate to the total area of the perforated plate. In some embodiments, the perforation rate should not be too high in order to ensure the stability of the perforated plate. In some embodiments, the perforation rate corresponding to the perforated plate structure 7940 may be within a range of 1%-90%. In some embodiments, the perforation rate corresponding to the perforated plate structure 7940 may be within a range of 5%-80%. In some embodiments, the perforation rate corresponding to the perforated plate structure 7940 may be within a range of 20%-70%. In some embodiments, the perforation rate corresponding to the perforated plate structure 7940 may be within a range of 40%-60%. In some embodiments, at least two of the one or more cavities 7942 may have different resonant frequencies. For example, a resonant frequency of a portion of the one or more cavities 7942 may be equal to a resonant frequency of the acoustic transmission structure, and a resonant frequency of a portion of the cavities 7942 may be greater than the resonant frequency of the acoustic transmission structure. In some embodiments, by providing a plurality of cavities 7942 with different resonant frequencies in a plurality of cavities 7942, the perforated plate structure 7940 may absorb acoustic waves in a plurality of frequencies or a plurality of frequency ranges, which may increase a sound absorbing bandwidth of the perforated plate structure 7940.

In some embodiments, when the plurality of cavities 7942 are provided side by side along the extension direction of the acoustic transmission structure, at least two of the one or more cavities 7942 may be provided independently or may be in flow communication. For example, as shown in FIG. 79B, two adjacent cavities 7942 of the plurality of cavities 7942 may be separated from each other by a sidewall of the cavity body 7942 (as shown by dashed lines in FIG. 79B). As another example, two adjacent cavities 7942 of the plurality of cavities 7942 may exclude the sidewall of the cavity body, such that the two adjacent cavities 7942 may be in flow communication.

Figure 79C:
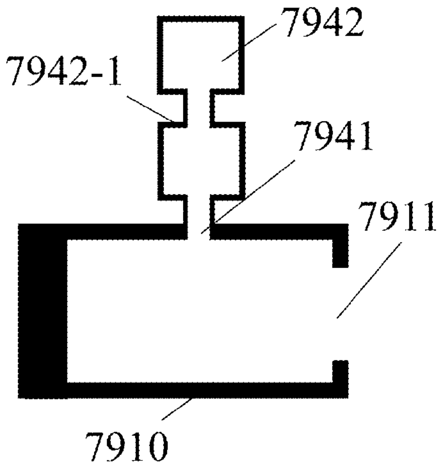

In some embodiments, as shown in FIG. 79C, the perforated plate structure 7940 may include a plurality of cavities 7942, and the plurality of cavities 7942 may be acoustically connected to the interior of the acoustic transmission structure (e.g., the housing 7910) via the hole 7941. In some embodiments, the plurality of cavities 7942 may be provided in series. For example, as shown in FIG. 79C, one cavity 7942 may be acoustically connected to a bottom wall 7942-1 or a side wall of another cavity 7942 through a corresponding hole. In some embodiments, the plurality of cavities 7942 provided in series may have the same or different resonant frequencies. In some embodiments, when the plurality of cavities 7942 provided in series have the same or similar resonant frequency, the sound absorbing amount of the perforated plate structure 7940 may be related to the count of the cavities 7942. For example, the greater the count of the cavities 7942 with the same resonant frequency provided in series, the greater the sound absorbing amount of the perforated plate structure 7940. In some embodiments, when a plurality of cavities 7942 provided in series have different resonant frequencies, the perforated plate structure 7940 may absorb the acoustic waves at a plurality of frequencies or frequency ranges, which may increase the sound absorbing bandwidth of the perforated plate structure 7940.

In some embodiments, the plurality of cavities 7942 may also be provided both in series and side by side. For example, a portion of the plurality of cavities 7942 may be provided in series and a portion of the cavities 7942 may be provided side by side.

Figure 79D:
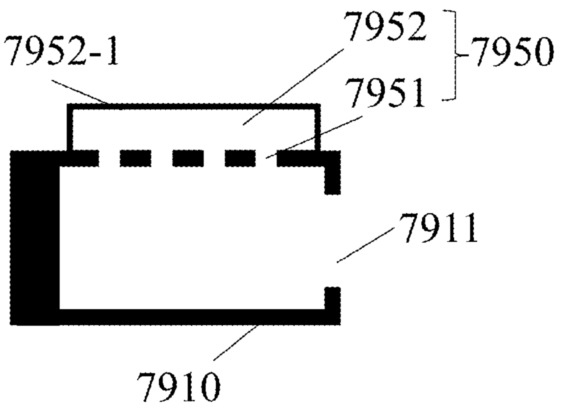

In some embodiments, the perforated plate structure 7940 may further include a microperforated plate structure. The microperforated plate structure may refer to a specialized perforated plate structure with relatively small holes. For example, the microperforated plate structure may include one or more micro holes with smaller apertures and one or more cavities, and the one or more cavities may be acoustically connected to the interior of the acoustic transmission structure. Merely by way of example, as shown in FIG. 79D, the microperforated plate structure 7950 may include a plurality of micro holes 7951 and cavities 7952. The cavities 7952 may be regarded as a plurality of interconnected cavities. In some embodiments, the microperforated plate structure 7950 may be suitable for the acoustic transmission structure with a relatively smaller cavity body compared to the above-described perforated plate structure.

In the embodiments of the present disclosure, when the acoustic wave passes through the micro holes 7951 and enters the cavity 7952, the acoustic resistance of the acoustic wave when it passes through the micro holes 7951 may be increased due to the small diameter of the micro holes 7951, which may enhance the sound absorbing effect of the microperforated plate structure 7950. In some embodiments, the diameter of the micro holes 7951 may be less than 5 mm. In some embodiments, the diameter of the micro holes 7951 may be less than 3 mm. In some embodiments, the diameter of the micro holes 7951 may be less than 1 mm. In some embodiments, the diameter of the micro holes 7951 may be less than 0.5 mm. In some embodiments, the perforation rate of the microperforated plate structure 4950 may be increased, thereby increasing the sound absorbing amount of the microperforated plate structure 4950. In some embodiments, the perforation rate should not be too high in order to ensure stability of the perforated plate. In some embodiments, the perforation rate corresponding to the microperforated plate structure 7950 may be within a range of 1%-50%. In some embodiments, the perforation rate corresponding to the microperforated plate structure 7950 may be within a range of 1%-30%. In some embodiments, the perforation rate corresponding to the microperforated plate structure 7950 may be within a range of 1%-10%. In some embodiments, the perforation rate corresponding to the microperforated plate structure 7950 may be within a range of 1%-5%.

In some embodiments, a resonant frequency of the microperforated plate structure 7950 may be related to parameters of the microperforated plate structure, such as a depth of the cavity, a relative acoustic mass, or the like. In some embodiments, a correspondence between the resonant frequency of the microperforated plate structure and the parameters of the microperforated plate structure may be as shown in equation (9):

$$f = \frac{1}{2\pi}\sqrt{\left(m + \frac{D}{3c}\right)\left(\frac{D}{c}\right)}, \tag{9}$$

where c denotes a sound speed, m denotes the relative acoustic mass, and D denotes the depth of the cavity (i.e., a distance between the microperforated plate and the bottom wall 7952-1 of the cavity). In some embodiments, the resonant frequency of the microperforated plate structure 7950 may be adjusted by adjusting the parameters, such as the depth of the cavity of the microperforated plate structure or the relative acoustic mass, to adjust a frequency of the acoustic wave absorbed by the microperforated plate structure 7950.

In some embodiments, when the microperforated plate structure 7950 includes a plurality of cavities 7952, the plurality of cavities 7952 may resonate at the same or different frequencies. In some embodiments, at least two of the plurality of cavities 7952 may be provided side by side or in series, or the plurality of cavities 7952 may be provided both in series and side by side. The arrangement of the cavities 7952 in the microperforated plate structure 7950 may be similar to that of the perforated plate structure 7940 described above and may not be described herein.

In some embodiments, the impedance-type acoustic absorbing structure may include a ¼ wavelength resonance pipe structure. The ¼ wavelength resonance pipe structure may refer to an absorption assembly that utilizes a principle of ¼ wavelength resonance. In some embodiments, the ¼ wavelength resonance pipe structure may include a pipe cavity. An acoustic wave that enters the ¼ wavelength resonance pipe structure may be superimposed on itself after being reflected within the pipe cavity. For example, when the acoustic waves entering the ¼ wavelength resonance pipe structure cause the ¼ wavelength resonance pipe structure to resonate, a phase difference may be formed between an incident acoustic wave and a reflected acoustic wave, which may cancel each other, thus achieving a sound absorbing effect.

Figure 79E:
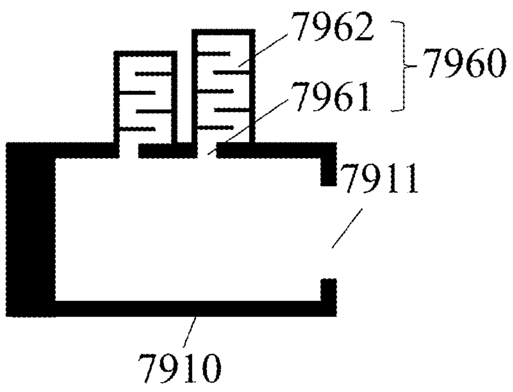
FIG. 79E is a schematic diagram illustrating a ¼ wavelength resonance pipe structure according to some embodiments of the present disclosure.

FIG. 79E is a schematic diagram illustrating a ¼ wavelength resonance pipe structure according to some embodiments of the present disclosure. In some embodiments, as shown in FIG. 79E, a ¼ wavelength resonance pipe structure 7960 may include one or more holes 7961 (or referred to as an opening of a pipe length) and one or more ¼ wavelength resonance pipes 7962. The one or more ¼ wavelength resonance pipes 7962 may be acoustically connected to an interior of an acoustic transmission structure through the one or more holes 7961. In some embodiments, the ¼ wavelength resonance pipe 7962 may be a tubular container, and a pipe length of the ¼ wavelength resonance pipe 7962 may be ¼ of a wavelength of a resonant acoustic wave. The resonant acoustic wave may refer to an acoustic wave that causes the ¼ wavelength resonance pipe 7962 to resonate. In some embodiments, the ¼ wavelength resonance pipe 7962 may be folded and coiled to save space when the ¼ wavelength resonance pipe 7962 is long. For example, as shown in FIG. 79E, the ¼ wavelength resonance pipe 7962 may be folded and coiled a plurality of times to form a labyrinthine structure. The actual equivalent pipe length of the ¼ wavelength resonance pipe 7962 may be the total length of a plurality of folded and coiled pipes.

In some embodiments, a resonant frequency of the ¼ wavelength resonance pipe 7962 may be related to parameters of the ¼ wavelength resonance pipe 7962, such as the pipe length of the ¼ wavelength resonance pipe 7962, a correction amount of the opening end of the pipe length, etc. In some embodiments, a correspondence between the resonant frequency of the ¼ wavelength resonance pipe 7962 and the parameters of the ¼ wavelength resonance pipe 7962 may be shown in equation (10):

$$f = \frac{c}{4(L+\delta)}, \tag{10}$$

where c denotes a sound speed, L denotes the pipe length of the ¼ wavelength resonance pipe 7962, and δ denotes the correction amount of the opening end of the pipe length of the ¼ wavelength resonance pipe 7962. In some embodiments, the resonant frequency of the ¼ wavelength resonance pipe 7962 may be adjusted by adjusting the parameters such as the pipe length of the ¼ wavelength resonance pipe 7962 and the correction amount of the opening end of the pipe length, thereby adjusting the frequency of acoustic waves absorbed by the ¼ wavelength resonance pipe structure 7960.

In some embodiments, the resonant frequencies of the one or more ¼ wavelength resonance pipes 7962 may be the same. Correspondingly, the ¼ wavelength resonance pipe structure 7960 may absorb acoustic waves with frequencies near the resonant frequency. In some embodiments, the sound absorbing amount of the ¼ wavelength resonance pipe structure 7960 may be related to a count of ¼ wavelength resonance pipes 7962 of the same resonant frequency. For example, the greater the count of ¼ wavelength resonance pipes 7962 of the same resonant frequency, the greater the sound absorbing amount of the ¼ wavelength resonance pipe structure 7960 near the resonant frequency.

In some embodiments, the resonant frequencies of at least two of the one or more ¼ wavelength resonance pipes 7962 may be different. In some embodiments, a frequency range in which the resonant frequencies of the plurality of ¼ wavelength resonance pipes 7962 are located may be related to an acoustic absorption bandwidth of the ¼ wavelength resonance pipe structure 7960. For example, the larger the frequency range in which the resonant frequencies of the plurality of ¼ wavelength resonance pipes 7962 reside, the larger the acoustic absorption bandwidth of the ¼ wavelength resonance pipe structure 7960.

In some embodiments, the one or more ¼ wavelength resonance pipes 7962 may be configured in a plurality of manners. In some embodiments, the ¼ wavelength resonance pipe structure 7960 may be provided outside the acoustic transmission structure (e.g., the housing 7910), and at least two of the one or more ¼ wavelength resonance pipes 7962 may be provided side by side along an extension direction of the acoustic transmission structure.

In some embodiments, the ¼ wavelength resonance pipe structure 7960 may be provided in the interior of the acoustic transmission structure around a sound guiding hole 7911. For example, a plurality of ¼ wavelength resonance pipes 7962 may be affixed to an inner wall on the housing 7910 where a sound guiding hole 7911 is located and provided around the sound guiding hole 7911 on the housing 7910. Holes 7961 corresponding to the plurality of ¼ wavelength resonance pipes 7962 may be provided around an edge of the sound guiding hole 7911. More descriptions regarding the ¼ wavelength resonance pipes provided around the sound guiding hole 7911 may be found elsewhere in the present disclosure, for example, FIG. 85A-FIG. 85B and descriptions thereof.

In some embodiments, the acoustic absorbing structure may include a resistance-type acoustic absorbing structure and an impedance-type acoustic absorbing structure. That is to say, both the resistance-type acoustic absorbing structure and the impedance-type acoustic absorbing structure may be provided as a resistance and impedance hybrid acoustic absorbing structure to realize functions of the filtering structure 7730. For example, the resistance and impedance hybrid acoustic absorbing structure may include a perforated plate structure, and a porous acoustic absorbing material or an acoustic gauze. The porous acoustic absorbing material or the acoustic gauze may be provided in a cavity of the perforated plate structure or may be provided in the interior of the acoustic transmission structure. As another example, the resistance and impedance hybrid acoustic absorbing structure may include a ¼ wavelength resonance pipe structure, and a porous acoustic absorbing material or an acoustic gauze. The ¼ wavelength resonance pipe structure may be provided in the interior or an exterior of the acoustic transmission structure. The porous acoustic absorbing material or the acoustic gauze may be provided in the interior of the acoustic transmission structure. As another example, the resistance and impedance hybrid acoustic absorbing structure may include a perforated plate structure, a ¼ wavelength resonance pipe structure, and a porous acoustic absorbing material or an acoustic gauze.

Figure 80:
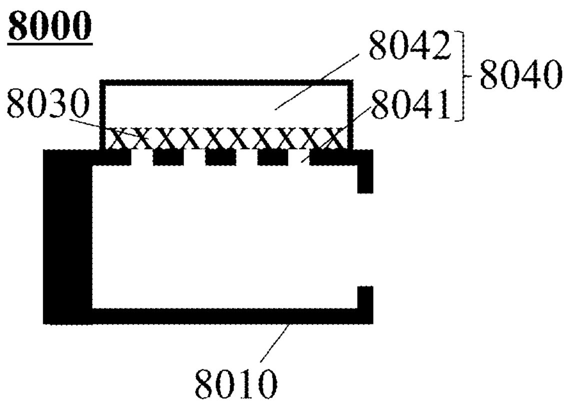
FIG. 80 is a schematic diagram illustrating a resistance and impedance hybrid acoustic absorbing structure according to some embodiments of the present disclosure.

Merely by way of example, an exemplary resistance and impedance hybrid acoustic absorbing structure is provided below to illustrate in detail a specific realization of the resistance and impedance hybrid acoustic absorbing structure. FIG. 80 is a schematic diagram illustrating a resistance and impedance hybrid acoustic absorbing structure according to some embodiments of the present disclosure.

In some embodiments, as shown in FIG. 80, the acoustic transmission structure (e.g., a housing 8010) of a headphone 8000 may include a perforated plate structure 8040 and an impedance-type acoustic absorbing structure 8030. The resistance-type acoustic absorbing structure 8030 may include a porous acoustic absorbing material and/or an acoustic gauze. In some embodiments, as shown in FIG. 80, the resistance-type acoustic absorbing structure 8031 may be provided around openings of one or more holes 8041 of the perforated plate structure 8040. In some embodiments, by providing the resistance and impedance hybrid acoustic absorbing structure as shown in FIG. 80, not only may the sound be absorbed by the resonance of the resistance-type acoustic absorbing structure, but also frictional dissipation of the acoustic wave may be increased by the resistance-type acoustic absorbing structure. Furthermore, the sound absorbing bandwidth may be improved, and the sound leakage reduction effect of the headphone 8000 may be improved within a target frequency range.

It should be noted that, the resistance and impedance hybrid acoustic absorbing structure shown in FIG. 80 is for exemplary illustration only and is not a limitation of the present disclosure. In some embodiments, the resistance and impedance hybrid acoustic absorbing structure 8031 may be affixed to an inner wall of a cavity 8042 of the perforated plate structure 8040. In some embodiments, the resistance-type acoustic absorbing structure 8031 may fill at least a portion of the cavity 8042. In some embodiments, as shown in FIGS. 78A-78C, the resistance-type acoustic absorbing structure 8031 may also be provided within the housing 8010 or as a portion of the housing 8010.

Figure 81:
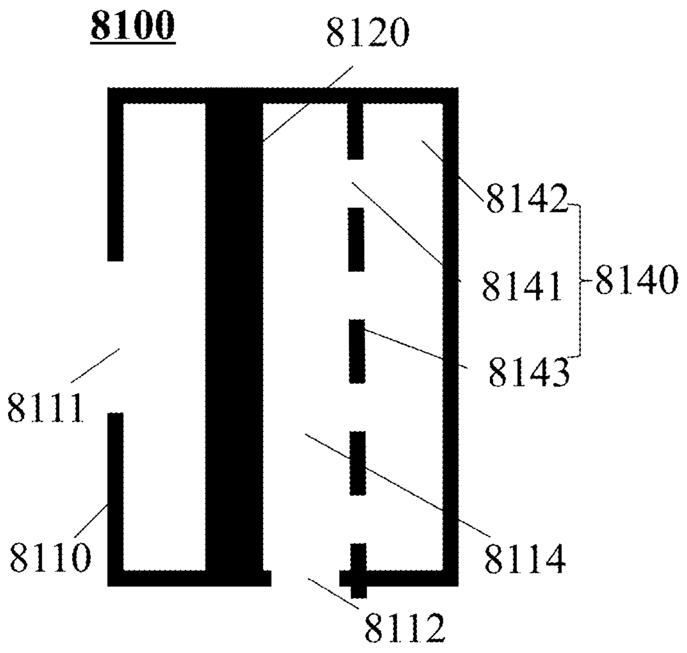
FIG. 81 is a schematic diagram illustrating a headphone provided with a filtering structure according to some embodiments of the present disclosure.

Three exemplary headphones are provided below for describing in detail the specific implementation of the filtering structure. FIG. 81 is a schematic diagram illustrating a headphone provided with a filtering structure according to some embodiments of the present disclosure.

As shown in FIG. 81, the headphone 8100 may include a housing 8110 and a loudspeaker 8120. The housing 8110 between a first sound guiding hole 8111 and the loudspeaker 8120 may serve as a first acoustic transmission structure, and the housing 8110 between a second sound guiding hole 8112 and the diaphragm 8120 may serve as a second acoustic transmission structure. In some embodiments, the first sound guiding hole 8111 may face the opening of the ear canal of the user. A sound path distance from the second sound guiding hole 8112 to the opening of the ear canal may be greater than a sound path distance from the first sound guiding hole 8111 to the opening of the ear canal. Compared to the headphone 7500, the headphone 8100 provided by the embodiments of the present disclosure may be provided with a microperforated plate structure 8140 in the second acoustic transmission structure. For example, a microperforated plate 8143 may be provided in the cavity body 8114 of the second acoustic transmission structure. The microperforated plate 8143 may be provided in parallel with a diaphragm, and both ends of the microperforated plate may be connected to a sidewall of the second acoustic transmission structure. The microperforated plate 8143 may form a cavity 8142 of the microperforated plate structure 8140 in conjunction with the housing 8110.

In some embodiments, parameters of the microperforated plate structure 8140 may be configured such that the resonant frequency of the microperforated plate structure 8140 may be near the resonant frequency of the second acoustic transmission structure. Merely by way of example, diameters of micro holes 8141 may be within a range of 0.3 mm-0.5 mm, perforation rate may be within a range of 0.5%-3%, an arrangement distance of the micro holes 8141 may be within a range 2.5 mm-4.5 mm, depths of the micro holes 8141 may be within a range 0.5 mm-1 mm, and a depth of the cavity 8142 may be about 1 mm. The arrangement distance may refer to a distance between same positions (e.g., a center of a circle) of two adjacent micro holes 8141. Correspondingly, a resonant frequency of the microperforated plate structure 8140 may be in a frequency band within a range of 2700 Hz-8800 Hz.

Figure 82A:
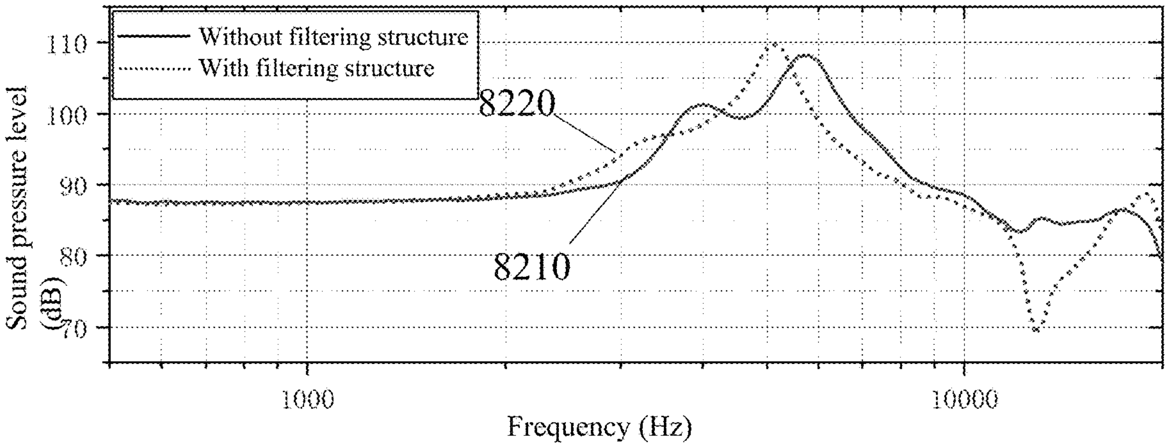
FIG. 82A is a schematic diagram illustrating exemplary frequency response curves of a first guiding hole of the headphone illustrated in FIG. 81 with and without a filtering structure.
Figure 82B:
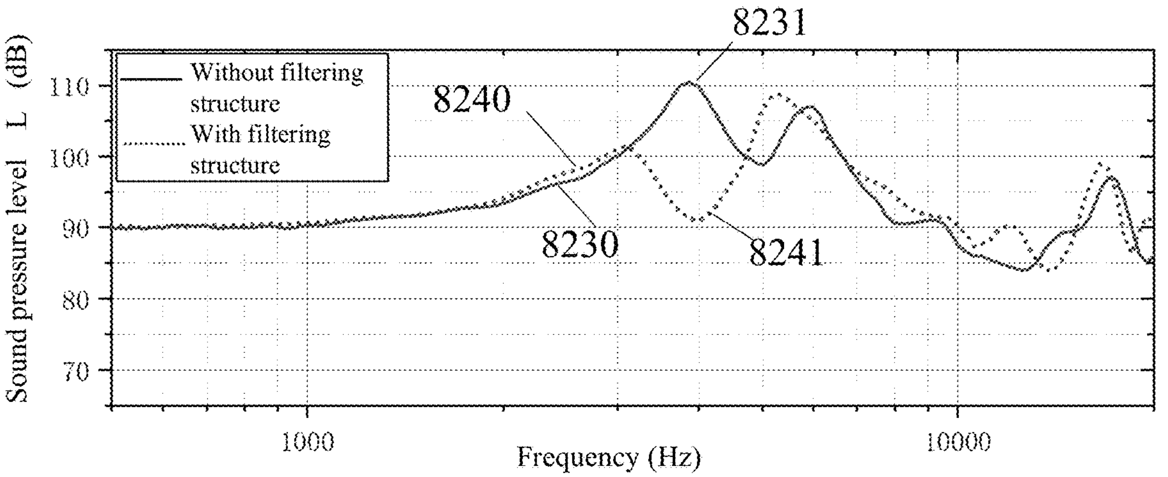
FIG. 82B is a schematic diagram illustrating exemplary frequency response curves at a second guiding hole of the headphone illustrated in FIG. 81 with and without a filtering structure.

FIG. 82A is a schematic diagram illustrating exemplary frequency response curves of a first guiding hole of the headphone illustrated in FIG. 81 with and without a filtering structure. FIG. 82B is a schematic diagram illustrating exemplary frequency response curves of a second guiding hole of the headphone illustrated in FIG. 81 with and without a filtering structure. As shown in FIG. 82A, curve 8210 represents a frequency response curve of a first sound guiding hole 8111 of the headphone 8100 when a microperforated plate structure 8140 is not provided in a second acoustic transmission structure, and curve 8220 represents a frequency response curve of the first sound guiding hole 8111 of the headphone 8100 when the microperforated plate structure 8140 is provided in the second acoustic transmission structure. As shown in FIG. 82B, curve 8230 represents a frequency response curve at the second sound guiding hole 8112 of the headphone 8100 when the microperforated plate structure 8140 is not provided in the second acoustic transmission structure, and curve 8240 represents a frequency response curve at the second sound guiding hole 8112 of the headphone 8100 when the microperforated plate structure 8140 is provided in the second acoustic transmission structure. In some embodiments, the frequency response curves measured at the first sound guiding hole 8111 and the second sound guiding hole 8112 may represent the frequency response curves of the first acoustic transmission structure and the second acoustic transmission structure, respectively.

As shown in FIGS. 82A and 82B, when the microperforated plate structure 8140 is not provided in the second acoustic transmission structure, the curve 8230 has a resonance peak 8231 near 4 kHz, i.e., the second acoustic transmission structure resonates at a frequency near 4 kHz. According to the embodiments described herein, when the second acoustic transmission structure resonates, the phase and/or amplitude of the acoustic waves transmitted therein may change. At this time, the acoustic waves radiated by the second sound guiding hole 8112, which dominates the sound leakage reduction, may not interfere with and cancel the acoustic waves radiated by the first sound guiding hole 8111 at a spatial point (e.g., a far field), making it difficult to realize the sound leakage reduction function. In addition, when the acoustic waves transmitted in the second acoustic transmission structure are greater than or equal to 4 kHz, the acoustic waves radiated by the second sound guiding hole 8112 may also increase the sound leakage at the spatial point. Thus, the acoustic waves greater than or equal to 4 kHz radiated by the second sound guiding hole 8112 at the acoustic wave should be eliminated or reduced.

Further in combination with the curve 8240, when the microperforated plate structure 8140 is provided in the second acoustic transmission structure, the resonance peak 8231 of the curve 8230 near 4 kHz may become a valley 8241 on the curve 8240. In such cases, the microperforated plate structure 8140 may effectively reduce the acoustic waves that have a frequency near the resonant frequency of the second acoustic transmission structure output at the second sound guiding hole 8112. Further combining the curves 8210 and 8220, when the microperforated plate structure 8140 is provided in the second acoustic transmission structure, the frequency response curve of the acoustic wave radiated by the first sound guiding hole 8111 may be slightly altered, and the resonant frequency of the first acoustic transmission structure may be slightly reduced, but may not be significantly changed. That is, when the microperforated plate structure 8140 is provided in the second acoustic transmission structure, the amplitude of the acoustic wave near 4 kHz radiated from the first sound guiding hole 8111 may vary slightly, which does not substantially affect the acoustic wave transmitted from the first sound guiding hole 8111 to the opening of the ear canal. However, the amplitude of the acoustic wave near 4 kHz radiated from the second sound guiding hole 8112 may decrease, which may reduce the amplitude of the acoustic wave near 4 kHz at the spatial point (e.g., the far field), thereby reducing sound leakage at the spatial point.

According to FIGS. 82A and 82B and the descriptions thereof, a filtering structure may be provided in the second acoustic transmission structure to reduce the amplitude of acoustic wave at the spatial point (e.g., the far field) near the resonant frequency of the second acoustic transmission structure, while substantially not affecting a volume of a heard sound at the opening of the ear canal. In some embodiments, the resonant frequency of the ear canal may be within a range of 3 kHz-4 kHz. That is, the ear of the user may be more sensitive to sounds near the frequency of 3 kHz-4 kHz. As a result, sound leakage in the far field in the frequency range of 3 kHz-4 kHz may be reduced by setting a sound absorbing frequency of the filtering structure in the second acoustic transmission structure. Therefore, the leaked sound heard by other users may be significantly reduced, which ensures that the headphone 8100 has a better far-field sound leakage reduction effect.

It should be noted that the headphone 8100 described in FIGS. 81, 82A, and 82B are only exemplary illustrations and do not limit the application scenarios in which the filtering structure may be used. In some embodiments, the filtering structure may be provided in the first acoustic transmission structure to absorb acoustic waves of the acoustic waves transmitted by the first acoustic transmission structure in the target frequency range, thereby reducing the amplitude of the acoustic waves in the target frequency range at a near-field spatial point (e.g., the opening of the ear canal). In some embodiments, the filtering structure may also be provided in both the first acoustic transmission structure and the second acoustic transmission structure, so that acoustic waves transmitted by the first acoustic transmission structure and the second acoustic transmission structure may be absorbed simultaneously, thereby reducing the amplitude of the acoustic waves in the target frequency range at an arbitrary spatial point. In some embodiments, the acoustic absorption frequency of the filtering structure may include frequencies greater than 4 kHz, thereby allowing for the absorption of acoustic waves of higher frequencies.

Figure 83:
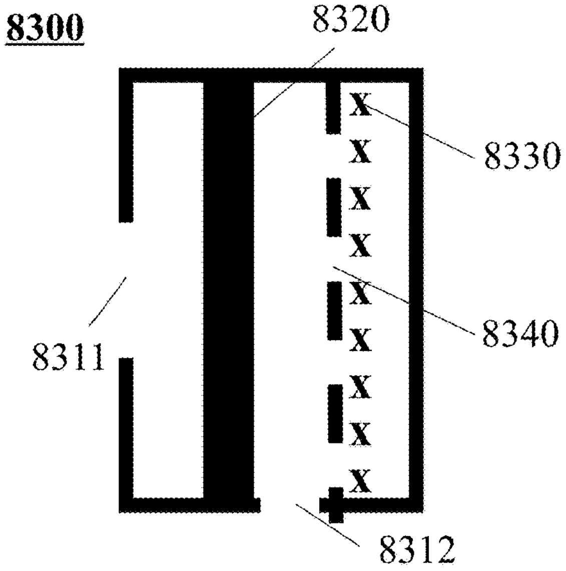
FIG. 83 is a schematic diagram illustrating a headphone provided with a filtering structure according to some embodiments of the present disclosure.

FIG. 83 is a schematic diagram illustrating a headphone provided with a filtering structure according to some embodiments of the present disclosure.

As shown in FIG. 83, compared to the headphone 7500, a headphone 8300 shown in FIG. 83 may be provided with a resistance and impedance hybrid acoustic absorbing structure in a second acoustic transmission structure. The resistance and impedance hybrid acoustic absorbing structure may include a microperforated plate structure 8340 and a resistance-type acoustic absorbing structure 8330. Compared to the above-described headphone 8100, the headphone 8300 provided by the embodiments of the present disclosure may have an additional resistance-type acoustic absorbing structure 8330 at the micro holes of the microperforated plate structure 8340.

In some embodiments, the resistance-type acoustic absorbing structure 8330 may be an acoustic gauze. In some embodiments, an acoustic resistance of the acoustic gauze may be 260 Rayl. The microperforated plate structure 8340 may be similar to the microperforated plate structure 8140 described in FIG. 81 and is not described herein. More description regarding the resistance-type acoustic absorbing structure 8330 may be found in elsewhere the present disclosure, for example, in the above-described FIG. 78A-FIG. 78B and descriptions thereof.

In some embodiments, the microperforated plate structure 8340 may absorb acoustic waves in a target frequency range of acoustic waves emitted by a loudspeaker 8320. Additionally, the acoustic waves emitted by the loudspeaker 8320 may be absorbed by the resistance-type acoustic absorbing structure 8330, which may further reduce the amplitude of the acoustic waves in the target frequency range at the spatial point, thereby further improving the sound leakage reduction effect of the headphone 8300.

Figure 84A:
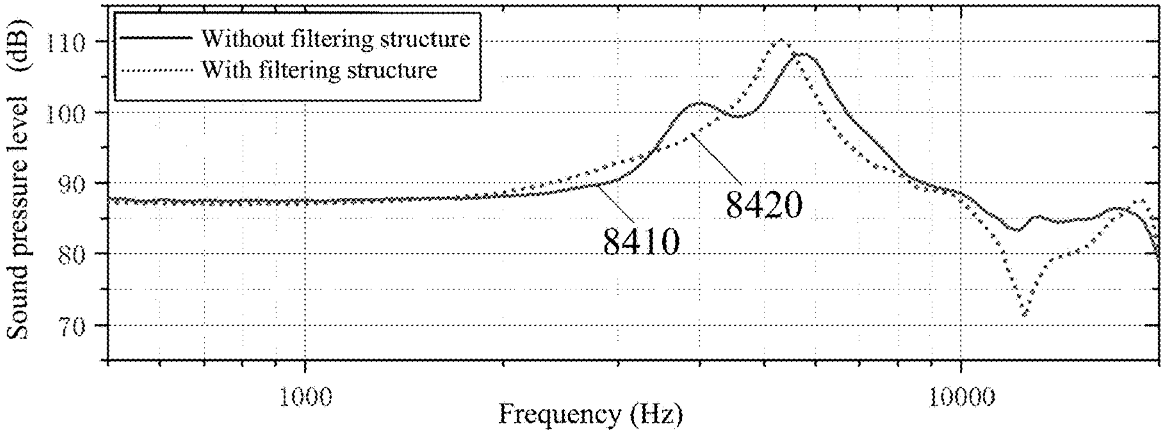
FIG. 84A is a schematic diagram illustrating exemplary frequency response curves of a first guiding hole of the headphone illustrated in FIG. 83 with and without a filtering structure.
Figure 84B:
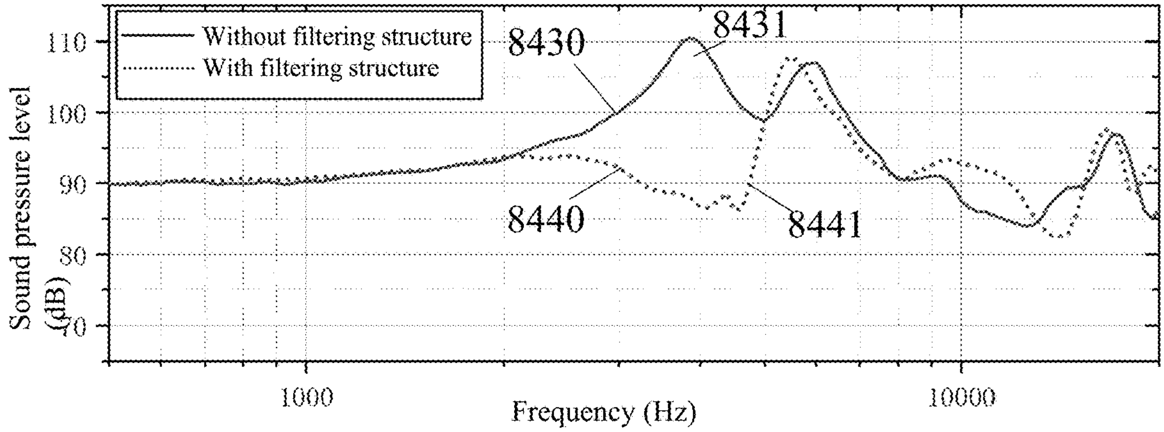
FIG. 84B is a schematic diagram illustrating exemplary frequency response curves at a second guiding hole of the headphone illustrated in FIG. 83 with and without a filtering structure.

FIG. 84A is a schematic diagram illustrating exemplary frequency response curves of a first guiding hole 8311 of the headphone 8300 illustrated in FIG. 83 with and without a filtering structure. FIG. 84B is a schematic diagram illustrating exemplary frequency response curves of a second guiding hole 8312 of the headphone 8300 illustrated in FIG. 83 with and without a filtering structure. As shown in FIG. 84A, curve 8410 represents a frequency response curve of the first sound guiding hole 8311 of the headphone 8300 when the resistance and impedance hybrid acoustic absorbing structure is not provided in the second acoustic transmission structure, and curve 8420 represents a frequency response curve of the first sound guiding hole 8311 of the headphone 8300 when the resistance and impedance hybrid acoustic absorbing structure is provided in the second acoustic transmission structure. As shown in FIG. 84B, the curve 8430 represents the frequency response curve of the headphone 8300 of the second sound guiding hole 8312 when the resistance and impedance hybrid acoustic absorbing structure is not provided in the second acoustic transmission structure, and the curve 8440 represents the frequency response curve of the second sound guiding hole 8312 of the headphone 8300 when the resistance and impedance hybrid sound absorbing structure is provided in the second acoustic transmission structure.

As shown in FIGS. 84A and 84B, when the resistance and impedance hybrid acoustic absorbing structure is not provided in the second acoustic transmission structure, the curve 8430 has a resonance peak 8431 near a frequency of 4 kHz, i.e., the second acoustic transmission structure may resonate near a frequency of 4 kHz. Further in conjunction with curve 8440, when the resistance and impedance hybrid acoustic absorbing structure is provided in the second acoustic transmission structure, the resonance peak 8431 of the curve 8430 near the frequency of 4 kHz changes to a valley 8441 on the curve 8440. Therefore, the resistance and impedance hybrid acoustic absorbing structure may effectively reduce the acoustic wave outputted at the second sound guiding hole 8312 at a frequency near the resonant frequency of the second acoustic transmission structure. Further combining curves 8410 and 8420, when the resistance and impedance hybrid acoustic absorbing structure is provided in the second acoustic transmission structure, the amplitude of the acoustic wave radiated from the first sound guiding hole 8311 near the frequency of 4 kHz may be slightly changed, and the amplitude of the acoustic wave radiated from the second sound guiding hole 8312 near the frequency of 4 kHz may be reduced. Thus, the amplitude of the acoustic wave near the frequency of 4 kHz at the spatial point (e.g., the far field) may be reduced, thereby reducing the sound leakage at that spatial point. In addition, a comparison of curve 8240 with curve 8440 shows that valley 8441 has a lower amplitude than valley 8241, and curve 8440 has a lower amplitude over a wide frequency range (e.g., 2 kHz-4 kHz). In such cases, compared to the headphone 8300 provided with only the microperforated plate structure 8340, the headphone 8300 with the resistance and impedance hybrid acoustic absorbing structure may have a larger sound absorbing amount near the frequency of 4 kHz and a wider acoustic absorption frequency range, thereby further improving the sound leakage reduction effect of the headphone 8300.

Figure 85A:
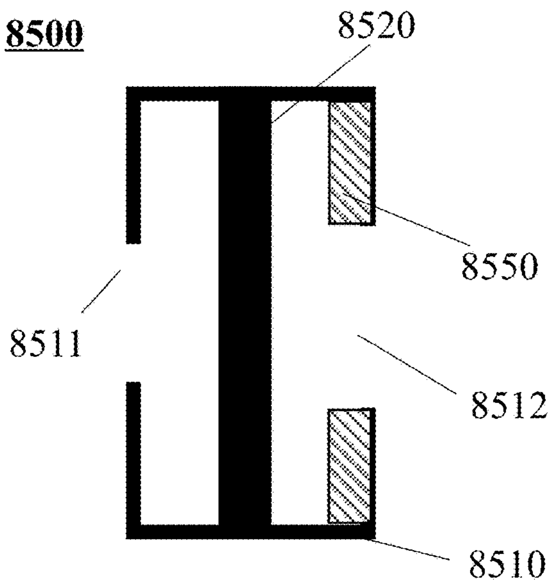
FIG. 85A is a schematic diagram illustrating a headphone provided with a ¼ wavelength resonance pipe structure according to some embodiments of the present disclosure.
Figure 85B:
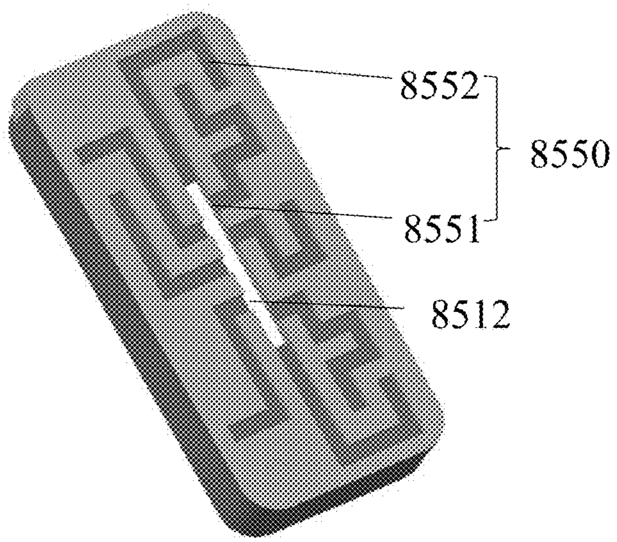
FIG. 85B is a schematic diagram illustrating a three-dimensional structure of a ¼ wavelength resonance pipe structure according to some embodiments of the present disclosure.

FIG. 85A is a schematic diagram illustrating a headphone provided with a ¼ wavelength resonance pipe structure according to some embodiments of the present disclosure. FIG. 85B is a schematic diagram illustrating a three-dimensional structure of a ¼ wavelength resonance pipe structure according to some embodiments of the present disclosure.

As shown in FIG. 85A, a headphone 8500 may be provided with a ¼ wavelength resonance pipe structure 8550 in a second acoustic transmission structure as compared to the headphone 7500. The ¼ wavelength resonance pipe structure 8550 may be affixed to an inner wall where the second sound guiding hole 8512 is provided on the housing 8510, and a plurality of ¼ wavelength resonance pipes 8552 and a plurality of holes 8551 may be provided around an opening of the second sound guiding hole 8512. It should be noted that, since the second sound guiding hole 8512 and the second acoustic transmission structure are not independent of each other and do not have clear boundaries, the ¼ wavelength resonance pipe structure 8550 may be considered to be provided in the second acoustic transmission structure and may also be considered to be provided at the second sound guiding hole 8512. In some embodiments, the ¼ wavelength resonance pipe structure 8550 may absorb acoustic waves of the second acoustic wave emitted from a loudspeaker 8520 in a target frequency range, thereby reducing the amplitude of the acoustic waves in the target frequency range at the spatial point, thereby improving the sound leakage reduction effect of the headphone 8500.

In some embodiments, parameters of the ¼ wavelength resonance pipe structure 8550 may be configured such that a resonant frequency of the ¼ wavelength resonance pipe structure 8550 may be within the target frequency range. For example, the ¼ wavelength resonance pipe 8552 may have a pipe length within a range of 10 mm-22 mm, and the resonant frequency may be within a range of 4 kHz-9 kHz.

Figure 86A:
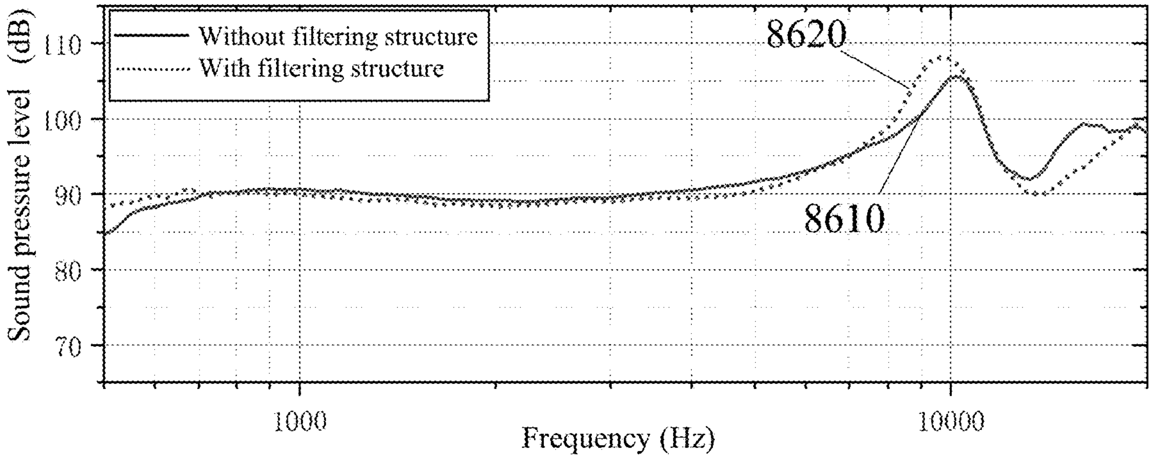
FIG. 86A is a schematic diagram illustrating exemplary frequency response curves at a first sound guiding hole of the headphone illustrated in FIG. 85A with and without a filtering structure.
Figure 86B:
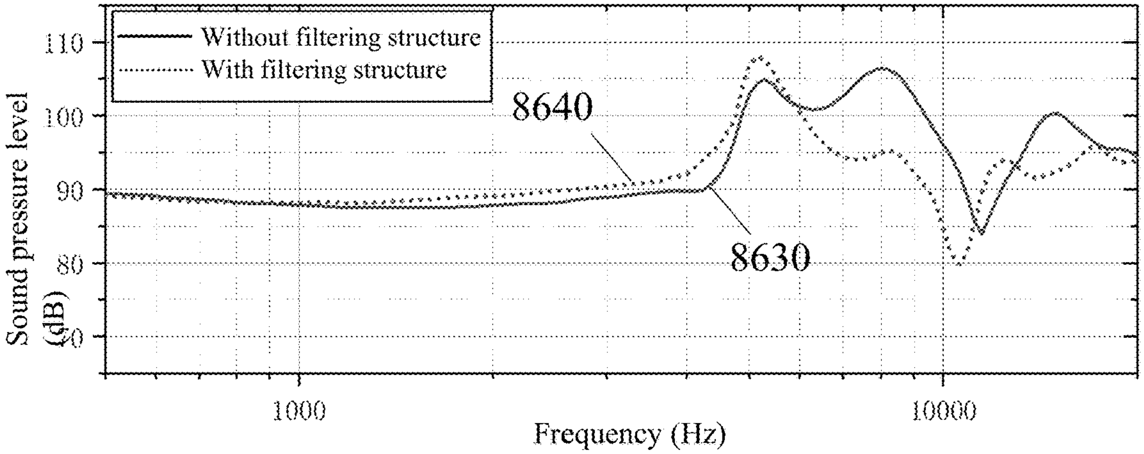
FIG. 86B is a schematic diagram illustrating exemplary frequency response curves at a second sound guiding hole of the headphone illustrated in FIG. 85A with and without a filtering structure.

FIG. 86A is a schematic diagram illustrating exemplary frequency response curves at a first sound guiding hole 8511 of the headphone 8500 illustrated in FIG. 85A with and without a filtering structure. FIG. 86B is a schematic diagram illustrating exemplary frequency response curves at a first sound guiding hole 8512 of the headphone 8500 illustrated in FIG. 85A with and without a filtering structure. As shown in FIG. 86A, curve 8610 represents a frequency response curve of the first sound guiding hole 8511 of the headphone 8500 when the ¼ wavelength resonance pipe structure 8550 is not provided in the second acoustic transmission structure, and curve 8620 represents a frequency response curve of the first sound guiding hole 8511 of the headphone 8500 when the ¼ wavelength resonance pipe structure 8550 is provided in the second acoustic transmission structure. As shown in FIG. 86B, curve 8630 represents a frequency response curve of the second sound guiding hole 8512 of the headphone 8500 when the ¼ wavelength resonance pipe structure 8550 is not provided in the second acoustic transmission structure, and curve 8640 represents a frequency response curve of the second sound guiding hole 8512 of the headphone 8500 when the ¼ wavelength resonance pipe structure 8550 is not provided in the second acoustic transmission structure.

As shown in FIGS. 86A and 86B, in combination with curves 8610 and 8620, the ¼ wavelength resonance pipe structure 8550 provided in the second acoustic transmission structure may cause a slight change in an amplitude of acoustic waves output from the first sound guiding hole 8511 near a specific frequency (e.g., the amplitude near frequencies such as 5 kHz, 10 kHz, etc., may be improved). Further combining curves 8530 and 8540, in such a case, the ¼ wavelength resonance pipe structure 8550, when has little effect on the acoustic waves output from the first sound guiding hole 8511, may cause the amplitude of the acoustic waves output from the second sound guiding hole 8512 to be significantly reduced in a high-frequency band (e.g., in a frequency range of higher than 6 kHz). Therefore, the headphone 8500 may have a better leaked sound reduction effect.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and amendments are intended to be suggested by this disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations, therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A headphone, comprising:

a first acoustic wave generation structure and a second acoustic wave generation structure, wherein the first acoustic wave generation structure and the second acoustic wave generation structure respectively generate a first acoustic wave and a second acoustic wave, the first acoustic wave has a phase difference with the second acoustic wave, and the phase difference is within a range of 120°-240°;

an acoustic transmission structure configured to transmit the first acoustic wave and the second acoustic wave to a spatial point outside the headphone, wherein the first acoustic wave transmitted to the spatial point interferes with the second acoustic wave transmitted to the spatial point in a first frequency range, and the interference reduces an amplitude of the first acoustic wave in the first frequency range; and a filtering structure configured to reduce an amplitude of an acoustic wave generated by the headphone in a second frequency range at the spatial point, wherein the first frequency range is smaller than the second frequency range.

2. The headphone of claim 1, wherein the filtering structure includes an acoustic absorbing structure configured to absorb an acoustic wave of the first acoustic wave and/or the second acoustic wave in the second frequency range.

3. The headphone of claim 2, wherein the acoustic absorbing structure is configured to absorb the acoustic wave of the second acoustic wave generated by the headphone in the second frequency range to reduce an amplitude of the acoustic wave in the second frequency range at the spatial point, wherein a sound path distance from the second acoustic wave generation structure to an opening of an ear canal is greater than a sound path distance from the first acoustic wave generation structure to the opening of the ear canal.

4. The headphone of claim 2, wherein the acoustic transmission structure includes at least a housing and one or more sound guiding holes provided on the housing, and the acoustic absorbing structure includes at least one of a resistance-type acoustic absorbing structure or an impedance-type acoustic absorbing structure.

5. The headphone of claim 4, wherein the resistance-type acoustic absorbing structure includes at least one of a porous acoustic absorbing material or an acoustic gauze, an acoustic absorbing coefficient of the porous acoustic absorbing material in the second frequency range being greater than 0.3, or an acoustic resistance of the acoustic gauze being within a range of 10 Rayl-700 Rayl.

6. The headphone of claim 5, wherein the porous acoustic absorbing material or the acoustic gauze is affixed to an inner wall of the acoustic transmission structure or constitutes at least a portion of an inner wall of the acoustic transmission structure.

7. The headphone of claim 4, wherein the impedance-type acoustic absorbing structure includes a perforated plate structure, wherein the perforated plate structure includes one or more holes and one or more cavities, and the one or more cavities are acoustically connected to an interior of the acoustic transmission structure through the one or more holes.

8. The headphone of claim 7, wherein resonant frequencies of the one or more cavities are the same, or resonant frequencies of at least two of the one or more cavities are different.

9. The headphone of claim 7, wherein at least two of the one or more cavities are provided side by side along an extension direction of the acoustic transmission structure, or at least two of the one or more cavities are provided in series.

10. The headphone of claim 7, wherein at least one of the one or more cavities further includes a resistance-type acoustic absorbing structure, and the resistance-type acoustic absorbing structure includes at least one of a porous acoustic absorbing material or an acoustic gauze.

11. The headphone of claim 7, wherein at least one of the one or more cavities include a Helmholtz resonant cavity, and the perforated plate structure satisfies at least one of:

a diameter of each of the one or more holes being within a range of 1 mm-10 mm, an area of each of the one or more holes being within a range of 0.7 $mm^2$-80 $mm^2$, or a perforation rate of the perforated plate structure being within a range of 5%-80%.

12. The headphone of claim 7, a diameter of each of the one or more holes is less than 1 mm.

13. The headphone of claim 7, wherein a perforation rate of the perforated plate structure is within a range of 1%-5%.

14. The headphone of claim 4, wherein the impedance-type acoustic absorbing structure includes a ¼ wavelength resonance pipe structure, the ¼ wavelength resonance pipe structure includes one or more holes and one or more ¼ wavelength resonance pipes, and the one or more ¼ wavelength resonance pipes are acoustically connected to an interior of the acoustic transmission structure through the one or more holes.

15. The headphone of claim 14, wherein resonant frequencies of the one or more ¼ wavelength resonance pipes are the same, or resonant frequencies of at least two of the one or more ¼ wavelength resonance pipes are different.

16. The headphone of claim 14, wherein the ¼ wavelength resonance pipe structure is provided outside the acoustic transmission structure, and at least two of the one or more ¼ wavelength resonance pipes are provided side by side along an extension direction of the acoustic transmission structure.

17. The headphone of claim 14, wherein the ¼ wavelength resonance pipe structure is provided inside the acoustic transmission structure, wherein the one or more ¼ wavelength resonance pipes are provided around at least one of the one or more sound guiding holes.

18. The headphone of claim 1, wherein the second frequency range is within 1 kHz-10 kHz, and the second frequency range includes a resonant frequency value of the acoustic transmission structure.

19. A headphone, comprising:

a first acoustic wave generation structure;

an acoustic transmission structure configured to transmit a first acoustic wave generated by the first acoustic wave generation structure to a spatial point outside the headphone, wherein the first acoustic wave generates a resonance having a resonant frequency under an action of the acoustic transmission structure; and a filtering structure configured to absorb, in a target frequency range, the first acoustic wave transmitted through the acoustic transmission structure to reduce an amplitude of an acoustic wave generated by the headphone at the spatial point, wherein the target frequency range includes the resonant frequency, wherein the filtering structure includes a perforated plate structure.

20. A headphone, comprising:

a loudspeaker;

a housing, configured to accommodate the loudspeaker, including a first sound guiding hole and a second sound guiding hole acoustically connected with the loudspeaker, respectively, wherein the loudspeaker outputs acoustic waves with a phase difference through the first sound guiding hole and the second sound guiding hole; and a filtering structure, provided in an acoustic transmission structure between the first sound guiding hole or the second sound guiding hole and the housing loudspeaker, configured to absorb an acoustic wave in a target frequency range, wherein the target frequency range is in a range from 1 kHz to 10 kHz, wherein the filtering structure includes a perforated plate structure.

* * * * *